(12) United States Patent
Nathan et al.

(10) Patent No.: US 11,930,322 B2
(45) Date of Patent: *Mar. 12, 2024

(54) CONDITIONING AUDIO SIGNALS INCLUDING OVERLAPPING VOICES

(71) Applicant: Orcam Technologies Ltd., Jerusalem (IL)

(72) Inventors: Roi Nathan, Jerusalem (IL); Yonatan Wexler, Jerusalem (IL); Amnon Shashua, Mevaseret Zion (IL); Tal Rosenwein, Jerusalem (IL); Oren Tadmor, Jerusalem (IL)

(73) Assignee: ORCAM TECHNOLOGIES LTD., Jerusalem (IL)

( * ) Notice: Subject to any disclaimer, the term of this patent is extended or adjusted under 35 U.S.C. 154(b) by 363 days.

This patent is subject to a terminal disclaimer.

(21) Appl. No.: 17/230,680

(22) Filed: Apr. 14, 2021

(65) Prior Publication Data

US 2021/0235208 A1 Jul. 29, 2021

Related U.S. Application Data

(63) Continuation of application No. PCT/IB2019/001132, filed on Oct. 10, 2019.
(Continued)

(51) Int. Cl.
*H04R 25/00* (2006.01)
*G03B 31/00* (2021.01)
(Continued)

(52) U.S. Cl.
CPC .......... *H04R 25/407* (2013.01); *G03B 31/00* (2013.01); *G06F 1/163* (2013.01); *G06F 1/1686* (2013.01);
(Continued)

(58) Field of Classification Search
CPC ........ H04R 25/00; H04R 25/45; H04R 25/60; H04R 25/65; H04R 25/407; H04R 25/554;
(Continued)

(56) References Cited

U.S. PATENT DOCUMENTS 9,516,408 B2 * 12/2016 Zakis ..................... H04R 3/005
11,638,103 B2 * 4/2023 Rosenwein ............. G10L 15/26
381/313

(Continued)

FOREIGN PATENT DOCUMENTS

EP 2472907 A1 7/2012
EP 2887697 A2 6/2015
(Continued)

OTHER PUBLICATIONS

International Search Report and Written Opinion, dated May 29, 2020, issued in corresponding International Application No. PCT/IB2019/001132; 52 pages.

*Primary Examiner* — Suhan Ni
(74) *Attorney, Agent, or Firm* — Finnegan, Henderson, Farabow, Garrett & Dunner, LLP

(57) ABSTRACT

A system may include a wearable camera configured to capture images and a microphone configured to capture sounds. The system may also include a processor programmed to receive audio signals from the microphone and detect, based on analysis of the audio signals, a first audio signal associated with a first time period. The first audio signal may be representative of a voice of a single individual. The processor may also be programmed to detect, based on analysis of the audio signals, a second audio signal associated with a second time period. The second time period may be different from the first time period, and the second audio signal may be representative of overlapping voices of two or more individuals. The processor may
(Continued)

further be programmed to selectively condition the first and second audio signals, and cause transmission of the conditioned first audio signal to a hearing interface device.

20 Claims, 91 Drawing Sheets

Related U.S. Application Data

(60) Provisional application No. 62/857,773, filed on Jun. 5, 2019, provisional application No. 62/808,317, filed on Feb. 21, 2019, provisional application No. 62/746,595, filed on Oct. 17, 2018, provisional application No. 62/745,478, filed on Oct. 15, 2018.

(51) Int. Cl.
| | |
|---|---|
| G06F 1/16 | (2006.01) |
| G06F 3/16 | (2006.01) |
| G06F 18/21 | (2023.01) |
| G06F 18/25 | (2023.01) |
| G06V 10/80 | (2022.01) |
| G06V 20/10 | (2022.01) |
| G06V 40/10 | (2022.01) |
| G06V 40/16 | (2022.01) |
| G06V 40/20 | (2022.01) |
| G10L 15/26 | (2006.01) |
| G10L 17/00 | (2013.01) |
| G10L 17/04 | (2013.01) |
| G10L 17/06 | (2013.01) |
| G10L 17/18 | (2013.01) |
| G10L 21/003 | (2013.01) |
| G10L 21/0272 | (2013.01) |
| G10L 21/034 | (2013.01) |
| G10L 25/51 | (2013.01) |
| H04N 5/38 | (2006.01) |
| H04N 7/18 | (2006.01) |
| H04N 23/51 | (2023.01) |
| H04R 1/08 | (2006.01) |
| G06F 18/00 | (2023.01) |

(52) U.S. Cl.
CPC ............. *G06F 3/165* (2013.01); *G06F 3/167* (2013.01); *G06F 18/21* (2023.01); *G06F 18/251* (2023.01); *G06V 10/803* (2022.01); *G06V 20/10* (2022.01); *G06V 40/10* (2022.01); *G06V 40/16* (2022.01); *G06V 40/165* (2022.01); *G06V 40/171* (2022.01); *G06V 40/172* (2022.01); *G06V 40/20* (2022.01); *G10L 15/26* (2013.01); *G10L 17/00* (2013.01); *G10L 17/04* (2013.01); *G10L 17/06* (2013.01); *G10L 17/18* (2013.01); *G10L 21/003* (2013.01); *G10L 21/0272* (2013.01); *G10L 21/034* (2013.01); *G10L 25/51* (2013.01); *H04N 5/38* (2013.01); *H04N 7/185* (2013.01); *H04N 23/51* (2023.01); *H04R 1/08* (2013.01); *H04R 25/405* (2013.01); *H04R 25/45* (2013.01); *H04R 25/505* (2013.01); *H04R 25/554* (2013.01); *H04R 25/558* (2013.01); *H04R 25/60* (2013.01); *H04R 25/606* (2013.01); *H04R 25/65* (2013.01); *G06F 18/00* (2023.01); *H04R 2225/025* (2013.01); *H04R 2225/41* (2013.01); *H04R 2225/43* (2013.01); *H04R 2225/55* (2013.01); *H04R 2460/01* (2013.01); *H04R 2460/13* (2013.01)

(58) Field of Classification Search
CPC ............... H04R 25/558; H04R 25/606; H04R 2225/025; H04R 2225/41; H04R 2225/43; H04R 2225/55; H04R 2460/01; H04R 2460/13
See application file for complete search history.

(56) References Cited

U.S. PATENT DOCUMENTS

| | | | |
|---|---|---|---|
| 2010/0020951 A1 | 1/2010 | Basart et al. | |
| 2013/0300648 A1 | 11/2013 | Kim et al. | |
| 2014/0006026 A1 | 1/2014 | Lamb et al. | |
| 2014/0153742 A1 | 6/2014 | Hershey et al. | |
| 2015/0016644 A1 | 1/2015 | Strelcyk | |
| 2015/0088500 A1 | 3/2015 | Conliffe | |
| 2015/0341734 A1 | 11/2015 | Sherman | |
| 2017/0230760 A1 | 8/2017 | Sanger et al. | |
| 2018/0048800 A1 | 2/2018 | Wexler et al. | |
| 2018/0262849 A1* | 9/2018 | Farmani | H04R 25/407 |
| 2019/0132685 A1* | 5/2019 | Skoglund | G10L 21/02 |

FOREIGN PATENT DOCUMENTS

| | | |
|---|---|---|
| JP | 2003244669 A | 8/2003 |
| KR | 20170111450 A | 10/2017 |
| WO | 2008083315 A2 | 7/2008 |
| WO | 2012083989 A1 | 6/2012 |
| WO | 2015103578 A1 | 7/2015 |

* cited by examiner

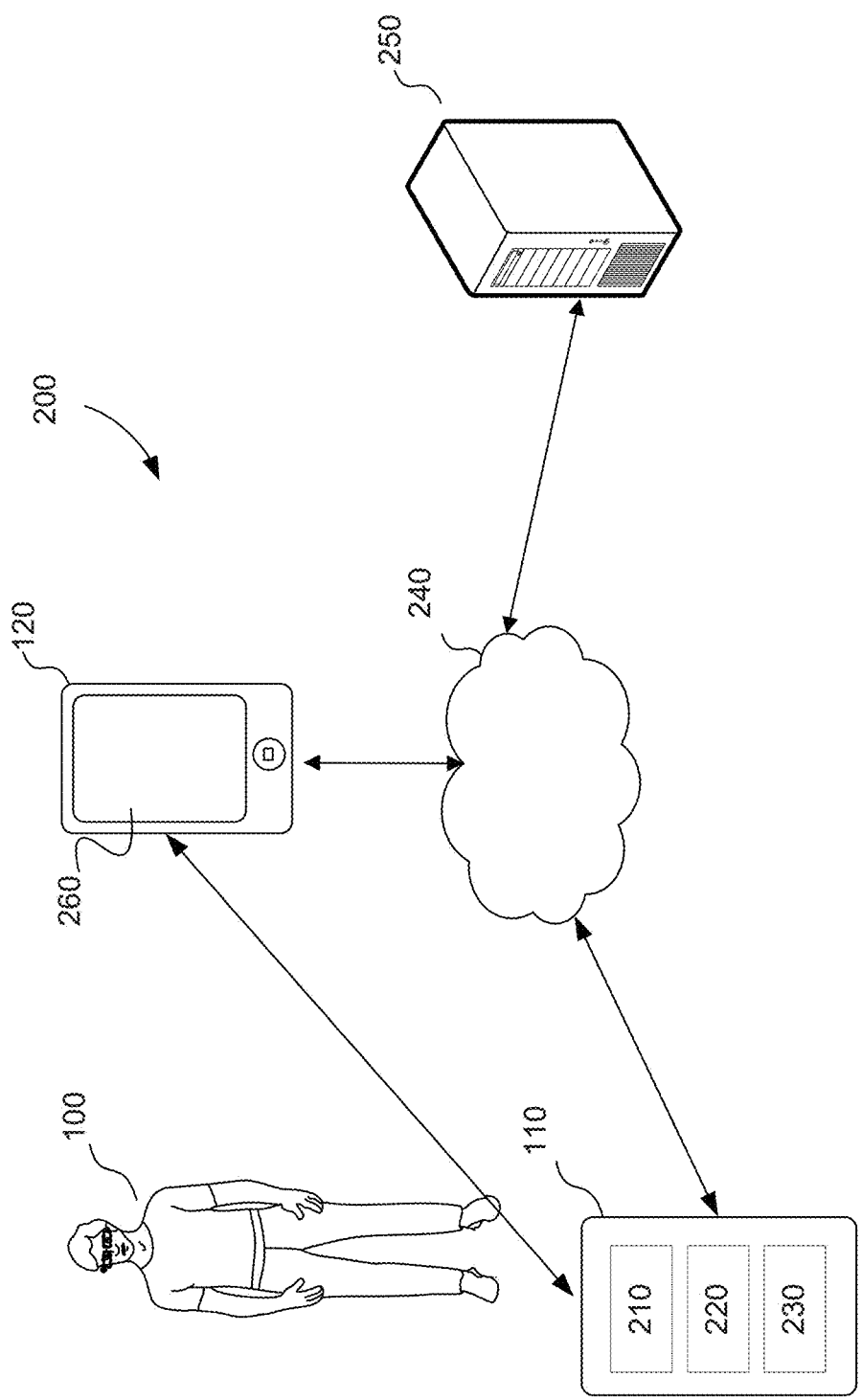

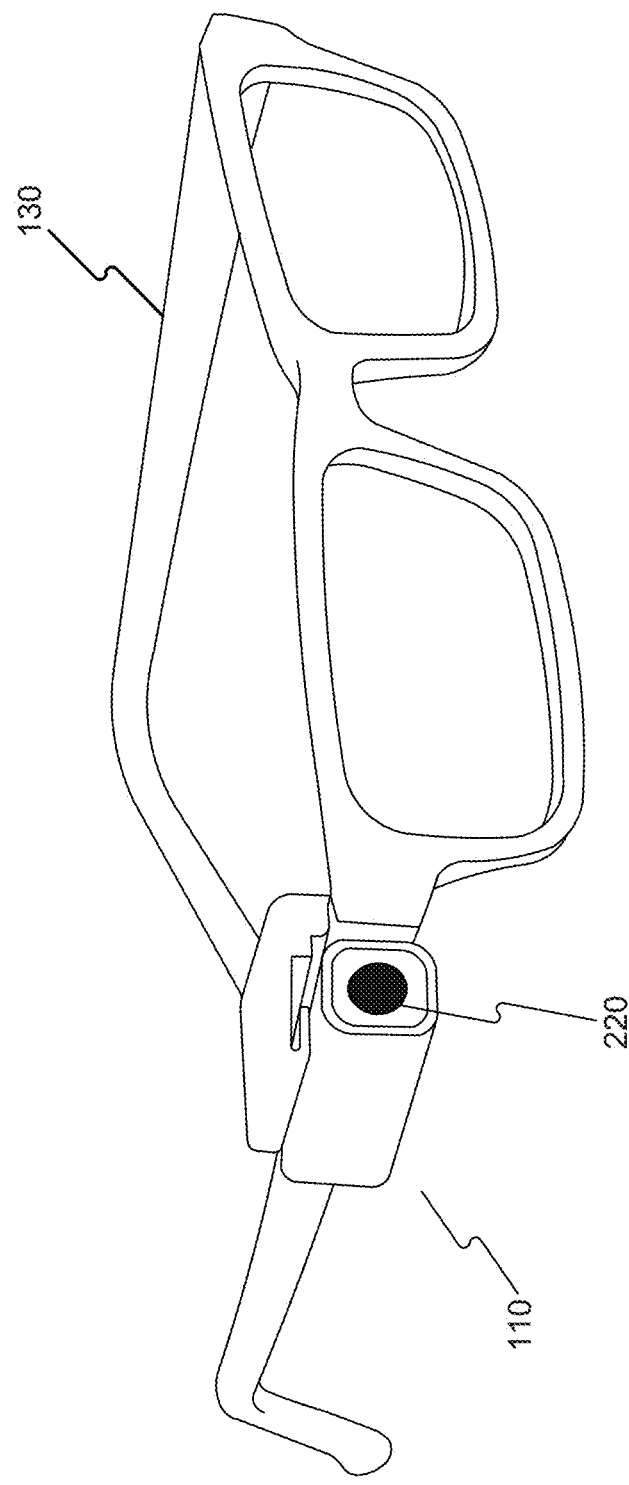

F-View

R-View

S-View

T-View

B-View

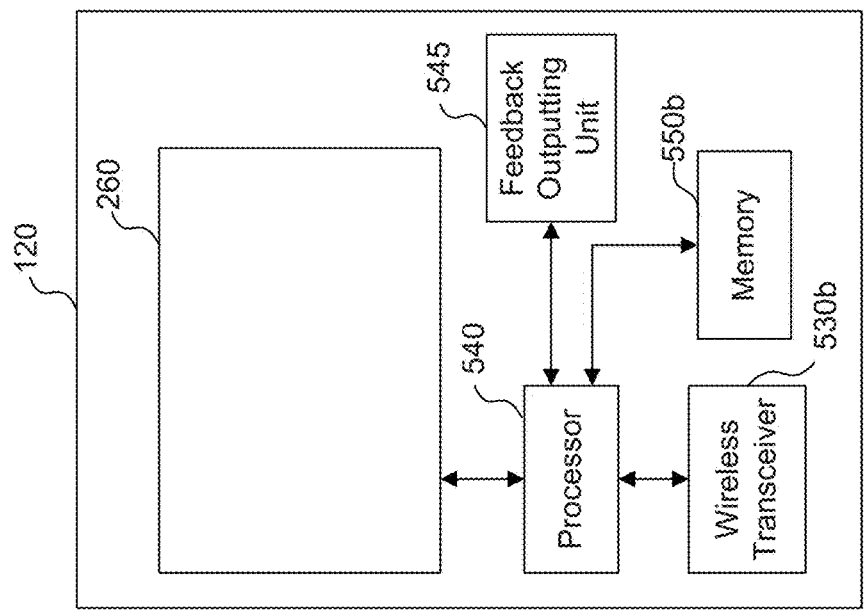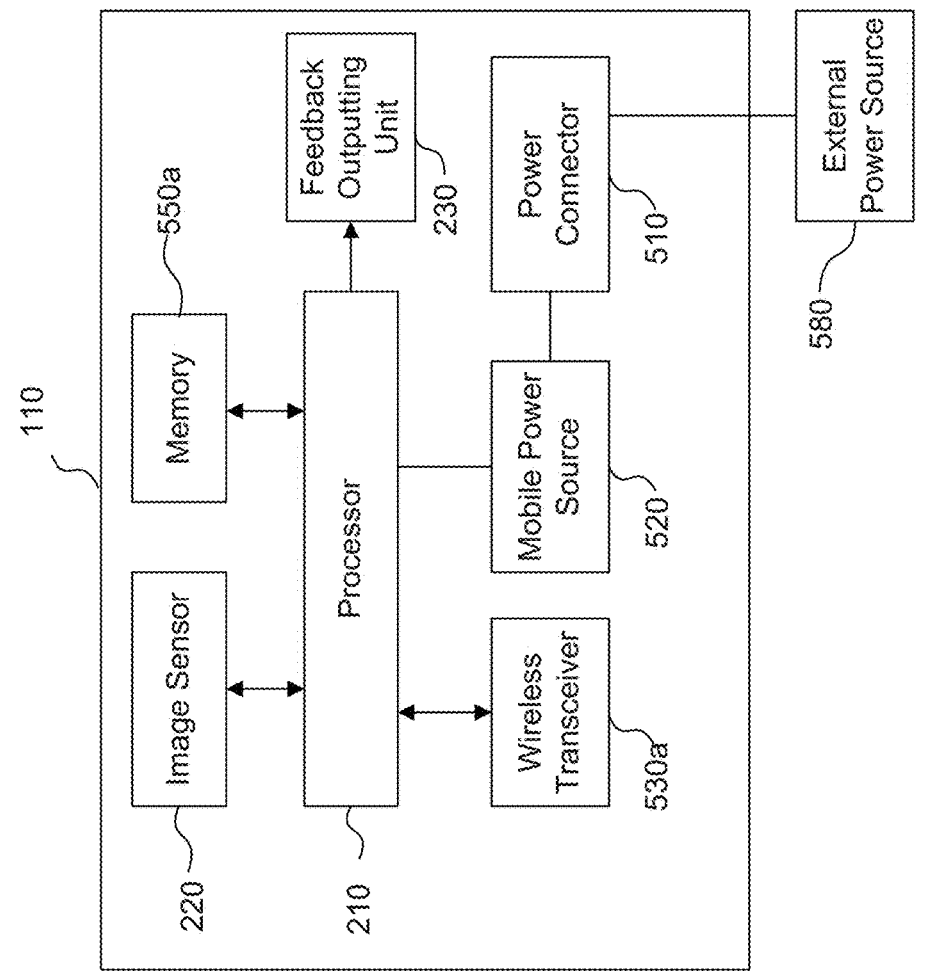
Fig. 5C

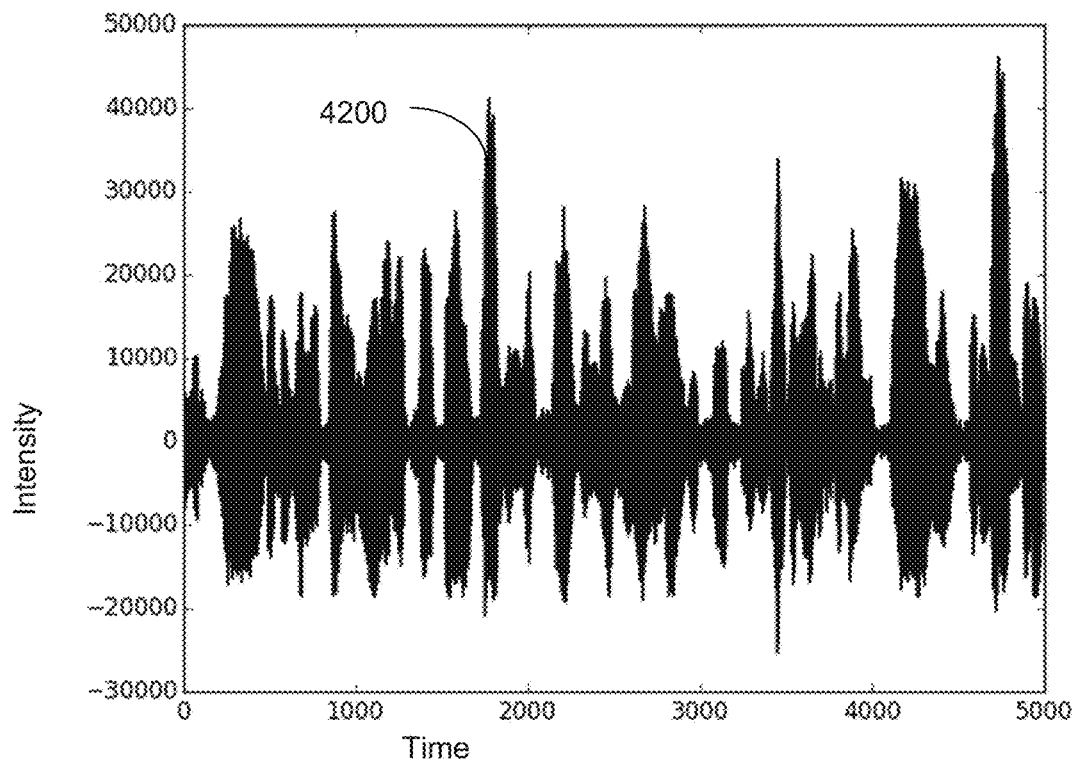
FIG. 42A
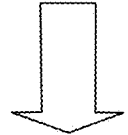
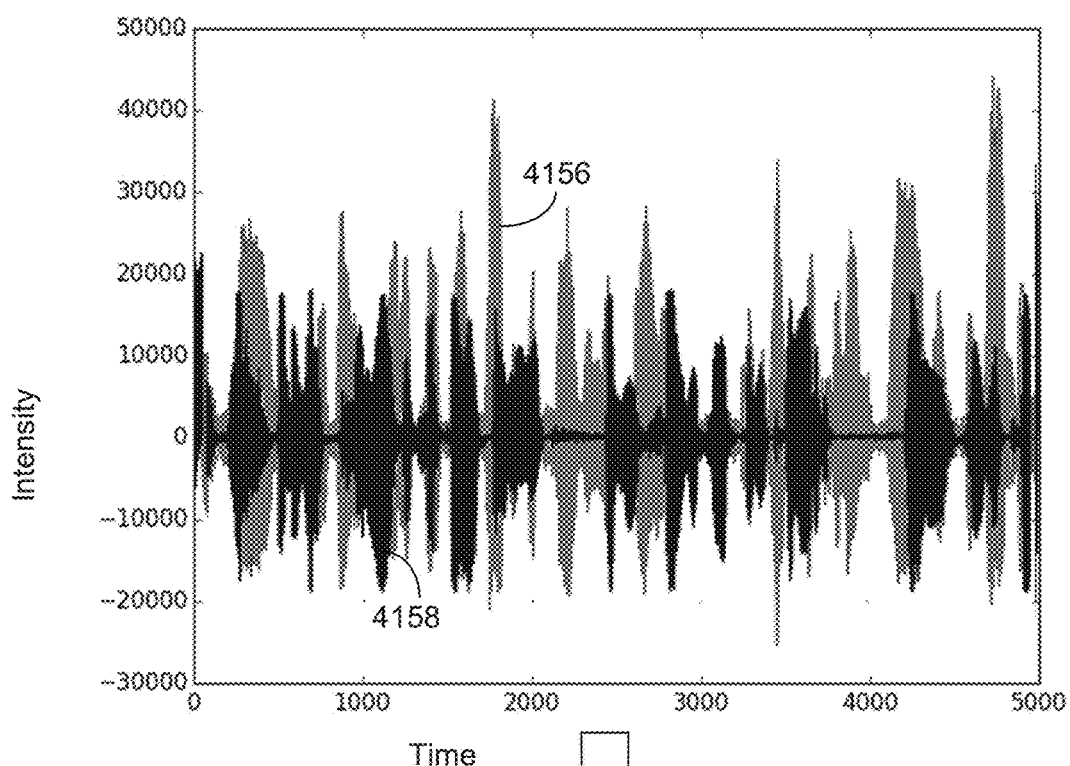
FIG. 42B
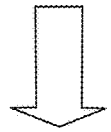

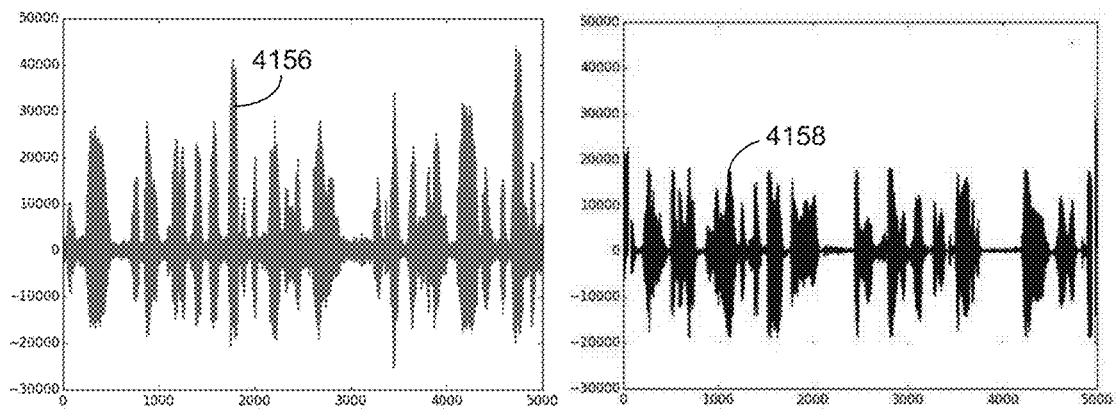
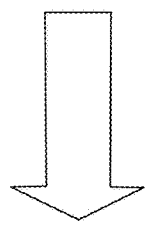 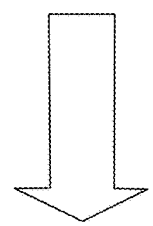
FIG. 42C
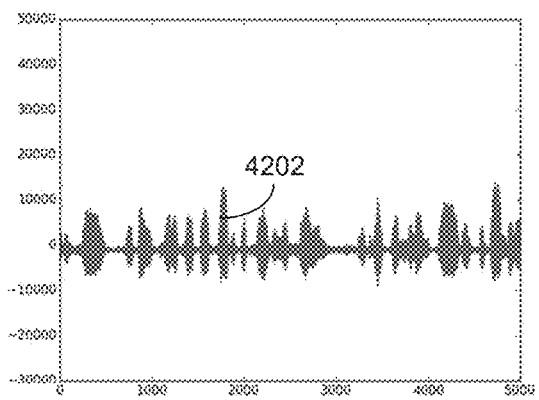 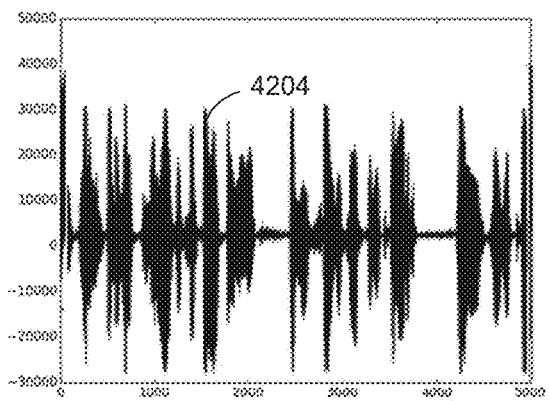
FIG. 42D

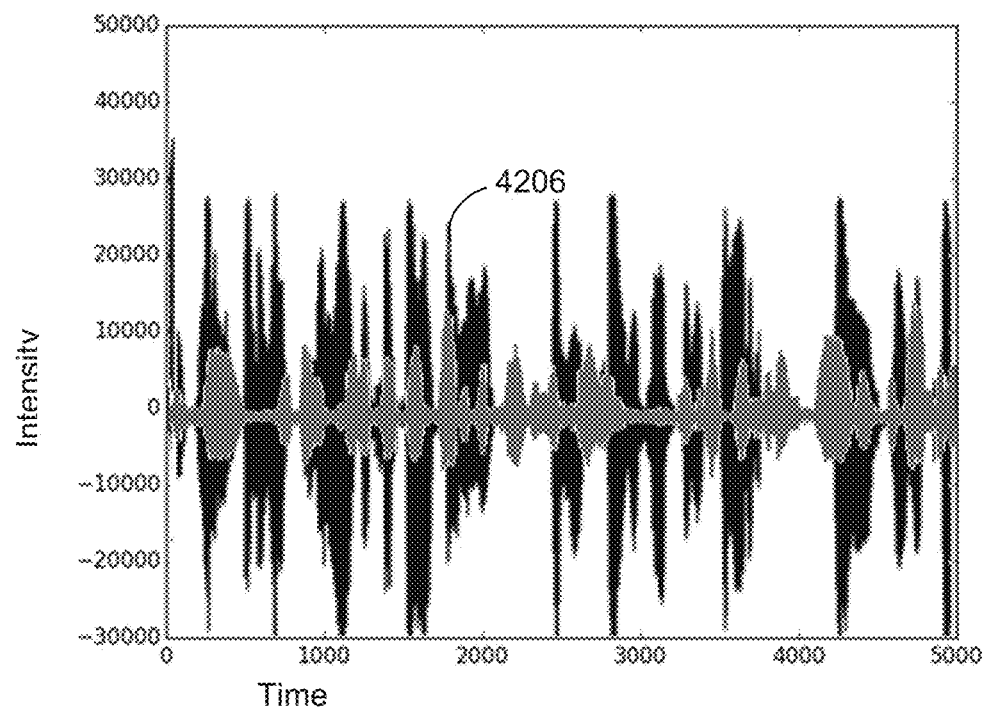
FIG. 42E
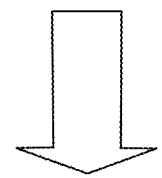
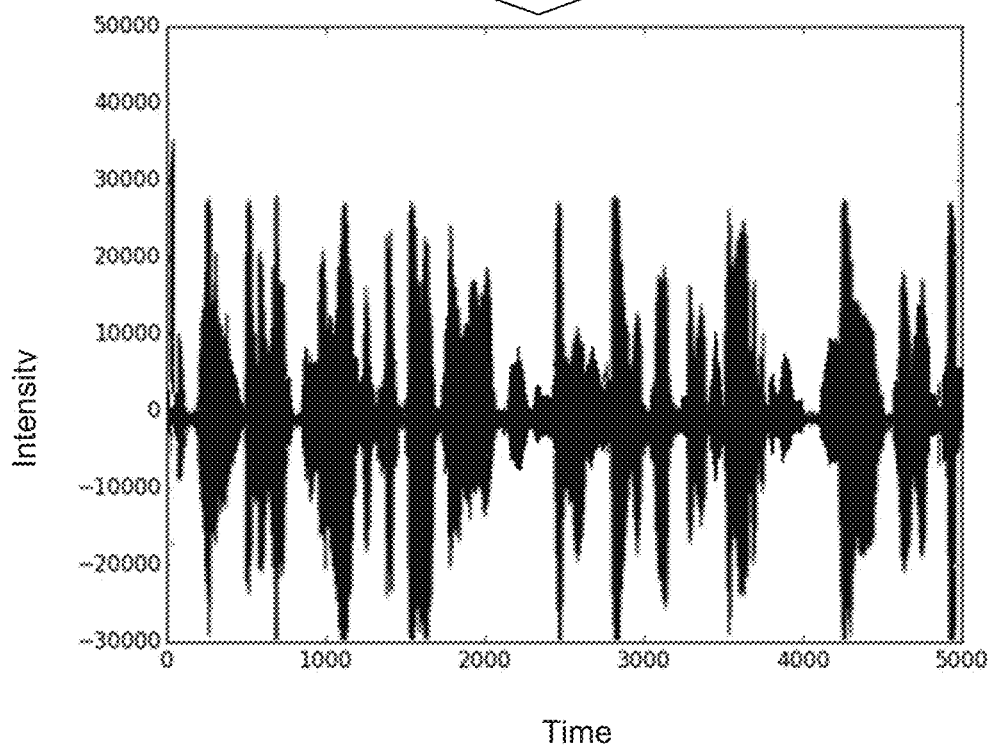
FIG. 42F

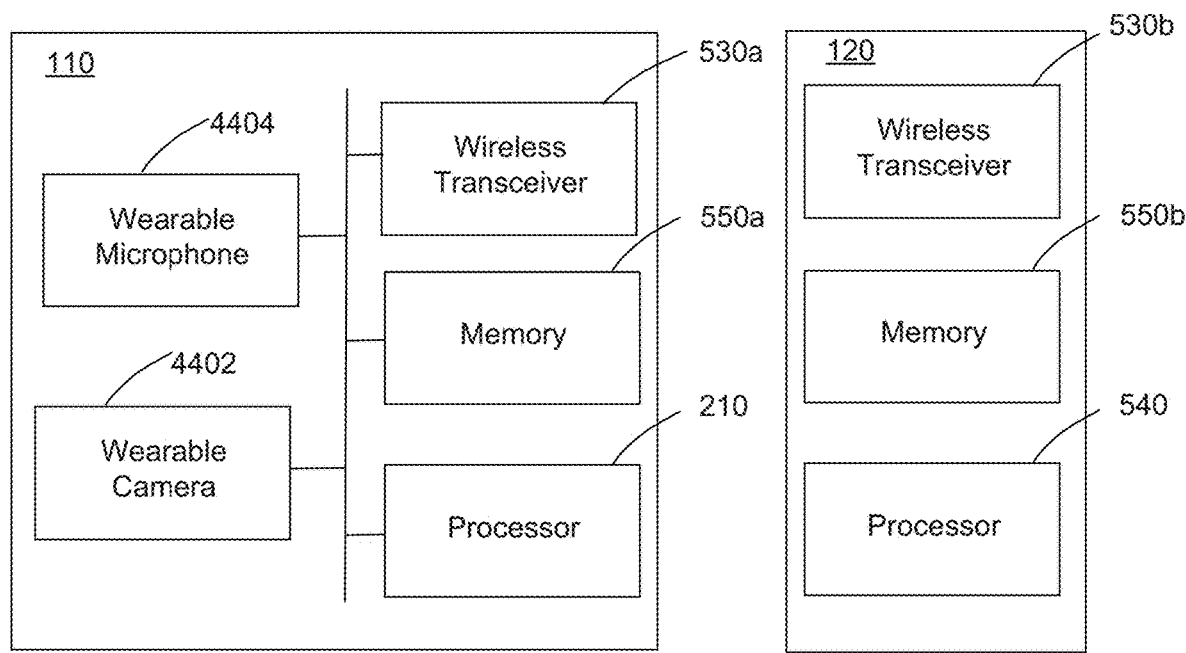
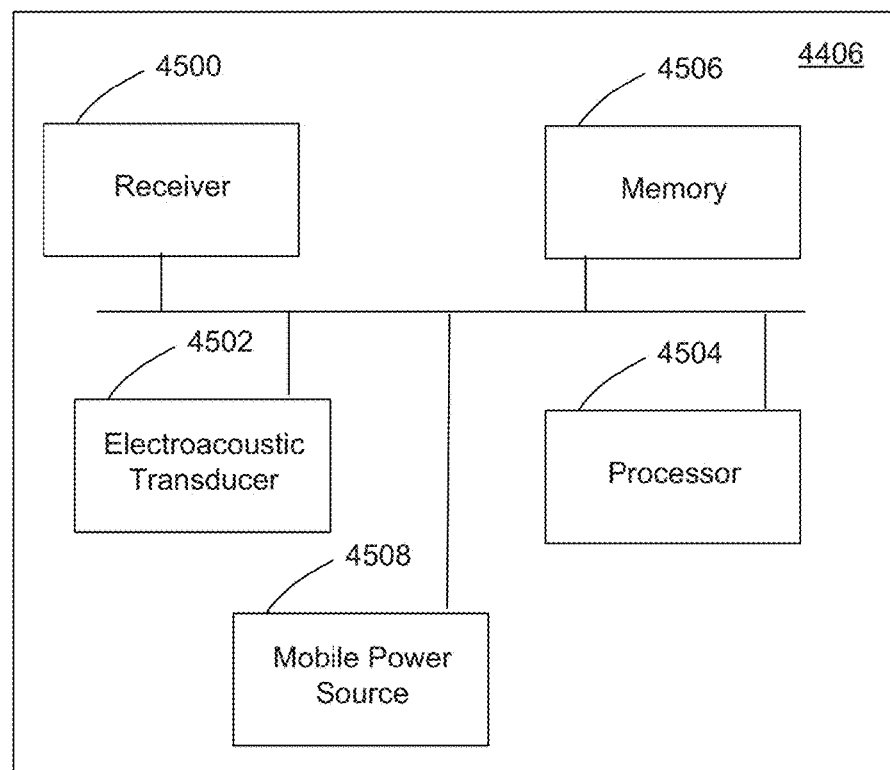
FIG. 45

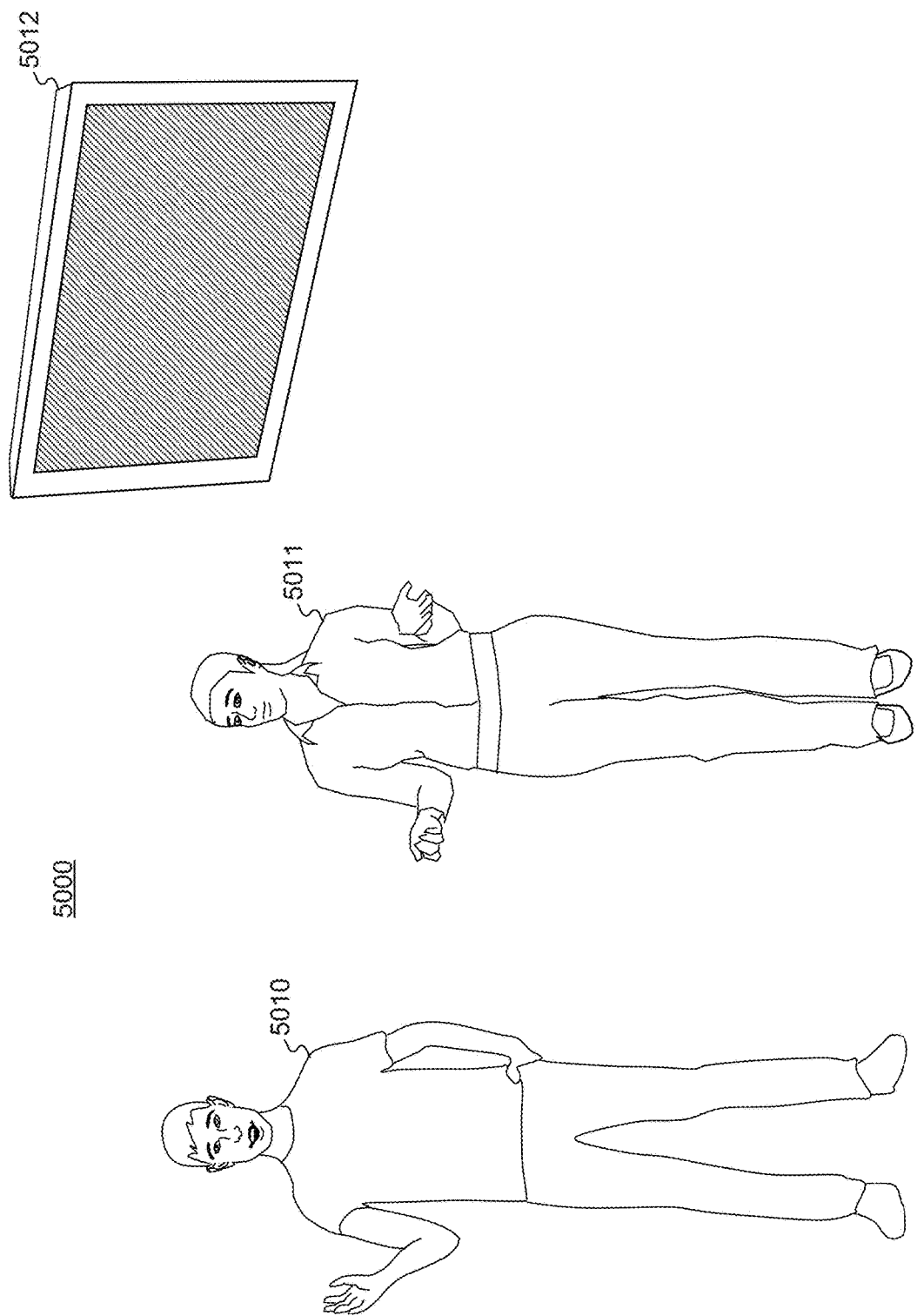

5020

| Visual Characteristics | Name | Type | Relationship | Level of importance (1 to 5) | Rule for audio conditioning |
|---|---|---|---|---|---|
| 🔊 | Cindy Moore | Individual | Colleague | 5 | +10% volume |
| 🔊 | Ed Shapirov | Individual | Colleague | 3 | +20% Pitch enhancement |
| 🔊 | Raj Polar | Individual | Friend | 4 | +25% volume when meeting outside |
| 🔊 | Terri Solomon | Individual | Family | 2 | -5% a rate of speech |
| 📱 | My phone | Machine | Ownership | 5 | Increase relative to other sounds |
| 📺 | TV | Machine | None | 1 | Mute when user is not looking at it |

Fig. 50B

CONDITIONING AUDIO SIGNALS INCLUDING OVERLAPPING VOICES

CROSS REFERENCES TO RELATED APPLICATIONS

This application is a continuation of International Application No. PCT/IB2019/001132, filed Oct. 10, 2019, which claims the benefit of priority of priority of U.S. Provisional Patent Application No. 62/745,478, filed on Oct. 15, 2018; U.S. Provisional Patent Application No. 62/746,595, filed on Oct. 17, 2018; U.S. Provisional Patent Application No. 62/808,317, filed on Feb. 21, 2019; and U.S. Provisional Patent Application No. 62/857,773, filed on Jun. 5, 2019. All of the foregoing applications are incorporated herein by reference in their entirety.

BACKGROUND

Technical Field

This disclosure generally relates to devices and methods for capturing and processing images and audio from an environment of a user, and using information derived from captured images and audio.

Background Information

Today, technological advancements make it possible for wearable devices to automatically capture images and audio, and store information that is associated with the captured images and audio. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image and audio data.

Even though users can capture images and audio with their smartphones and some smartphone applications can process the captured information, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images and audio to provide useful information to users of the apparatuses, and for systems and methods to process and leverage information gathered by the apparatuses.

SUMMARY

Embodiments consistent with the present disclosure provide devices and methods for automatically capturing and processing images and audio from an environment of a user, and systems and methods for processing information related to images and audio captured from the environment of the user.

In an embodiment, a hearing aid system may selectively amplify sounds emanating from a detected look direction of a user of the hearing aid system. The system may include a wearable camera configured to capture a plurality of images from an environment of the user; at least one microphone configured to capture sounds from an environment of the user; and at least one processor. The processor may be programmed to receive the plurality of images captured by the camera, receive audio signals representative of sounds received by the at least one microphone from the environment of the user, determine a look direction for the user based on analysis of at least one of the plurality of images, cause selective conditioning of at least one audio signal received by the at least one microphone from a region associated with the look direction of the user, and cause transmission of the at least one conditioned audio signal to a hearing interface device configured to provide sound to an ear of the user.

In an embodiment, a method may selectively amplify sounds emanating from a detected look direction of a user of the hearing aid system. The method may comprise receiving a plurality of images captured by a wearable camera from an environment of a user; receiving audio signals representative of sounds captured by at least one microphone from the environment of the user, determining a look direction for the user based on analysis of at least one of the plurality of images, causing selective conditioning of at least one audio signal received by the at least one microphone from a region associated with the look direction of the user, causing transmission of the at least one conditioned audio signal to a hearing interface device configured to provide sound to an ear of the user.

In an embodiment, a hearing aid system may selectively amplify audio signals associated with a voice of a recognized individual. The system may include a wearable camera configured to capture a plurality of images from an environment of the user, at least one microphone configured to capture sounds from an environment of the user, and at least one processor. The processor may be programmed to receive the plurality of images captured by the camera, identify a representation of at least one recognized individual in at least one of the plurality of images, receive audio signals representative of the sounds captured by the at least one microphone, cause selective conditioning of at least one audio signal received by the at least one microphone from a region associated with the at least one recognized individual, and cause transmission of the at least one conditioned audio signal to a hearing interface device configured to provide sound to an ear of the user.

In an embodiment, a method may selectively amplify audio signals associated with a voice of a recognized individual. The method may comprise receiving a plurality of images captured by a wearable camera from an environment of the user, identifying a representation of at least one recognized individual in at least one of the plurality of images, receiving audio signals representative of sounds captured by at least one microphone from the environment of the user, causing selective conditioning of at least one audio signal received by the at least one microphone from a region associated with the at least one recognized individual, and causing transmission of the at least one conditioned audio signal to a hearing interface device configured to provide sound to an ear of the user.

In an embodiment, a voice transmission system may selectively transmit audio signals associated with a voice of a recognized user. The system may include at least one microphone configured to capture sounds from an environment of the user and at least one processor. The processor may be programmed to receive audio signals representative of the sounds captured by the at least one microphone, identify, based on analysis of the received audio signals, one or more voice audio signals representative of a recognized voice of the user, cause transmission, to a remotely located device, of the one or more voice audio signals representative of the recognized voice of the user, and prevent transmission, to the remotely located device, of at least one background noise audio signal different from the one or more voice audio signals representative of a recognized voice of the user.

In an embodiment, a method may selectively transmit audio signals associated with a voice of a recognized user. The method may comprise receiving audio signals representative of sounds captured by at least one microphone from an environment of a user, identifying, based on analysis of the received audio signals, one or more voice audio signals representative of a recognized voice of the user, causing transmission, to a remotely located device, of the one or more voice audio signals representative of the recognized voice of the user, and preventing transmission, to the remotely located device, of at least one background noise audio signal different from the one or more voice audio signals representative of a recognized voice of the user.

In an embodiment, a hearing aid system may selectively amplify audio signals based on tracked lip movements. The system may include a wearable camera configured to capture a plurality of images from an environment of the user, at least one microphone configured to capture sounds from an environment of the user, and at least one processor. The processor may be programmed to receive the plurality of images captured by the camera; identify a representation of at least one individual in at least one of the plurality of images; identify at least one lip movement associated with a mouth of the individual, based on analysis of the plurality of images; receive audio signals representative of the sounds captured by the at least one microphone; identify, based on analysis of the sounds captured by the at least one microphone, at least a first audio signal associated with a first voice and at least a second audio signal associated with a second voice different from the first voice; cause selective conditioning of the first audio signal based on a determination by the at least one processor that the first audio signal is associated with the identified at least one lip movement associated with the mouth of the individual; and cause transmission of the selectively conditioned first audio signal to a hearing interface device configured to provide sound to an ear of the user.

In an embodiment, a method may selectively amplify audio signals based on tracked lip movements. The method may comprise receiving a plurality of images captured by a wearable camera from an environment of the user; identifying a representation of at least one individual in at least one of the plurality of images; identifying at least one lip movement associated with a mouth of the individual, based on analysis of the plurality of images; receiving audio signals representative of the sounds captured by at least one microphone from the environment of the user; identifying, based on analysis of the sounds captured by the at least one microphone, at least a first audio signal associated with a first voice and at least a second audio signal associated with a second voice different from the first voice; causing selective conditioning of the first audio signal based on a determination by the at least one processor that the first audio signal is associated with the identified at least one lip movement associated with the mouth of the individual; and causing transmission of the selectively conditioned first audio signal to a hearing interface device configured to provide sound to an ear of the user.

In an embodiment, a hearing aid system for amplifying audio signals may comprise a wearable camera configured to capture a plurality of images from an environment of a user and at least one microphone configured to capture sounds from an environment of the user. The hearing aid system may also include at least one processor programmed to receive the plurality of images captured by the camera and identify a representation of a first individual and a representation of a second individual in the plurality of images. The at least one processor may also be programmed to receive from the at least one microphone a first audio signal associated with a voice of the first individual and receive from the at least one microphone a second audio signal associated with a voice of the second individual. The at least one processor may further be programmed to detect at least one amplification criteria indicative of a voice amplification priority between the first individual and the second individual. The at least one processor may also be programmed to selectively amplify the first audio signal relative to the second audio signal when the at least one amplification criteria indicates that the first individual has voice amplification priority over the second individual and selectively amplify the second audio signal relative to the first audio signal when the at least one amplification criteria indicates that the second individual has voice amplification priority over the first individual. The at least one processor may further be programmed to cause transmission of the selectively amplified first or second audio signal to a hearing interface device configured to provide sound to an ear of the user.

In an embodiment, a computer-implemented method for selectively amplifying audio signals may comprise receiving the plurality of images captured by a camera from an environment of a user and identifying a representation of a first individual and a representation of a second individual in the plurality of images. The method may also comprise receiving from at least one microphone a first audio signal associated with a voice of the first individual and receiving from the at least one microphone a second audio signal associated with a voice of the second individual. The method may further comprise detecting at least one amplification criteria indicative of a voice amplification priority between the first individual and the second individual. The method may also comprise selectively amplifying the first audio signal relative to the second audio signal when the at least one amplification criteria indicates that the first individual has voice amplification priority over the second individual and selectively amplifying the second audio signal relative to the first audio signal when the at least one amplification criteria indicates that the second individual has voice amplification priority over the first individual. The method may further comprise causing transmission of the selectively amplified first or second audio signal to a hearing interface device configured to provide sound to an ear of the user.

In an embodiment, a non-transitory computer-readable medium store instructions that, when executed by at least one processor, may cause a device to perform a method comprising receiving the plurality of images captured by a camera from an environment of a user and identifying a representation of a first individual and a representation of a second individual in the plurality of images. The method may also comprise receiving from at least one microphone a first audio signal associated with a voice of the first individual and receiving from the at least one microphone a second audio signal associated with a voice of the second individual. The method may further comprise detecting at least one amplification criteria indicative of a voice amplification priority between the first individual and the second individual. The method may also comprise selectively amplifying the first audio signal relative to the second audio signal when the at least one amplification criteria indicates that the first individual has voice amplification priority over the second individual and selectively amplifying the second audio signal relative to the first audio signal when the at least one amplification criteria indicates that the second individual has voice amplification priority over the first individual. The method may further comprise causing transmission of the selectively amplified first or second audio signal to a hearing interface device configured to provide sound to an ear of the user.

In an embodiment, a hearing aid system for selectively amplifying audio signals may comprise a wearable camera configured to capture a plurality of images from an environment of a user and at least one microphone configured to capture sounds from an environment of the user. The hearing aid system may also include at least one processor programmed to receive the plurality of images captured by the camera; identify a representation of one or more individuals in the plurality of images; receive from the at least one microphone a first audio signal associated with a voice; determine, based on analysis of the plurality of images, that the first audio signal is not associated with a voice of any of the one or more individuals; receive from the at least one microphone a second audio signal associated with a voice; determine, based on analysis of the plurality of images, that the second audio signal is associated with a voice of one of the one or more individuals; cause a first amplification of the first audio signal and a second amplification of the second audio signal, wherein the first amplification differs from the second amplification in at least one aspect; and cause transmission of at least one of the first audio signal, amplified according to the first amplification, and the second audio signal, amplified according to the second amplification, to a hearing interface device configured to provide sound to an ear of the user.

In an embodiment, a hearing aid system for selectively amplifying audio signals may comprise a wearable camera configured to capture a plurality of images from an environment of a user and at least one microphone configured to capture sounds from an environment of the user. The hearing aid system may also include at least one processor programmed to: receive a first plurality of images captured by the camera; identify a representation of an individual in the first plurality of images; receive from the at least one microphone a first audio signal representative of a voice; determine, based on analysis of the first plurality of images, that the first audio signal representative of a voice is associated with the individual; selectively amplify the first audio signal over other audio signals received from the at least one microphone representative of sounds from sources other than the individual; receive a second plurality of images captured by the camera; determine, based on analysis of the second plurality of images, that the individual is not represented in the second plurality of images; receive from the at least one microphone a second audio signal representative of a voice; determine, based on analysis of the first audio signal and the second audio signal, that the second audio signal is associated with the individual; selectively amplify the second audio signal over other received audio signals representative of sounds from sources other than the individual; and cause transmission of at least one of the selectively amplified first audio signal or the selectively amplified second audio signal to a hearing interface device configured to provide sound to an ear of the user.

In an embodiment, a hearing aid system for selectively amplifying audio signals may comprise a wearable camera configured to capture a plurality of images from an environment of a user and at least one microphone configured to capture sounds from an environment of the user. The hearing aid system may also include at least one processor programmed to: receive the plurality of images captured by the camera; identify a representation of one or more individuals in the plurality of images; receive from the at least one microphone an audio signal associated with a voice; determine, based on analysis of the plurality of images, that the audio signal is not associated with a voice of any of the one or more individuals; determine, based on analysis of the audio signal, that the audio signal is associated with at least one indicator that the audio signal is related to a public announcement; cause selective amplification of the audio signal based on the determination that the audio signal is associated with at least one indicator that the audio signal relates to a public announcement; and cause transmission of the selectively amplified audio signal to a hearing interface device configured to provide sound to an ear of the user.

In an embodiment, a hearing aid system is provided. The system may include a wearable camera configured to capture a plurality of images from an environment of a user; at least one microphone configured to capture sounds from an environment of the user; and at least one processor. The processor may be programmed to receive the plurality of images captured by the camera; identify a representation of at least one individual in at least one of the plurality of images, and determine whether the at least one individual is a recognized individual. Further, if the at least one individual is determined to be a recognized individual, cause an image of the at least one individual to be shown on a display and selectively condition at least one audio signal that is received from the at least one microphone and determined to be associated with the recognized individual; and cause transmission of the at least one conditioned audio signal to a hearing interface device configured to provide sound to an ear of the user.

In an embodiment, a hearing aid system is provided. The system may include a wearable camera configured to capture a plurality of images from an environment of a user; at least one microphone configured to capture sounds from an environment of the user; and at least one processor. The processor may be programmed to receive an audio signal from the at least one microphone and determine whether the received audio signal is associated with a recognized individual. Further, if the at least one individual is determined to be a recognized individual, cause an image of the at least one individual to be shown on a display and selectively condition the audio signal, and cause transmission of the conditioned audio signal to a hearing interface device configured to provide sound to an ear of the user.

In an embodiment, a hearing aid system is provided. The system may include a wearable camera configured to capture a plurality of images from an environment of a user; at least one microphone configured to capture sounds from an environment of the user; and at least one processor. The processor may be programmed to receive audio signals from the at least one microphone; detect, based on analysis of the audio signals, a first audio signal associated with a first time period, wherein the first audio signal is representative of the voice of a single individual; detect, based on analysis of the audio signals, a second audio signal associated with a second time period, wherein the second time period is different from the first time period, and wherein the second audio signal is representative of overlapping voices of two or more individuals; selectively condition the first audio signal and the second audio signal, wherein the selective conditioning of the first audio signal is different in at least one respect relative the selective conditioning of the second audio signal; and cause transmission of the conditioned first audio signal to a hearing interface device configured to provide sound to an ear of the user.

In an embodiment, a hearing aid system is disclosed. The system includes a wearable camera configured to capture a plurality of images from an environment of a user, at least one microphone configured to capture sounds from the environment of the user, and at least one processor programmed to: receive the plurality of images captured by the wearable camera; receive audio signals representative of sounds captured by the at least one microphone; identify a first audio signal, from among the received audio signals, representative of a voice of a first individual; transcribe and store, in a memory, text corresponding to speech associated with the voice of the first individual; determine whether the first individual is a recognized individual; and if the first individual is a recognized individual, associate an identifier of the first recognized individual with the stored text corresponding to speech associated with the voice of the first individual.

In an embodiment, a computer-implemented method for individual identification of a hearing aid system is disclosed. The method includes: receiving a plurality of images from a wearable camera; receiving audio signals representative of sounds from at least one microphone; identifying a first audio signal, from among the received audio signals, representative of a voice of a first individual; transcribing and storing text corresponding to speech associated with the voice of the first individual; determining whether the first individual is a recognized individual; and if the first individual is a recognized individual, associating an identifier of the first recognized individual with the stored text corresponding to speech associated with the voice of the first individual.

In an embodiment, a non-transitory computer readable storage media is disclosed. The non-transitory computer readable storage media stores program instructions which are executed by at least one processor to perform: receiving a plurality of images from a wearable camera; receiving audio signals representative of sounds from at least one microphone; identifying a first individual represented in at least one of the plurality of images; identifying a first audio signal, from among the received audio signals, representative of a voice of the a first individual; transcribing and storing text corresponding to speech associated with the voice of the first individual; determining whether the first individual is a recognized individual; and if the first individual is a recognized individual, associating an identifier of the first recognized individual with the stored text corresponding to the speech associated with the voice of the first individual.

In an embodiment, a hearing aid system for selectively conditioning audio signals associated with a recognized object is provided. The system may include at least one processor programmed to receive audio signals acquired by a wearable microphone, wherein the audio signals are representative of sounds emanating from objects in an environment of a user. The at least one processor may analyze the received audio signals to obtain an isolated audio stream associated with a sound-emanating object in the environment of the user. Further, the at least one processor may determine an audioprint from the isolated audio stream and may use the audioprint to retrieve from a database information relating to the particular sound-emanating object. Based on the retrieved information, the at least one processor may cause selective conditioning of at least one audio signal received by the wearable microphone from a region associated with the at least one sound-emanating object, and may cause transmission of the at least one conditioned audio signal to a hearing interface device configured to provide sounds to an ear of the user.

In an embodiment, a method is provided for selectively conditioning audio signals associated with a recognized object. The method may comprise receiving audio signals acquired by a wearable microphone, wherein the audio signals are representative of sounds emanating from objects in an environment of a user; analyzing the received audio signals to isolate an audio stream determined to be associated with a particular sound-emanating object in the environment of the user; determining an audioprint of the isolated audio stream; using the determined audioprint to retrieve from a database information relating to the particular sound-emanating object; based on the retrieved information, causing selective conditioning of at least one audio signal received by the wearable microphone from a region associated with the at least one sound-emanating object; and causing transmission of the at least one conditioned audio signal to a hearing interface device configured to provide sounds to an ear of the user.

In an embodiment, a hearing aid system for selectively conditioning audio signals associated with a recognized object is provided. The system may include at least one processor programmed to receive a plurality of images from an environment of a user captured by a wearable camera. The at least one processor may process the plurality of images to detect a sound-emanating object in at least one of the plurality of images, and identify the sound-emanating object using the at least one of the plurality of images. The at least one processor may further use the determined identity of the sound-emanating object to retrieve from a database information relating to the sound-emanating object. The at least one processor may also receive at least one audio signal acquired by a wearable microphone, wherein the at least one audio signal is representative of sounds including a sound emanating from the sound-emanating object, and separate the at least one audio signal using the retrieved information to isolate the sound emanating from the sound-emanating object, cause selective conditioning of the sound to obtain at least one conditioned audio signal, and may cause transmission of the at least one conditioned audio signal to a hearing interface device configured to provide sounds to an ear of the user.

In an embodiment, a hearing aid system for selective modification of background noises is provided. The system may include and at least one processor programmed to receive a plurality of images from an environment of a user captured by a wearable camera during a time period, and receive at least one audio signal representative of sounds acquired by a wearable microphone during the time period. Further, the at least one processor may determine that at least one of the sounds was generated by a sound-emanating object in the environment of the user, but outside of a field of view of the wearable camera, and retrieve from a database information associated with the at least one sound. Based on the retrieved information, the at least one processor may cause selective conditioning of audio signals acquired by the wearable microphone during the time period and causes transmission of the conditioned audio signals to a hearing interface device configured to provide sounds to an ear of the user.

In an embodiment, a method is provided for selective modification of different types of background noises. The method may comprise receiving a plurality of images from an environment of a user captured by a wearable camera during a time period; receiving audio signals representative of sounds from the environment of the user acquired by a wearable microphone during the time period; determining that at least one of the sounds was generated in response to sounds from a sound-emanating object in the environment of the user, but outside of a field of view of the wearable camera; retrieving from a database information associated with the at least one of the sounds based on the retrieved information, causing selective conditioning of audio signals acquired by the wearable microphone during the time period; and causing transmission of the conditioned audio signals to a hearing interface device configured to provide sounds to an ear of the user.

In an embodiment, a system for identifying sound-emanating objects in an environment of a user is disclosed. The system may comprise at least one memory device configured to store a database of reference visual characteristics and reference voiceprints corresponding to a plurality of objects; and at least one processor. The processor may be programmed to receive a plurality of images captured by a wearable camera, wherein at least one of the plurality of images depicts at least one sound-emanating object in an environment of a user; analyze the received at least one of the plurality of images to determine one or more visual characteristics associated with the at least one sound-emanating object; identify within the database in view of the one or more visual characteristics, the at least one sound-emanating object and determine a degree of certainty of identification; receive audio signals acquired by a wearable microphone, wherein the audio signals are representative of one or more sounds emanating from the at least one sound-emanating object; analyze the received audio signals to determine a voiceprint of the at least one sound-emanating object; when the degree of certainty of identification falls below a predetermined level, further identify the at least one sound-emanating object based on the determined voiceprint; and initiate at least one action based on an identity of the at least one sound-emanating object.

In an embodiment, a method for identifying sound-emanating objects in an environment of a user is disclosed. The method may comprise accessing a database of reference visual signatures and reference voice signatures corresponding to a plurality of objects; receiving a plurality of images captured by a wearable camera, wherein at least one of the plurality of images depicts at least one sound-emanating object in an environment of a user; analyzing the received at least one of the plurality of images to determine one or more visual characteristics associated with the at least one sound-emanating object; identifying, based on review of the database in view of the one or more visual characteristics, the at least one sound-emanating object and determine a degree of certainty of identification; receiving audio signals acquired by a wearable microphone, wherein the audio signals are representative of one or more sounds emanating from the at least one sound-emanating object; analyzing the received audio signals to determine voiceprint of the at least one sound-emanating object; when the degree of certainty of identification falls below a predetermined level, further identifying the at least one sound-emanating object based on the determined voiceprint; and initiating at least one action based on an identity of the at least one sound-emanating object.

In an embodiment, a software product may be stored on a non-transitory computer readable medium and may comprise computer implementable instructions for a method for identifying sound-emanating objects. The method may comprise accessing a database of reference visual signatures and reference voice signatures corresponding to a plurality of objects; receiving a plurality of images captured by a wearable camera, wherein at least one of the plurality of images depicts at least one sound-emanating object in an environment of a user; analyzing the received at least one of the plurality of images to determine one or more visual characteristics associated with the at least one sound-emanating object; identifying, based on review of the database in view of the one or more visual characteristics, the at least one sound-emanating object and determine a degree of certainty of identification; receiving audio signals acquired by a wearable microphone, wherein the audio signals are representative of one or more sounds emanating from the at least one sound-emanating object; analyzing the received audio signals to determine voiceprint of the at least one sound-emanating object; when the degree of certainty of identification falls below a predetermined level, further identifying the at least one sound-emanating object based on the determined voiceprint; and initiating at least one action based on an identity of the at least one sound-emanating object.

In an embodiment, a hearing aid system may selectively condition audio signals. The hearing aid system may include at least one processor programmed to receive a plurality of images captured by a wearable camera, wherein the plurality of images depict objects in an environment of a user; receive audio signals acquired by a wearable microphone, wherein the audio signals are representative of sounds emanating from the objects; analyze the plurality of images to identify at least one sound-emanating object in the environment of the user; retrieve from a database information about the at least one identified sound-emanating object; based on the retrieved information, cause selective conditioning of at least one audio signal received by the wearable microphone from a region associated with the at least one sound-emanating object; cause transmission of the at least one conditioned audio signal to a hearing interface device configured to provide sounds to an ear of the user.

In an embodiment, a method for modifying sounds emanating from objects in an environment of a user is disclosed. The method may comprise receiving a plurality of images captured by a wearable camera, wherein the plurality of images depict objects in an environment of a user; receiving audio signals acquired by a wearable microphone, wherein the audio signals are representative of sounds emanating from the objects; analyzing the plurality of images to identify at least one sound-emanating object in the environment of the user; retrieving from a database information about the at least one sound-emanating object; based on the retrieved information, causing selective conditioning of at least one audio signal acquired by the wearable microphone from a region associated with the at least one sound-emanating object; causing transmission of the at least one conditioned audio signal to a hearing interface device configured to provide sounds to an ear of the user.

In an embodiment, a software product may be stored on a non-transitory computer readable medium and may comprise computer implementable instructions for a method for identifying sound-emanating objects. The method may comprise accessing a database of reference visual signatures and reference voice signatures corresponding to a plurality of objects; receiving a plurality of images captured by a wearable camera, wherein at least one of the plurality of images depicts at least one sound-emanating object in an environment of a user; analyzing the received at least one of the plurality of images to determine one or more visual characteristics associated with the at least one sound-emanating object; identifying, based on review of the database in view of the one or more visual characteristics, the at least one sound-emanating object and determine a degree of certainty of identification; receiving audio signals acquired by a wearable microphone, wherein the audio signals are representative of one or more sounds emanating from the at least one sound-emanating object; analyzing the received audio signals to determine voiceprint of the at least one sound-emanating object; when the degree of certainty of identification falls below a predetermined level, further identifying the at least one sound-emanating object based on the determined voiceprint; and initiating at least one action based on an identity of the at least one sound-emanating object.

In an embodiment, a hearing interface device is disclosed. The hearing interface device may comprise a receiver configured to receive at least one audio signal, wherein the at least one audio signal was acquired by a wearable microphone and was selectively conditioned by at least one processor configured to receive a plurality of images captured by a wearable camera, identify at least one sound-emanating object in the plurality of images, and cause the conditioning based on retrieved information about the at least one sound-emanating object. The hearing aid device may further comprise an electroacoustic transducer configured to provide sounds from the at least one audio signal to an ear of the user.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of an example system consistent with the disclosed embodiments.

FIG. 3A is a schematic illustration of an example of the wearable apparatus shown in FIG. 1A.

FIG. 5C is a block diagram illustrating an example of the components of a wearable apparatus according to a third embodiment.

FIGS. 42A-42F are schematic illustrations of audio signals acquired and processed by the hearing aid system illustrated in FIG. 41B consistent with the present disclosure.

FIG. 45 is a block diagram illustrating an example of the components of a hearing interface device consistent with the present disclosure.

FIG. 50A is a schematic illustration showing examples of sound emitting objects that may be identified in the environment of a user consistent with the present disclosure.

FIG. 50B is an illustration of an example database storing information associated with sound emanating objects consistent with the present disclosure.

DETAILED DESCRIPTION

Figure 1A:
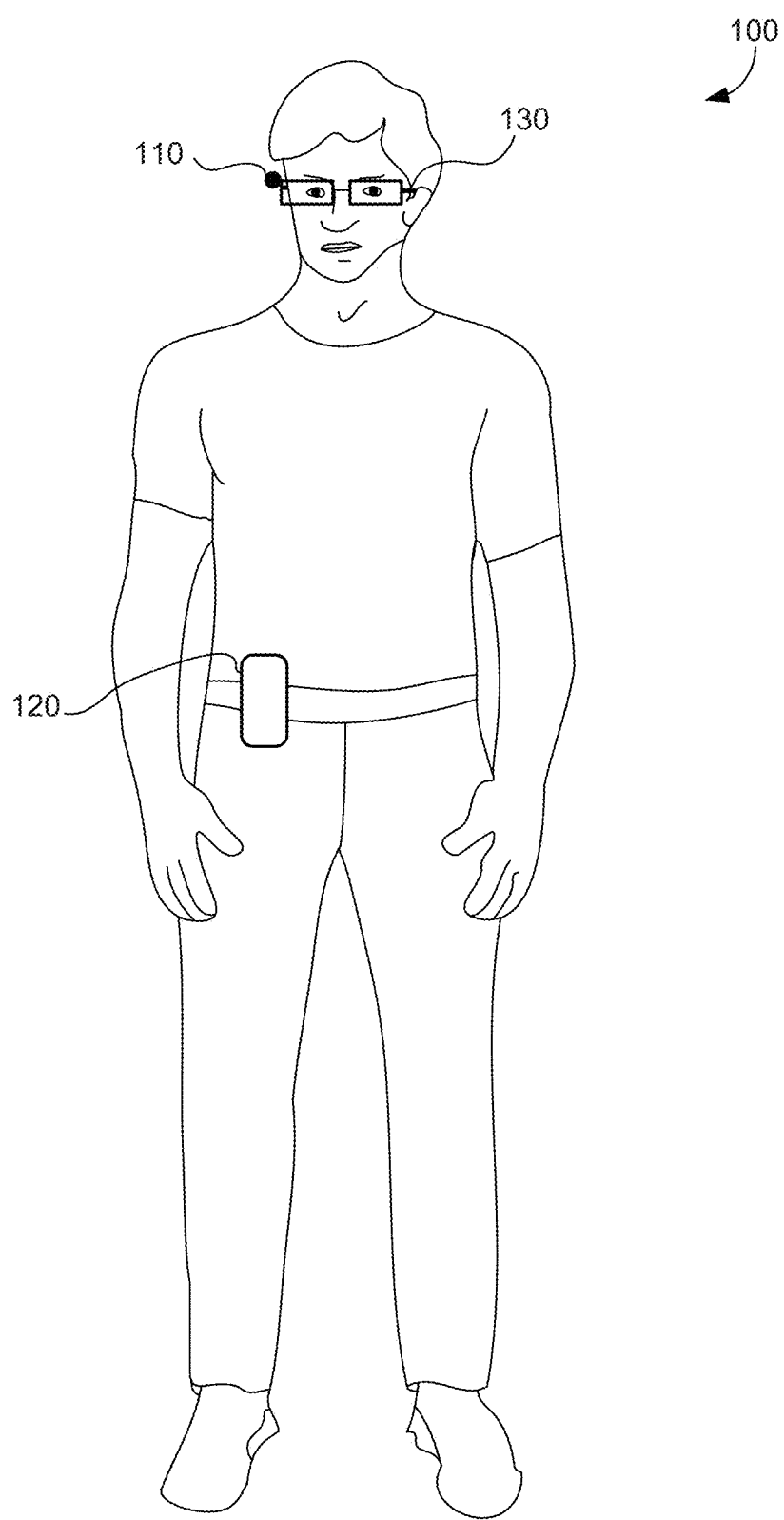
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
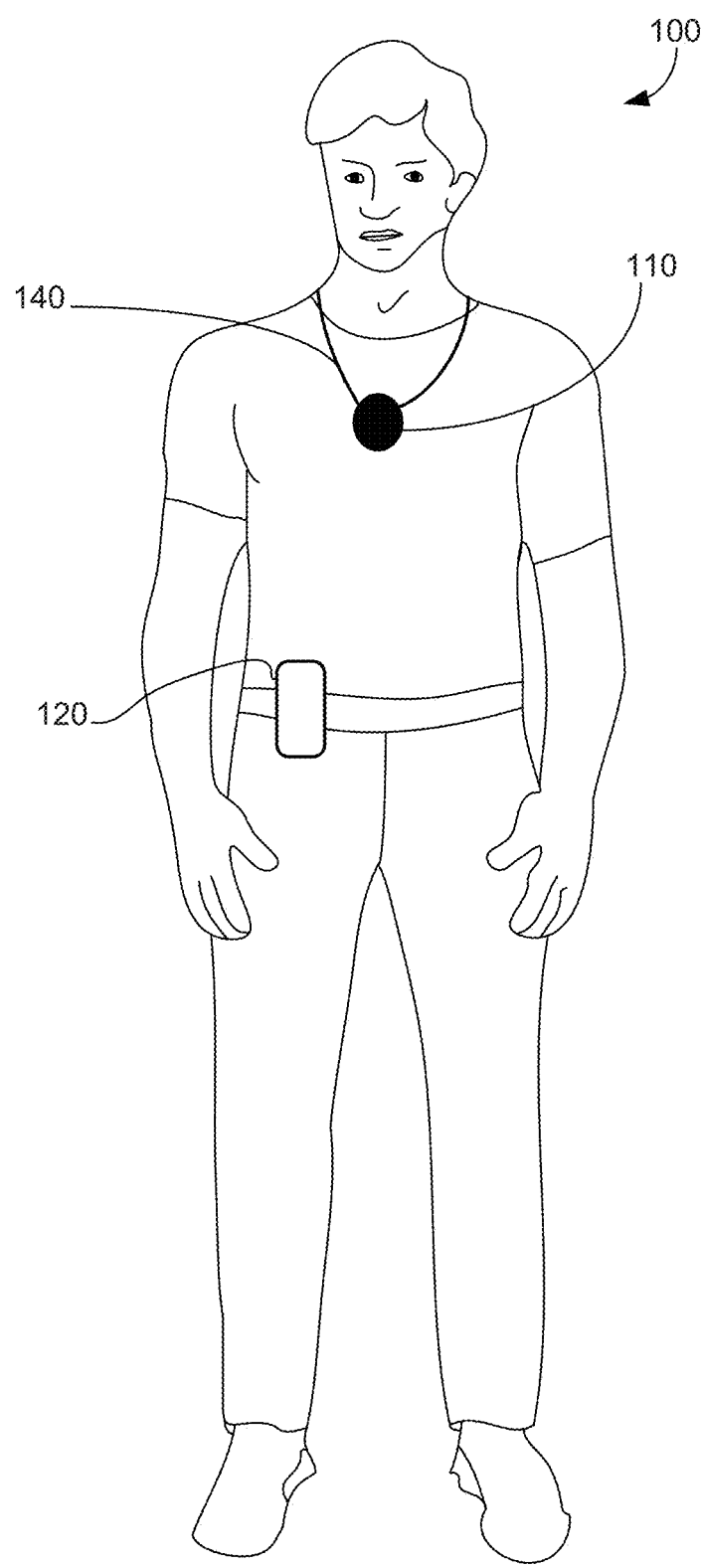
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
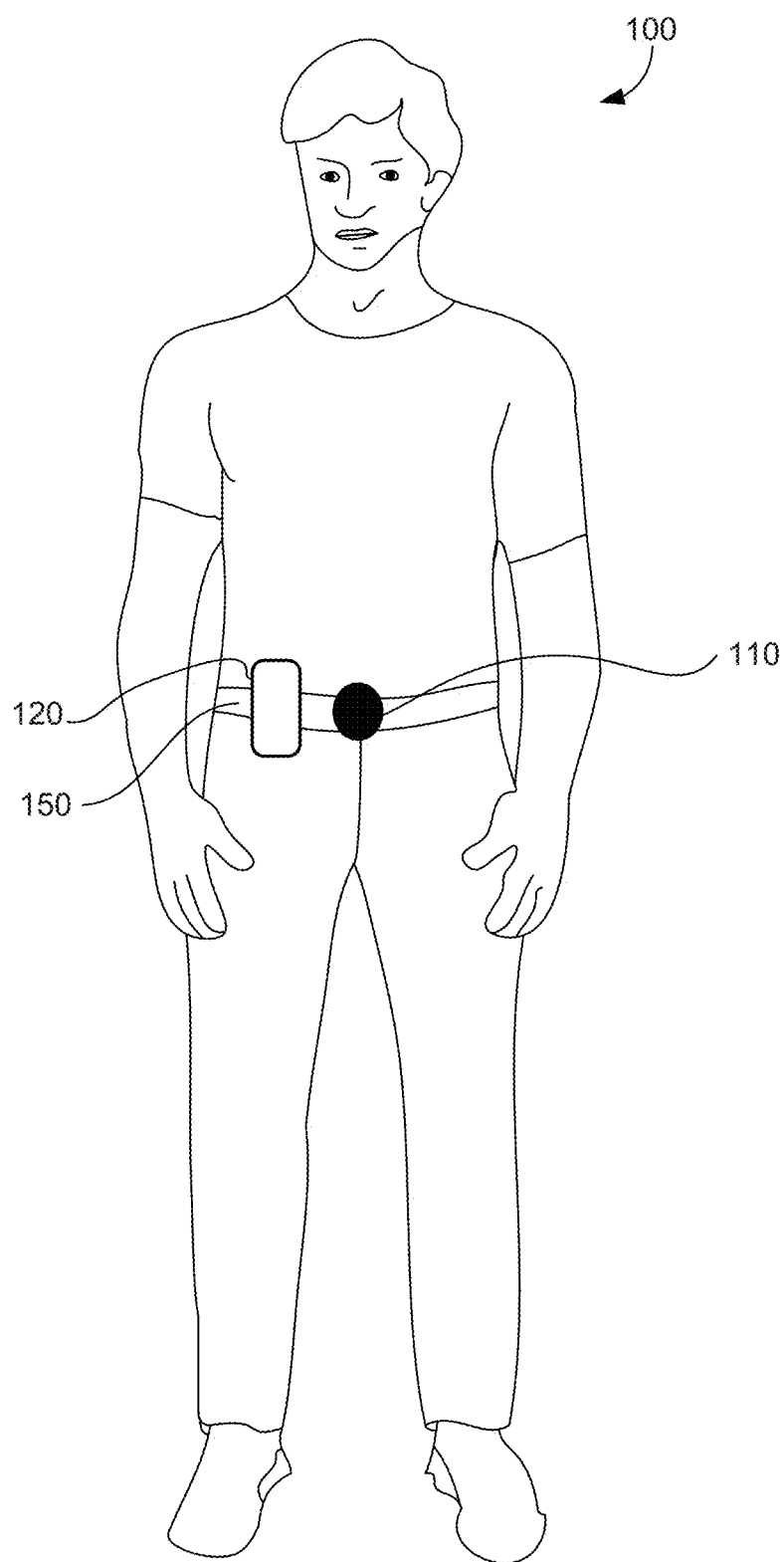
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
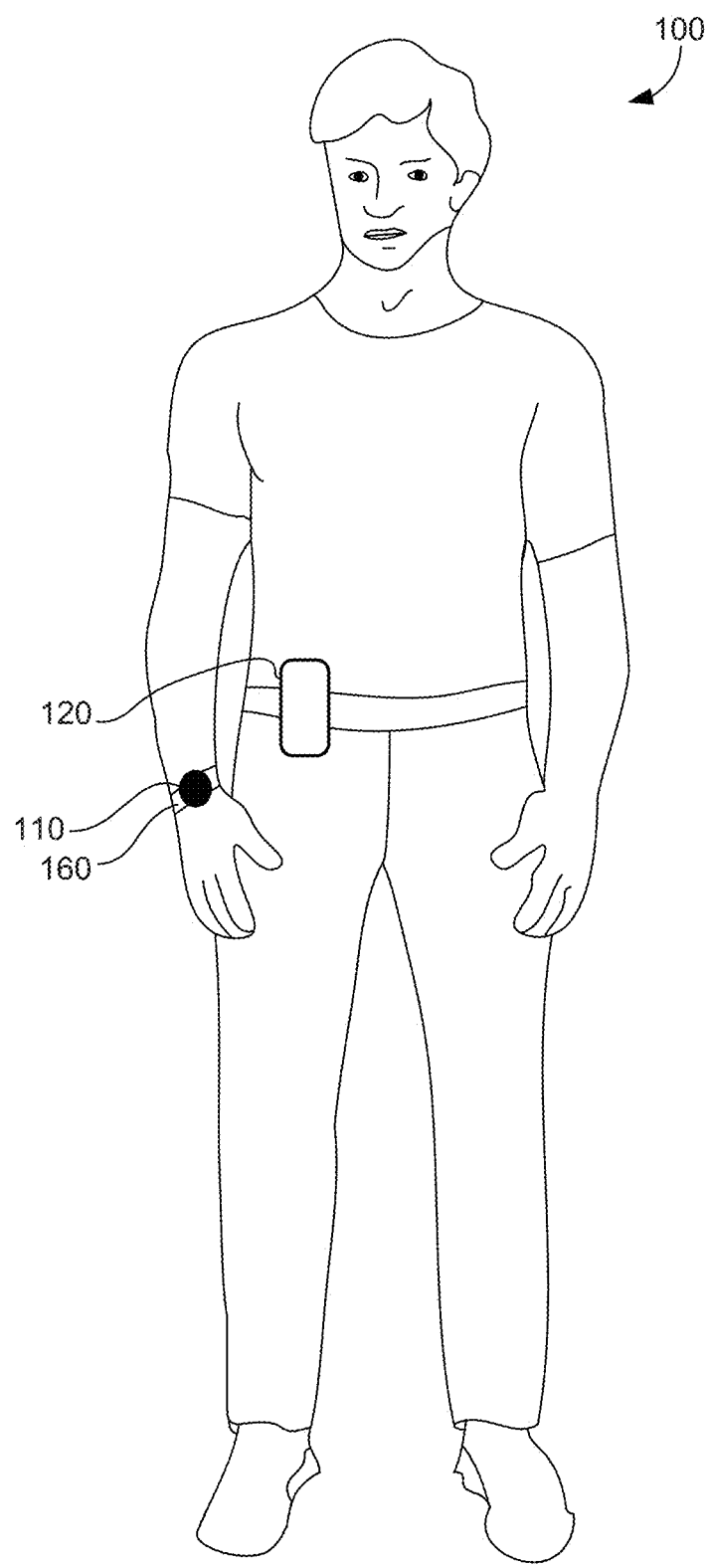
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device"

for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
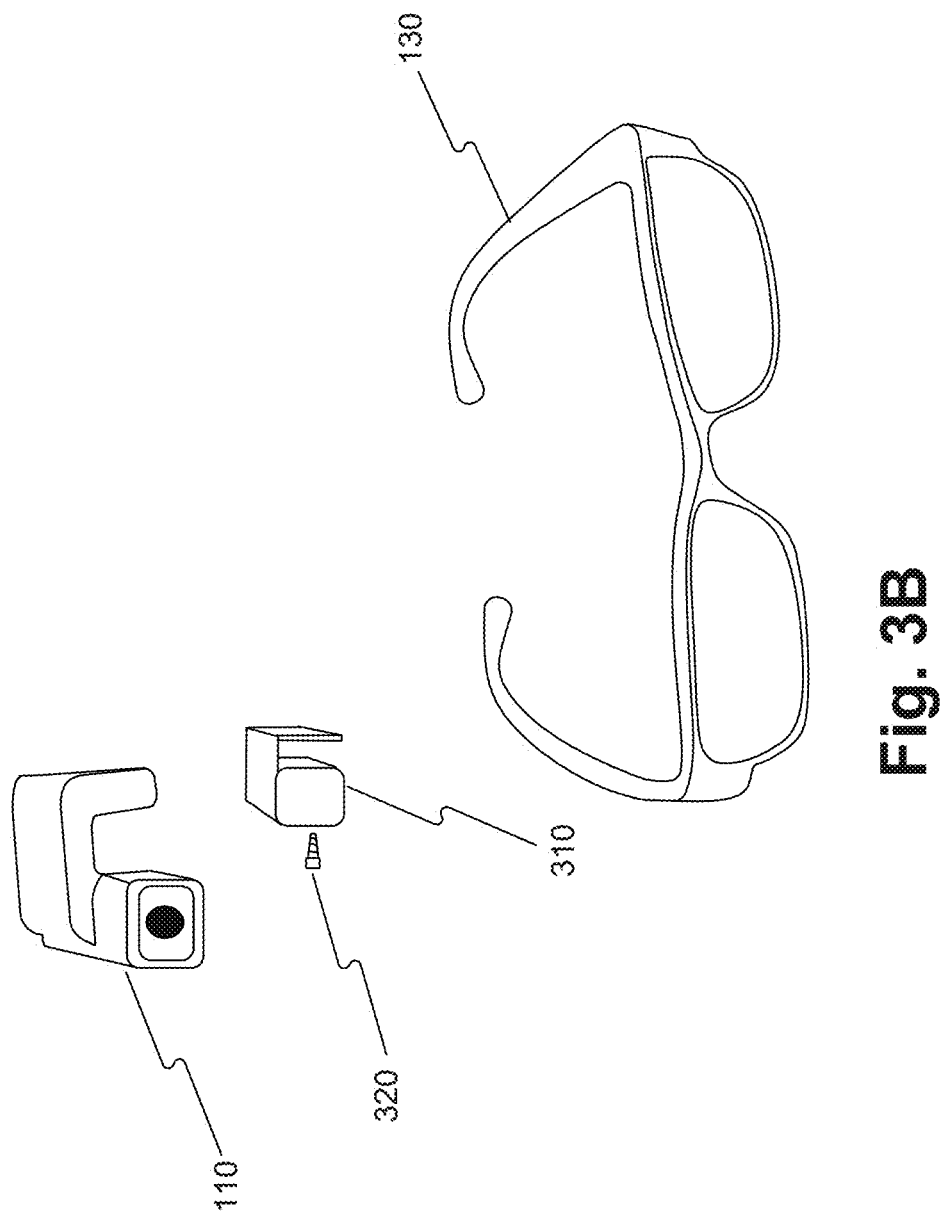
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
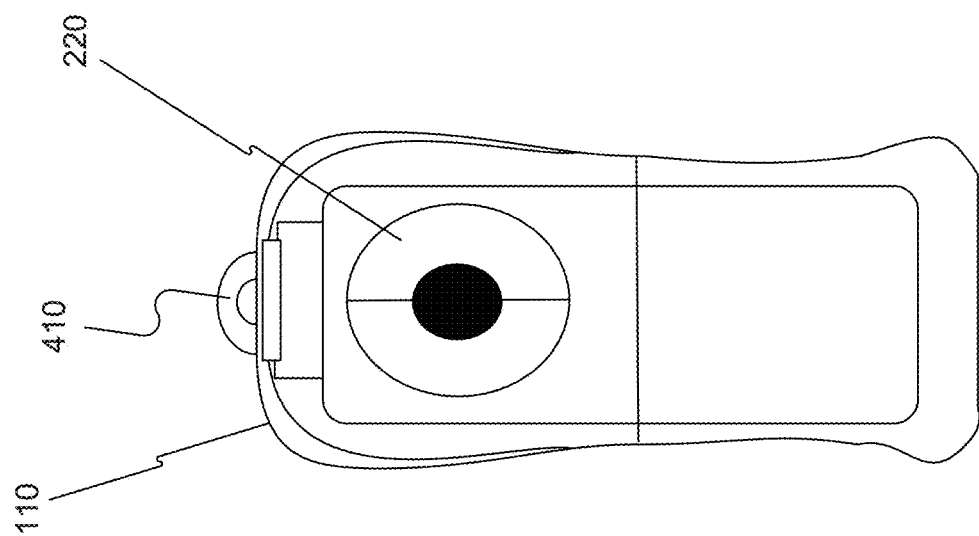
FIG. 4A-4K are schematic illustrations of an example of the wearable apparatus shown in FIG. 1B from various viewpoints.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a front viewpoint of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
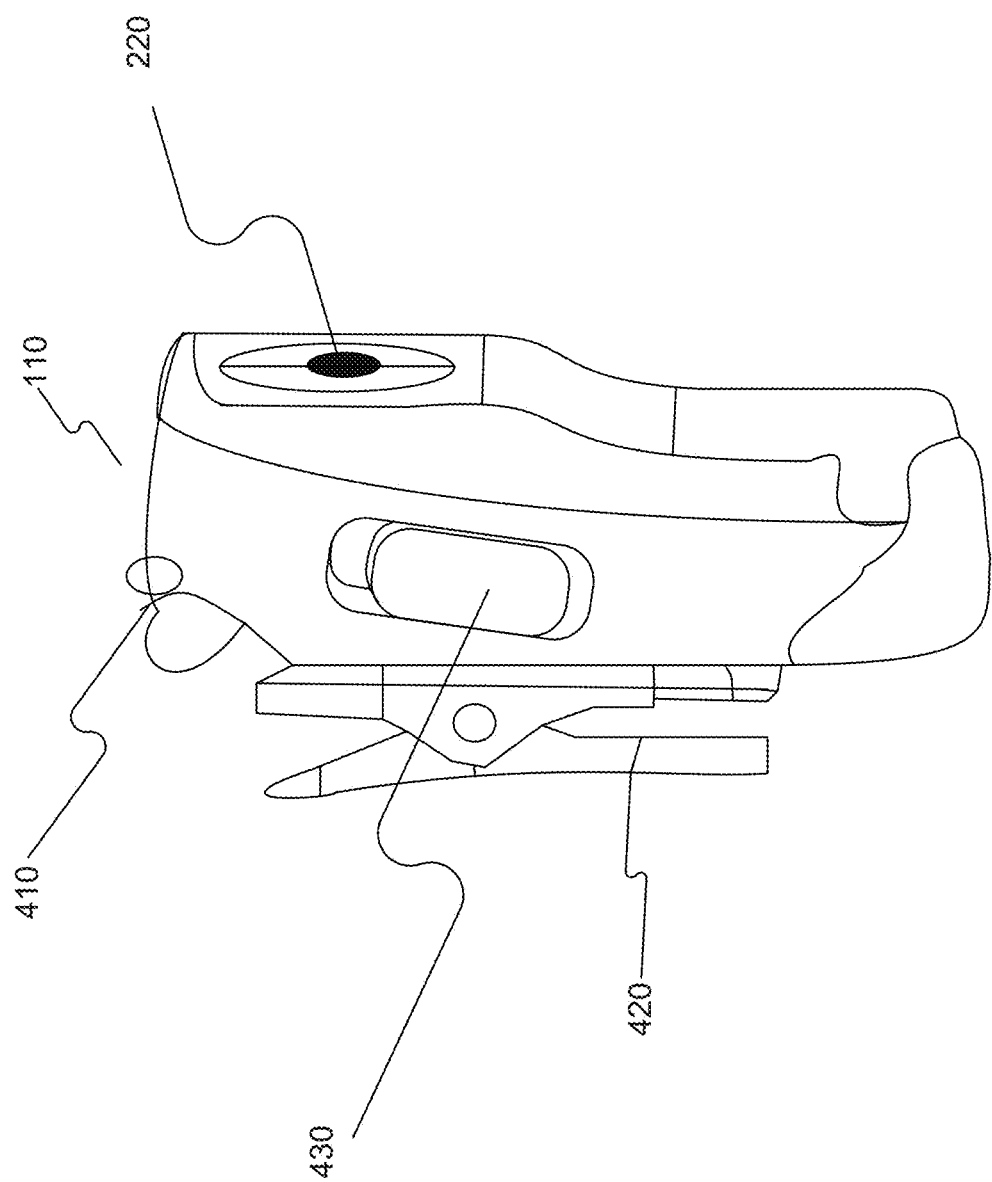

FIG. 4B is a schematic illustration of the example of a second embodiment of apparatus 110, from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and re-engaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

Figure 4C:
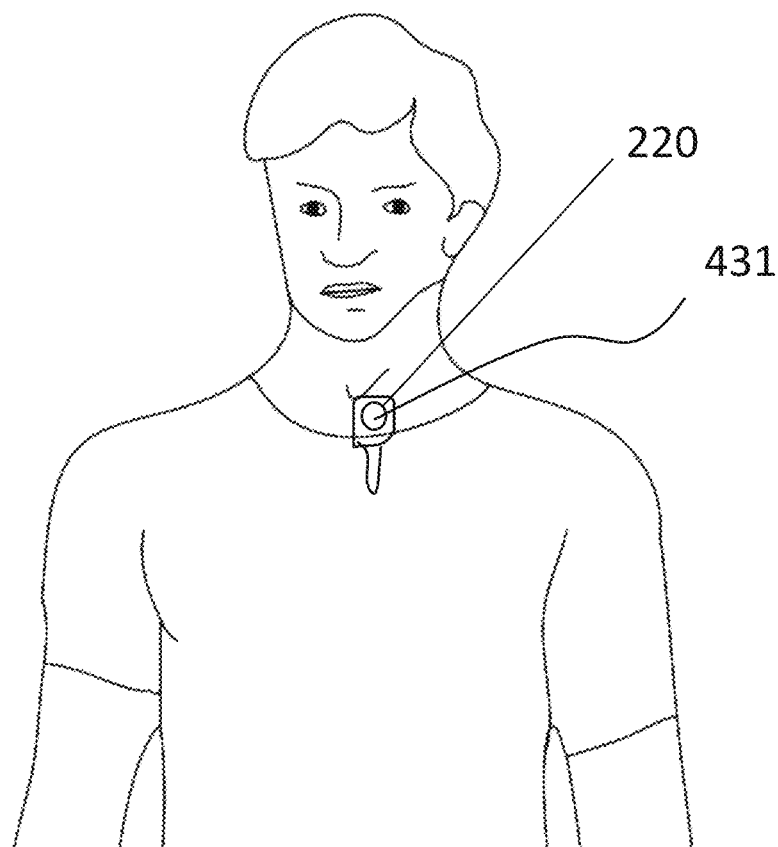

Apparatus 110 may be attached to an article of clothing (e.g., a shirt, a belt, pants, etc.), of user 100 at an edge of the clothing using a clip 431 as shown in FIG. 4C. For example, the body of apparatus 100 may reside adjacent to the inside surface of the clothing with clip 431 engaging with the outside surface of the clothing. In such an embodiment, as shown in FIG. 4C, the image sensor 220 (e.g., a camera for visible light) may be protruding beyond the edge of the clothing. Alternatively, clip 431 may be engaging with the inside surface of the clothing with the body of apparatus 110 being adjacent to the outside of the clothing. In various embodiments, the clothing may be positioned between clip 431 and the body of apparatus 110.

Figure 4D:
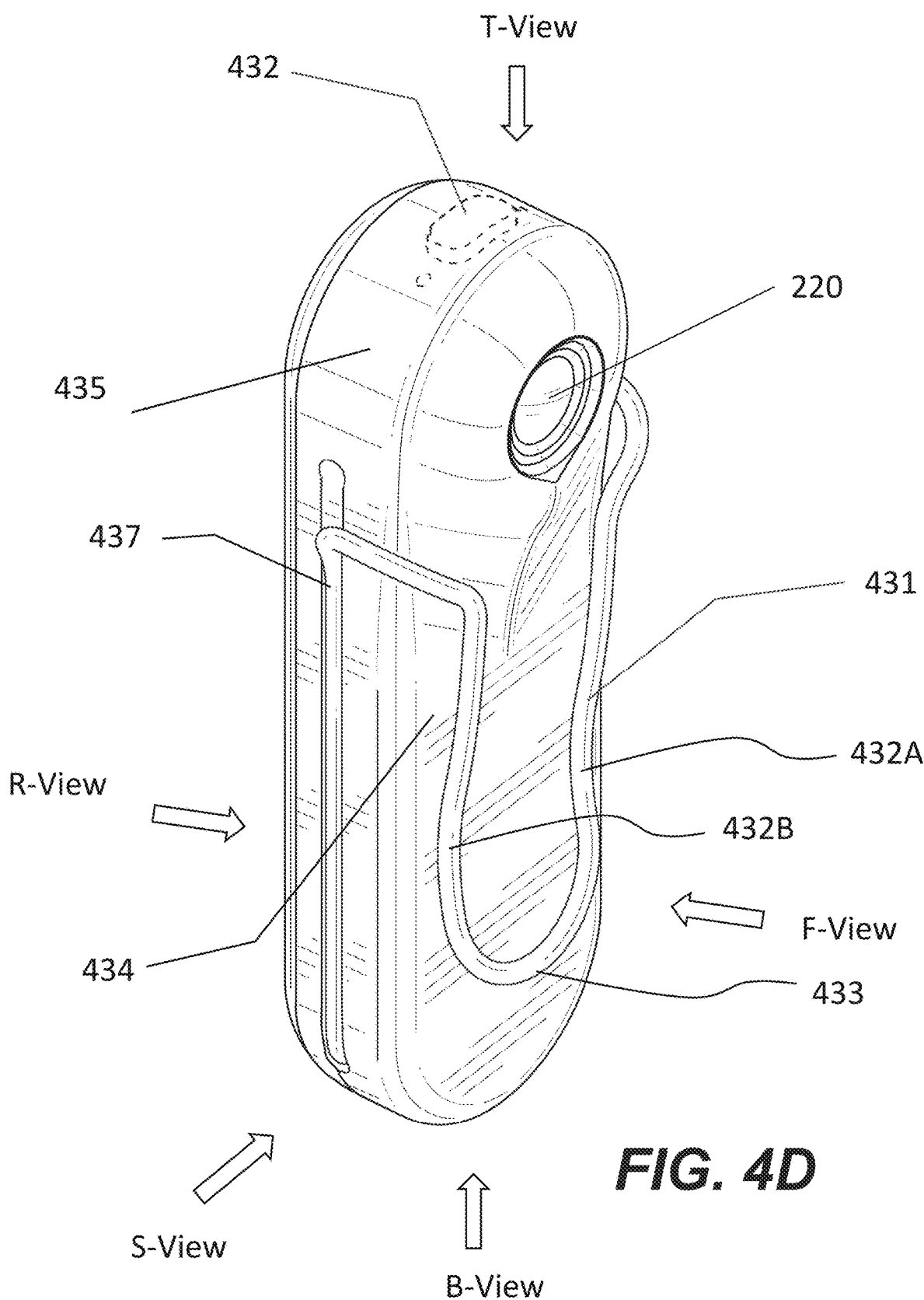

An example embodiment of apparatus 110 is shown in FIG. 4D. Apparatus 110 includes clip 431 which may include points (e.g., 432A and 432B) in close proximity to a front surface 434 of a body 435 of apparatus 110. In an example embodiment, the distance between points 432A, 432B and front surface 434 may be less than a typical thickness of a fabric of the clothing of user 100. For example, the distance between points 432A, 432B and surface 434 may be less than a thickness of a tee-shirt, e.g., less than a millimeter, less than 2 millimeters, less than 3 millimeters, etc., or, in some cases, points 432A, 432B of clip 431 may touch surface 434. In various embodiments, clip 431 may include a point 433 that does not touch surface 434, allowing the clothing to be inserted between clip 431 and surface 434.

FIG. 4D shows schematically different views of apparatus 110 defined as a front view (F-view), a rearview (R-view), a top view (T-view), a side view (S-view) and a bottom view (B-view). These views will be referred to when describing apparatus 110 in subsequent figures. FIG. 4D shows an example embodiment where clip 431 is positioned at the same side of apparatus 110 as sensor 220 (e.g., the front side of apparatus 110). Alternatively, clip 431 may be positioned at an opposite side of apparatus 110 as sensor 220 (e.g., the rear side of apparatus 110). In various embodiments, apparatus 110 may include function button 430, as shown in FIG. 4D.

Figure 4E:
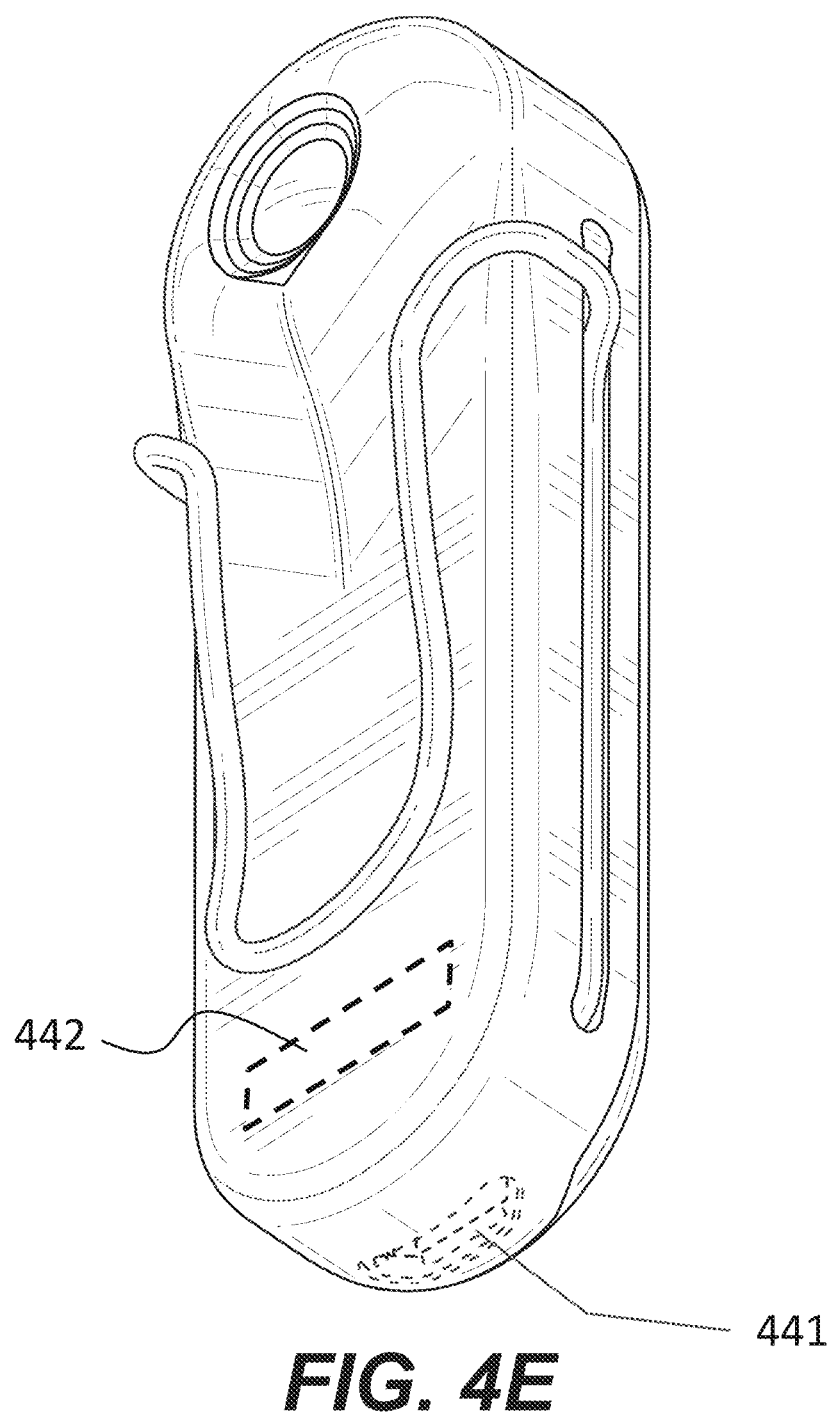
Figure 4F:
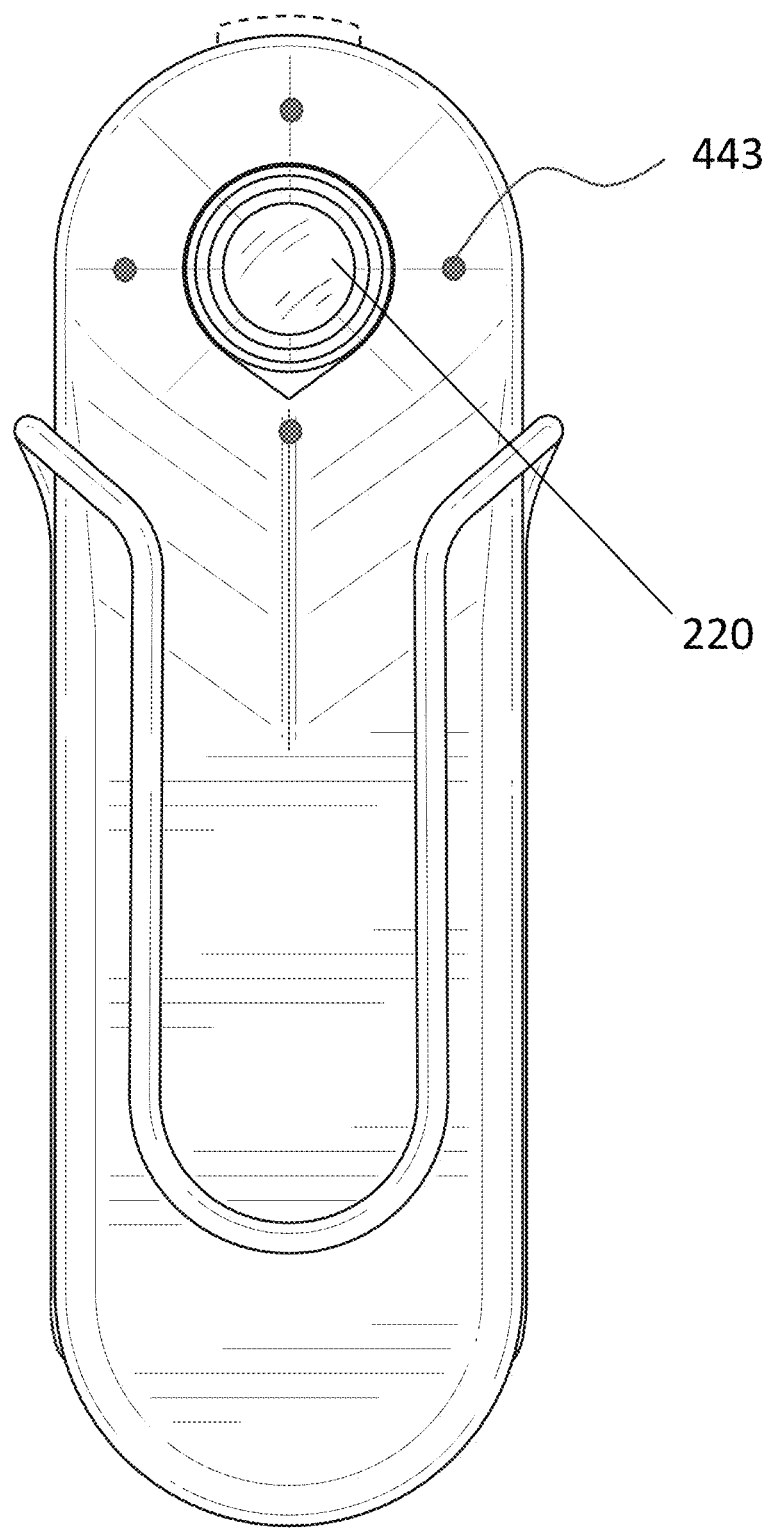
Figure 4G:
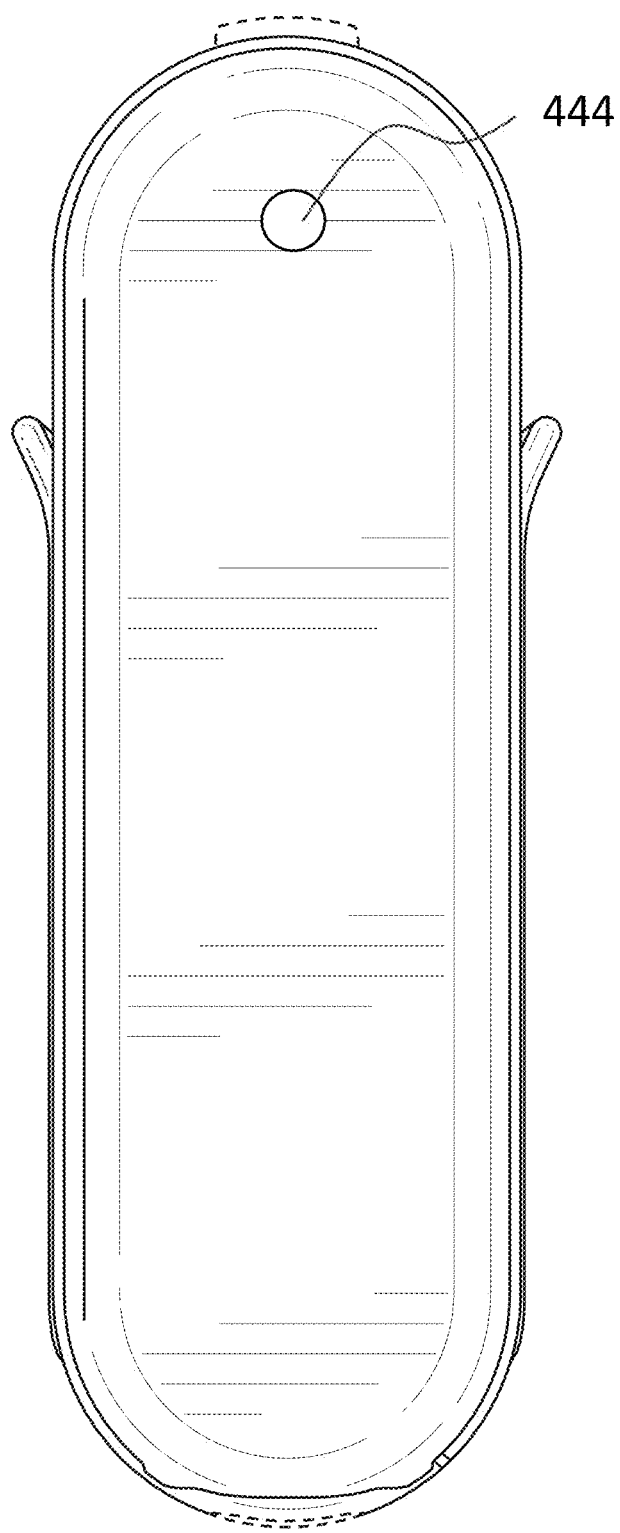

Various views of apparatus 110 are illustrated in FIGS. 4E through 4K. For example, FIG. 4E shows a view of apparatus 110 with an electrical connection 441. Electrical connection 441 may be, for example, a USB port, that may be used to transfer data to/from apparatus 110 and provide electrical power to apparatus 110. In an example embodiment, connection 441 may be used to charge a battery 442 schematically shown in FIG. 4E. FIG. 4F shows F-view of apparatus 110, including sensor 220 and one or more microphones 443. In some embodiments, apparatus 110 may include several microphones 443 facing outwards, wherein microphones 443 are configured to obtain environmental sounds and sounds of various speakers communicating with user 100. FIG. 4G shows R-view of apparatus 110. In some embodiments, microphone 444 may be positioned at the rear side of apparatus 110, as shown in FIG. 4G. Microphone 444 may be used to detect an audio signal from user 100. It should be noted, that apparatus 110 may have microphones placed at any side (e.g., a front side, a rear side, a left side, a right side, a top side, or a bottom side) of apparatus 110. In various embodiments, some microphones may be at a first side (e.g., microphones 443 may be at the front of apparatus 110) and other microphones may be at a second side (e.g., microphone 444 may be at the back side of apparatus 110).

Figure 4H:
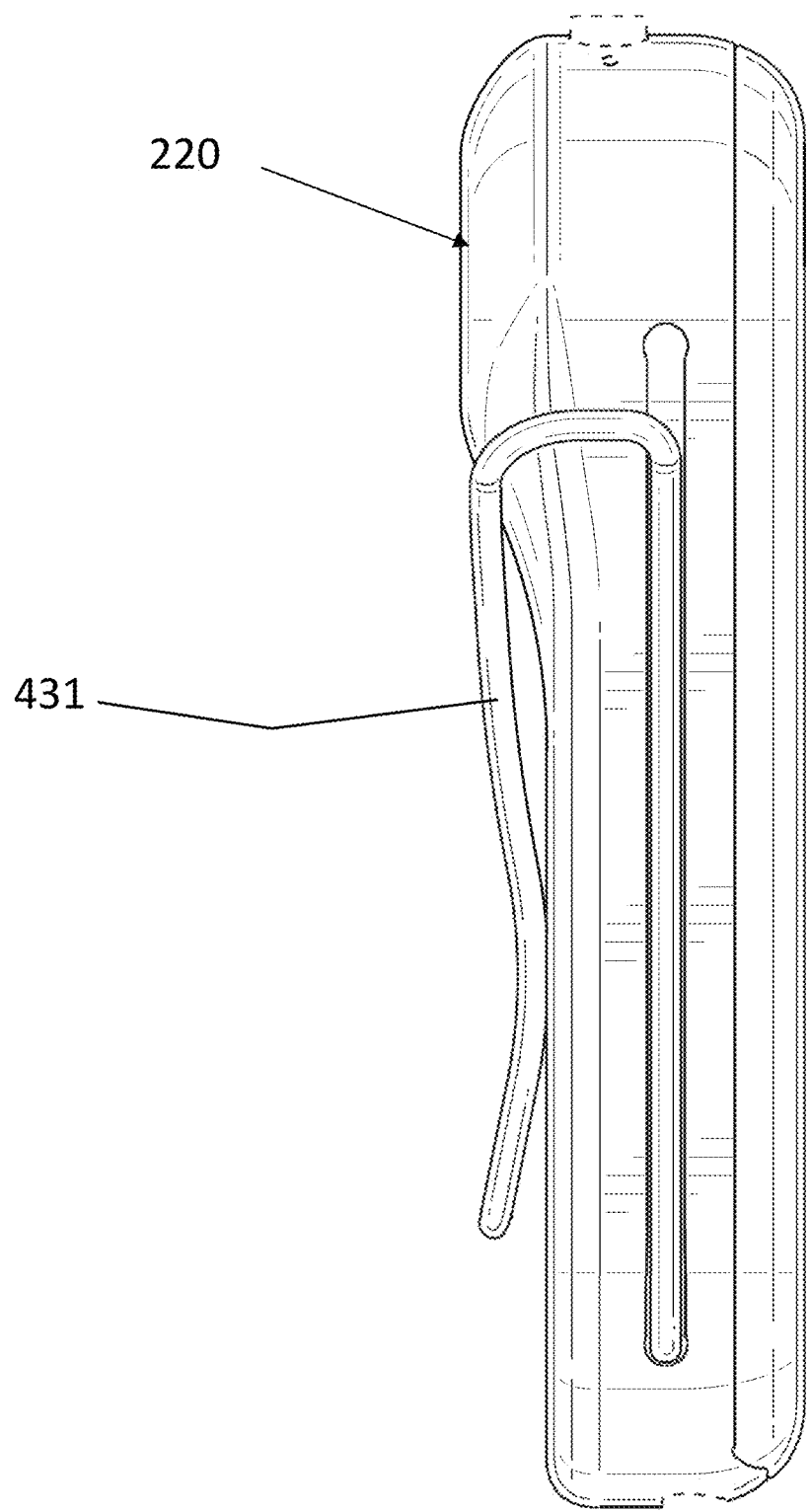
Figure 4I:
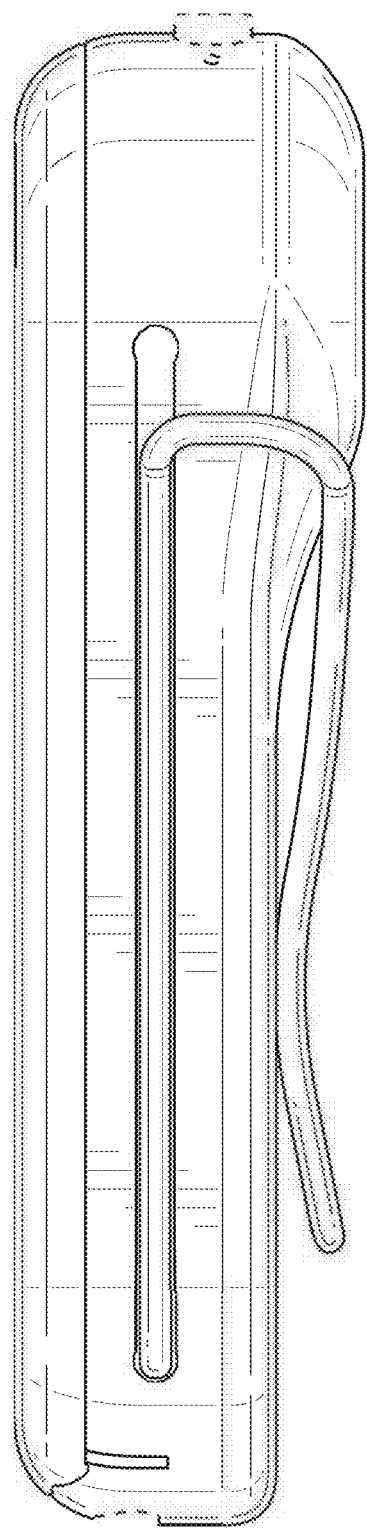
Figure 4J:
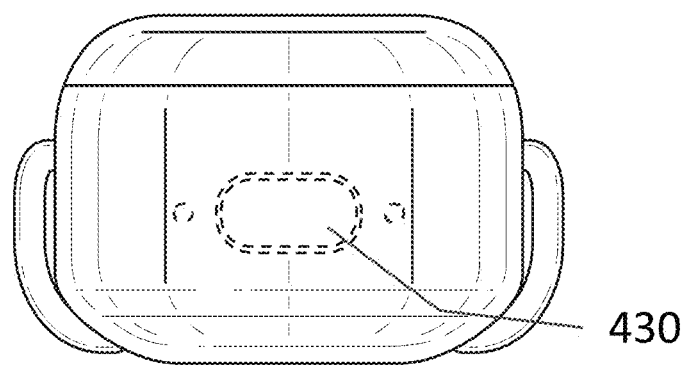
Figure 4K:
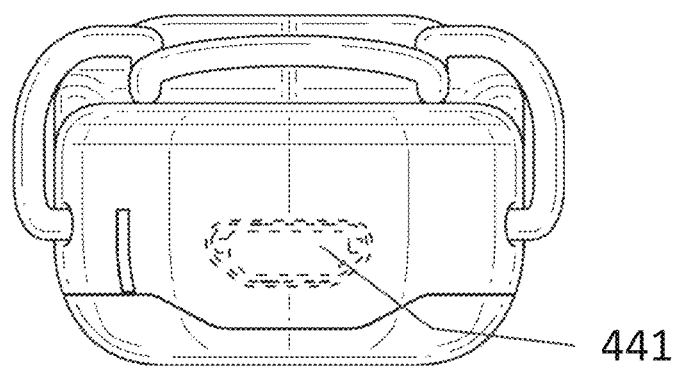

FIGS. 4H and 4I show different sides of apparatus 110 (i.e., S-view of apparatus 110) consisted with disclosed embodiments. For example, FIG. 4H shows the location of sensor 220 and an example shape of clip 431. FIG. 4J shows T-view of apparatus 110, including function button 430, and FIG. 4K shows B-view of apparatus 110 with electrical connection 441.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
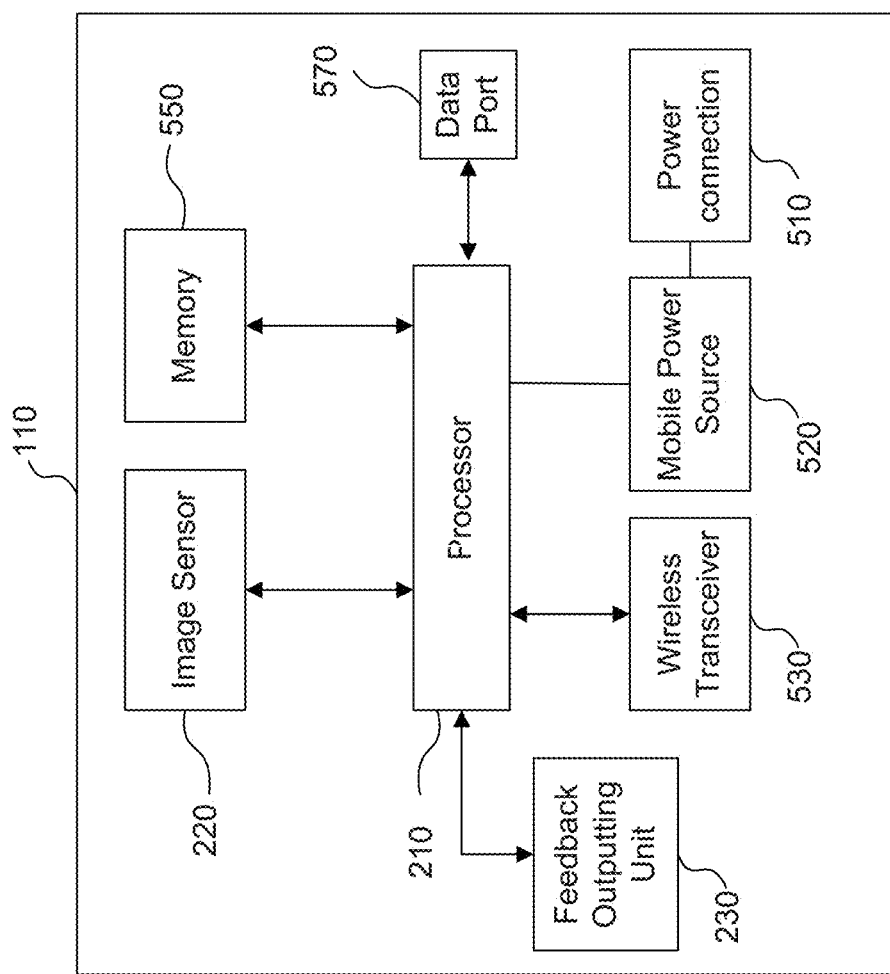
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
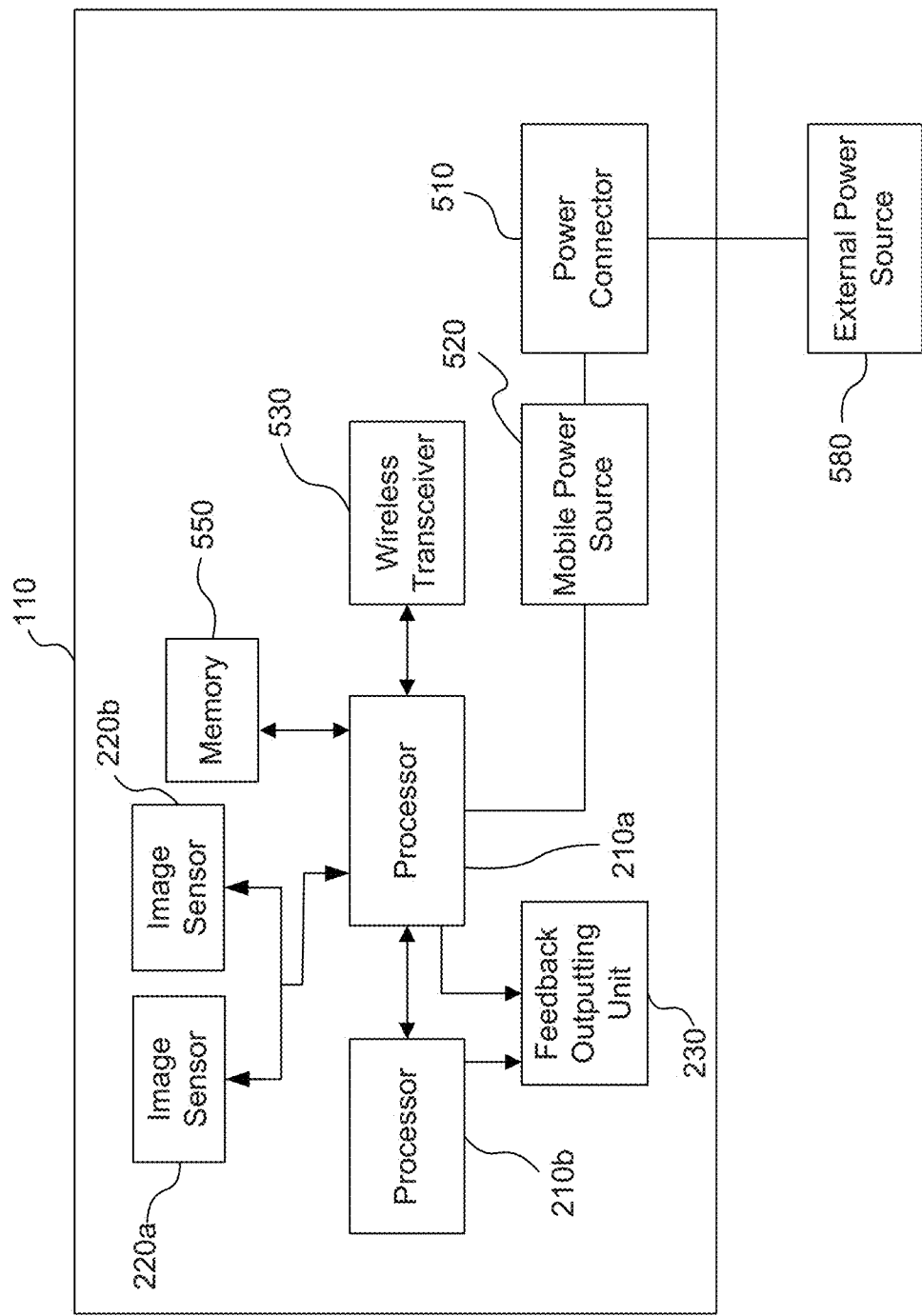
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
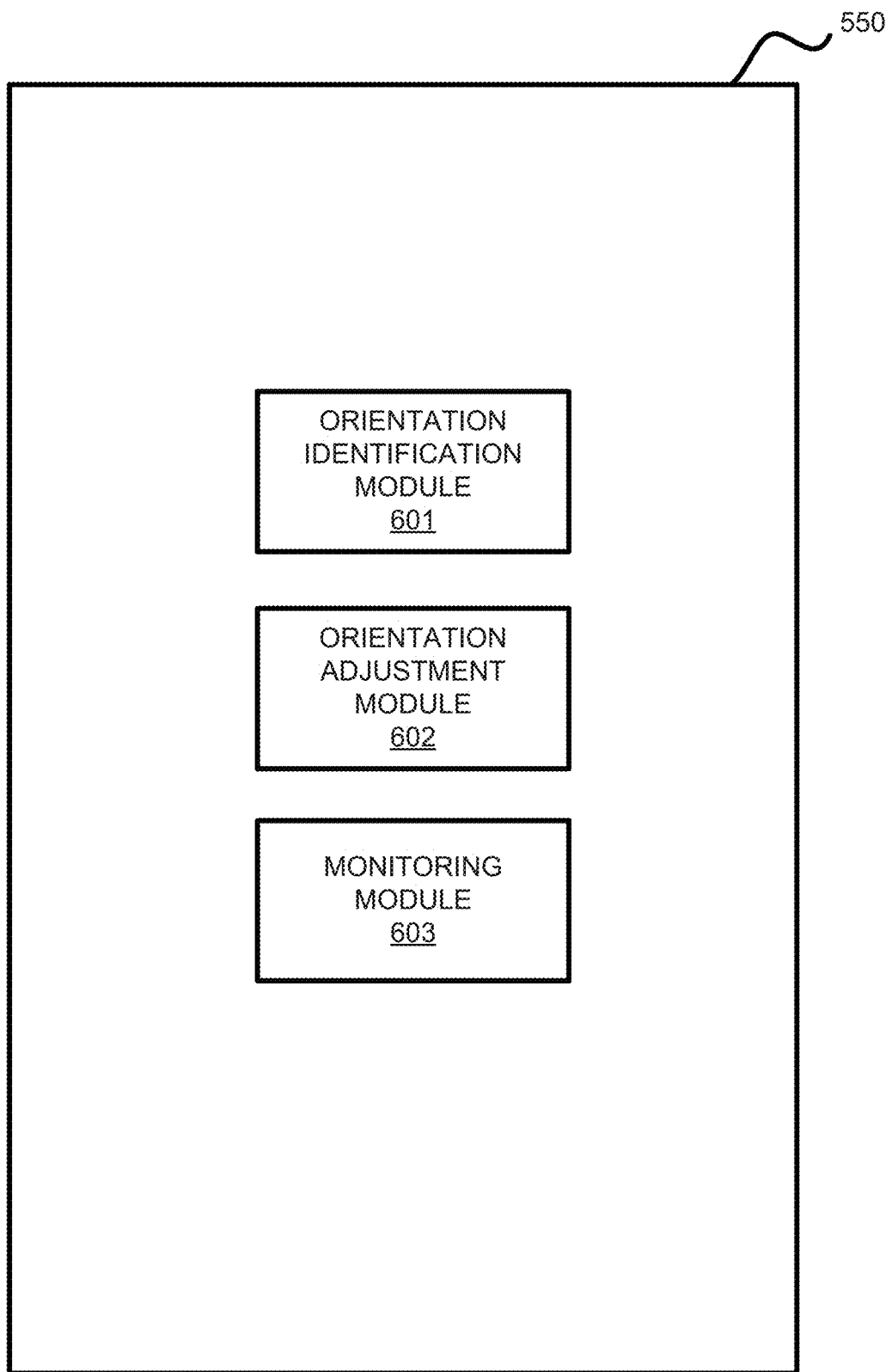
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
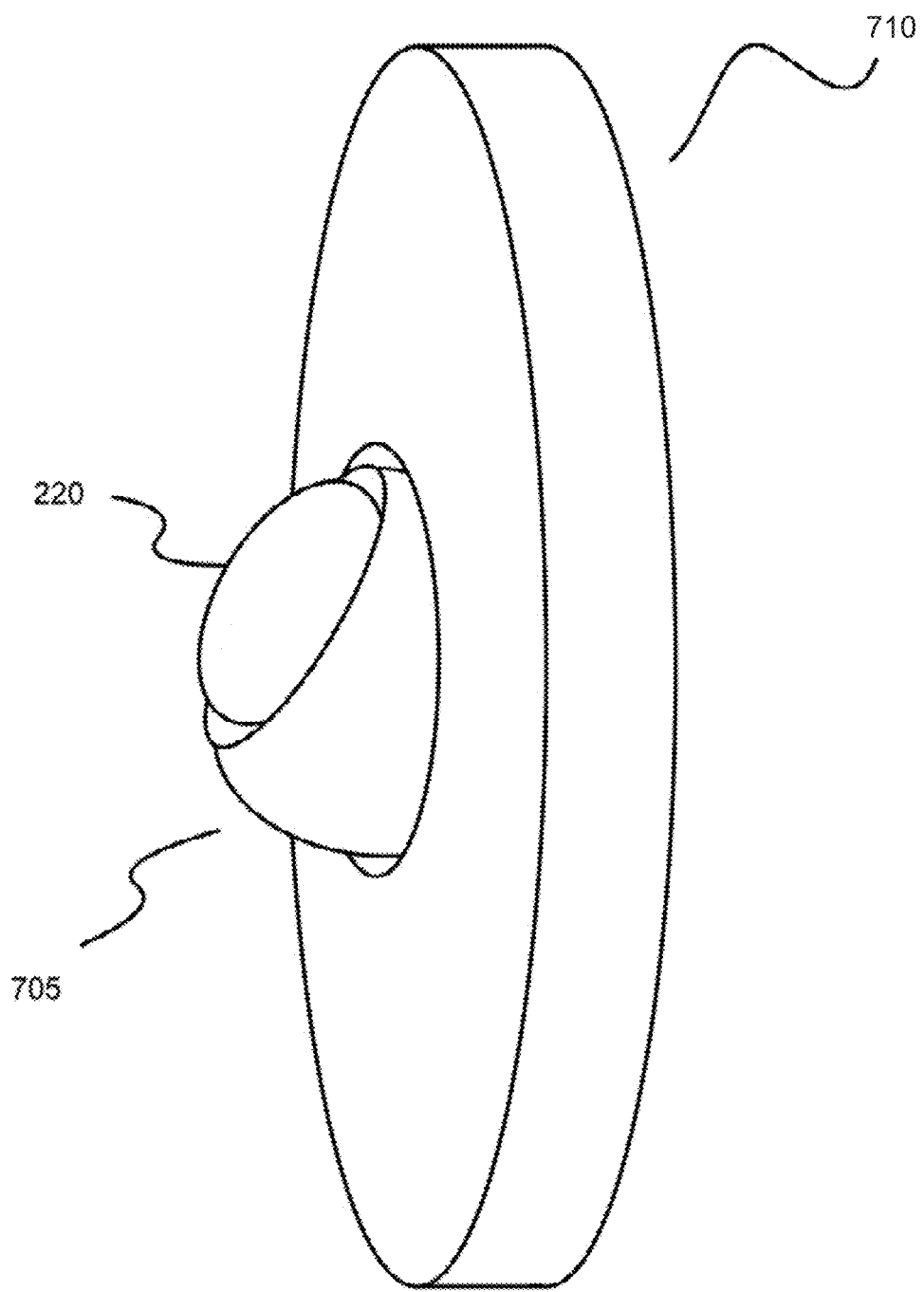
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing Exemplary embodiments of capturing units, connectors, and power units consistent with the disclosure are discussed in further detail with respect to FIGS. 8-14.

Figure 8:
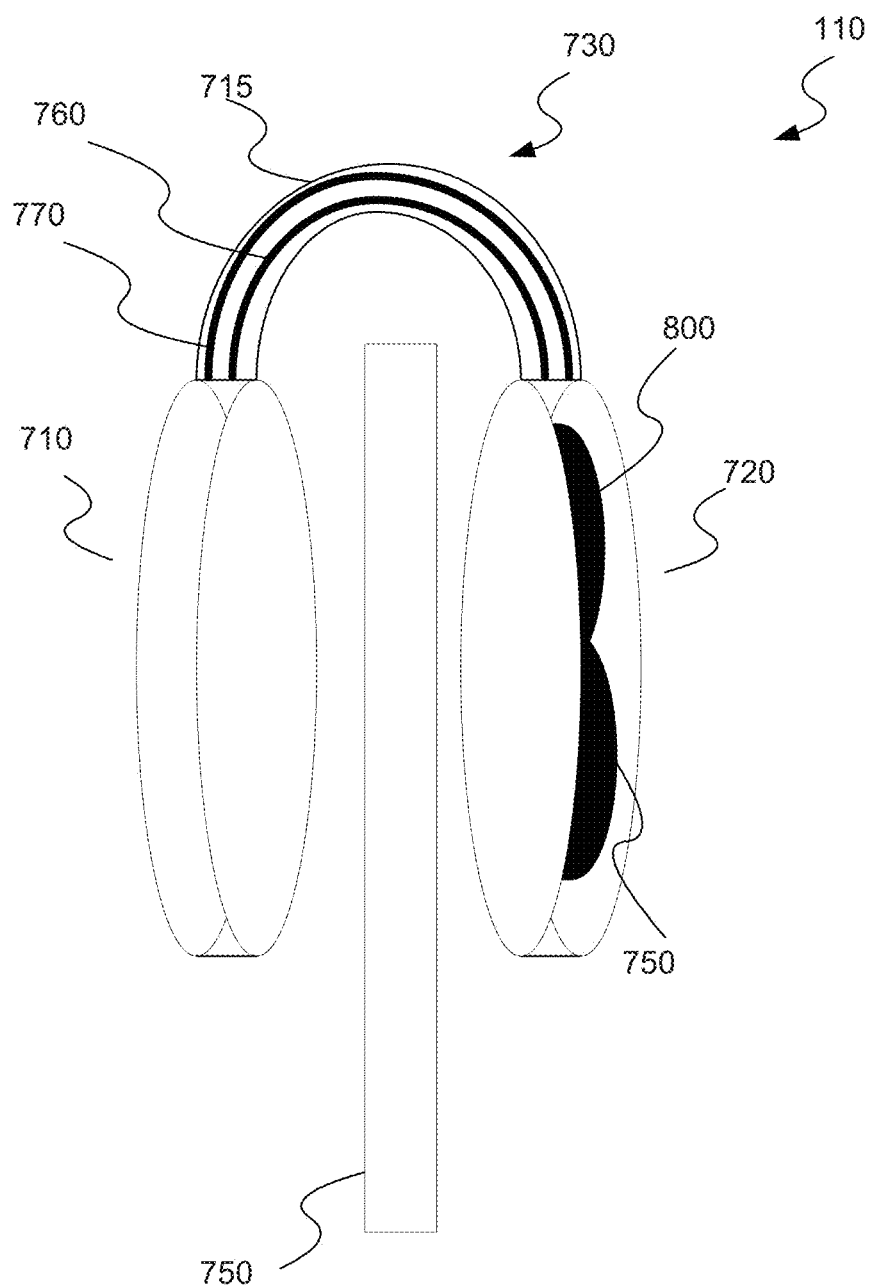
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
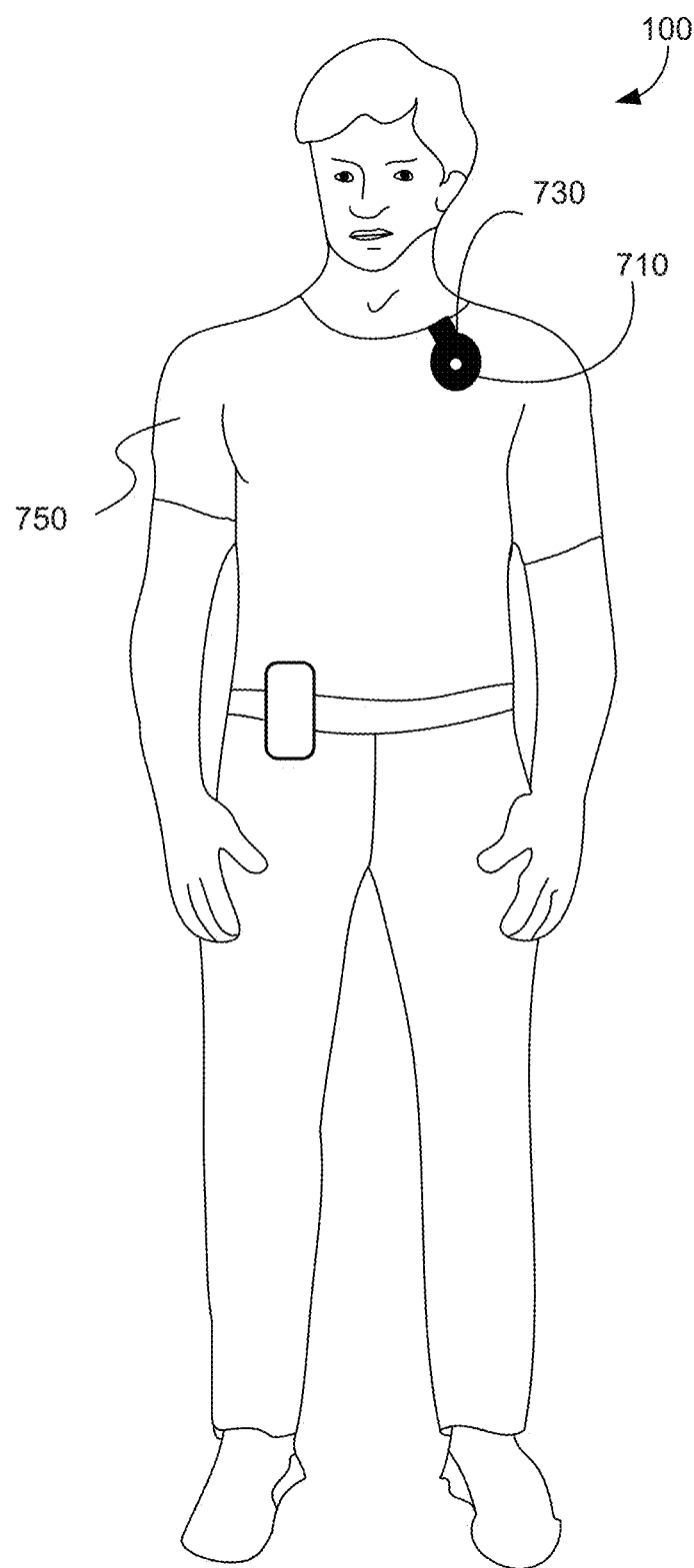
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
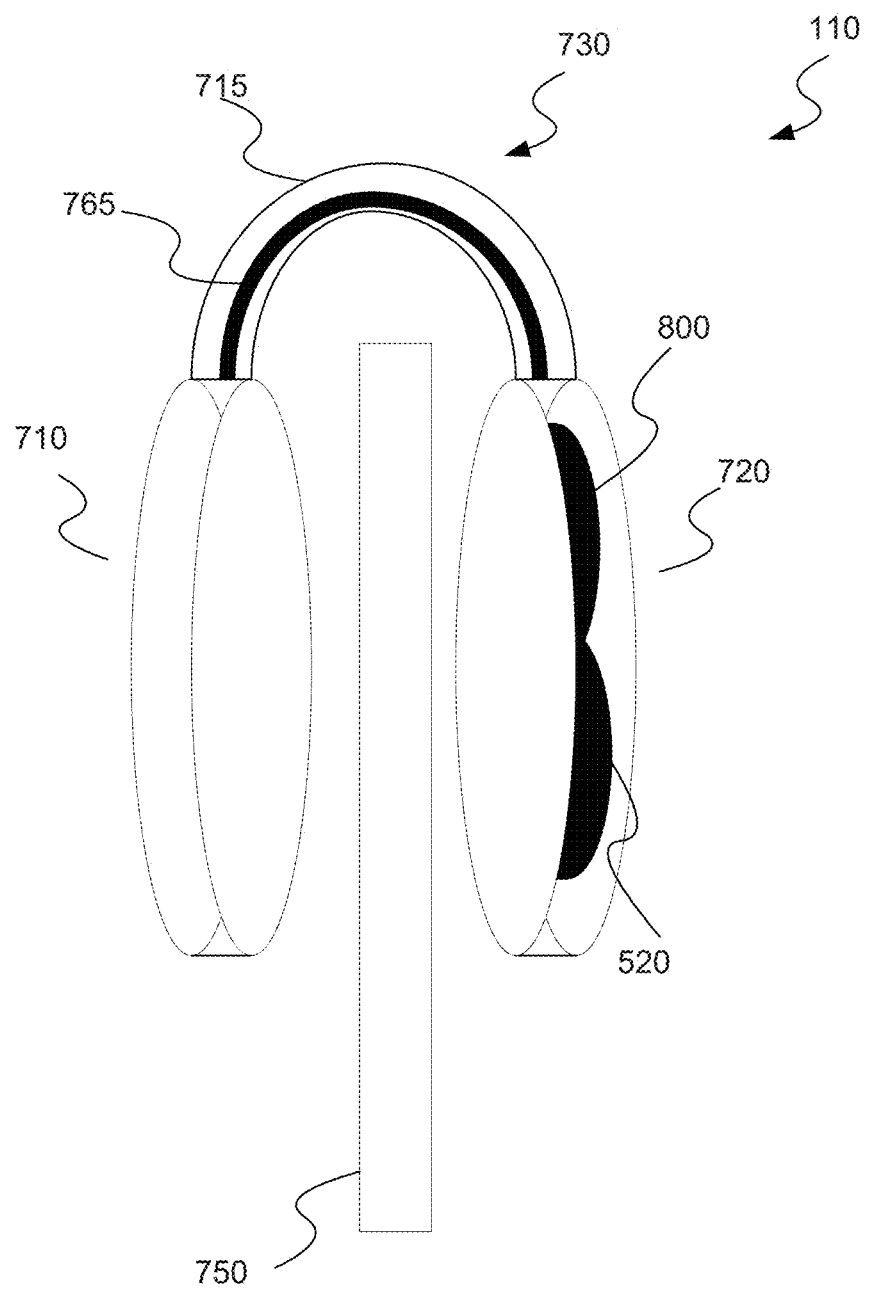
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
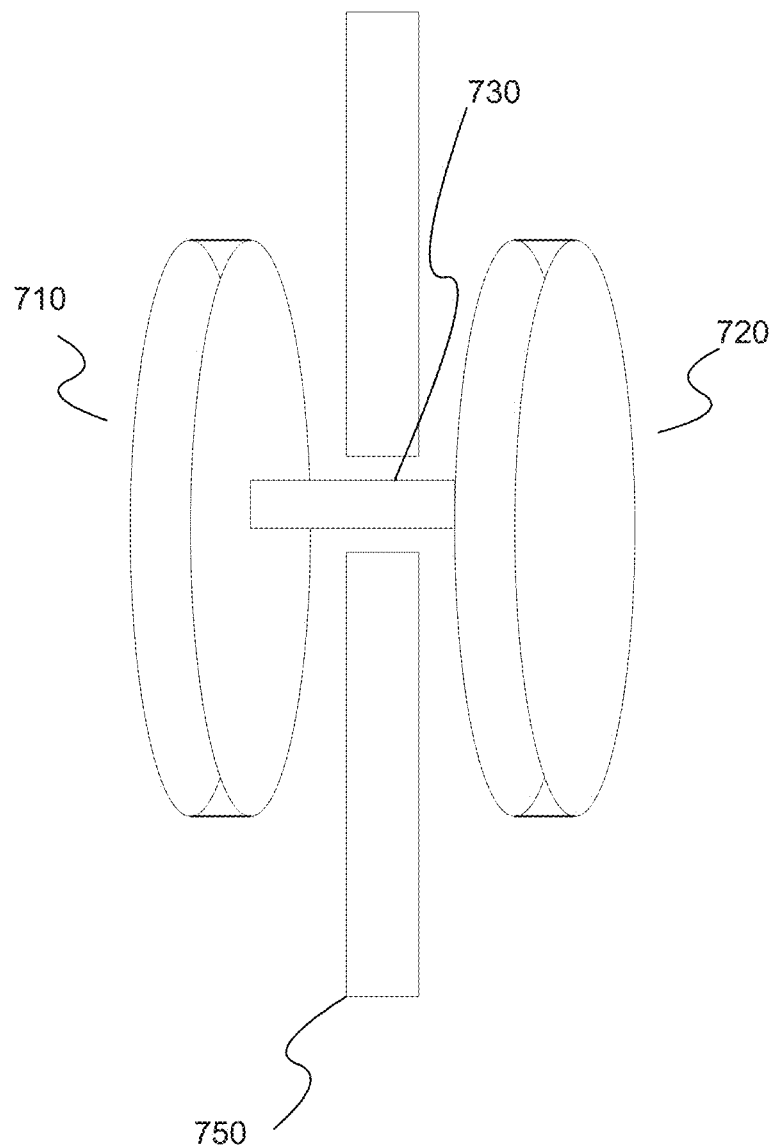
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
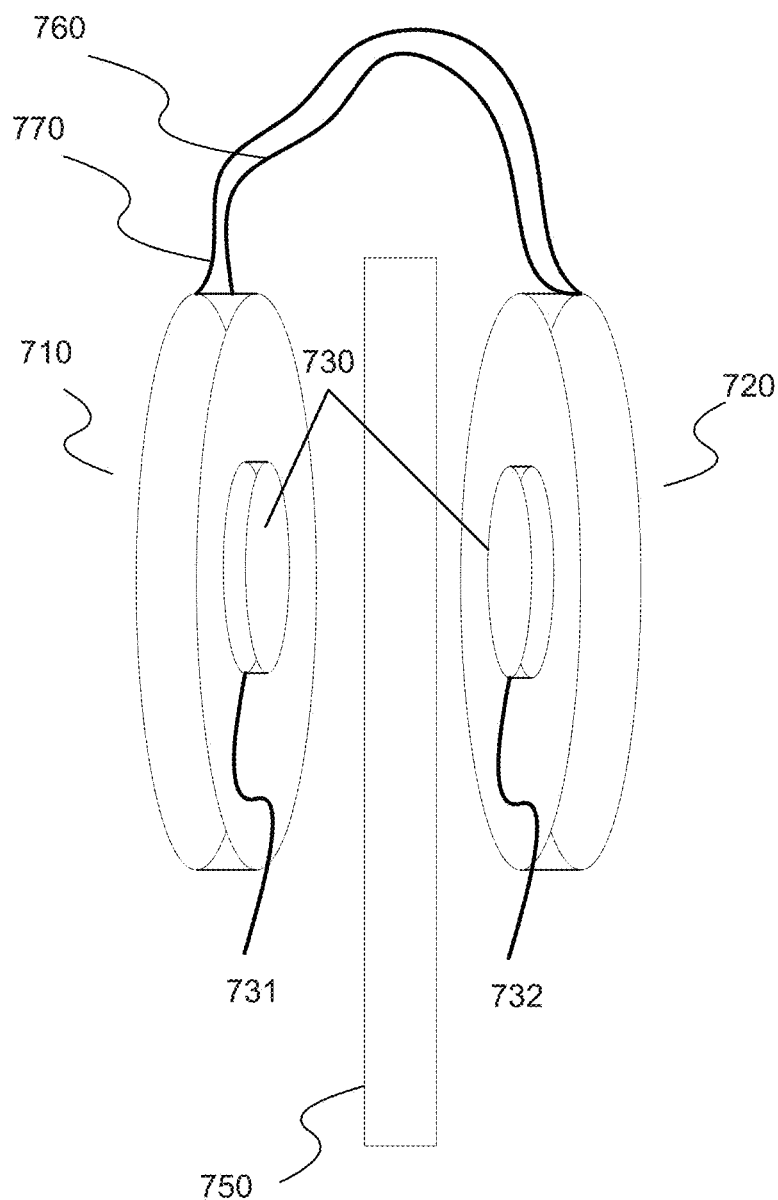
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
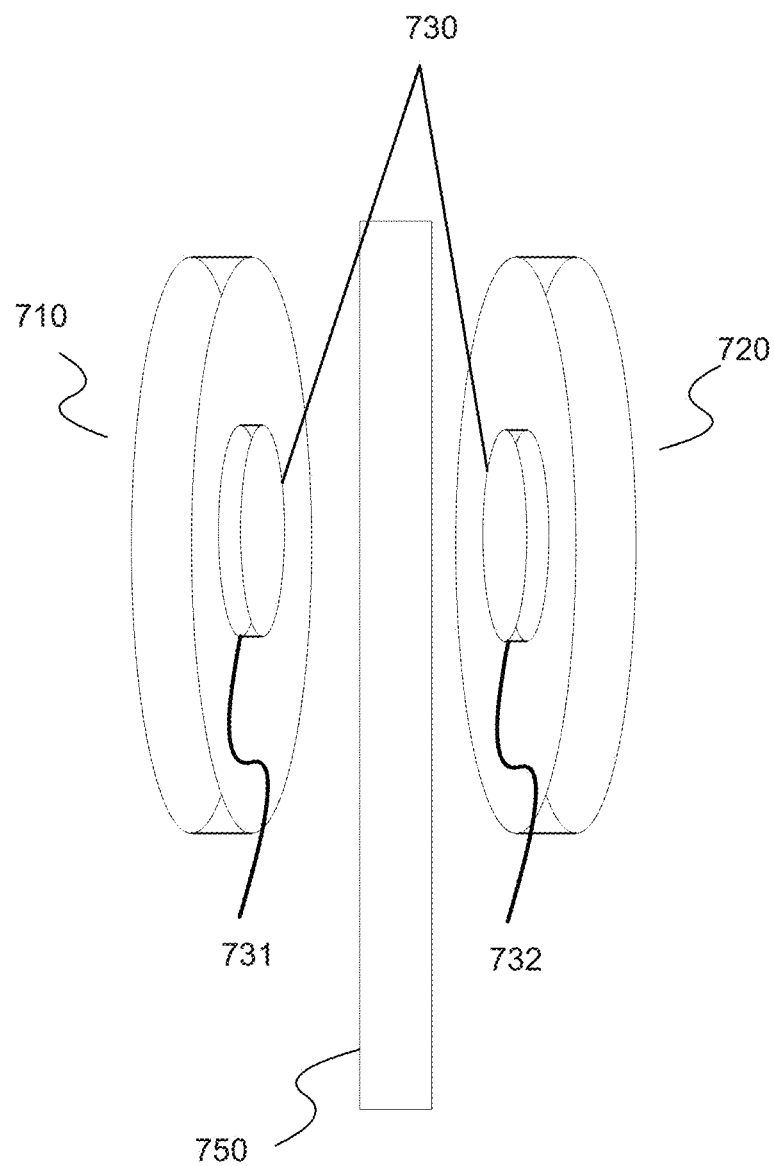
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
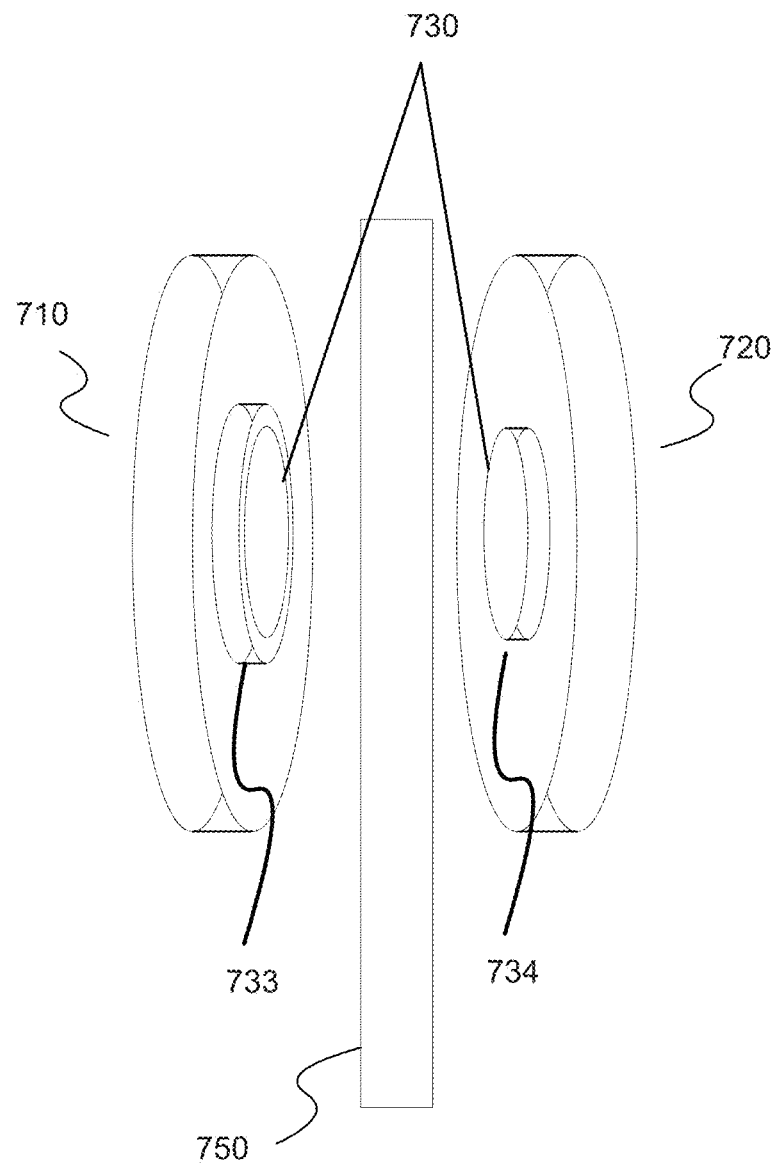
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
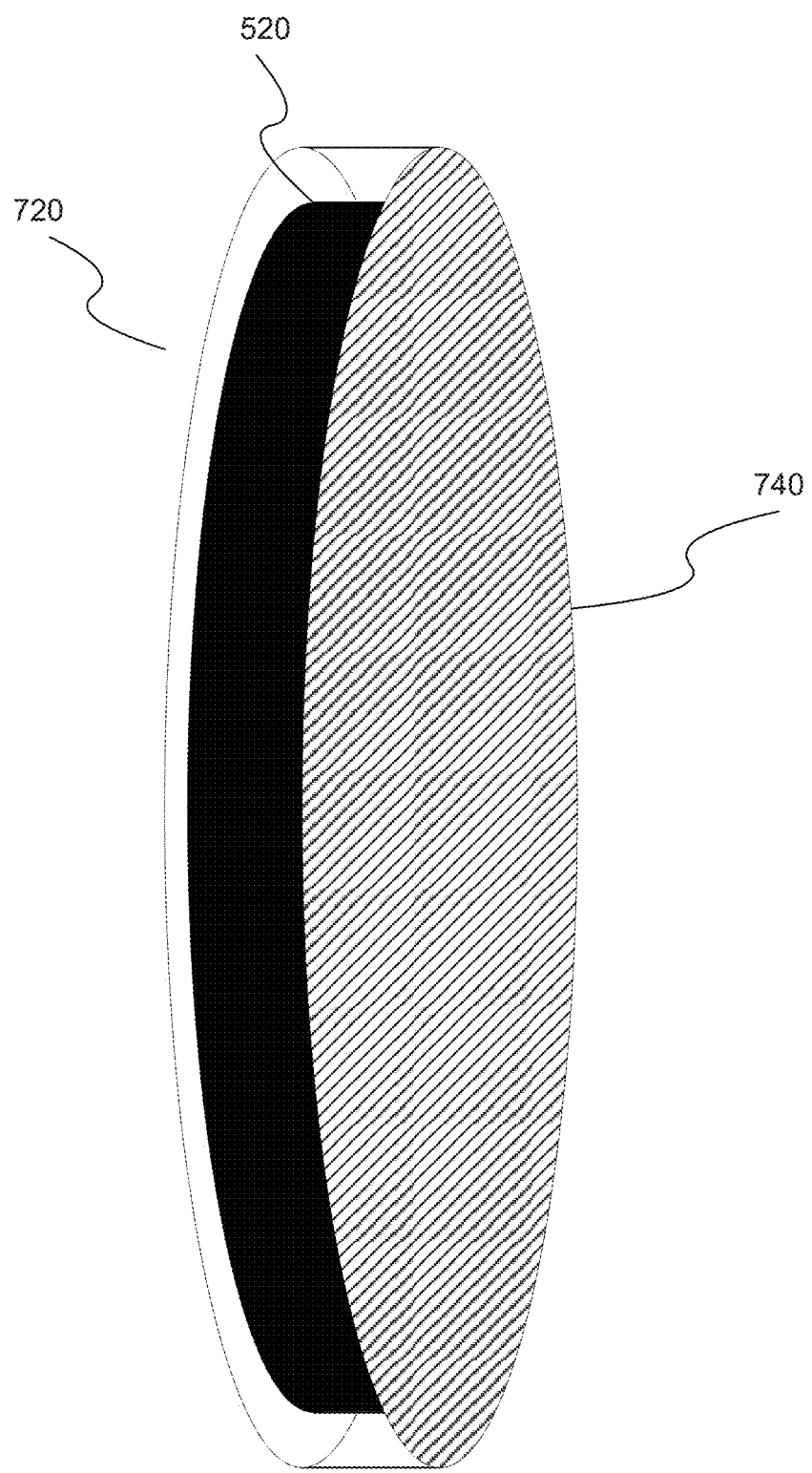
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
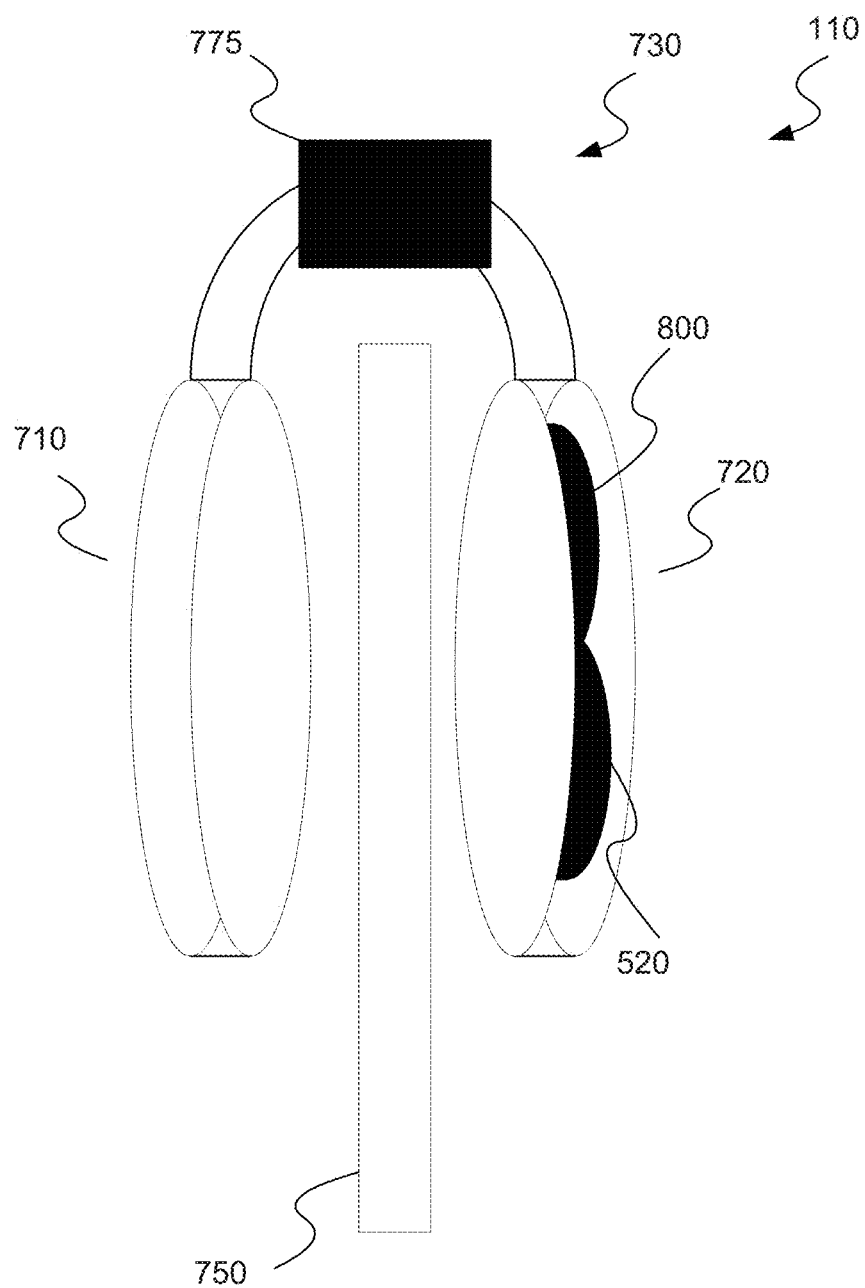
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Camera-Based Directional Hearing Aid

As discussed previously, the disclosed embodiments may include providing feedback, such as acoustical and tactile feedback, to one or more auxiliary devices in response to processing at least one image in an environment. In some embodiments, the auxiliary device may be an earpiece or other device used to provide auditory feedback to the user, such as a hearing aid. Traditional hearing aids often use microphones to amplify sounds in the user's environment. These traditional systems, however, are often unable to distinguish between sounds that may be of particular importance to the wearer of the device, or may do so on a limited basis. Using the systems and methods of the disclosed embodiments, various improvements to traditional hearing aids are provided, as described in detail below.

In one embodiment, a camera-based directional hearing aid may be provided for selectively amplifying sounds based on a look direction of a user. The hearing aid may communicate with an image capturing device, such as apparatus 110, to determine the look direction of the user. This look direction may be used to isolate and/or selectively amplify sounds received from that direction (e.g., sounds from individuals in the user's look direction, etc.). Sounds received from directions other than the user's look direction may be suppressed, attenuated, filtered or the like.

Figure 17A:
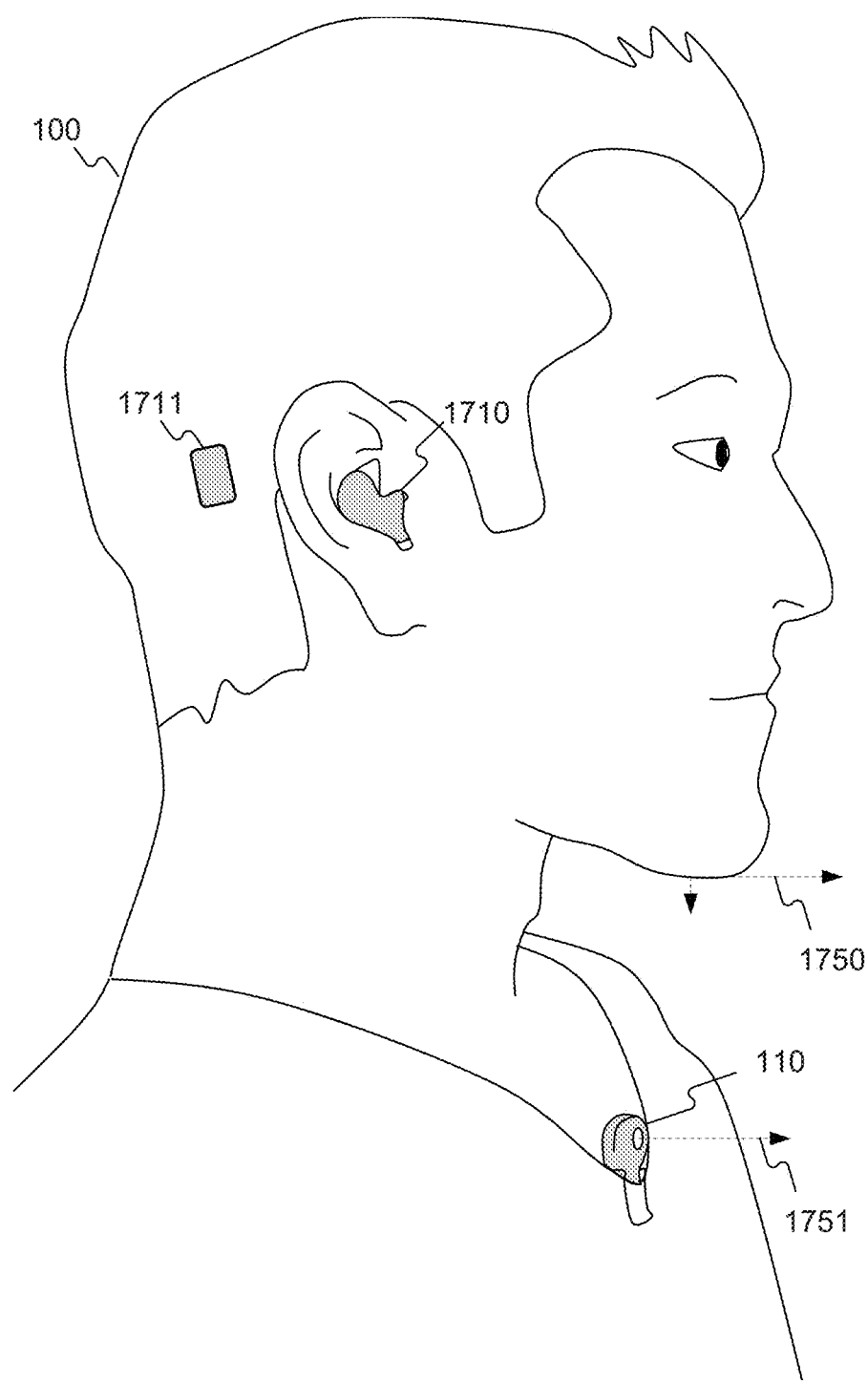
FIG. 17A is a schematic illustration of an example of a user wearing an apparatus for a camera-based hearing aid device according to a disclosed embodiment.

FIG. 17A is a schematic illustration of an example of a user 100 wearing an apparatus 110 for a camera-based hearing interface device 1710 according to a disclosed embodiment. User 100 may wear apparatus 110 that is physically connected to a shirt or other piece of clothing of user 100, as shown. Consistent with the disclosed embodiments, apparatus 110 may be positioned in other locations, as described previously. For example, apparatus 110 may be physically connected to a necklace, a belt, glasses, a wrist strap, a button, etc. Apparatus 110 may be configured to communicate with a hearing interface device such as hearing interface device 1710. Such communication may be through a wired connection, or may be made wirelessly (e.g., using a Bluetooth™, NFC, or forms of wireless communication). In some embodiments, one or more additional devices may also be included, such as computing device 120. Accordingly, one or more of the processes or functions described herein with respect to apparatus 110 or processor 210 may be performed by computing device 120 and/or processor 540.

Hearing interface device 1710 may be any device configured to provide audible feedback to user 100. Hearing interface device 1710 may correspond to feedback outputting unit 230, described above, and therefore any descriptions of feedback outputting unit 230 may also apply to hearing interface device 1710. In some embodiments, hearing interface device 1710 may be separate from feedback outputting unit 230 and may be configured to receive signals from feedback outputting unit 230. As shown in FIG. 17A, hearing interface device 1710 may be placed in one or both ears of user 100, similar to traditional hearing interface devices. Hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, microphones for detecting sounds in the environment of user 100, internal electronics, processors, memories, etc. In some embodiments, in addition to or instead of a microphone, hearing interface device 1710 may comprise one or more communication units, and in particular one or more receivers for receiving signals from apparatus 110 and transferring the signals to user 100.

Hearing interface device 1710 may have various other configurations or placement locations. In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Apparatus 110 may be configured to determine a user look direction 1750 of user 100. In some embodiments, user look direction 1750 may be tracked by monitoring a direction of the chin, or another body part or face part of user 100 relative to an optical axis of a camera sensor 1751. Apparatus 110 may be configured to capture one or more images of the surrounding environment of user, for example, using image sensor 220. The captured images may include a representation of a chin of user 100, which may be used to determine user look direction 1750. Processor 210 (and/or processors 210a and 210b) may be configured to analyze the captured images and detect the chin or another part of user 100 using various image detection or processing algorithms (e.g., using convolutional neural networks (CNN), scale-invariant feature transform (SIFT), histogram of oriented gradients (HOG) features, or other techniques). Based on the detected representation of a chin of user 100, look direction 1750 may be determined. Look direction 1750 may be determined in part by comparing the detected representation of a chin of user 100 to an optical axis of a camera sensor 1751. For example, the optical axis 1751 may be known or fixed in each image and processor 210 may determine look direction 1750 by comparing a representative angle of the chin of user 100 to the direction of optical axis 1751. While the process is described using a representation of a chin of user 100, various other features may be detected for determining user look direction 1750, including the user's face, nose, eyes, hand, etc.

In other embodiments, user look direction 1750 may be aligned more closely with the optical axis 1751. For example, as discussed above, apparatus 110 may be affixed to a pair of glasses of user 100, as shown in FIG. 1A. In this embodiment, user look direction 1750 may be the same as or close to the direction of optical axis 1751. Accordingly, user look direction 1750 may be determined or approximated based on the view of image sensor 220.

Figure 17B:
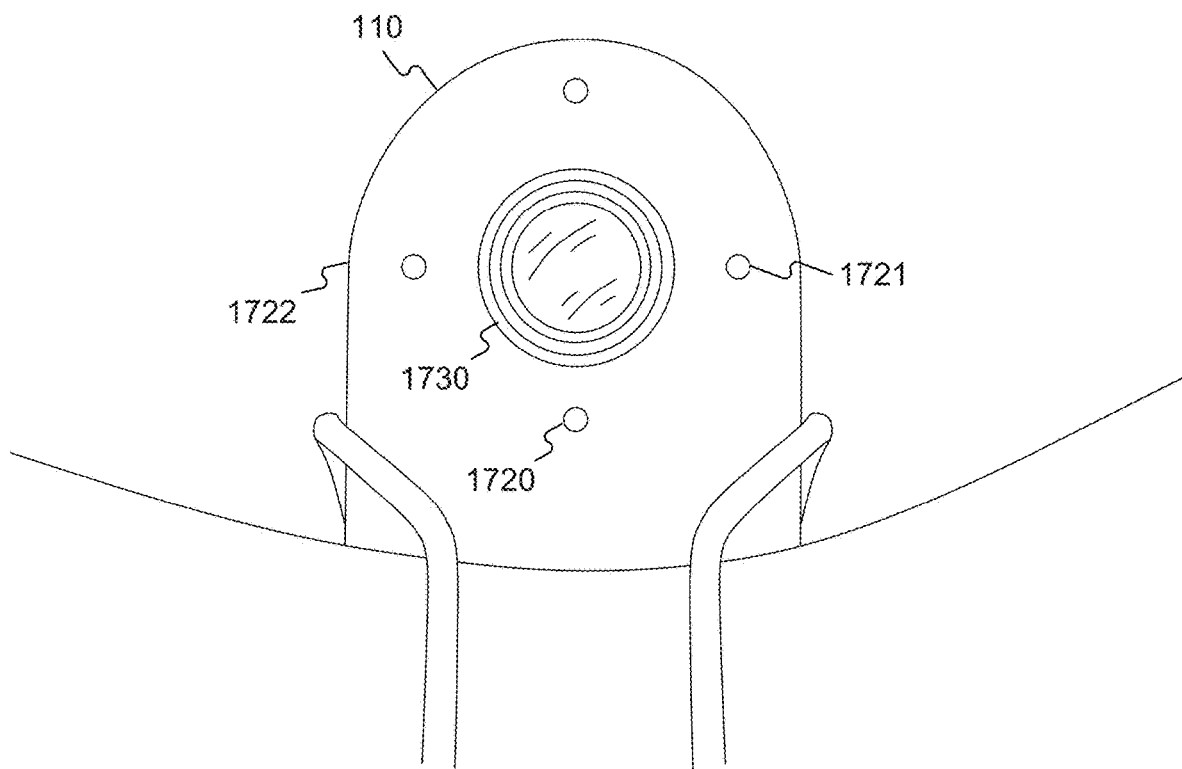
FIG. 17B is a schematic illustration of an embodiment of an apparatus securable to an article of clothing consistent with the present disclosure.

FIG. 17B is a schematic illustration of an embodiment of an apparatus securable to an article of clothing consistent with the present disclosure. Apparatus 110 may be securable to a piece of clothing, such as the shirt of user 110, as shown in FIG. 17A. Apparatus 110 may be securable to other articles of clothing, such as a belt or pants of user 100, as discussed above. Apparatus 110 may have one or more cameras 1730, which may correspond to image sensor 220. Camera 1730 may be configured to capture images of the surrounding environment of user 100. In some embodiments, camera 1730 may be configured to detect a representation of a chin of the user in the same images capturing the surrounding environment of the user, which may be used for other functions described in this disclosure. In other embodiments camera 1730 may be an auxiliary or separate camera dedicated to determining user look direction 1750.

Apparatus 110 may further comprise one or more microphones 1720 for capturing sounds from the environment of user 100. Microphone 1720 may also be configured to determine a directionality of sounds in the environment of user 100. For example, microphone 1720 may comprise one or more directional microphones, which may be more sensitive to picking up sounds in certain directions. For example, microphone 1720 may comprise a unidirectional microphone, designed to pick up sound from a single direction or small range of directions. Microphone 1720 may also comprise a cardioid microphone, which may be sensitive to sounds from the front and sides. Microphone 1720 may also include a microphone array, which may comprise additional microphones, such as microphone 1721 on the front of apparatus 110, or microphone 1722, placed on the side of apparatus 110. In some embodiments, microphone 1720 may be a multi-port microphone for capturing multiple audio signals. The microphones shown in FIG. 17B are by way of example only, and any suitable number, configuration, or location of microphones may be utilized. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100.

As a preliminary step before other audio analysis operations, the sound captured from an environment of a user may be classified using any audio classification technique. For example, the sound may be classified into segments containing music, tones, laughter, screams, or the like. Indications of the respective segments may be logged in a database and may prove highly useful for life logging applications. As one example, the logged information may enable the system to to retrieve and/or determine a mood when the user met another person. Additionally, such processing is relatively fast and efficient, and does not require significant computing resources, and transmitting the information to a destination does not require significant bandwidth. Moreover, once certain parts of the audio are classified as non-speech, more computing resources may be available for processing the other segments.

Figure 18:
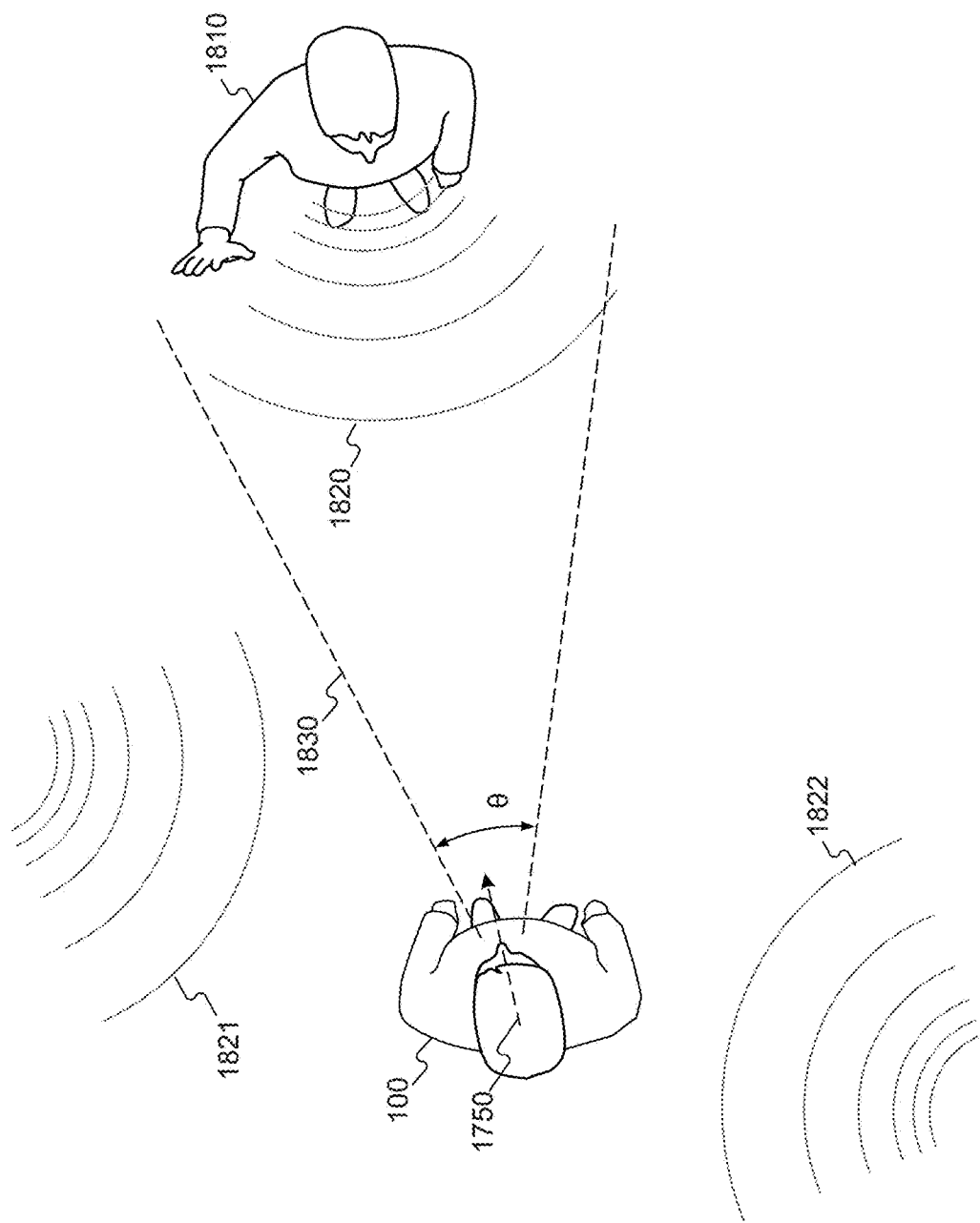
FIG. 18 is a schematic illustration showing an exemplary environment for use of a camera-based hearing aid consistent with the present disclosure.

Based on the determined user look direction 1750, processor 210 may selectively condition or amplify sounds from a region associated with user look direction 1750. FIG. 18 is a schematic illustration showing an exemplary environment for use of a camera-based hearing aid consistent with the present disclosure. Microphone 1720 may detect one or more sounds 1820, 1821, and 1822 within the environment of user 100. Based on user look direction 1750, determined by processor 210, a region 1830 associated with user look direction 1750 may be determined. As shown in FIG. 18, region 1830 may be defined by a cone or range of directions based on user look direction 1750. The range of angles may be defined by an angle, θ, as shown in FIG. 18. The angle, θ, may be any suitable angle for defining a range for conditioning sounds within the environment of user 100 (e.g., 10 degrees, 20 degrees, 45 degrees).

Processor 210 may be configured to cause selective conditioning of sounds in the environment of user 100 based on region 1830. The conditioned audio signal may be transmitted to hearing interface device 1710, and thus may provide user 100 with audible feedback corresponding to the look direction of the user. For example, processor 210 may determine that sound 1820 (which may correspond to the voice of an individual 1810, or to noise for example) is within region 1830. Processor 210 may then perform various conditioning techniques on the audio signals received from microphone 1720. The conditioning may include amplifying audio signals determined to correspond to sound 1820 relative to other audio signals. Amplification may be accomplished digitally, for example by processing audio signals associated with 1820 relative to other signals. Amplification may also be accomplished by changing one or more parameters of microphone 1720 to focus on audio sounds emanating from region 1830 (e.g., a region of interest) associated with user look direction 1750. For example, microphone 1720 may be a directional microphone that and processor 210 may perform an operation to focus microphone 1720 on sound 1820 or other sounds within region 1830. Various other techniques for amplifying sound 1820 may be used, such as using a beamforming microphone array, acoustic telescope techniques, etc.

Conditioning may also include attenuation or suppressing one or more audio signals received from directions outside of region 1830. For example, processor 1820 may attenuate sounds 1821 and 1822. Similar to amplification of sound 1820, attenuation of sounds may occur through processing audio signals, or by varying one or more parameters associated with one or more microphones 1720 to direct focus away from sounds emanating from outside of region 1830.

In some embodiments, conditioning may further include changing a tone of audio signals corresponding to sound 1820 to make sound 1820 more perceptible to user 100. For example, user 100 may have lesser sensitivity to tones in a certain range and conditioning of the audio signals may adjust the pitch of sound 1820 to make it more perceptible to user 100. For example, user 100 may experience hearing loss in frequencies above 10 khz. Accordingly, processor 210 may remap higher frequencies (e.g., at 15 khz) to 10 khz. In some embodiments processor 210 may be configured to change a rate of speech associated with one or more audio signals. Accordingly, processor 210 may be configured to detect speech within one or more audio signals received by microphone 1720, for example using voice activity detection (VAD) algorithms or techniques. If sound 1820 is determined to correspond to voice or speech, for example from individual 1810, processor 220 may be configured to vary the playback rate of sound 1820. For example, the rate of speech of individual 1810 may be decreased to make the detected speech more perceptible to user 100. Various other processing may be performed, such as modifying the tone of sound 1820 to maintain the same pitch as the original audio signal, or to reduce noise within the audio signal. If speech recognition has been performed on the audio signal associated with sound 1820, conditioning may further include modifying the audio signal based on the detected speech. For example, processor 210 may introduce pauses or increase the duration of pauses between words and/or sentences, which may make the speech easier to understand.

The conditioned audio signal may then be transmitted to hearing interface device 1710 and produced for user 100. Thus, in the conditioned audio signal, sound 1820 may be easier to hear to user 100, louder and/or more easily distinguishable than sounds 1821 and 1822, which may represent background noise within the environment.

Figure 19:
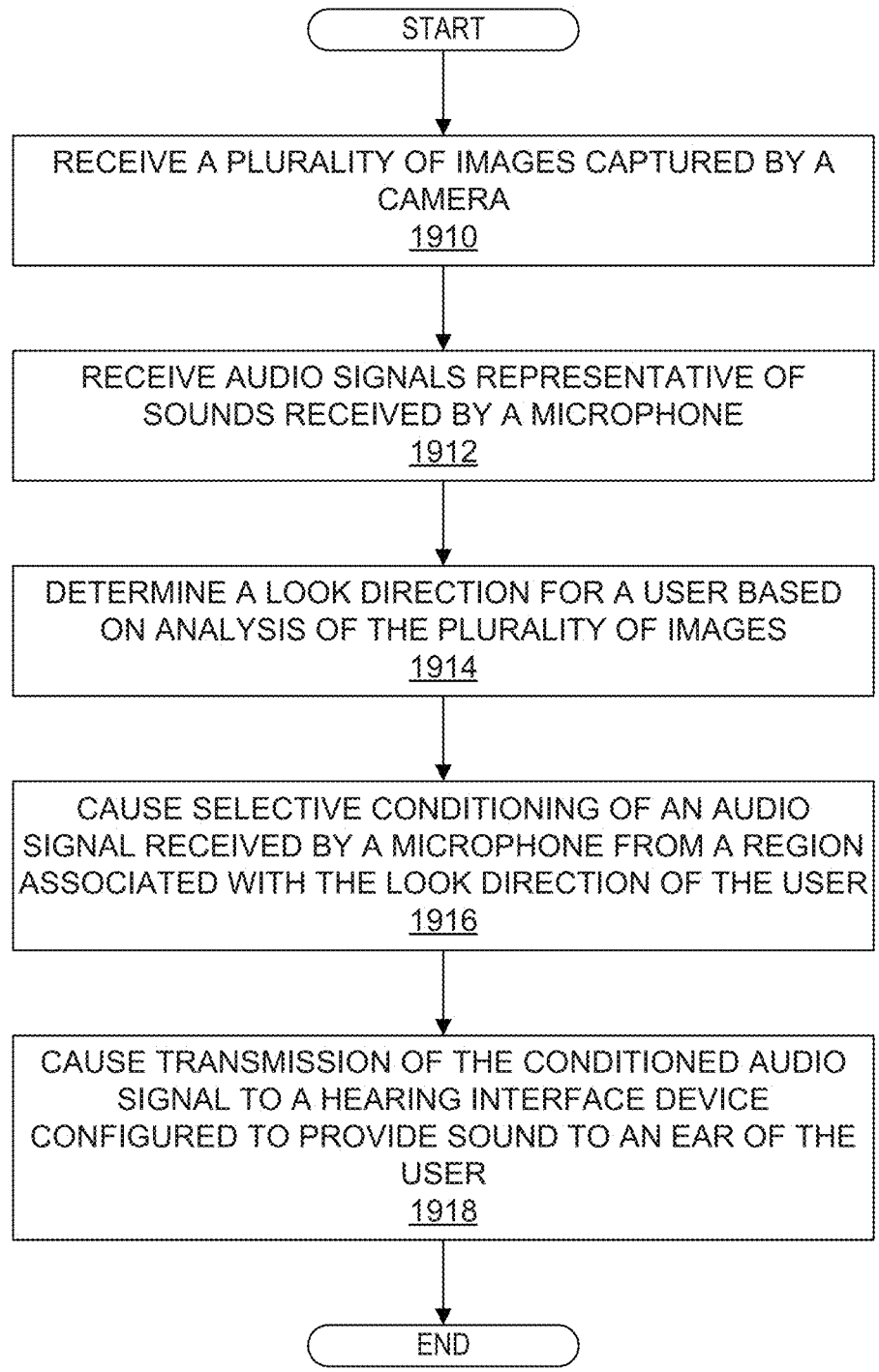
FIG. 19 is a flowchart showing an exemplary process for selectively amplifying sounds emanating from a detected look direction of a user consistent with disclosed embodiments.

FIG. 19 is a flowchart showing an exemplary process 1900 for selectively amplifying sounds emanating from a detected look direction of a user consistent with disclosed embodiments. Process 1900 may be performed by one or more processors associated with apparatus 110, such as processor 210. In some embodiments, some or all of process 1900 may be performed on processors external to apparatus 110. In other words, the processor performing process 1900 may be included in a common housing as microphone 1720 and camera 1730, or may be included in a second housing. For example, one or more portions of process 1900 may be performed by processors in hearing interface device 1710, or an auxiliary device, such as computing device 120.

In step 1910, process 1900 may include receiving a plurality of images from an environment of a user captured by a camera. The camera may be a wearable camera such as camera 1730 of apparatus 110. In step 1912, process 1900 may include receiving audio signals representative of sounds received by at least one microphone. The microphone may be configured to capture sounds from an environment of the user. For example, the microphone may be microphone 1720, as described above. Accordingly, the microphone may include a directional microphone, a microphone array, a multi-port microphone, or various other types of microphones. In some embodiments, the microphone and wearable camera may be included in a common housing, such as the housing of apparatus 110. The one or more processors performing process 1900 may also be included in the housing or may be included in a second housing. In such embodiments, the processor(s) may be configured to receive images and/or audio signals from the common housing via a wireless link (e.g., Bluetooth™, NFC, etc.). Accordingly, the common housing (e.g., apparatus 110) and the second housing (e.g., computing device 120) may further comprise transmitters or various other communication components.

In step 1914, process 1900 may include determining a look direction for the user based on analysis of at least one of the plurality of images. As discussed above, various techniques may be used to determine the user look direction. In some embodiments, the look direction may be determined based, at least in part, upon detection of a representation of a chin of a user in one or more images. The images may be processed to determine a pointing direction of the chin relative to an optical axis of the wearable camera, as discussed above.

In step 1916, process 1900 may include causing selective conditioning of at least one audio signal received by the at least one microphone from a region associated with the look direction of the user. As described above, the region may be determined based on the user look direction determined in step 1914. The range may be associated with an angular width about the look direction (e.g., 10 degrees, 20 degrees, 45 degrees, etc.). Various forms of conditioning may be performed on the audio signal, as discussed above. In some embodiments, conditioning may include changing the tone or playback speed of an audio signal. For example, conditioning may include changing a rate of speech associated with the audio signal. In some embodiments, the conditioning may include amplification of the audio signal relative to other audio signals received from outside of the region associated with the look direction of the user. Amplification may be performed by various means, such as operation of a directional microphone configured to focus on audio sounds emanating from the region, or varying one or more parameters associated with the microphone to cause the microphone to focus on audio sounds emanating from the region. The amplification may include attenuating or suppressing one or more audio signals received by the microphone from directions outside the region associated with the look direction of user 110.

In step 1918, process 1900 may include causing transmission of the at least one conditioned audio signal to a hearing interface device configured to provide sound to an ear of the user. The conditioned audio signal, for example, may be transmitted to hearing interface device 1710, which may provide sound corresponding to the audio signal to user 100. The processor performing process 1900 may further be configured to cause transmission to the hearing interface device of one or more audio signals representative of background noise, which may be attenuated relative to the at least one conditioned audio signal. For example, processor 220 may be configured to transmit audio signals corresponding to sounds 1820, 1821, and 1822. The signal associated with 1820, however, may be modified in a different manner, for example amplified, from sounds 1821 and 1822 based on a determination that sound 1820 is within region 1830. In some embodiments, hearing interface device 1710 may include a speaker associated with an earpiece. For example, hearing interface device may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

Hearing Aid with Voice and/or Image Recognition

Consistent with the disclosed embodiments, a hearing aid may selectively amplify audio signals associated with a voice of a recognized individual. The hearing aid system may store voice characteristics and/or facial features of a recognized person to aid in recognition and selective amplification. For example, when an individual enters the field of view of apparatus 110, the individual may be recognized as an individual that has been introduced to the device, or that has possibly interacted with user 100 in the past (e.g., a friend, colleague, relative, prior acquaintance, etc.). Accordingly, audio signals associated with the recognized individual's voice may be isolated and/or selectively amplified relative to other sounds in the environment of the user. Audio signals associated with sounds received from directions other than the individual's direction may be suppressed, attenuated, filtered or the like.

User 100 may wear a hearing aid device similar to the camera-based hearing aid device discussed above. For example, the hearing aid device may be hearing interface device 1720, as shown in FIG. 17A. Hearing interface device 1710 may be any device configured to provide audible feedback to user 100. Hearing interface device 1710 may be placed in one or both ears of user 100, similar to traditional hearing interface devices. As discussed above, hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, a communication unit for receiving signals from another system, such as apparatus 110, microphones for detecting sounds in the environment of user 100, internal electronics, processors, memories, etc. Hearing interface device 1710 may correspond to feedback outputting unit 230 or may be separate from feedback outputting unit 230 and may be configured to receive signals from feedback outputting unit 230.

In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Hearing interface device 1710 may be configured to communicate with a camera device, such as apparatus 110. Such communication may be through a wired connection, or may be made wirelessly (e.g., using a Bluetooth™, NFC, or forms of wireless communication). As discussed above, apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to apparatus 110 or processor 210 may be performed by computing device 120 and/or processor 540.

As discussed above, apparatus 110 may comprise at least one microphone and at least one image capture device. Apparatus 110 may comprise microphone 1720, as described with respect to FIG. 17B. Microphone 1720 may be configured to determine a directionality of sounds in the environment of user 100. For example, microphone 1720 may comprise one or more directional microphones, a microphone array, a multi-port microphone, or the like. The microphones shown in FIG. 17B are by way of example only, and any suitable number, configuration, or location of microphones may be utilized. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100. Apparatus 110 may comprise one or more cameras, such as camera 1730, which may correspond to image sensor 220. Camera 1730 may be configured to capture images of the surrounding environment of user 100.

Figure 20A:
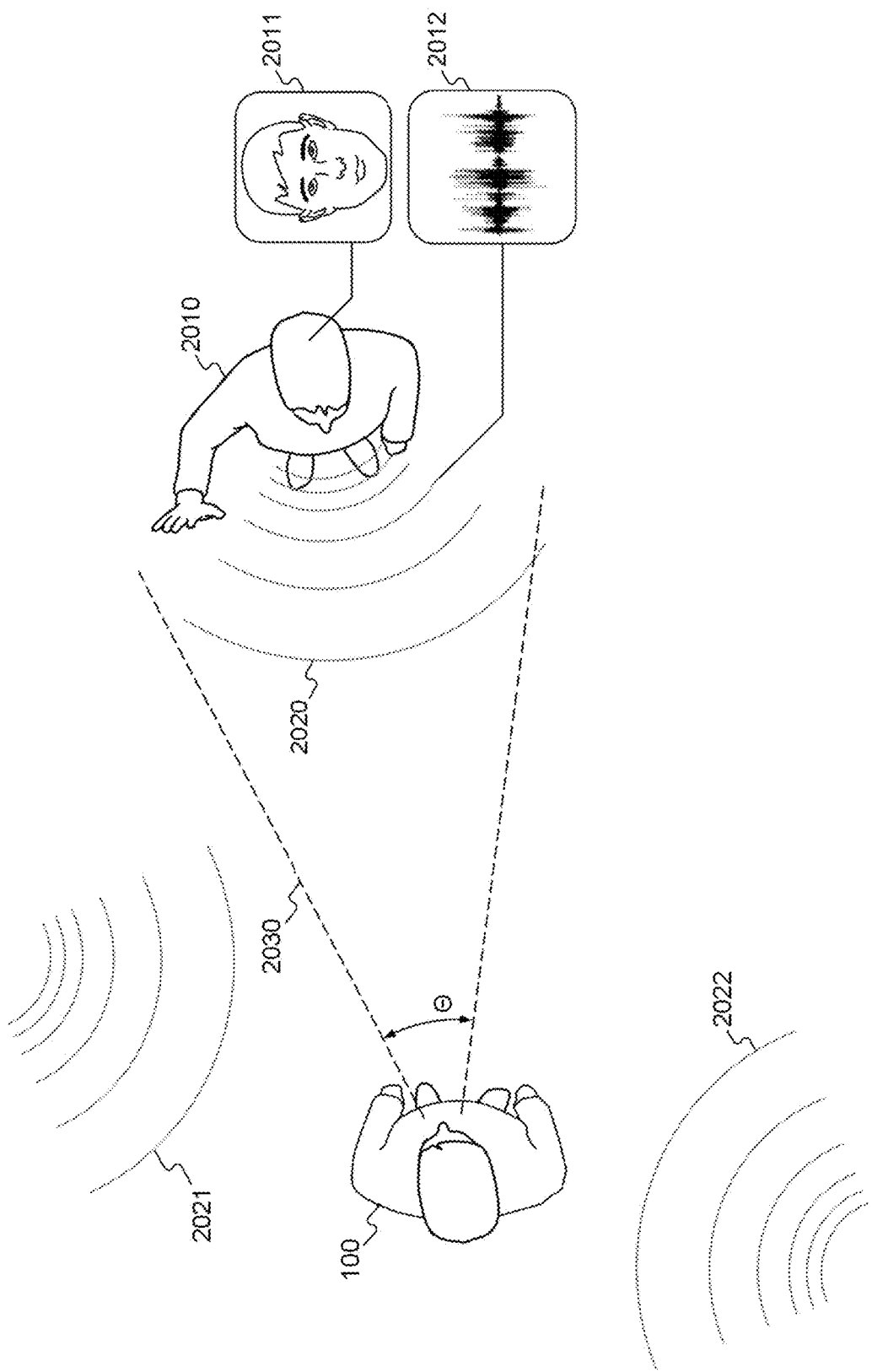
FIG. 20A is a schematic illustration showing an exemplary environment for use of a hearing aid with voice and/or image recognition consistent with the present disclosure.

Apparatus 110 may be configured to recognize an individual in the environment of user 100. FIG. 20A is a schematic illustration showing an exemplary environment for use of a hearing aid with voice and/or image recognition consistent with the present disclosure. Apparatus 110 may be configured to recognize a face 2011 or voice 2012 associated with an individual 2010 within the environment of user 100. For example, apparatus 110 may be configured to capture one or more images of the surrounding environment of user 100 using camera 1730. The captured images may include a representation of a recognized individual 2010, which may be a friend, colleague, relative, or prior acquaintance of user 100. Processor 210 (and/or processors 210a and 210b) may be configured to analyze the captured images and detect the recognized user using various facial recognition techniques, as represented by element 2011. Accordingly, apparatus 110, or specifically memory 550, may comprise one or more facial or voice recognition components.

Figure 20B:
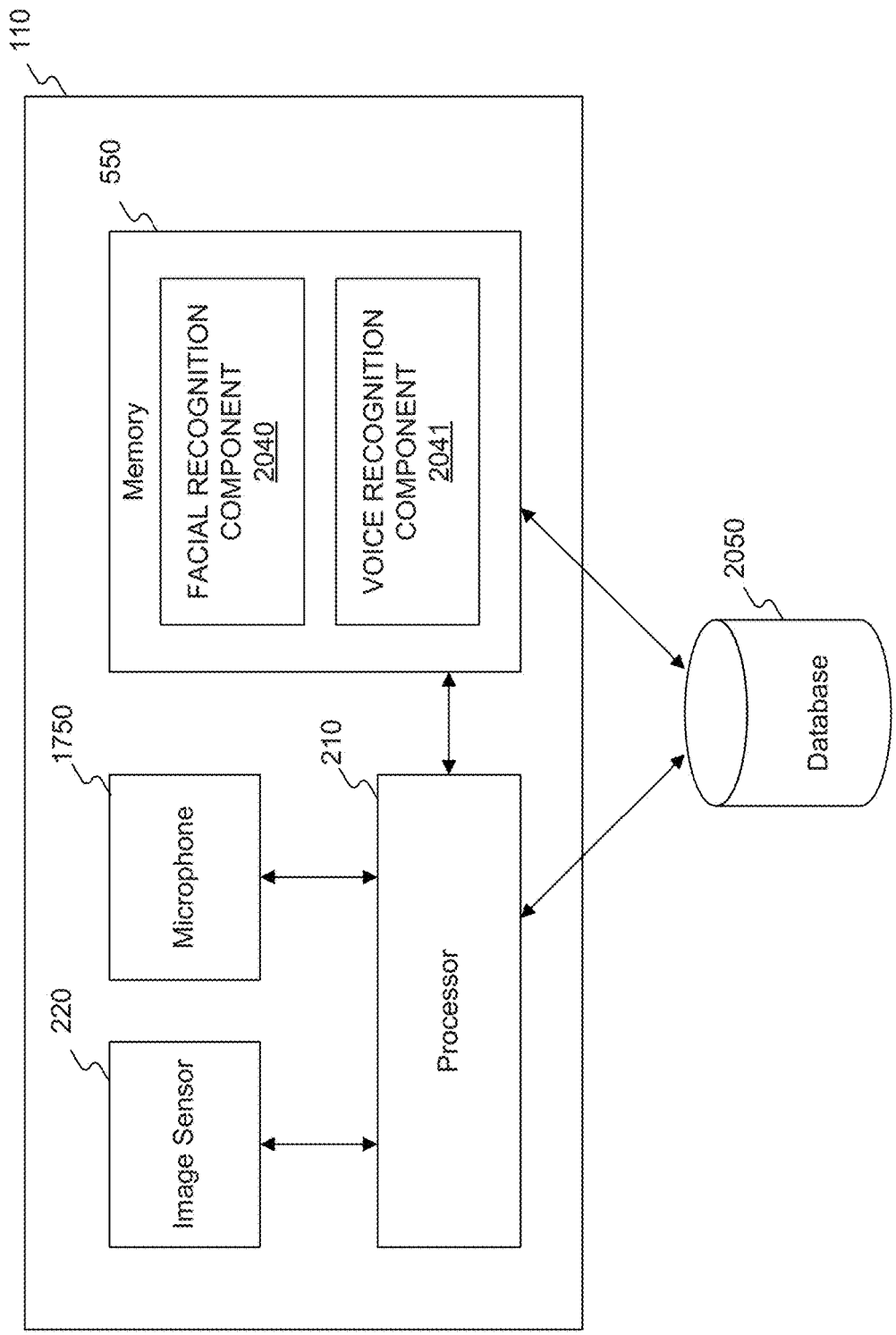
FIG. 20B illustrates an exemplary embodiment of an apparatus comprising facial and voice recognition components consistent with the present disclosure.

FIG. 20B illustrates an exemplary embodiment of apparatus 110 comprising facial and voice recognition components consistent with the present disclosure. Apparatus 110 is shown in FIG. 20B in a simplified form, and apparatus 110 may contain additional elements or may have alternative configurations, for example, as shown in FIGS. 5A-5C. Memory 550 (or 550a or 550b) may include facial recognition component 2040 and voice recognition component 2041. These components may be instead of or in addition to orientation identification module 601, orientation adjustment module 602, and motion tracking module 603 as shown in FIG. 6. Components 2040 and 2041 may contain software instructions for execution by at least one processing device, e.g., processor 210, included with a wearable apparatus. Components 2040 and 2041 are shown within memory 550 by way of example only, and may be located in other locations within the system. For example, components 2040 and 2041 may be located in hearing interface device 1710, in computing device 120, on a remote server, or in another associated device.

Facial recognition component 2040 may be configured to identify one or more faces within the environment of user 100. For example, facial recognition component 2040 may identify facial features on the face 2011 of individual 2010, such as the eyes, nose, cheekbones, jaw, or other features. Facial recognition component 2040 may then analyze the relative size and position of these features to identify the user. Facial recognition component 2040 may utilize one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like. Other facial recognition techniques such as 3-Dimensional recognition, skin texture analysis, and/or thermal imaging may also be used to identify individuals. Other features besides facial features may also be used for identification, such as the height, body shape, or other distinguishing features of individual 2010.

Facial recognition component 2040 may access a database or data associated with user 100 to determine if the detected facial features correspond to a recognized individual. For example, a processor 210 may access a database 2050 containing information about individuals known to user 100 and data representing associated facial features or other identifying features. Such data may include one or more images of the individuals, or data representative of a face of the user that may be used for identification through facial recognition. Database 2050 may be any device capable of storing information about one or more individuals, and may include a hard drive, a solid state drive, a web storage platform, a remote server, or the like. Database 2050 may be located within apparatus 110 (e.g., within memory 550) or external to apparatus 110, as shown in FIG. 20B. In some embodiments, database 2050 may be associated with a social network platform, such as Facebook™, LinkedIn™, Instagram™ etc. Facial recognition component 2040 may also access a contact list of user 100, such as a contact list on the user's phone, a web-based contact list (e.g., through Outlook™, Skype™, Google™, SalesForce™, etc.) or a dedicated contact list associated with hearing interface device 1710. In some embodiments, database 2050 may be compiled by apparatus 110 through previous facial recognition analysis. For example, processor 210 may be configured to store data associated with one or more faces recognized in images captured by apparatus 110 in database 2050. Each time a face is detected in the images, the detected facial features or other data may be compared to previously identified faces in database 2050. Facial recognition component 2040 may determine that an individual is a recognized individual of user 100 if the individual has previously been recognized by the system in a number of instances exceeding a certain threshold, if the individual has been explicitly introduced to apparatus 110, or the like.

In some embodiments, user 100 may have access to database 2050, such as through a web interface, an application on a mobile device, or through apparatus 110 or an associated device. For example, user 100 may be able to select which contacts are recognizable by apparatus 110 and/or delete or add certain contacts manually. In some embodiments, a user or administrator may be able to train facial recognition component 2040. For example, user 100 may have an option to confirm or reject identifications made by facial recognition component 2040, which may improve the accuracy of the system. This training may occur in real time, as individual 2010 is being recognized, or at some later time.

Other data or information may also inform the facial identification process. In some embodiments, processor 210 may use various techniques to recognize the voice of individual 2010, as described in further detail below. The recognized voice pattern and the detected facial features may be used, either alone or in combination, to determine that individual 2010 is recognized by apparatus 110. Processor 210 may also determine a user look direction 1750, as described above, which may be used to verify the identity of individual 2010. For example, if user 100 is looking in the direction of individual 2010 (especially for a prolonged period), this may indicate that individual 2010 is recognized by user 100, which may be used to increase the confidence of facial recognition component 2040 or other identification means.

Processor 210 may further be configured to determine whether individual 2010 is recognized by user 100 based on one or more detected audio characteristics of sounds associated with a voice of individual 2010. Returning to FIG. 20A, processor 210 may determine that sound 2020 corresponds to voice 2012 of user 2010. Processor 210 may analyze audio signals representative of sound 2020 captured by microphone 1720 to determine whether individual 2010 is recognized by user 100. This may be performed using voice recognition component 2041 (FIG. 20B) and may include one or more voice recognition algorithms, such as Hidden Markov Models, Dynamic Time Warping, neural networks, or other techniques. Voice recognition component and/or processor 210 may access database 2050, which may further include a voiceprint of one or more individuals. Voice recognition component 2041 may analyze the audio signal representative of sound 2020 to determine whether voice 2012 matches a voiceprint of an individual in database 2050. Accordingly, database 2050 may contain voiceprint data associated with a number of individuals, similar to the stored facial identification data described above. After determining a match, individual 2010 may be determined to be a recognized individual of user 100. This process may be used alone, or in conjunction with the facial recognition techniques described above. For example, individual 2010 may be recognized using facial recognition component 2040 and may be verified using voice recognition component 2041, or vice versa.

In some embodiments, apparatus 110 may detect the voice of an individual that is not within the field of view of apparatus 110. For example, the voice may be heard over a speakerphone, from a back seat, or the like. In such embodiments, recognition of an individual may be based on the voice of the individual only, in the absence of a speaker in the field of view. Processor 110 may analyze the voice of the individual as described above, for example, by determining whether the detected voice matches a voiceprint of an individual in database 2050.

After determining that individual 2010 is a recognized individual of user 100, processor 210 may cause selective conditioning of audio associated with the recognized individual. The conditioned audio signal may be transmitted to hearing interface device 1710, and thus may provide user 100 with audio conditioned based on the recognized individual. For example, the conditioning may include amplifying audio signals determined to correspond to sound 2020 (which may correspond to voice 2012 of individual 2010) relative to other audio signals. In some embodiments, amplification may be accomplished digitally, for example by processing audio signals associated with sound 2020 relative to other signals. Additionally, or alternatively, amplification may be accomplished by changing one or more parameters of microphone 1720 to focus on audio sounds associated with individual 2010. For example, microphone 1720 may be a directional microphone and processor 210 may perform an operation to focus microphone 1720 on sound 2020. Various other techniques for amplifying sound 2020 may be used, such as using a beamforming microphone array, acoustic telescope techniques, etc.

In some embodiments, selective conditioning may include attenuation or suppressing one or more audio signals received from directions not associated with individual 2010. For example, processor 210 may attenuate sounds 2021 and/or 2022. Similar to amplification of sound 2020, attenuation of sounds may occur through processing audio signals, or by varying one or more parameters associated with microphone 1720 to direct focus away from sounds not associated with individual 2010.

Selective conditioning may further include determining whether individual 2010 is speaking. For example, processor 210 may be configured to analyze images or videos containing representations of individual 2010 to determine when individual 2010 is speaking, for example, based on detected movement of the recognized individual's lips. This may also be determined through analysis of audio signals received by microphone 1720, for example by detecting the voice 2012 of individual 2010. In some embodiments, the selective conditioning may occur dynamically (initiated and/or terminated) based on whether or not the recognized individual is speaking.

In some embodiments, conditioning may further include changing a tone of one or more audio signals corresponding to sound 2020 to make the sound more perceptible to user 100. For example, user 100 may have lesser sensitivity to tones in a certain range and conditioning of the audio signals may adjust the pitch of sound 2020. In some embodiments processor 210 may be configured to change a rate of speech associated with one or more audio signals. For example, sound 2020 may be determined to correspond to voice 2012 of individual 2010. Processor 210 may be configured to vary the rate of speech of individual 2010 to make the detected speech more perceptible to user 100. Various other processing may be performed, such as modifying the tone of sound 2020 to maintain the same pitch as the original audio signal, or to reduce noise within the audio signal.

In some embodiments, processor 210 may determine a region 2030 associated with individual 2010. Region 2030 may be associated with a direction of individual 2010 relative to apparatus 110 or user 100. The direction of individual 2010 may be determined using camera 1730 and/or microphone 1720 using the methods described above. As shown in FIG. 20A, region 2030 may be defined by a cone or range of directions based on a determined direction of individual 2010. The range of angles may be defined by an angle, θ, as shown in FIG. 20A. The angle, θ, may be any suitable angle for defining a range for conditioning sounds within the environment of user 100 (e.g., 10 degrees, 20 degrees, 45 degrees). Region 2030 may be dynamically calculated as the position of individual 2010 changes relative to apparatus 110. For example, as user 100 turns, or if individual 1020 moves within the environment, processor 210 may be configured to track individual 2010 within the environment and dynamically update region 2030. Region 2030 may be used for selective conditioning, for example by amplifying sounds associated with region 2030 and/or attenuating sounds determined to be emanating from outside of region 2030.

The conditioned audio signal may then be transmitted to hearing interface device 1710 and produced for user 100. Thus, in the conditioned audio signal, sound 2020 (and specifically voice 2012) may be louder and/or more easily distinguishable than sounds 2021 and 2022, which may represent background noise within the environment.

In some embodiments, processor 210 may perform further analysis based on captured images or videos to determine how to selectively condition audio signals associated with a recognized individual. In some embodiments, processor 210 may analyze the captured images to selectively condition audio associated with one individual relative to others. For example, processor 210 may determine the direction of a recognized individual relative to the user based on the images and may determine how to selectively condition audio signals associated with the individual based on the direction. If the recognized individual is standing to the front of the user, audio associated with that user may be amplified (or otherwise selectively conditioned) relative to audio associated with an individual standing to the side of the user. Similarly, processor 210 may selectively condition audio signals associated with an individual based on proximity to the user. Processor 210 may determine a distance from the user to each individual based on captured images and may selectively condition audio signals associated with the individuals based on the distance. For example, an individual closer to the user may be prioritized higher than an individual that is farther away.

In some embodiments, selective conditioning of audio signals associated with a recognized individual may be based on the identities of individuals within the environment of the user. For example, where multiple individuals are detected in the images, processor 210 may use one or more facial recognition techniques to identify the individuals, as described above. Audio signals associated with individuals that are known to user 100 may be selectively amplified or otherwise conditioned to have priority over unknown individuals. For example, processor 210 may be configured to attenuate or silence audio signals associated with bystanders in the user's environment, such as a noisy office mate, etc. In some embodiments, processor 210 may also determine a hierarchy of individuals and give priority based on the relative status of the individuals. This hierarchy may be based on the individual's position within a family or an organization (e.g., a company, sports team, club, etc.) relative to the user. For example, the user's boss may be ranked higher than a co-worker or a member of the maintenance staff and thus may have priority in the selective conditioning process. In some embodiments, the hierarchy may be determined based on a list or database. Individuals recognized by the system may be ranked individually or grouped into tiers of priority. This database may be maintained specifically for this purpose, or may be accessed externally. For example, the database may be associated with a social network of the user (e.g., Facebook™, LinkedIn™, etc.) and individuals may be prioritized based on their grouping or relationship with the user. Individuals identified as "close friends" or family, for example, may be prioritized over acquaintances of the user.

Selective conditioning may be based on a determined behavior of one or more individuals determined based on the captured images. In some embodiments, processor 210 may be configured to determine a look direction of the individuals in the images. Accordingly, the selective conditioning may be based on behavior of the other individuals towards the recognized individual. For example, processor 210 may selectively condition audio associated with a first individual that one or more other users are looking at. If the attention of the individuals shifts to a second individual, processor 210 may then switch to selectively condition audio associated with the second user. In some embodiments, processor 210 may be configured to selectively condition audio based on whether a recognized individual is speaking to the user or to another individual. For example, when the recognized individual is speaking to the user, the selective conditioning may include amplifying an audio signal associated with the recognized individual relative to other audio signals received from directions outside a region associated with the recognized individual. When the recognized individual is speaking to another individual, the selective conditioning may include attenuating the audio signal relative to other audio signals received from directions outside the region associated with the recognized individual.

In some embodiments, processor 210 may have access to one or more voiceprints of individuals, which may facilitate selective conditioning of voice 2012 of individual 2010 in relation to other sounds or voices. Having a speaker's voiceprint, and a high quality voiceprint in particular, may provide for fast and efficient speaker separation. A high quality voice print may be collected, for example, when the user speaks alone, preferably in a quiet environment. By having a voiceprint of one or more speakers, it is possible to separate an ongoing voice signal almost in real time, e.g. with a minimal delay, using a sliding time window. The delay may be, for example 10 ms, 20 ms, 30 ms, 50 ms, 100 ms, or the like. Different time windows may be selected, depending on the quality of the voice print, on the quality of the captured audio, the difference in characteristics between the speaker and other speaker(s), the available processing resources, the required separation quality, or the like. In some embodiments, a voice print may be extracted from a segment of a conversation in which an individual speaks alone, and then used for separating the individual's voice later in the conversation, whether the individual's is recognized or not.

Separating voices may be performed as follows: spectral features, also referred to as spectral attributes, spectral envelope, or spectrogram may be extracted from a clean audio of a single speaker and fed into a pre-trained first neural network, which generates or updates a signature of the speaker's voice based on the extracted features. The audio may be for example, of one second of clean voice. The output signature may be a vector representing the speaker's voice, such that the distance between the vector and another vector extracted from the voice of the same speaker is typically smaller than the distance between the vector and a vector extracted from the voice of another speaker. The speaker's model may be pre-generated from a captured audio. Alternatively or additionally, the model may be generated after a segment of the audio in which only the speaker speaks, followed by another segment in which the speaker and another speaker (or background noise) is heard, and which it is required to separate.

Then, to separate the speaker's voice from additional speakers or background noise in a noisy audio, a second pre-trained neural network may receive the noisy audio and the speaker's signature, and output an audio (which may also be represented as attributes) of the voice of the speaker as extracted from the noisy audio, separated from the other speech or background noise. It will be appreciated that the same or additional neural networks may be used to separate the voices of multiple speakers. For example, if there are two possible speakers, two neural networks may be activated, each with models of the same noisy output and one of the two speakers. Alternatively, a neural network may receive voice signatures of two or more speakers, and output the voice of each of the speakers separately. Accordingly, the system may generate two or more different audio outputs, each comprising the speech of the respective speaker. In some embodiments, if separation is impossible, the input voice may only be cleaned from background noise.

Figure 21:
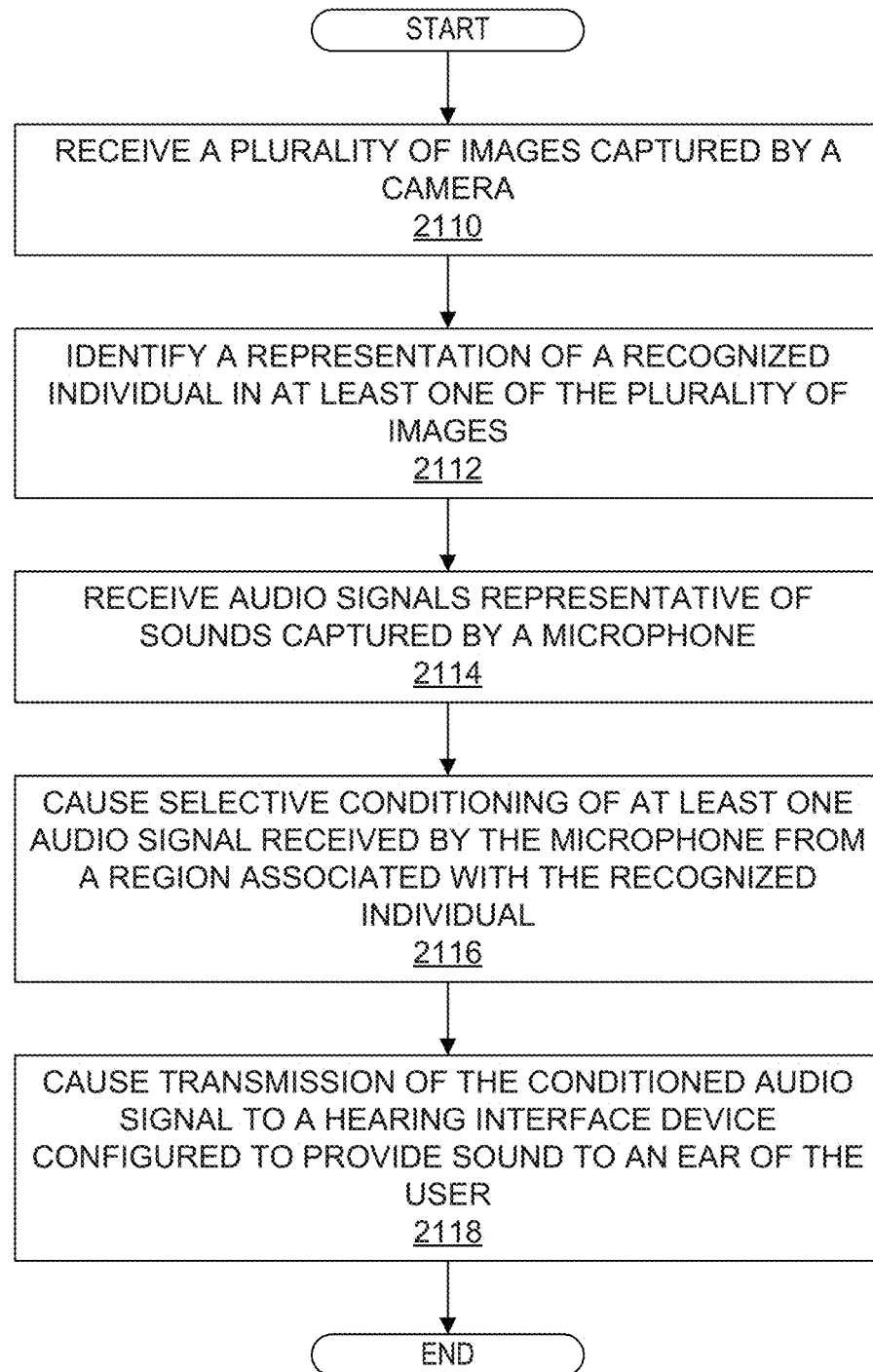
FIG. 21 is a flowchart showing an exemplary process for selectively amplifying audio signals associated with a voice of a recognized individual consistent with disclosed embodiments.

FIG. 21 is a flowchart showing an exemplary process 2100 for selectively amplifying audio signals associated with a voice of a recognized individual consistent with disclosed embodiments. Process 2100 may be performed by one or more processors associated with apparatus 110, such as processor 210. In some embodiments, some or all of process 2100 may be performed on processors external to apparatus 110. In other words, the processor performing process 2100 may be included in the same common housing as microphone 1720 and camera 1730, or may be included in a second housing. For example, one or more portions of process 2100 may be performed by processors in hearing interface device 1710, or in an auxiliary device, such as computing device 120.

In step 2110, process 2100 may include receiving a plurality of images from an environment of a user captured by a camera. The images may be captured by a wearable camera such as camera 1730 of apparatus 110. In step 2112, process 2100 may include identifying a representation of a recognized individual in at least one of the plurality of images. Individual 2010 may be recognized by processor 210 using facial recognition component 2040, as described above. For example, individual 2010 may be a friend, colleague, relative, or prior acquaintance of the user. Processor 210 may determine whether an individual represented in at least one of the plurality of images is a recognized individual based on one or more detected facial features associated with the individual. Processor 210 may also determine whether the individual is recognized based on one or more detected audio characteristics of sounds determined to be associated with a voice of the individual, as described above.

In step 2114, process 2100 may include receiving audio signals representative of sounds captured by a microphone. For example, apparatus 110 may receive audio signals representative of sounds 2020, 2021, and 2022, captured by microphone 1720. Accordingly, the microphone may include a directional microphone, a microphone array, a multi-port microphone, or various other types of microphones, as described above. In some embodiments, the microphone and wearable camera may be included in a common housing, such as the housing of apparatus 110. The one or more processors performing process 2100 may also be included in the housing (e.g., processor 210), or may be included in a second housing. Where a second housing is used, the processor(s) may be configured to receive images and/or audio signals from the common housing via a wireless link (e.g., Bluetooth™, NFC, etc.). Accordingly, the common housing (e.g., apparatus 110) and the second housing (e.g., computing device 120) may further comprise transmitters, receivers, and/or various other communication components.

In step 2116, process 2100 may include cause selective conditioning of at least one audio signal received by the at least one microphone from a region associated with the at least one recognized individual. As described above, the region may be determined based on a determined direction of the recognized individual based one or more of the plurality of images or audio signals. The range may be associated with an angular width about the direction of the recognized individual (e.g., 10 degrees, 20 degrees, 45 degrees, etc.).

Various forms of conditioning may be performed on the audio signal, as discussed above. In some embodiments, conditioning may include changing the tone or playback speed of an audio signal. For example, conditioning may include changing a rate of speech associated with the audio signal. In some embodiments, the conditioning may include amplification of the audio signal relative to other audio signals received from outside of the region associated with the recognized individual. Amplification may be performed by various means, such as operation of a directional microphone configured to focus on audio sounds emanating from the region or varying one or more parameters associated with the microphone to cause the microphone to focus on audio sounds emanating from the region. The amplification may include attenuating or suppressing one or more audio signals received by the microphone from directions outside the region. In some embodiments, step 2116 may further comprise determining, based on analysis of the plurality of images, that the recognized individual is speaking and trigger the selective conditioning based on the determination that the recognized individual is speaking. For example, the determination that the recognized individual is speaking may be based on detected movement of the recognized individual's lips. In some embodiments, selective conditioning may be based on further analysis of the captured images as described above, for example, based on the direction or proximity of the recognized individual, the identity of the recognized individual, the behavior of other individuals, etc.

In step 2118, process 2100 may include causing transmission of the at least one conditioned audio signal to a hearing interface device configured to provide sound to an ear of the user. The conditioned audio signal, for example, may be transmitted to hearing interface device 1710, which may provide sound corresponding to the audio signal to user 100. The processor performing process 2100 may further be configured to cause transmission to the hearing interface device of one or more audio signals representative of background noise, which may be attenuated relative to the at least one conditioned audio signal. For example, processor 210 may be configured to transmit audio signals corresponding to sounds 2020, 2021, and 2022. The signal associated with 2020, however, may be amplified in relation to sounds 2021 and 2022 based on a determination that sound 2020 is within region 2030. In some embodiments, hearing interface device 1710 may include a speaker associated with an earpiece. For example, hearing interface device 1710 may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

In addition to recognizing voices of individuals speaking to user 100, the systems and methods described above may also be used to recognize the voice of user 100. For example, voice recognition unit 2041 may be configured to analyze audio signals representative of sounds collected from the user's environment to recognize the voice of user 100. Similar to the selective conditioning of the voice of recognized individuals, the voice of user 100 may be selectively conditioned. For example, sounds may be collected by microphone 1720, or by a microphone of another device, such as a mobile phone (or a device linked to a mobile phone). Audio signals corresponding to the voice of user 100 may be selectively transmitted to a remote device, for example, by amplifying the voice of user 100 and/or attenuating or eliminating altogether sounds other than the user's voice. Accordingly, a voiceprint of one or more users of apparatus 110 may be collected and/or stored to facilitate detection and/or isolation of the user's voice, as described in further detail above.

Figure 22:
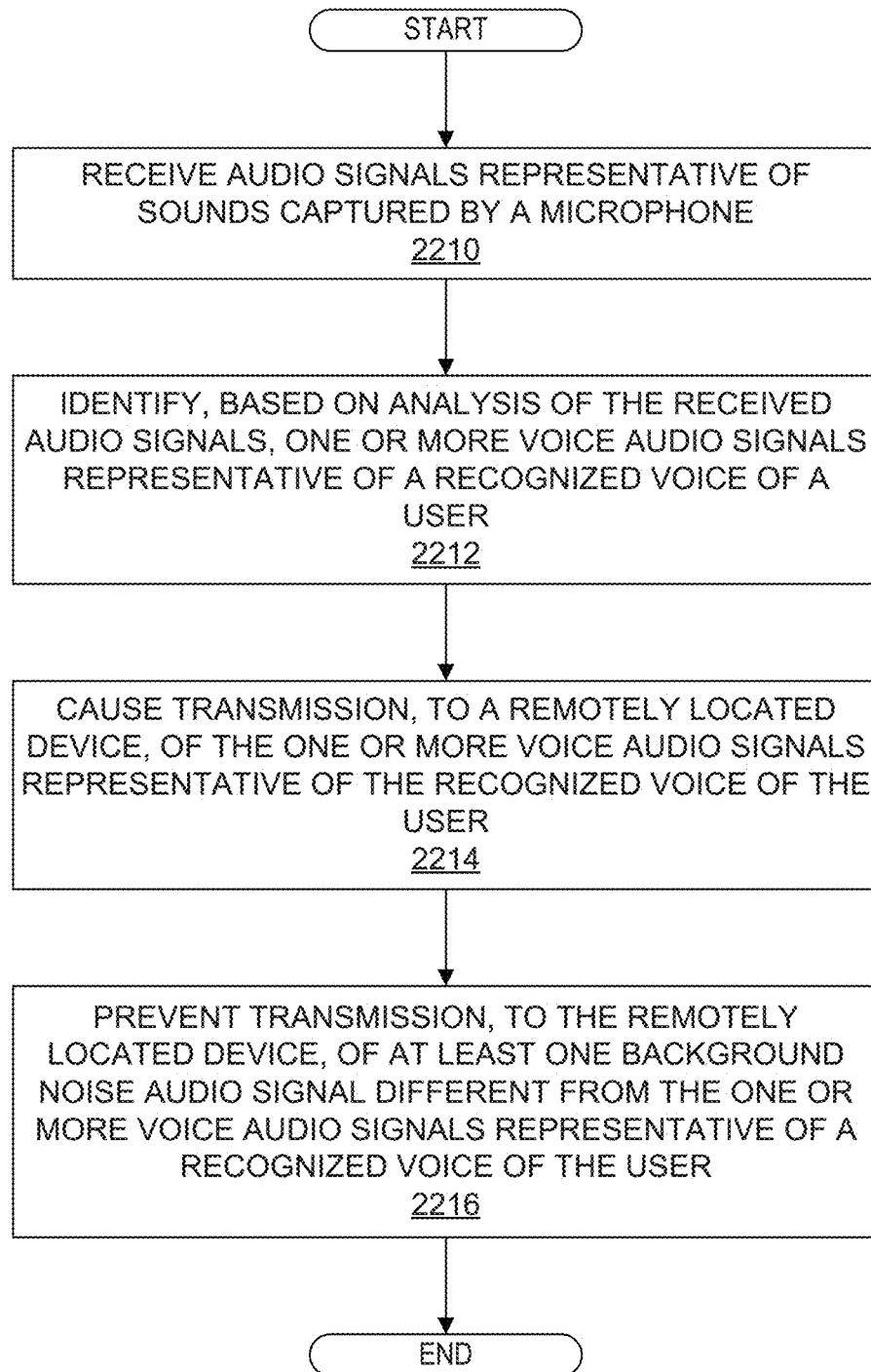
FIG. 22 is a flowchart showing an exemplary process for selectively transmitting audio signals associated with a voice of a recognized user consistent with disclosed embodiments.

FIG. 22 is a flowchart showing an exemplary process 2200 for selectively transmitting audio signals associated with a voice of a recognized user consistent with disclosed embodiments. Process 2200 may be performed by one or more processors associated with apparatus 110, such as processor 210.

In step 2210, process 2200 may include receiving audio signals representative of sounds captured by a microphone. For example, apparatus 110 may receive audio signals representative of sounds 2020, 2021, and 2022, captured by microphone 1720. Accordingly, the microphone may include a directional microphone, a microphone array, a multi-port microphone, or various other types of microphones, as described above. In step 2212, process 2200 may include identifying, based on analysis of the received audio signals, one or more voice audio signals representative of a recognized voice of the user. For example, the voice of the user may be recognized based on a voiceprint associated with the user, which may be stored in memory 550, database 2050, or other suitable locations. Processor 210 may recognize the voice of the user, for example, using voice recognition component 2041. Processor 210 may separate an ongoing voice signal associated with the user almost in real time, e.g. with a minimal delay, using a sliding time window. The voice may be separated by extracting spectral features of an audio signal according to the methods described above.

In step 2214, process 2200 may include causing transmission, to a remotely located device, of the one or more voice audio signals representative of the recognized voice of the user. The remotely located device may be any device configured to receive audio signals remotely, either by a wired or wireless form of communication. In some embodiments, the remotely located device may be another device of the user, such as a mobile phone, an audio interface device, or another form of computing device. In some embodiments, the voice audio signals may be processed by the remotely located device and/or transmitted further. In step 2216, process 2200 may include preventing transmission, to the remotely located device, of at least one background noise audio signal different from the one or more voice audio signals representative of a recognized voice of the user. For example, processor 210 may attenuate and/or eliminate audio signals associated with sounds 2020, 2021, or 2023, which may represent background noise. The voice of the user may be separated from other noises using the audio processing techniques described above.

In an exemplary illustration, the voice audio signals may be captured by a headset or other device worn by the user. The voice of the user may be recognized and isolated from the background noise in the environment of the user. The headset may transmit the conditioned audio signal of the user's voice to a mobile phone of the user. For example, the user may be on a telephone call and the conditioned audio signal may be transmitted by the mobile phone to a recipient of the call. The voice of the user may also be recorded by the remotely located device. The audio signal, for example, may be stored on a remote server or other computing device. In some embodiments, the remotely located device may process the received audio signal, for example, to convert the recognized user's voice into text.

Lip-Tracking Hearing Aid

Consistent with the disclosed embodiments, a hearing aid system may selectively amplify audio signals based on tracked lip movements. The hearing aid system analyzes captured images of the environment of a user to detect lips of an individual and track movement of the individual's lips. The tracked lip movements may serve as a cue for selectively amplifying audio received by the hearing aid system. For example, voice signals determined to sync with the tracked lip movements or that are consistent with the tracked lip movements may be selectively amplified or otherwise conditioned. Audio signals that are not associated with the detected lip movement may be suppressed, attenuated, filtered or the like.

User 100 may wear a hearing aid device consistent with the camera-based hearing aid device discussed above. For example, the hearing aid device may be hearing interface device 1710, as shown in FIG. 17A. Hearing interface device 1710 may be any device configured to provide audible feedback to user 100. Hearing interface device 1710 may be placed in one or both ears of user 100, similar to traditional hearing interface devices. As discussed above, hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, microphones for detecting sounds in the environment of user 100, internal electronics, processors, memories, etc. In some embodiments, in addition to or instead of a microphone, hearing interface device 1710 may comprise one or more communication units, and one or more receivers for receiving signals from apparatus 110 and transferring the signals to user 100. Hearing interface device 1710 may correspond to feedback outputting unit 230 or may be separate from feedback outputting unit 230 and may be configured to receive signals from feedback outputting unit 230.

In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Hearing interface device 1710 may be configured to communicate with a camera device, such as apparatus 110. Such communication may be through a wired connection, or may be made wirelessly (e.g., using a Bluetooth™, NFC, or forms of wireless communication). As discussed above, apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to apparatus 110 or processor 210 may be performed by computing device 120 and/or processor 540.

As discussed above, apparatus 110 may comprise at least one microphone and at least one image capture device. Apparatus 110 may comprise microphone 1720, as described with respect to FIG. 17B. Microphone 1720 may be configured to determine a directionality of sounds in the environment of user 100. For example, microphone 1720 may comprise one or more directional microphones, a microphone array, a multi-port microphone, or the like. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100. Apparatus 110 may comprise one or more cameras, such as camera 1730, which may correspond to image sensor 220. Camera 1730 may be configured to capture images of the surrounding environment of user 100. Apparatus 110 may also use one or more microphones of hearing interface device 1710 and, accordingly, references to microphone 1720 used herein may also refer to a microphone on hearing interface device 1710.

Figure 23B:
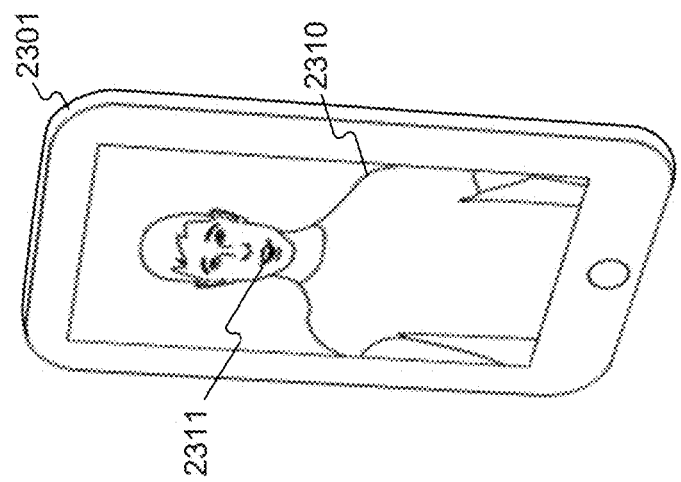
FIG. 23B is a schematic illustration showing an exemplary individual that may be identified in the environment of a user consistent with the present disclosure.
Figure 23A:
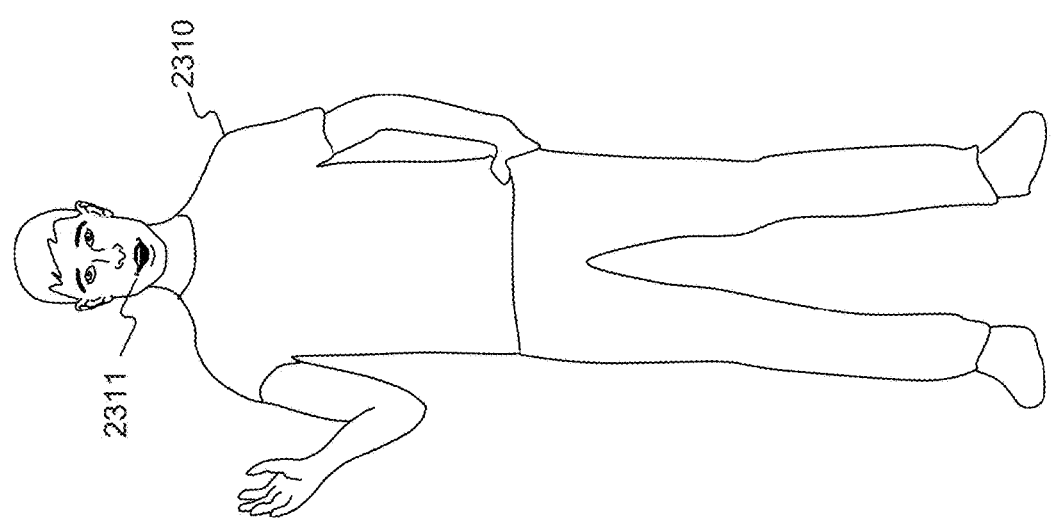
FIG. 23A is a schematic illustration showing an exemplary individual that may be identified in the environment of a user consistent with the present disclosure.

Processor 210 (and/or processors 210a and 210b) may be configured to detect a mouth and/or lips associated with an individual within the environment of user 100. FIGS. 23A and 23B show an exemplary individual 2310 that may be captured by camera 1730 in the environment of a user consistent with the present disclosure. As shown in FIG. 23, individual 2310 may be physically present with the environment of user 100. Processor 210 may be configured to analyze images captured by camera 1730 to detect a representation of individual 2310 in the images. Processor 210 may use a facial recognition component, such as facial recognition component 2040, described above, to detect and identify individuals in the environment of user 100. Processor 210 may be configured to detect one or more facial features of user 2310, including a mouth 2311 of individual 2310. Accordingly, processor 210 may use one or more facial recognition and/or feature recognition techniques, as described further below.

In some embodiments, processor 210 may detect a visual representation of individual 2310 from the environment of user 100, such as a video of user 2310. As shown in FIG. 23B, user 2310 may be detected on the display of a display device 2301. Display device 2301 may be any device capable of displaying a visual representation of an individual. For example, display device may be a personal computer, a laptop, a mobile phone, a tablet, a television, a movie screen, a handheld gaming device, a video conferencing device (e.g., Facebook Portal™, etc.), a baby monitor, etc. The visual representation of individual 2310 may be a live video feed of individual 2310, such as a video call, a conference call, a surveillance video, etc. In other embodiments, the visual representation of individual 2310 may be a prerecorded video or image, such as a video message, a television program, or a movie. Processor 210 may detect one or more facial features based on the visual representation of individual 2310, including a mouth 2311 of individual 2310.

Figure 23C:
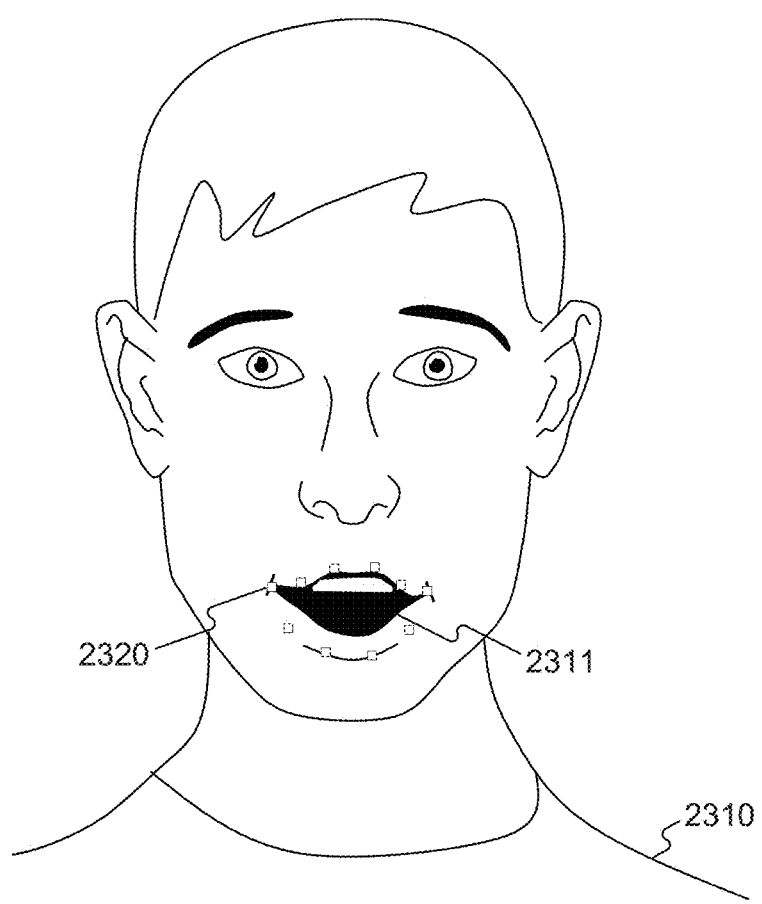
FIG. 23C illustrates an exemplary lip-tracking system consistent with the disclosed embodiments.

FIG. 23C illustrates an exemplary lip-tracking system consistent with the disclosed embodiments. Processor 210 may be configured to detect one or more facial features of individual 2310, which may include, but is not limited to the individual's mouth 2311. Accordingly, processor 210 may use one or more image processing techniques to recognize facial features of the user, such as convolutional neural networks (CNN), scale-invariant feature transform (SIFT), histogram of oriented gradients (HOG) features, or other techniques. In some embodiments, processor 210 may be configured to detect one or more points 2320 associated with the mouth 2311 of individual 2310. Points 2320 may represent one or more characteristic points of an individual's mouth, such as one or more points along the individual's lips or the corner of the individual's mouth. The points shown in FIG. 23C are for illustrative purposes only and it is understood that any points for tracking the individual's lips may be determined or identified via one or more image processing techniques. Points 2320 may be detected at various other locations, including points associated with the individual's teeth, tongue, cheek, chin, eyes, etc. Processor 210 may determine one or more contours of mouth 2311 (e.g., represented by lines or polygons) based on points 2320 or based on the captured image. The contour may represent the entire mouth 2311 or may comprise multiple contours, for example including a contour representing an upper lip and a contour representing a lower lip. Each lip may also be represented by multiple contours, such as a contour for the upper edge and a contour for the lower edge of each lip. Processor 210 may further use various other techniques or characteristics, such as color, edge, shape or motion detection algorithms to identify the lips of individual 2310. The identified lips may be tracked over multiple frames or images. Processor 210 may use one or more video tracking algorithms, such as mean-shift tracking, contour tracking (e.g., a condensation algorithm), or various other techniques. Accordingly, processor 210 may be configured to track movement of the lips of individual 2310 in real time.

Figure 24:
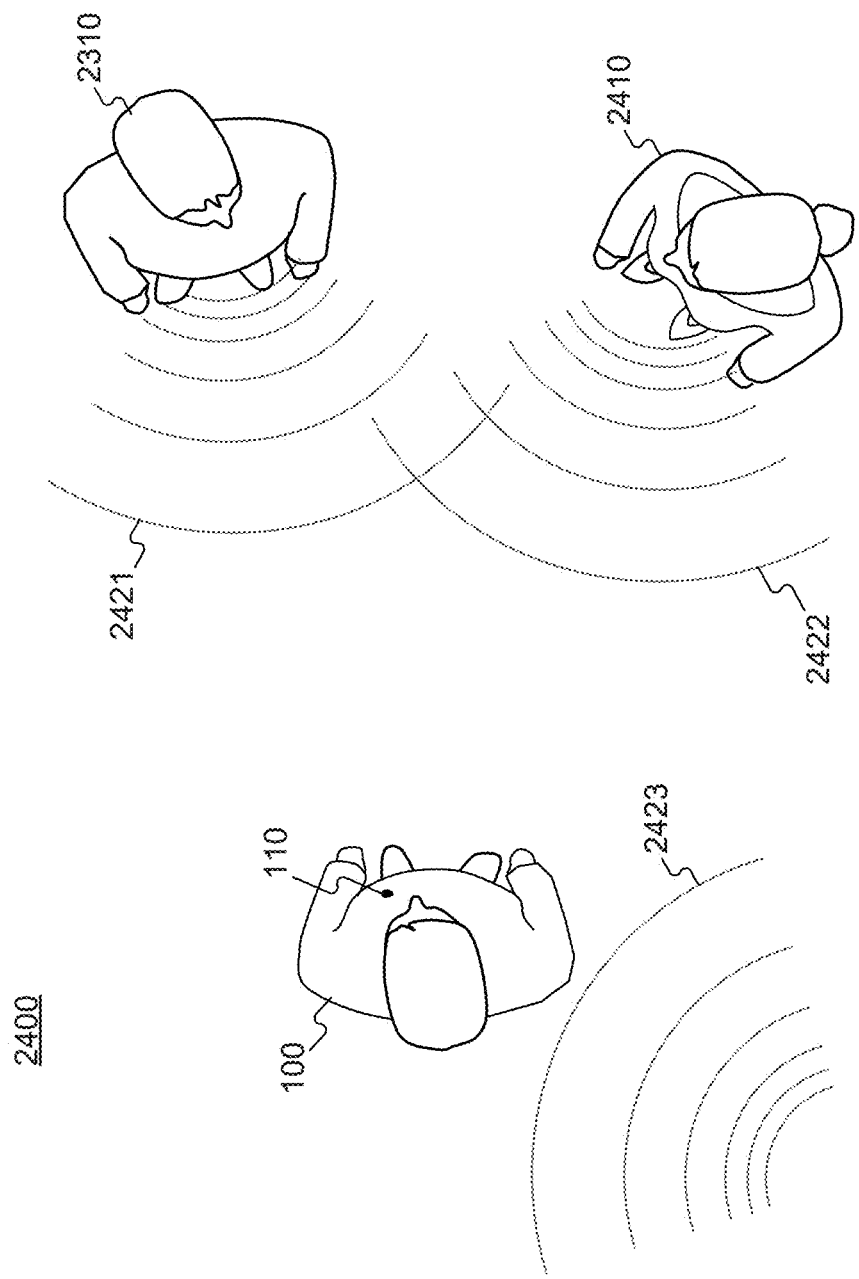
FIG. 24 is a schematic illustration showing an exemplary environment for use of a lip-tracking hearing aid consistent with the present disclosure.

The tracked lip movement of individual 2310 may be used to separate if required, and selectively condition one or more sounds in the environment of user 100. FIG. 24 is a schematic illustration showing an exemplary environment 2400 for use of a lip-tracking hearing aid consistent with the present disclosure. Apparatus 110, worn by user 100 may be configured to identify one or more individuals within environment 2400. For example, apparatus 110 may be configured to capture one or more images of the surrounding environment 2400 using camera 1730. The captured images may include a representation of individuals 2310 and 2410, who may be present in environment 2400. Processor 210 may be configured to detect a mouth of individuals 2310 and 2410 and track their respective lip movements using the methods described above. In some embodiments, processor 210 may further be configured to identify individuals 2310 and 2410, for example, by detecting facial features of individuals 2310 and 2410 and comparing them to a database, as discussed previously.

In addition to detecting images, apparatus 110 may be configured to detect one or more sounds in the environment of user 100. For example, microphone 1720 may detect one or more sounds 2421, 2422, and 2423 within environment 2400. In some embodiments, the sounds may represent voices of various individuals. For example, as shown in FIG. 24, sound 2421 may represent a voice of individual 2310 and sound 2422 may represent a voice of individual 2410. Sound 2423 may represent additional voices and/or background noise within environment 2400. Processor 210 may be configured to analyze sounds 2421, 2422, and 2423 to separate and identify audio signals associated with voices. For example, processor 210 may use one or more speech or voice activity detection (VAD) algorithms and/or the voice separation techniques described above. When there are multiple voices detected in the environment, processor 210 may isolate audio signals associated with each voice. In some embodiments, processor 210 may perform further analysis on the audio signal associated the detected voice activity to recognize the speech of the individual. For example, processor 210 may use one or more voice recognition algorithms (e.g., Hidden Markov Models, Dynamic Time Warping, neural networks, or other techniques) to recognize the voice of the individual. Processor 210 may also be configured to recognize the words spoken by individual 2310 using various speech-to-text algorithms. In some embodiments, instead of using microphone 1710, apparatus 110 may receive audio signals from another device through a communication component, such as wireless transceiver 530. For example, if user 100 is on a video call, apparatus 110 may receive an audio signal representing a voice of user 2310 from display device 2301 or another auxiliary device.

Processor 210 may determine, based on lip movements and the detected sounds, which individuals in environment 2400 are speaking. For example, processor 2310 may track lip movements associated with mouth 2311 to determine that individual 2310 is speaking. A comparative analysis may be performed between the detected lip movement and the received audio signals. In some embodiments, processor 210 may determine that individual 2310 is speaking based on a determination that mouth 2311 is moving at the same time as sound 2421 is detected. For example, when the lips of individual 2310 stop moving, this may correspond with a period of silence or reduced volume in the audio signal associated with sound 2421. In some embodiments, processor 210 may be configured to determine whether specific movements of mouth 2311 correspond to the received audio signal. For example, processor 210 may analyze the received audio signal to identify specific phonemes, phoneme combinations or words in the received audio signal. Processor 210 may recognize whether specific lip movements of mouth 2311 correspond to the identified words or phonemes. Various machine learning or deep learning techniques may be implemented to correlate the expected lip movements to the detected audio. For example, a training data set of known sounds and corresponding lip movements may be fed to a machine learning algorithm to develop a model for correlating detected sounds with expected lip movements. Other data associated with apparatus 110 may further be used in conjunction with the detected lip movement to determine and/or verify whether individual 2310 is speaking, such as a look direction of user 100 or individual 2310, a detected identity of user 2310, a recognized voiceprint of user 2310, etc.

Based on the detected lip movement, processor 210 may cause selective conditioning of audio associated with individual 2310. The conditioning may include amplifying audio signals determined to correspond to sound 2421 (which may correspond to a voice of individual 2310) relative to other audio signals. In some embodiments, amplification may be accomplished digitally, for example by processing audio signals associated with sound 2421 relative to other signals. Additionally, or alternatively, amplification may be accomplished by changing one or more parameters of microphone 1720 to focus on audio sounds associated with individual 2310. For example, microphone 1720 may be a directional microphone and processor 210 may perform an operation to focus microphone 1720 on sound 2421. Various other techniques for amplifying sound 2421 may be used, such as using a beamforming microphone array, acoustic telescope techniques, etc. The conditioned audio signal may be transmitted to hearing interface device 1710, and thus may provide user 100 with audio conditioned based on the individual who is speaking.

In some embodiments, selective conditioning may include attenuation or suppressing one or more audio signals not associated with individual 2310, such as sounds 2422 and 2423. Similar to amplification of sound 2421, attenuation of sounds may occur through processing audio signals, or by varying one or more parameters associated with microphone 1720 to direct focus away from sounds not associated with individual 2310.

In some embodiments, conditioning may further include changing a tone of one or more audio signals corresponding to sound 2421 to make the sound more perceptible to user 100. For example, user 100 may have lesser sensitivity to tones in a certain range and conditioning of the audio signals may adjust the pitch of sound 2421. For example, user 100 may experience hearing loss in frequencies above 10 kHz and processor 210 may remap higher frequencies (e.g., at 15 kHz) to 10 kHz. In some embodiments processor 210 may be configured to change a rate of speech associated with one or more audio signals. Processor 210 may be configured to vary the rate of speech of individual 2310 to make the detected speech more perceptible to user 100. If speech recognition has been performed on the audio signal associated with sound 2421, conditioning may further include modifying the audio signal based on the detected speech. For example, processor 210 may introduce pauses or increase the duration of pauses between words and/or sentences, which may make the speech easier to understand. Various other processing may be performed, such as modifying the tone of sound 2421 to maintain the same pitch as the original audio signal, or to reduce noise within the audio signal.

The conditioned audio signal may then be transmitted to hearing interface device 1710 and then produced for user 100. Thus, in the conditioned audio signal, sound 2421 (may be louder and/or more easily distinguishable than sounds 2422 and 2423.

Processor 210 may be configured to selectively condition multiple audio signals based on which individuals associated with the audio signals are currently speaking. For example, individual 2310 and individual 2410 may be engaged in a conversation within environment 2400 and processor 210 may be configured to transition from conditioning of audio signals associated with sound 2421 to conditioning of audio signals associated with sound 2422 based on the respective lip movements of individuals 2310 and 2410. For example, lip movements of individual 2310 may indicate that individual 2310 has stopped speaking or lip movements associated with individual 2410 may indicate that individual 2410 has started speaking. Accordingly, processor 210 may transition between selectively conditioning audio signals associated with sound 2421 to audio signals associated with sound 2422. In some embodiments, processor 210 may be configured to process and/or condition both audio signals concurrently but only selectively transmit the conditioned audio to hearing interface device 1710 based on which individual is speaking. Where speech recognition is implemented, processor 210 may determine and/or anticipate a transition between speakers based on the context of the speech. For example, processor 210 may analyze audio signals associate with sound 2421 to determine that individual 2310 has reached the end of a sentence or has asked a question, which may indicate individual 2310 has finished or is about to finish speaking.

In some embodiments, processor 210 may be configured to select between multiple active speakers to selectively condition audio signals. For example, individuals 2310 and 2410 may both be speaking at the same time or their speech may overlap during a conversation. Processor 210 may selectively condition audio associated with one speaking individual relative to others. This may include giving priority to a speaker who has started but not finished a word or sentence or has not finished speaking altogether when the other speaker started speaking. This determination may also be driven by the context of the speech, as described above.

Various other factors may also be considered in selecting among active speakers. For example, a look direction of the user may be determined and the individual in the look direction of the user may be given higher priority among the active speakers. Priority may also be assigned based on the look direction of the speakers. For example, if individual 2310 is looking at user 100 and individual 2410 is looking elsewhere, audio signals associated with individual 2310 may be selectively conditioned. In some embodiments, priority may be assigned based on the relative behavior of other individuals in environment 2400. For example, if both individual 2310 and individual 2410 are speaking and more other individuals are looking at individual 2410 than individual 2310, audio signals associated with individual 2410 may be selectively conditioned over those associated with individual 2310. In embodiments where the identity of the individuals is determined, priority may be assigned based on the relative status of the speakers, as discussed previously in greater detail. User 100 may also provide input into which speakers are prioritized through predefined settings or by actively selecting which speaker to focus on.

Processor 210 may also assign priority based on how the representation of individual 2310 is detected. While individuals 2310 and 2410 are shown to be physically present in environment 2400, one or more individuals may be detected as visual representations of the individual (e.g., on a display device) as shown in FIG. 23B. Processor 210 may prioritize speakers based on whether or not they are physically present in environment 2400. For example, processor 210 may prioritize speakers who are physically present over speakers on a display. Alternatively, processor 210 may prioritize a video over speakers in a room, for example, if user 100 is on a video conference or if user 100 is watching a movie. The prioritized speaker or speaker type (e.g. present or not) may also be indicated by user 100, using a user interface associated with apparatus 110.

Figure 25:
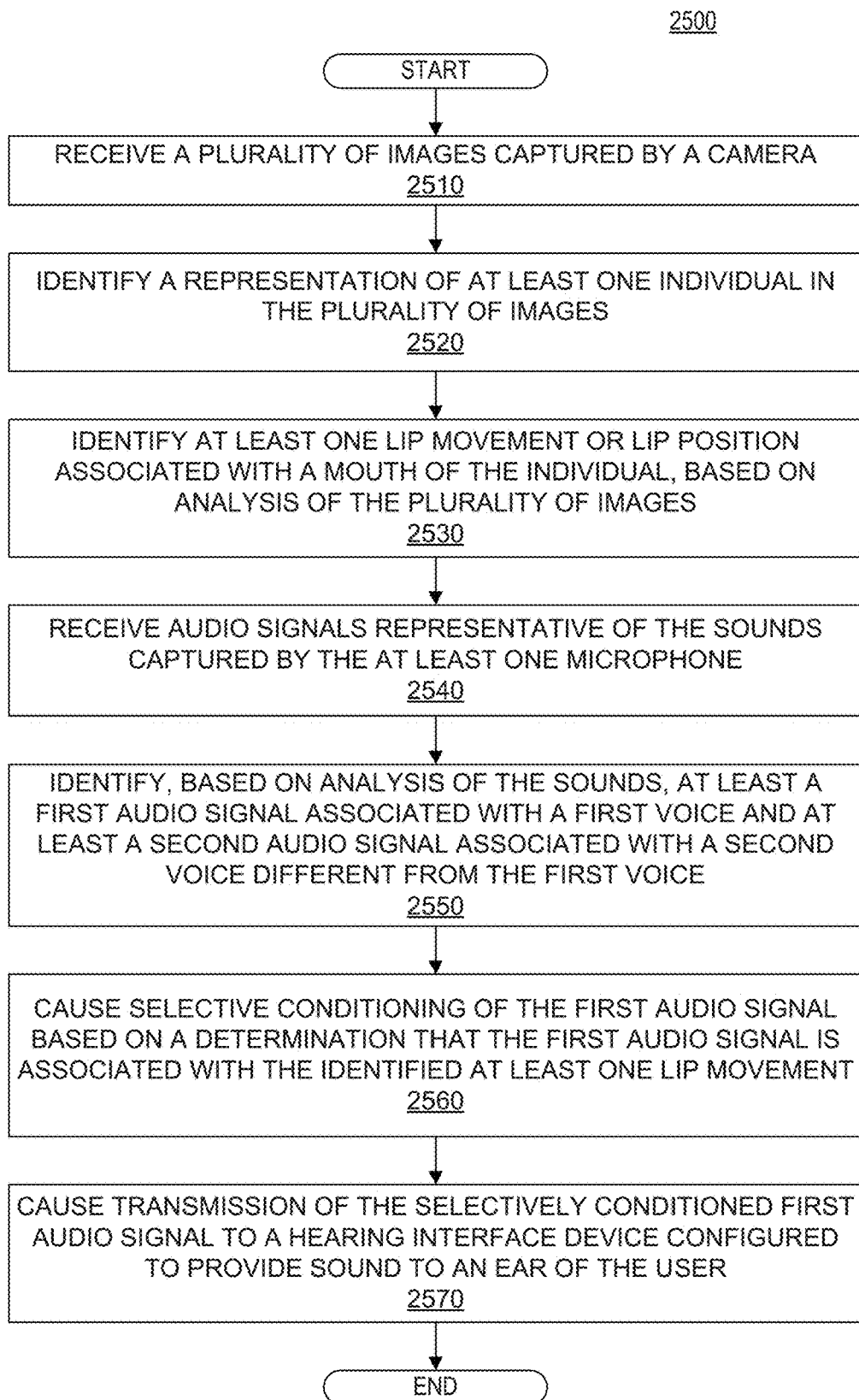
FIG. 25 is a flowchart showing an exemplary process for selectively amplifying audio signals based on tracked lip movements consistent with disclosed embodiments.

FIG. 25 is a flowchart showing an exemplary process 2500 for selectively amplifying audio signals based on tracked lip movements consistent with disclosed embodiments. Process 2500 may be performed by one or more processors associated with apparatus 110, such as processor 210. The processor(s) may be included in the same common housing as microphone 1720 and camera 1730, which may also be used for process 2500. In some embodiments, some or all of process 2500 may be performed on processors external to apparatus 110, which may be included in a second housing. For example, one or more portions of process 2500 may be performed by processors in hearing interface device 1710, or in an auxiliary device, such as computing device 120 or display device 2301. In such embodiments, the processor may be configured to receive the captured images via a wireless link between a transmitter in the common housing and receiver in the second housing.

In step 2510, process 2500 may include receiving a plurality of images captured by a wearable camera from an environment of the user. The images may be captured by a wearable camera such as camera 1730 of apparatus 110. In step 2520, process 2500 may include identifying a representation of at least one individual in at least one of the plurality of images. The individual may be identified using various image detection algorithms, such as Haar cascade, histograms of oriented gradients (HOG), deep convolution neural networks (CNN), scale-invariant feature transform (SIFT), or the like. In some embodiments, processor 210 may be configured to detect visual representations of individuals, for example from a display device, as shown in FIG. 23B.

In step 2530, process 2500 may include identifying at least one lip movement or lip position associated with a mouth of the individual, based on analysis of the plurality of images. Processor 210 may be configured to identify one or more points associated with the mouth of the individual. In some embodiments, processor 210 may develop a contour associated with the mouth of the individual, which may define a boundary associated with the mouth or lips of the individual. The lips identified in the image may be tracked over multiple frames or images to identify the lip movement. Accordingly, processor 210 may use various video tracking algorithms, as described above.

In step 2540, process 2500 may include receiving audio signals representative of the sounds captured by a microphone from the environment of the user. For example, apparatus 110 may receive audio signals representative of sounds 2421, 2422, and 2423 captured by microphone 1720. In step 2550, process 2500 may include identifying, based on analysis of the sounds captured by the microphone, a first audio signal associated with a first voice and a second audio signal associated with a second voice different from the first voice. For example, processor 210 may identify an audio signal associated with sounds 2421 and 2422, representing the voice of individuals 2310 and 2410, respectively. Processor 210 may analyze the sounds received from microphone 1720 to separate the first and second voices using any currently known or future developed techniques or algorithms. Step 2550 may also include identifying additional sounds, such as sound 2423 which may include additional voices or background noise in the environment of the user. In some embodiments, processor 210 may perform further analysis on the first and second audio signals, for example, by determining the identity of individuals 2310 and 2410 using available voiceprints thereof. Alternatively, or additionally, processor 210 may use speech recognition tools or algorithms to recognize the speech of the individuals.

In step 2560, process 2500 may include causing selective conditioning of the first audio signal based on a determination that the first audio signal is associated with the identified lip movement associated with the mouth of the individual. Processor 210 may compare the identified lip movement with the first and second audio signals identified in step 2550. For example, processor 210 may compare the timing of the detected lip movements with the timing of the voice patterns in the audio signals. In embodiments where speech is detected, processor 210 may further compare specific lip movements to phonemes or other features detected in the audio signal, as described above. Accordingly, processor 210 may determine that the first audio signal is associated with the detected lip movements and is thus associated with an individual who is speaking.

Various forms of selective conditioning may be performed, as discussed above. In some embodiments, conditioning may include changing the tone or playback speed of an audio signal. For example, conditioning may include remapping the audio frequencies or changing a rate of speech associated with the audio signal. In some embodiments, the conditioning may include amplification of a first audio signal relative to other audio signals. Amplification may be performed by various means, such as operation of a directional microphone, varying one or more parameters associated with the microphone, or digitally processing the audio signals. The conditioning may include attenuating or suppressing one or more audio signals that are not associated with the detected lip movement. The attenuated audio signals may include audio signals associated with other sounds detected in the environment of the user, including other voices such as a second audio signal. For example, processor 210 may selectively attenuate the second audio signal based on a determination that the second audio signal is not associated with the identified lip movement associated with the mouth of the individual. In some embodiments, the processor may be configured to transition from conditioning of audio signals associated with a first individual to conditioning of audio signals associated with a second individual when identified lip movements of the first individual indicates that the first individual has finished a sentence or has finished speaking.

In step 2570, process 2500 may include causing transmission of the selectively conditioned first audio signal to a hearing interface device configured to provide sound to an ear of the user. The conditioned audio signal, for example, may be transmitted to hearing interface device 1710, which may provide sound corresponding to the first audio signal to user 100. Additional sounds such as the second audio signal may also be transmitted. For example, processor 210 may be configured to transmit audio signals corresponding to sounds 2421, 2422, and 2423. The first audio signal, which may be associated with the detected lip movement of individual 2310, may be amplified, however, in relation to sounds 2422 and 2423 as described above. In some embodiments, hearing interface 1710 device may include a speaker associated with an earpiece. For example, hearing interface device may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

Selective Amplification of Speaker of Interest

The disclosed systems and methods may enable a hearing aid system to selectively amplify an audio signal and transmit the amplified audio signal to a hearing interface device configured to provide sound to an ear of a user. For example, the system may recognize multiple speakers through analysis of captured images, but may selectively amplify one of the voices of the detected speakers. The voice selected for amplification may be based on a hierarchy or other suitable differentiator. In one example, the voice of the speaker whom the user is looking at may be amplified. In another example, the voice of a speaker detected to be looking toward the user may be amplified. In another example, in case of speech overlap, the voice of a speaker who already started speaking but has not finished when another speaker has started speaking may be selected.

Figure 26:
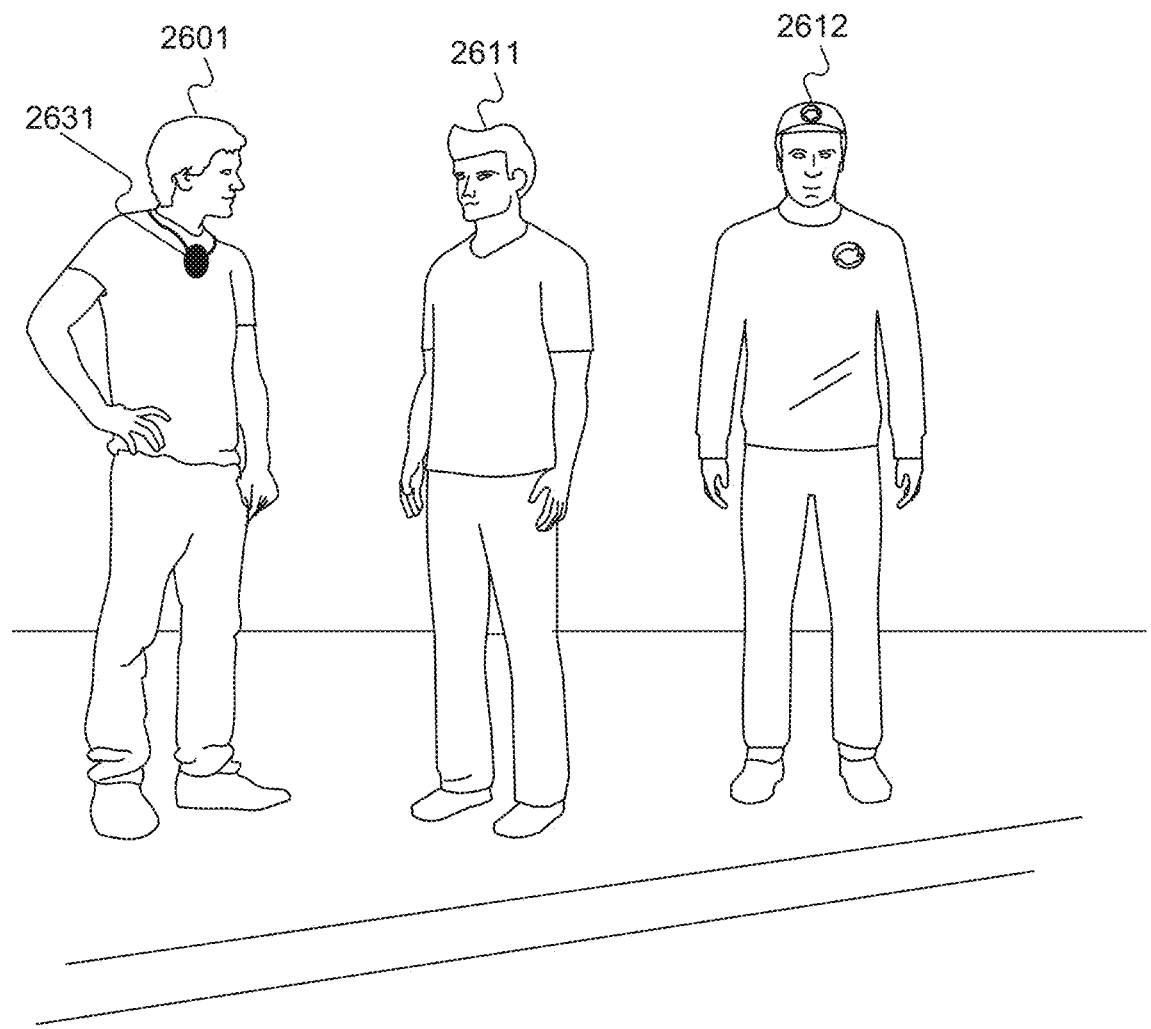
FIG. 26 is a schematic illustration of an exemplary hearing aid system consistent with the present disclosure.

FIG. 26 illustrates a user wearing an exemplary hearing aid system. User 2601 may wear a wearable device 2631. Wearable device 2631 may include an image sensor configured to capture images of the environment of user 2601. As illustrated in FIG. 26, a first individual 2611 may stand in front of user 2601 and look in the direction of user 2601. In addition, a second individual 2612 may also stand in front of user 2601, but look in a direction away from user 2601. The image sensor of wearable device 2631 may capture one or more images including first individual 2611 and second individual 2612.

Figure 27:
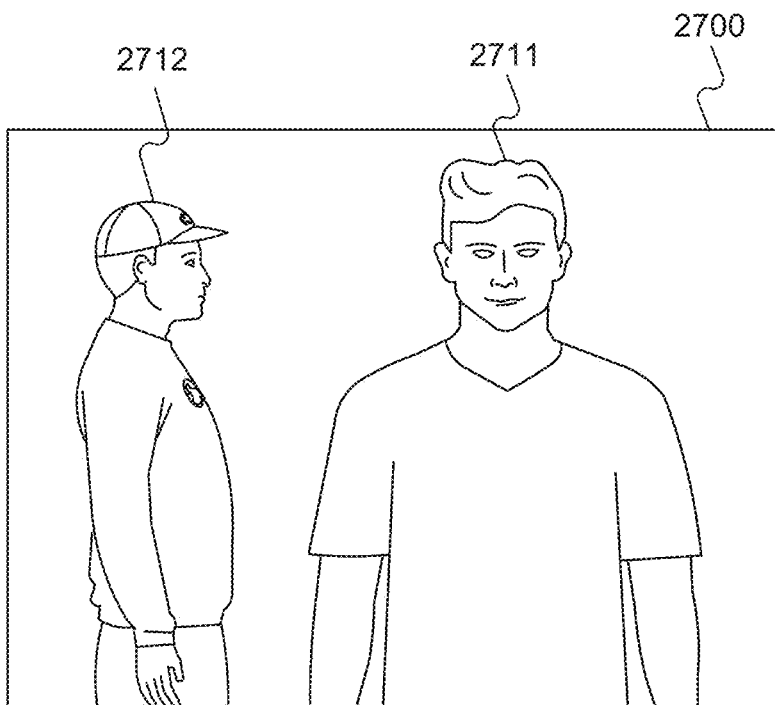
FIG. 27 is a schematic illustration of an exemplary image captured by an imaging capture device consistent with the present disclosure.

FIG. 27 illustrates an exemplary image 2700 of the environment of user 2601 illustrated in FIG. 26 as may be captured by an image sensor of wearable device 2631. Image 2700 may include a presentation 2711 of first individual 2611 and a presentation 2712 of second individual 2612.

Wearable device 2631 may also include at least one processor configured to analyze the images captured by the image sensor. The processor may also identify one or more individuals included in the images, based on the image analysis. For example, the processor may receive image 2700 (illustrated in FIG. 27) from the image sensor. The processor may also identify first individual 2611 and second individual 2612 included in the image.

Wearable device 2631 may further include at least one microphone configured to receive one or more audio signals from the environment of user 2601. For example, the microphone may be configured to receive (or detect) a first audio signal associated with the voice of the first individual 2611 and a second audio signal associated with the voice of the second individual 2612.

The processor may detect at least one amplification criteria indicative of a voice amplification priority between the first individual and the second individual. Some amplification criteria may be static, while others may be dynamic. For example, based on the analysis of image 2700, the processor may detect that first individual 2611 is looking in the direction of user 2601 and second individual 2612 is looking in a direction away user 2601, which may indicate that the voice amplification priority of first individual 2611 should be higher than second individual 2612. The processor may also selectively amplify the first audio signal, based on the voice amplification priority.

Wearable device 2631 may further include a hearing interface device such as hearing interface device 1710, configured to receive audio signals and provide sound to an ear of user 2601. For example, the hearing interface device may receive the amplified first audio signal and provide sound to user 2601 based on the amplified first audio signal. In some embodiments, the hearing interface device may receive the amplified first audio signal and unprocessed second audio signal, and provide sound to user 2601 based on the amplified first audio signal and second audio signal.

Figure 28:
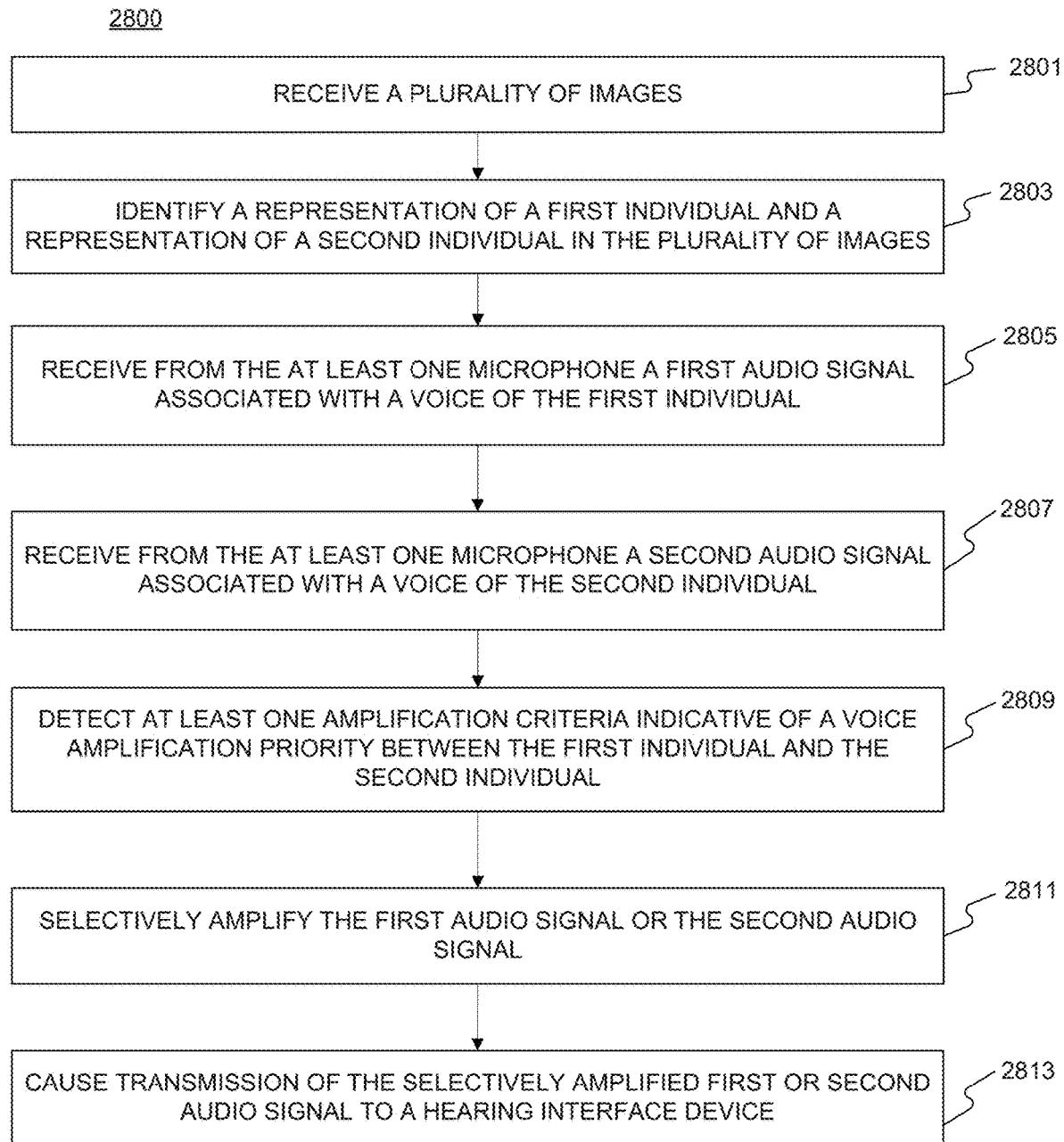
FIG. 28 is a flowchart of an exemplary process for selectively amplifying an audio signal.

FIG. 28 is a flowchart of an exemplary process 2800 for selectively amplifying an audio signal. At step 2801, the hearing aid system (e.g., apparatus 110) may receive a plurality of images of an environment of the user. For example, the hearing aid system may include a processor (e.g., processor 210) configured to receive images of the environment of the user captured by an image sensor (e.g., image sensor 220). In some embodiments, the image sensor may be part of a camera included the hearing aid system. By way of example, as illustrated in FIG. 26, user 2601 may wear a wearable device 2631 that may include an image sensor configured to capture images of the environment of the user. The processor of the hearing aid system may receive the images from wearable device 2631.

In some embodiments, the processor may be configured to control the image sensor to capture images. For example, the processor may detect a gesture performed by the user (a finger-pointing gesture) and control the image sensor to capture images based on the detected gesture (e.g., adjusting the field of view of the image sensor based on the direction of the finger-pointing gesture). As another example, the hearing aid system may include a microphone configured to detect (or receive) audio signals from the environment of the user. The processor may receive the audio signals from the microphone and detect a voice by one or more individuals nearby. The processor may control the image sensor to capture images if a voice is detected.

In some embodiments, the processor may receive data from and transmit data to the image sensor over one or more networks via any known wireless standard (e.g., cellular, Wi-Fi, Bluetooth®, etc.), or via near-filed capacitive coupling, other short-range wireless techniques, or via a wired connection. For example, the processor may also be configured to receive data (e.g., the captured images, etc.) from the image sensor via a wireless link between a transmitter in a housing in which the image sensor is included and a receiver in a housing in which the processor is included.

At step 2803, the processor may analyze one or more images received from the image sensor and identify that one or more individuals are included in the images. For example, as illustrated in FIG. 26, two individuals—first individual 2611 and second individual 2612—stand in front of user 2601 (first individual 2611 may stand closer to user 2601 than second individual 2612 does). The image sensor may be configured to capture image 2700 (illustrated in FIG. 27) of the environment of user 2601, including first individual 2611 and second individual 2612. The processor may analyze image 2700 and identify in image 2700 a representation 2711 of first individual 2611 and representation 2712 of second individual 2612. Representation 2711 of first individual 2611 may appear bigger than representation 2712 of second individual 2612 since first individual 2611 may stand closer to user 2601 than second individual 2612 does. In some embodiments, the processor may identify one or more individuals based on object recognition techniques (e.g., a deep-learning algorithm for recognizing objects).

In some embodiments, the processor may recognize one or more individuals included in the images. For example, the processor may recognize one of the individuals is a family member or a friend, based on a human recognition technique (e.g., a deep-learning algorithm for recognizing an individual). In some embodiments, the processor may be configured to retrieve information relating to the recognized individual (e.g., the name of the individual and the last time the user met the individual). The processor may also transmit the information to the user via the hearing aid interface and/or a feedback-outputting unit.

In some embodiments, the processor may be configured to determine the visual line (or the look direction) of each of one or more identified individuals and/or the user, based on the analysis of the images. For example, an individual may look at the user, and the processor may determine that the look direction of the individual is towards the user, based on the image analysis. As another example, the processor may determine the look direction of the user based on the image analysis.

At step 2805, the processor may receive from at least one microphone a first audio signal associated with a voice of the first individual. For example, the hearing aid system may include one or more microphones configured to detect (or receive) audio signals from the environment of the user. By way of example, wearable device 2631 (e.g., illustrated in FIG. 26) may include a microphone configured to receive a first audio signal associated with first individual 2611 and may receive a second audio signal associated with the second individual 2612, who stands in front of user 2601. The processor may receive the first audio signal from the microphone. In some embodiments, the processor may receive data from the microphone over one or more networks via any known wireless standard (e.g., cellular, Wi-Fi, Bluetooth®, etc.), or via near-filed capacitive coupling, other short-range wireless techniques, or via a wired connection. For example, the processor may also be configured to receive data (e.g., the audio signals, etc.) from the microphone via a wireless link between a transmitter in a housing in which the microphone is included and a receiver in a housing in which the processor is included.

In some embodiments, the processor may be configured to control the microphone to detect (or receive) audio signals and/or transmit the audio signals to the processing device (and/or the hearing aid interface). For example, the processor may identify one or more individuals based on the analysis of the audio signals. The processor may activate the microphone to receive audio signals if one or more individuals are identified. In some embodiments, if a speaker is recognized and the audio signal is transmitted to the processing device, the audio signal associated with the speaker may be transmitted to the processing device as long as the speaker keeps speaking (or a pause is less than a threshold). In some embodiments, the audio signal associated with the speaker may be transmitted to the processing device as long as the speaker keeps speaking (or a pause is less than a threshold) even if other voices, whether recognized or not are captured, to let the user continuously listen to the speaker. For example, the processor may be configured to continue causing transmission of the first audio signal, rather than the second audio signal, to the hearing interface device configured to provide sound to an ear of the user, until a pause longer than a predetermined length is detected in speech associated the voice of the first individual. In some embodiments, short breaks in speaking, for example, breathing breaks or pauses for searching for a word may still be considered as continuous speech. In some embodiments, pauses up to a predetermined length may be considered as part of continuous speech, while longer periods may be considered as the end of a speech by the speaker, such that other speakers can be detected or amplified or amplified to a different degree.

In some embodiments, the microphone may include a directional microphone (e.g., a bi-directional microphone, an omnidirectional microphone, etc.), a microphone array, or the like, or a combination thereof. In some embodiments, the processor may be configured to determine the speaking direction of each of one or more identified individuals and/or the user, based on the audio signals received. For example, the microphone may include one or more directional microphones, and the processor may be configured to determine the speak direction of an individual based on the audio signal associated with the individual.

At step 2807, the processor may receive from the microphone a second audio signal associated with a voice of the second individual. By way of example, wearable device 2631, illustrated in FIG. 26, may include a microphone configured to receive a second audio signal associated with second individual 2612, who stand in front of user 2601.

In some embodiments, the processor may be configured to receive audio signals from the microphone and recognize the individual associated with the audio signal received. For example, the processor may recognize the individual based on the characteristics of the voice of the individual (e.g., the individual's voice speed, pitch, etc.). In some embodiments, the processor may be configured to retrieve information relating to the recognized individual (e.g., the name of the individual and the last time met the individual). The processor may also transmit the information to the user via the hearing aid interface and/or a feedback-outputting unit.

In some embodiments, the processor may be configured to recognize the individual associated with the audio signal based on analysis of the audio signal and one or more images received from the image sensor. For example, the processor may determine a first confidence score for the association of an individual and the audio signal based on the analysis of the audio signal. The processor may also determine a second confidence score for the association of the individual and the audio signal based on the analysis of the one or more images received from the image sensor (similar to the recognition process in step 2803). The processor may further determine an overall confidence score based on the first and second confidence scores and identify the individual based on the overall confidence score (e.g., identifying the individual if the overall confidence score exceeds a threshold). By way of example, the processor may determine a first confidence score of 9 (out of 10) for the association of a specific individual and an audio signal based on the analysis of the audio signal. The processor may also determine a second confidence score of 2 (out of 10) for the association of the specific individual and the audio signal based on the analysis of one or more images received from the image sensor. The processor may further determine an overall confidence score of 11 (i.e., 2 plus 9 out of 20 in total) and determine that this individual is not associated with the audio signal if the threshold is 16. As another example, the processor may determine the first confidence score of 9 and determine the second confidence score of 8. The processor may also determine that the overall confidence score is 17 and recognize the individual being associated with the audio signal. In some embodiments, the processor may determine the overall confidence score based a weighted first confidence score and/or a weighted second confidence score.

In some embodiments, the microphone and the image sensor (or the wearable camera that includes the image sensor) may be included in a common housing. For example, wearable device 2631 illustrated in FIG. 26 may include both the microphone and the wearable camera in a common housing. Alternatively, the microphone may be included in a housing different from a housing in which the wearable camera is installed.

In some embodiments, the processor may be included in a common housing with at least one of the microphone and the wearable camera. For example, the processor may also be included in a common housing in which both the microphone and the wearable camera are included. Alternatively, the processor may be included in a separate housing from a common housing where the microphone and the wearable camera are installed. The processor may also be configured to receive data (e.g., the captured images, the detected audio signals, etc.) from the wearable camera and/or the microphone via a wireless link between a transmitter in the common housing (in which the microphone and the wearable camera are included) and receiver in the second housing (in which the processor is included).

At step 2809, the processor may detect at least one amplification criteria indicative of a voice amplification priority between the first individual and the second individual. The detection of an amplification criteria may be based on the analysis of the received images and/or audio signals. For example, the processor may detect that the first individual stands closer to the user than the second individual stands based on, for example, the image analysis. The detection that the user is closer to the first individual than the second individual may be an amplification criteria indicative of a voice amplification priority of the first individual over the second individual.

In some embodiments, the amplification criteria may include the position and/or the orientation of the user in relative to the first and/or second individuals, the look direction of the user, the look direction of the speaker (e.g., the first individual, the second individual, etc.), or the like, or a combination thereof. For example, if the user is detected to be facing more towards the second individual than the first individual (based on the analysis of the images and/or audio signals), the processor may detect that the second individual has a higher voice amplification priority than the first individual does. Alternatively or additionally, the amplification criteria may relate to the identity of the first individual and/or the second individual. For example, the processor may identify the first individual to be a family member (but does not recognize the second individual) and determine that the first individual has a higher voice amplification priority than the second individual.

In some embodiments, an amplification criteria may include the look direction of the user, and the voice amplification priority between the first and second individuals may be determined based on whether the look direction of the user correlates with the first individual or with the second individual. For example, the processor may determine the look direction of the user based on the analysis of the images captured by the image sensor, and determine whether the user looks towards more to the first individual or the second individual. As another example, the processor may be configured to detect the look direction of the user by detecting a representation of the user's chin in at least one of the images and determining the look based on a detected direction associated with the user's chin. If the look direction of the user correlates with the first individual more than the second individual, the processor may determine that the first individual has a higher voice amplification priority than the second individual.

In some embodiments, an amplification criteria may include the look direction of the speaker (e.g., the first individual, the second individual, etc.), and voice amplification priority between the first and second individuals may be determined based on whether the first individual or the second individual is looking in the direction of the user based on the look direction of the speaker. For example, if the processor determines that the first individual is looking in the direction of the user based on the speaker look of the first individual and the second individual is looking in a direction away from the user, the first individual may have a higher voice amplification priority than the second individual. On the other hand, if the processor determines that the second individual is looking in the direction of the user and the first individual is looking in a direction away from the user, the second individual may have a higher voice amplification priority than the first individual. In some embodiments, the processor may be configured to detect the look direction of the speaker based on his or her facial characteristics (e.g., the eyes, the orientation of the face, etc.) determined according to the images captured by the image sensor.

In some embodiments, amplification criteria may include a speaking continuity indicating that a speaker who already started speaking but has not finished when another speaker has started speaking. For example, the first individual already started speaking but has not finished when the second individual has started speaking. The processor may determine that the first individual may have a speaking continuity and have a higher amplification priority than the second individual.

In some embodiments, amplification criteria may include a relationship between the user and one of the first individual and the second individual. For example, the processor may identify the first individual and/or the second individual (as described elsewhere in this disclosure) and determine a relationship between the user and one of the first individual and the second individual. By way of example, the processor may determine that one of the individuals is a family member or a friend of the user, and determine the amplification priority based on the determined relationship. Exemplary relationship may include family member, friend, acquaintance, colleague, stranger, or the like, or a combination thereof. Alternatively or additionally, the amplification criteria may include a relationship between the first and second individuals. For example, the processor may determine that the first individual is a supervisor of the second individual (i.e., a type of relationship). Alternatively or additionally, the amplification criteria may include a relationship among the user, the first individual, and the second individual. For example, the processor may determine that the first individual is a supervisor of the user and the second individual. In some embodiments, the processor may determine the amplification priority based on the closeness of the relationship of the first individual and/or the second individual with the user. For example, the processor may determine that the first individual is an immediate family member of the user and the second individual is a friend of the user, and determine that the first individual is closer (in terms of relationship) to the user than the second individual to the user. The processor may also determine that the first individual has a higher amplification priority than the second individual. Alternatively or additionally, the processor may determine the amplification priority based on the hierarchy of the determined relationship. For example, the processor may determine that the first individual is a supervisor of the second individual (i.e., a type of relationship) and determined that the first individual has a higher amplification priority than the second individual.

At step 2811, the processor may selectively amplify the first audio signal or the second audio signal, based on the voice amplification priority. For example, if the first audio signal has a higher voice amplification priority than the second audio signal, the processor may amplify the first audio signal. Similarly, if the second audio signal has a higher voice amplification priority than the first audio signal, the processor may amplify the second audio signal.

In some embodiments, the processor may amplify an audio signal (the first audio signal or the second audio signal) to a predetermined sound level. Alternatively or additionally, the processor may amplify an audio signal by increasing the sound level by a percentage. Alternatively or additionally, while amplifying an audio signal, the processor may be configured to attenuating one or more other audio signals (by, for example, decreasing the sound level of the other signal(s) to a predetermined sound level or by a predetermined percentage). For example, if the first audio signal has a higher voice amplification priority than the second audio signal, the processor may be configured to amplify the first audio signal by 50% and attenuate the second audio signal by 50%.

In some embodiments, the hearing aid system may include an audio amplification circuit configured to selectively amplify an audio signal. The audio amplification circuit may receive inputs from two or more input audio transducers. For example, a first input audio transducer may receive the first audio signal, and a second input audio transducer may receive the second audio signal. The processor may cause the audio amplification circuit to amplify one of the first audio signal or the second audio signal, based on their voice amplification priorities. Alternatively or additionally, the processor may cause the audio amplification circuit to attenuate the audio signal that has a lower voice amplification priority.

At step 2813, the processor may cause transmission of the selectively amplified audio signal to a hearing interface device. For example, the processor may cause a transmitter to transmit the amplified audio signal to a hearing interface device via a wireless network (e.g., cellular, Wi-Fi, Bluetooth®, etc.), or via near-filed capacitive coupling, other short-range wireless techniques, or via a wired connection. Alternatively or additionally, the processor may cause transmission of the unprocessed audio signal(s) (and/or the selectively attenuated audio signal) to the hearing interface device.

The hearing interface device may also be configured to deliver sound to an ear of the user based on the amplified audio signal. For example, the hearing interface device may receive the amplified audio signal (e.g., amplified first audio signal) and deliver sound to an ear of the user based on the amplified audio signal. In some embodiments, the hearing interface device may also receive one or more unprocessed audio signals and/or one or more attenuated audio signal. For example, the hearing interface device may receive amplified first audio signal and unprocessed second audio signal. The hearing interface device may deliver sound based on the amplified first audio signal and second audio signal.

In some embodiments, a hearing interface device may include a speaker associated with an earpiece. For example, the hearing interface device may include an in-ear earphone. As another example, the hearing interface device may include a speaker included in a wearable device (e.g., wearable device 2631). In some embodiments, the hearing interface device may include an earphone, a headphone, a speaker, or the like, or a combination thereof.

In some embodiments, the hearing interface device may include a bone conduction microphone.

Differential Amplification Relative to Voice of Speakerphone User

The disclosed systems and methods may enable a hearing aid system to determine through image analysis that at least one speaker in a group is participating in a group meeting via speakerphone (e.g., by receiving at least one voice signal even where image analysis indicates no visible speakers are present in a group). Such a voice signal may originate from a person participating in a meeting by speakerphone or from a person outside of the field-of-view (FOV) of a wearable camera, for example a speaker sitting in the back seat of a car while the wearable camera is front-facing. In such scenarios, the voice signal may be weaker than voice signals received from individuals physically present in a group or in front of the user (e.g., with an unimpeded path to the user's sound collection microphone). The audio signals determined to be received from a source different from the imaged individuals may be amplified differently (e.g., using a higher gain) relative to audio signals received from imaged individuals. In an embodiment, the system may detect the presence of a speakerphone participant, at least in part, through detection in a captured image of a speakerphone device or similar device present in the FOV of the system camera.

In some embodiments, the system may automatically identify individuals present in a group discussion (e.g., via facial recognition, voice recognition, or both) and record the discussion participants in a database. The system may also determine the identity of at least one person participating in the discussion by phone (or outside the camera FOV) through voice recognition or based on other criteria, such as meeting invite records, prior known associations, etc. The system may record the identities of the participants. In some embodiments, the system may amplify the voice of a person that previously appeared in a camera FOV but has exited the FOV, and later speaks (e.g., during a car ride, or in a user's home, etc.). In some embodiments, the system may also amplify certain sound signals. For example, the system may amplify a fire alarm, a siren, crying by a kid, a voice warning (e.g., "Mayday!"). Alternatively or additionally, some (predetermined, recognized or not) sounds, whether recognized or not, or predetermined may be amplified and transmitted at a delay. For example, in an airport when there is an announcement about a flight, the system may realize that this is an important announcement only after the flight number is mentioned. The system may play the whole announcement even though that voice is not of anyone known to the user.

Figure 29:
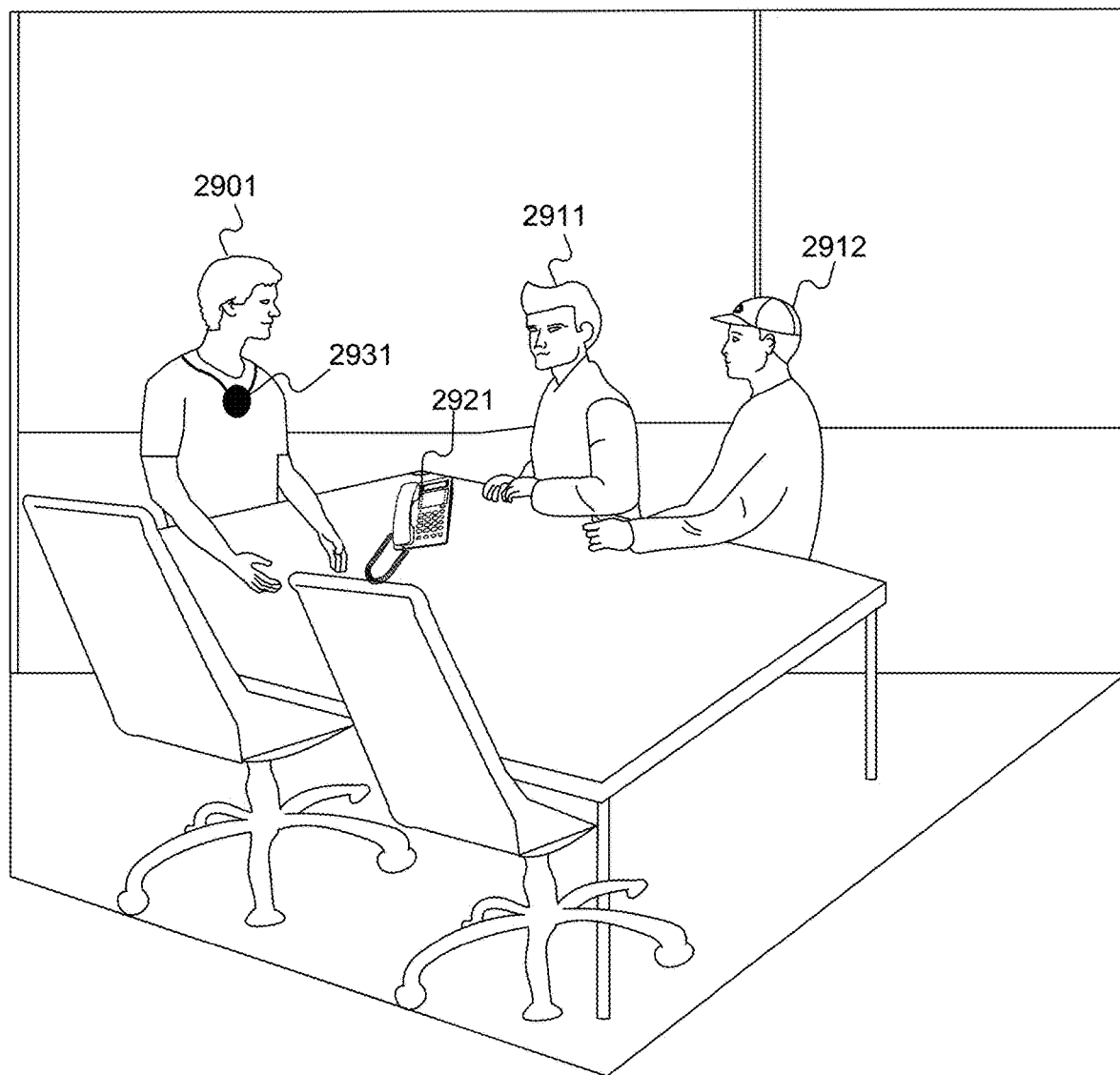
FIG. 29 is a schematic illustration of an exemplary hearing aid system consistent with the present disclosure.

FIG. 29 illustrates an exemplary hearing aid system. User 2901 may wear a wearable device 2931. Wearable device 2931 may include an image sensor configured to capture images of the environment of user 2901. As illustrated in FIG. 29, user 2901 may sit by one side of a table. A first individual 2911 and a second individual 2912 may sit by another side of the table. The image sensor of wearable device 2931 may capture one or more images of the environment of user 2901, including first individual 2911, second individual 2912, and a speakerphone 2921.

Figure 30A:
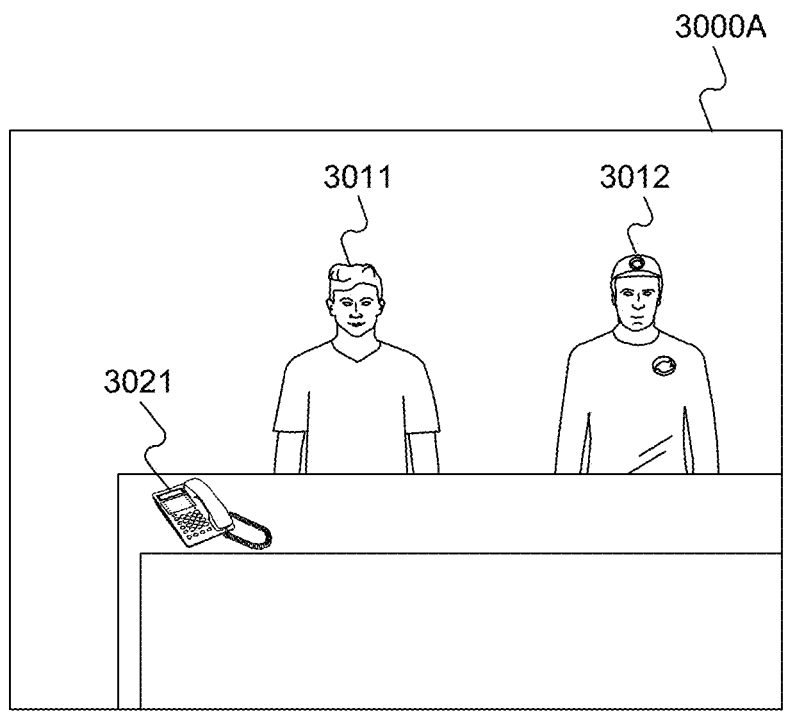
FIGS. 30A and 30B are schematic illustrations of exemplary images captured by an imaging capture device consistent with the present disclosure.
Figure 30B:
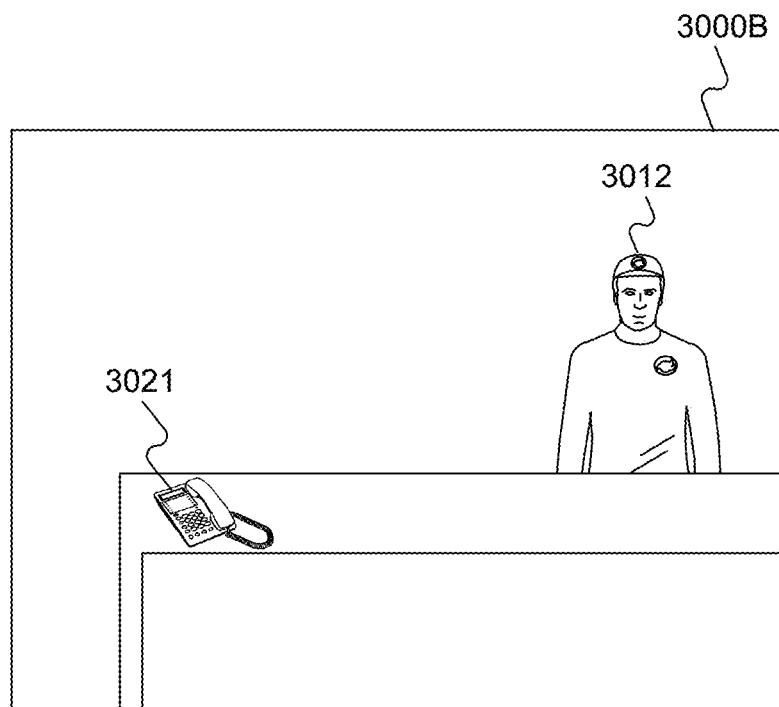

FIGS. 30A and 30B illustrate exemplary images 3000A and 3000B of the environment of user 2901 illustrated in FIG. 29. Image 3000A may include a representation 3011 of first individual 3011, a representation 3012 of second individual 3012, and a representation 3021 of speakerphone 2921. Image 3000B may include representation 3012 of second individual 3012 and representation 3021 of speakerphone 2921 (the first individual may be out of the FOV of the camera). Wearable device 2931 may also include at least one processor configured to analyze the images captured by the image sensor. The processor may also identify a representation of one or more individuals and one or more objects included in the images, based on the image analysis. For example, the processor may receive image 3000A and/or 3000B (illustrated in FIGS. 30A and 30B) from the image sensor and identify representations of first individual 2911, second individual 2912, and speakerphone 2921 included in the image. In some embodiments, the processor may be programmed to perform one or more steps of process 3110, process 3130, and/or process 3150 (illustrated in FIGS. 31A, 31B, and 31C, respectively).

In some embodiments, wearable device 2931 may be configured to automatically identify one or more individuals, based on the images, the audio signal(s) detected, another type of data, or the like, or a combination thereof. For instance, wearable device 2931 may automatically identify first individual 2911 and second individual 2912 based on the images using facial recognition technologies. Alternatively or additionally, wearable device 2931 may automatically identify an individual based on voice recognition (e.g., the voice print of the individual) associated with an audio signal detected. For instance, wearable device 2931 may automatically identify an individual who is not in the room with user 2901 and is participating in a conference call via speakerphone 2921, based on a detected audio signal associated with the individual. Alternatively or additionally, wearable device 2931 may automatically identify an individual based on a calendar invite associated with the user or prior known associations of the user. For example, wearable device 2931 may receive data relating to a calendar invite, which may include the identity of one or more participants. Wearable device 2931 may identify an individual as one of the participants included in the calendar invite. In some embodiments, wearable device 2931 may further record the identification of the one or more individuals in a database.

Wearable device 2931 may further include at least one microphone configured to receive one or more audio signals from the environment of user 2901. For example, the microphone may be configured to receive (or detect) an audio signal associated with the first individual 2911 and/or the second individual 2912 and/or additional audio such as background noise. The microphone may also be configured to receive (or detect) an audio signal associated with the speakerphone 2921 (e.g., the voice of a third individual participating in the conference through the speakerphone 2921).

In some embodiments, the microphone may include a directional microphone (e.g., a bi-directional microphone, an omnidirectional microphone, etc.), a microphone array, or the like, or a combination thereof. In some embodiments, the processor may be configured to determine the speak direction of each of one or more identified individuals and/or the user, based on the audio signals received. For example, the microphone may include one or more directional microphones, and the processor may be configured to determine the speak direction of an individual based on the audio signal associated with the individual.

Wearable device 2931 may also determine, based on analysis of the images, whether an audio signal received is associated with a voice of the one or more individuals detected in the images. For example, wearable device 2931 may receive a first audio signal and determine that the first audio signal is not associated with any of the individuals (e.g., first individual 2911 and second individual 2912) identified in the images based on analysis of the images. Additionally, wearable device 2931 may receive a second audio signal and determine that the second audio signal is associated with a voice of first individual 2911. Wearable device 2931 may further determine the sources of the audio signals based on the images and/or the audio signals. For example, wearable device 2931 may detect lip movements associated with first individual 2911 based on the image analysis. Wearable device 2931 may also determine that the detected lip movements correspond to the second audio signal and determine the source of the second audio signal to be first individual 2911. As another example, wearable device 2931 may determine that an audio signal originated from a speaker. In some embodiments, the speaker may include a speakerphone, a network-connected speaker (e.g., Bluetooth or WiFi speaker), a wired speaker, a cell phone, or the like, or a combination thereof. By way of example, wearable device 2931 may determine that the speaker is included in a speakerphone by detecting, through analysis of one or more of the images, a representation of a device recognized as a speakerphone.

Wearable device 2931 may further cause a first amplification of the first audio signal and a second amplification of the second audio signal. The first amplification may differ from the second amplification in at least one aspect. For example, wearable device 2931 may amplify the first audio signal by a first gain level and amplify the second audio signal by a second gain level. In some embodiments, the first gain level may be greater than the second gain level.

Wearable device 2931 may be in communication with a hearing interface device (e.g., an earphone) configured to receive audio signals and provide sound to an ear of user 2901. For example, wearable device 2931 may cause transmission of at least one of the first audio signal, amplified according to the first amplification, and the second audio signal, amplified according to the second amplification, to a hearing interface device configured to provide sound to an ear of user 2901. For example, the processor may cause a transmitter to transmit at least one of the first audio signal, amplified according to the first amplification, and the second audio signal, amplified according to the second amplification to a hearing interface device via a wireless network (e.g., cellular, Wi-Fi, Bluetooth®, etc.), or via near-field capacitive coupling, other short-range wireless techniques, or via a wired connection.

In some embodiments, a hearing interface device may include a speaker associated with an earpiece. For example, the hearing interface device may include an in-the-ear, in-the-canal, completely-in-canal, behind-the-ear, on-the-ear, receiver-in-canal, open fit, or various other styles of earphones. As another example, the hearing interface device may include a speaker included in a wearable device (e.g., wearable device 2631). In some embodiments, the hearing interface device may include an earphone, a headphone, a speaker, or the like, or a combination thereof. In some embodiments, the hearing interface device may include a bone conduction microphone.

In some embodiments, the microphone and the image sensor (or the wearable camera that includes the image sensor) may be included in a common housing. For example, wearable device 2931 illustrated in FIG. 29 may include both the microphone and the wearable camera in a common housing. Alternatively, the microphone may be included in a housing different from a housing in which the wearable camera is installed.

In some embodiments, the processor may be included in a common housing with at least one of the microphone and the wearable camera. For example, the processor may also be included in a common housing in which both the microphone and the wearable camera are included. Alternatively, the processor may be included in a separate housing from a common housing where the microphone and the wearable camera are installed. The processor may also be configured to receive data (e.g., the captured images, the detected audio signals, etc.) from the wearable camera and/or the microphone via a wireless link between a transmitter in the common housing (in which the microphone and the wearable camera are included) and receiver in the second housing (in which the processor is included).

Figure 31A:
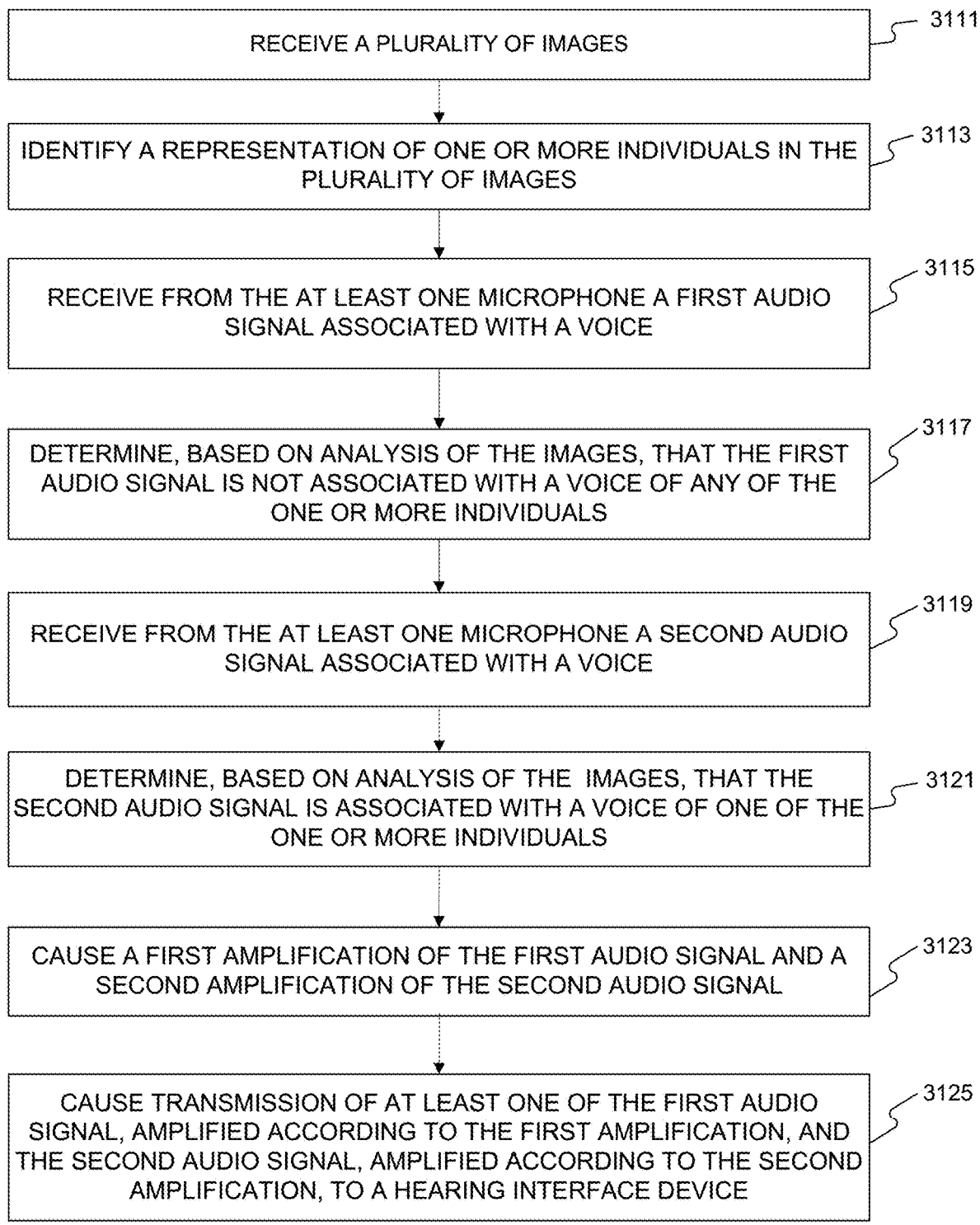
FIG. 31A is a flowchart of an exemplary process for selectively amplifying audio signals.

FIG. 31A is a flowchart of an exemplary process for selectively amplifying audio signals. At step 3111, the hearing aid system may receive a plurality of images captured by a camera. For example, the hearing aid system may include a processor (e.g., processor 210) configured to receive images of the environment of the user captured by an image sensor (e.g., image sensor 220). In some embodiments, the image sensor may be part of a camera included the hearing aid system. By way of example, as illustrated in FIG. 29, user 2901 may wear a wearable device 2931 that may include an image sensor configured to capture images of the environment of the user. The processor of the hearing aid system may receive the images from wearable device 2931.

In some embodiments, the hearing aid system may control the image sensor to capture images. For example, the processor may detect a gesture performed by the user (a finger-pointing gesture) and control the image sensor to capture images based on the detected gesture (e.g., adjusting the field of view of the image sensor based on the direction of the finger-pointing gesture). As another example, the hearing aid system may include a microphone configured to detect (or receive) audio signals from the environment of the user. The processor may receive the audio signals from the microphone and detect a voice by one or more individuals nearby. The processor may control the image sensor to capture images if a voice is detected.

In some embodiments, the processor may receive data from or transmit data to the image sensor over one or more networks via any known wireless standard (e.g., cellular, Wi-Fi, Bluetooth®, etc.), or via near-field capacitive coupling, other short-range wireless techniques, or via a wired connection. For example, the processor may also be configured to receive data (e.g., the captured images, etc.) from the image sensor via a wireless link between a transmitter in a housing in which the image sensor is included and a receiver in a housing in which the processor is included.

At step 3113, the hearing aid system may identify a representation of one or more individuals in the plurality of images. For example, the processor may identify a representation of first individual 2911 and second individual 2912 in the images. For instance, the processor may analyze image 3000A illustrated in FIG. 30A and identify representation 3011 of first individual 2911 and representation 3012 of second individual 2912. In some embodiments, the processor may also identify a representation of one or more objects included in the images. For example, the processor may identify in image 3000A representation 3021 of speakerphone 2921 (illustrated in FIG. 29).

In some embodiments, the processor may be configured to automatically identify the one or more individuals, based on the images, the audio signal(s) detected, another type of data, or the like, or a combination thereof. For instance, the processor may automatically identify first individual 2911 and second individual 2912 based on the images using facial recognition technologies. Alternatively or additionally, the processor may automatically identify an individual based on voice recognition (e.g., the voice print of the individual) associated with an audio signal detected. Alternatively or additionally, the processor may automatically identify an individual based on a calendar invite associated with the user or prior known associations of the user. For example, the processor may receive data relating to a calendar invite, which may include the identity of one or more participants. The processor may identify first individual 2911 as one of the participants included in the calendar invite. In some embodiments, the processor may further record the identification of the one or more individuals in a database.

At step 3115, the hearing aid system may receive from the at least one microphone a first audio signal associated with a voice. For example, the hearing aid system may include a microphone configured to receive (or detect) audio signals from the environment of user 2901, including a first audio signal associated with a voice.

At step 3117, the hearing aid system may determine, based on analysis of the plurality of images, that the first audio signal is not associated with a voice of any of the one or more individuals. For example, the processor may analyze the images to detect the facial expression (e.g., lip movements) of the individual(s) detected in the images. The processor may determine the first audio signal is not associated with a voice of any of the one or more individuals by analyzing detected lip movements associated with mouths of first individual 2911 and/or second individual 2912, and determine that the first audio signal does not correspond to the detected lip movements associated with mouths of first individual 2911 and/or second individual 2912. The first audio signal may be associated with a voice of an individual who is outside of the FOV of the camera (e.g., an individual participating in a conference call through speakerphone 2921 or an individual who is in the room but sits far away from user 2901).

In some embodiments, the processor may identify the source of the first audio signal. For example, the processor may automatically identify an individual based on voice recognition (e.g., the voice print of the individual) associated with an audio signal detected. By way of example, the processor may automatically identify an individual who is not in the room with user 2901 and is participating a conference call via speakerphone 2921, based on the analysis of the first audio signal. Alternatively or additionally, the processor may automatically identify an individual based on a calendar invite associated with the user or prior known associations of the user. For example, the processor may receive data relating to a calendar invite, which may include the identify of one or more participants. The processor may identify an individual as one of the participants included in the calendar invite. In some embodiments, the processor may further record the identification of the one or more individuals in a database. The participant may be captured earlier and then disappeared from the image (maybe went to another room)

At step 3119, the hearing aid system may receive from the at least one microphone a second audio signal associated with a voice. The hearing aid system may receive the first audio signal and the second audio signal at the same time or at different times. In some embodiments, at least portion of the first audio signal may overlap with a portion of the second audio signal. The voices may be separate by any voice separation technique, for example using periods in which only one speaker speaks, as detailed above.

At step 3121, the hearing aid system may determine, based on analysis of the plurality of images, that the second audio signal is associated with a voice of one of the one or more individuals. For example, the processor may determine the second audio signal is associated with first individual 2911 (and/or second individual 2912) by analyzing detected lip movements associated with mouths of first individual 2911 (and/or second individual 2912) and determining that the second audio signal corresponds to the detected lip movements associated with a mouth of first individual 2911 (and/or second individual 2912).

In some embodiments, the processor may be configured to automatically identify one or more individuals associated with the first audio signal and/or the second audio signal, based on the images, the audio signal(s) detected, another type of data, or the like, or a combination thereof. For instance, the processor may automatically identify first individual 2911 (and/or second individual 2912) who is associated with the second audio signal, based on the images using facial recognition technologies. Alternatively or additionally, the processor may automatically identify an individual based on voice recognition (e.g., the voice print of the individual) associated with an audio signal detected. Alternatively or additionally, the processor may automatically identify an individual based on a calendar invite associated with the user or prior known associations of the user. For example, the processor may receive data relating to a calendar invite, which may include the identity of one or more participants. The processor may identify an individual as one of the participants included in the calendar invite. In some embodiments, the processor may further record the identification of the one or more individuals in a database.

At step 3123, the hearing aid system may cause a first amplification of the first audio signal and a second amplification of the second audio signal. The first amplification may differ from the second amplification in at least one aspect. For example, the processor may amplify the first audio signal by a first gain level and amplify the second audio signal by a second gain level. In some embodiments, the first gain level may be greater than the second gain level.

In some embodiments, the processor may amplify the first audio signal to a first predetermined sound level and the second audio signal to a second predetermined sound level. The first predetermined sound level may be lower than, greater than, or the same as the second predetermined sound level. Alternatively or additionally, the processor may amplify the first audio signal by increasing the sound level by a first percentage and amplify the second audio signal by increasing the sound level by a second percentage.

At step 3125, the hearing aid system may cause transmission of at least one of the first audio signal, amplified according to the first amplification, and the second audio signal, amplified according to the second amplification, to a hearing interface device configured to provide sound to an ear of the user. For example, the processor may include a transmitter configured to transmit the amplified audio signal(s) (e.g., amplified first audio signal, amplified second audio signal, etc.) to a hearing interface device via a wireless network (e.g., cellular, Wi-Fi, Bluetooth®, etc.), or via near-field capacitive coupling, other short-range wireless techniques, or via a wired connection. A hearing interface device may include a speaker associated with an earpiece.

For example, the hearing interface device may include an in-ear earphone. As another example, the hearing interface device may include a speaker included in a wearable device (e.g., wearable device 2931). In some embodiments, the hearing interface device may include an earphone, a headphone, a speaker, or the like, or a combination thereof.

Figure 31B:
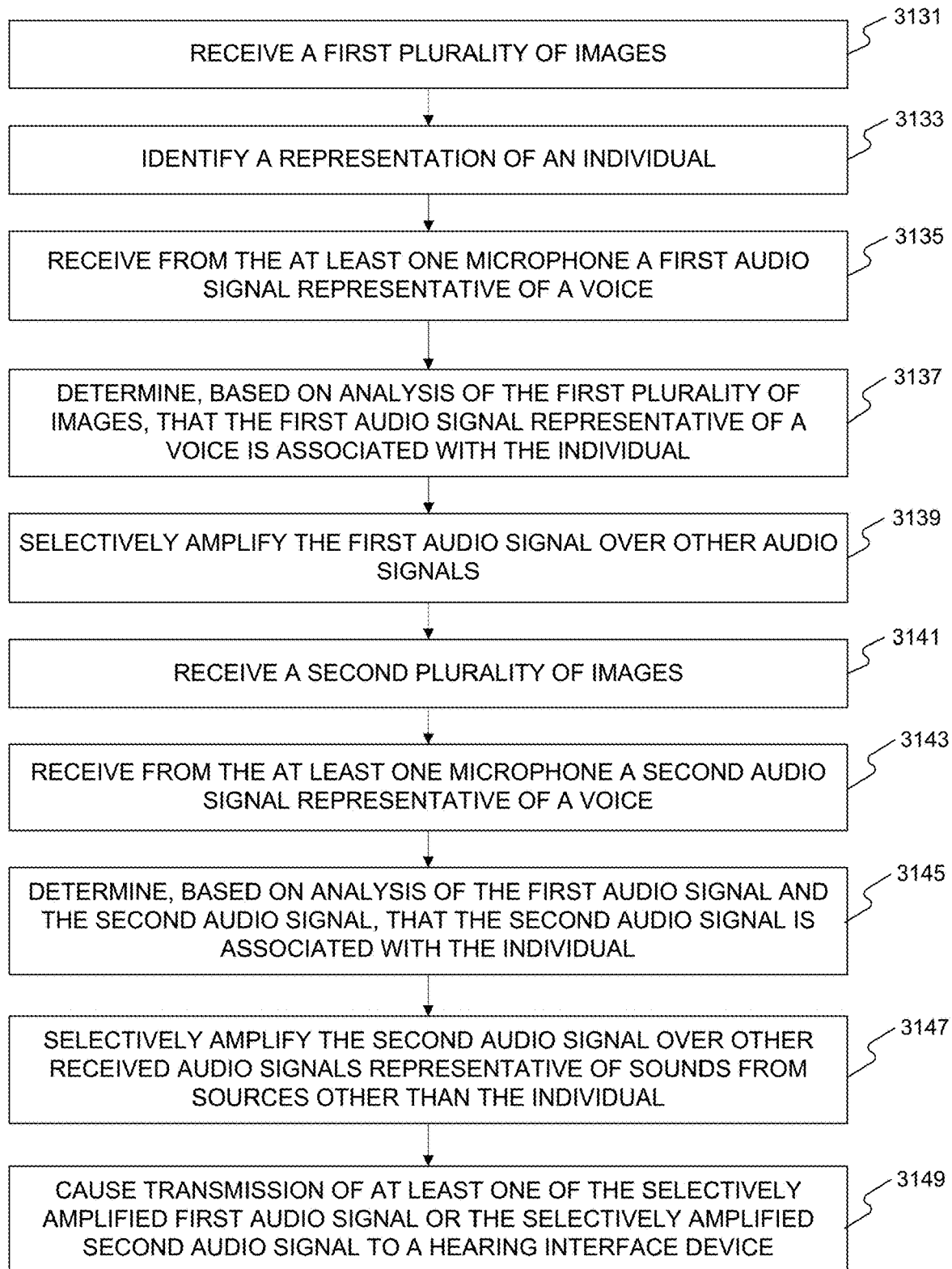
FIG. 31B is a flowchart of an exemplary process for selectively amplifying audio signals.

FIG. 31B is a flowchart of an exemplary process 3130 for selectively amplifying audio signals. At step 3131, the hearing aid system (e.g., apparatus 110) may receive a first plurality of images. For example, the hearing aid system may include a processor (e.g., processor 210) configured to receive images of the environment of the user captured by an image sensor (e.g., image sensor 220). In some embodiments, the image sensor may be part of a camera included in the hearing aid system. By way of example, as illustrated in FIG. 29, user 2901 may wear the processor that may include an image sensor configured to capture images of the environment of the user. The processor of the hearing aid system may receive the images from wearable device 2931.

At step 3133, the hearing aid system may identify a representation of an individual in the first plurality of images. In some embodiments, the hearing aid system may identify a representation of an individual (and or an object) in the first plurality of images using a method similar to that of step 3113 of process 3110 described above. For example, the processor may be configured to analyze image 3000A and identify representation 3011 of first individual 2911 and/or representation 3012 of second individual 2912 in image 3000A based on the image analysis. In some embodiments, the processor may also automatically identify the individual and record the identification of the individual into a database as described elsewhere in this disclosure.

At step 3135, the hearing aid system receive from the at least one microphone a first audio signal representative of a voice. For example, the hearing aid system may include a microphone configured to receive (or detect) audio signals from the environment of user 2901, including a first audio signal associated with a voice. In some embodiments, the microphone may include a directional microphone (e.g., a bi-directional microphone, an omnidirectional microphone, etc.), a microphone array, or the like, or a combination thereof.

In some embodiments, the microphone and the image sensor (or the wearable camera that includes the image sensor) may be included in a common housing. Alternatively, the microphone may be included in a housing different from a housing in which the wearable camera is installed. In some embodiments, the processor may be included in a common housing with at least one of the microphone and the wearable camera. For example, the processor may also be included in a common housing in which both the microphone and the wearable camera are included. Alternatively, the processor may be included in a separate housing from a common housing where the microphone and the wearable camera are installed. The processor may also be configured to receive data (e.g., the captured images, the detected audio signals, etc.) from the wearable camera and/or the microphone via a wireless link between a transmitter in the common housing (in which the microphone and the wearable camera are included) and receiver in the second housing (in which the processor is included).

At step 3137, the hearing aid system may determine, based on analysis of the first plurality of images, that the first audio signal representative of a voice is associated with the individual. In some embodiments, the hearing aid system may determine, based on analysis of the first plurality of images, that the first audio signal representative of a voice is associated with the individual using a method similar to that of step 3121 of process 3110 described above. For example, the processor may determine the first audio signal is associated with first individual 2911 (and/or second individual 2912) by analyzing detected lip movements associated with mouths of first individual 2911 (and/or second individual 2912) and determining that the first audio signal corresponds to the detected lip movements associated with a mouth of first individual 2911 (and/or second individual 2912).

At step 3139, the hearing aid system may selectively amplify the first audio signal over other audio signals received from the at least one microphone representative of sounds from sources other than the individual. For example, the processor may amplify the first audio signal by a first gain level. Alternatively or additionally, the processor may amplify the first audio signal to a first predetermined sound level. Alternatively or additionally, the processor may amplify the first audio signal by increasing the sound level by a percentage.

At step 3141, the hearing aid system may receive a second plurality of images captured by the camera. In some embodiments, the hearing aid system may receive the second plurality of images after the first plurality of images. For example, the processor may receive the first plurality of images captured by the camera during a first period of time and receive the second plurality of images captured by the camera during a second period of time. The hearing aid system may receive the second plurality of images using a method similar to step 3131 described above. For example, the hearing aid system may receive image 3000B illustrated in FIG. 30B (as one of the second plurality of images).

At step 3143, the hearing aid system may receive from the at least one microphone a second audio signal representative of a voice associated with the individual. In some embodiments, the hearing aid system may receive the second audio signal representative of a voice after the first audio signal. For example, the second audio signal may be received from speaker (e.g., speakerphone 2921) through which the individual speaks (e.g., the individual is speaking via speakerphone 2921 in a telephonic call). As another example, the second audio signal may be received from the individual directly. In some embodiments, the hearing aid system may receive the second audio signal using a method similar to step 3135 described above.

At step 3145, the hearing aid system may determine, based on analysis of the second plurality of images, that the individual is not represented in the second plurality of images. For example, the hearing aid system may determine, based on analysis of image 3000B illustrated in FIG. 30B, first individual 2911 may be outside of the FOV of the camera when image 3000B is captured (e.g., having left the room or being outside of the FOV despite remaining in the room). The processor may analyze the second plurality of images and determine that the individual is not represented in the second plurality of images.

At step 3147, the hearing aid system may selectively amplify the second audio signal over other received audio signals representative of sounds from sources other than the individual. In some embodiments, the processor may selectively amplify the second audio signal by a second gain level. Alternatively or additionally, the processor may amplify the second audio signal to a second predetermined sound level. Alternatively or additionally, the processor may amplify the second audio signal by increasing the sound level by a percentage.

At step 3149, the hearing aid system may cause transmission of at least one of the selectively amplified first audio signal or the selectively amplified second audio signal to a hearing interface device. Transmission of an amplified audio signal to the hearing interface device is described elsewhere in this disclosure. For example, the processor may cause a transmitter to transmit at least one of the selectively amplified first audio signal or the selectively amplified second audio signal to the hearing interface device via a wireless network (e.g., cellular, Wi-Fi, Bluetooth®, etc.), or via near-field capacitive coupling, other short-range wireless techniques, or via a wired connection.

In some embodiments, the hearing interface device may include a speaker associated with an earpiece. For example, the hearing interface device may include an in-ear earphone. As another example, the hearing interface device may include a speaker included in a wearable device (e.g., wearable device 2631). In some embodiments, the hearing interface device may include an earphone, a headphone, a speaker, or the like, or a combination thereof. In some embodiments, the hearing interface device may include a bone conduction microphone.

Figure 31C:
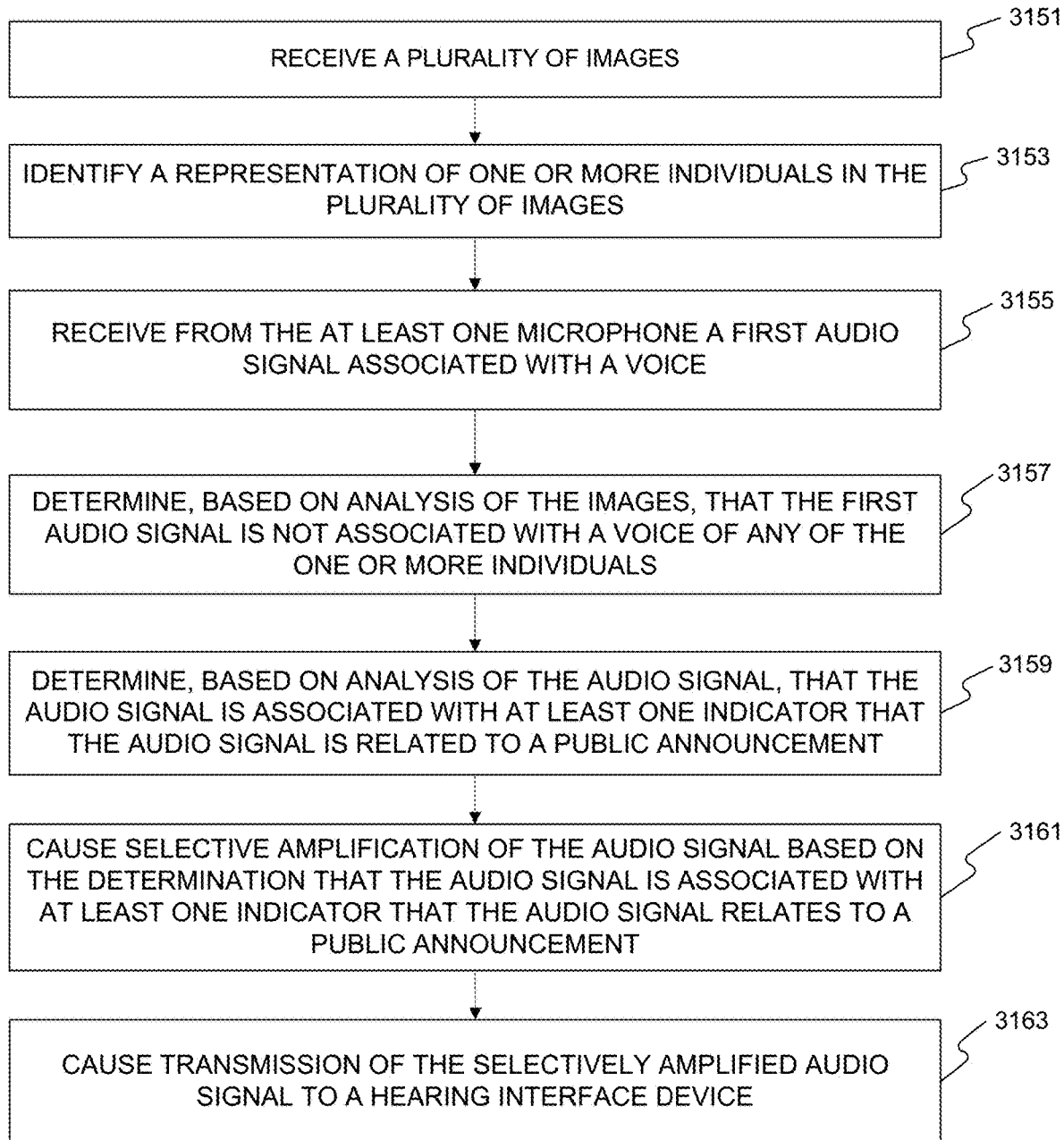
FIG. 31C is a flowchart of an exemplary process for selectively amplifying audio signals.

FIG. 31C is a flowchart of an exemplary process for selectively amplifying audio signals. At step 3151, the hearing aid system may receive a plurality of images. The hearing aid system may receive a plurality of images based on a method similar to step 3111 of process 3110 described above. For example, user 2901 may wear wearable device 2931 that may include an image sensor configured to capture images of the environment of the user. The processor of the hearing aid system may receive the images from wearable device 2931.

At step 3153, the hearing aid system may identify a representation of one or more individuals in the plurality of images. The hearing aid system may identify a representation of one or more individuals in the plurality of images based on a method similar to step 3113 of process 3110 described above. For instance, the processor may analyze image 3000A illustrated in FIG. 30A, and identify representation 3011 of first individual 2911 and representation 3012 of second individual 2912. In some embodiments, the processor may also identify a representation of one or more objects included in the images. For example, the processor may identify in image 3000A representation 3021 of speakerphone 2921 (illustrated in FIG. 29).

At step 3155, the hearing aid system may receive from the at least one microphone a first audio signal associated with a voice. In some embodiments, the hearing aid system may receive from the at least one microphone a first audio signal based on a method similar to step 3115 of process 3110 described above. For example, the processor may include a microphone configured to receive (or detect) audio signals from the environment of user 2901, including a first audio signal associated with a voice.

At step 3157, the hearing aid system may determine, based on analysis of the images, that the first audio signal is not associated with a voice of any of the one or more individuals. In some embodiments, the determination may be based on a method similar to step 3117 of process 3110 described above. For example, the processor may analyze the images to detect the facial expression (e.g., lip movements) of the individual(s) detected in the first plurality of images. The processor may determine the first audio signal is not associated with a voice of any of the one or more individuals is made by analyzing detected lip movements associated with mouths of first individual 2911 and/or second individual 2912, and determine that the first audio signal does not correspond to the detected lip movements associated with mouths of first individual 2911 and/or second individual 2912.

At step 3159, the hearing aid system may determine, based on analysis of the audio signal, that the audio signal is associated with at least one indicator that the audio signal is related to a public announcement. For example, the processor may analyze the received audio signal to determine the content associated with the audio signal. The processor may also determine that the audio signal is related to a public announcement based on the content. A public announcement may include a communication intended for a group of people, of which the device user may be a part (e.g., a gate announcement broadcasted at an airport). As another example, a public announcement may be a call for help (e.g., Mayday, etc.).

In some embodiments, the at least one indicator that the audio signal is related to a public announcement may include a recognized sound, word or phrase associated with the audio signal. For example, the processor may recognize one or more words or phrases that are associated with an airport announcement (e.g., a flight number), and determine that the audio signal is related to a public announcement based on the recognized word or phrase. As another example, the audio signal may include a word (or phrase) such as "help," "watch out," "attention," "announcement" (or similar words or phrases in other languages), or the like, or a combination thereof. The processor may analyze the audio signal and recognize such word (or phrase) and determine that the audio signal is related to a public announcement based on the recognized word (or phrase). Alternatively or additionally, the at least one indicator that the audio signal is related to a public announcement may include a volume level of the audio signal relative to an ambient noise level, which may indicate that the audio signal relates to a yell, scream, a public announcement over a loudspeaker, or the like, or a combination thereof. For example, the processor may determine that the volume level of the audio signal is greater than the ambient noise level by a threshold, and determine that the audio signal may be related to a public announcement or an event that needs attention. Alternatively or additionally, the at least one indicator that the audio signal is related to a public announcement includes at least one signal component associated with the audio signal indicative of production of the audio signal by a loudspeaker. For example, the audio signal may be related to a broadcast over one or more loudspeakers, which may include one or more signal characteristics indicating amplification of the voice or reproduction of the voice over a public address system.

At step 3161, the hearing aid system may cause selective amplification of the audio signal based on the determination that the audio signal is associated with at least one indicator that the audio signal relates to a public announcement. For example, the processor may amplify the audio signal associated with a public announcement. In some embodiments, the processor may amplify the audio signal to a predetermined sound level. Alternatively or additionally, the processor may amplify the audio signal by increasing the sound level by a percentage. Alternatively or additionally, while amplifying an audio signal, the processor may be configured to attenuating one or more other audio signals (by, for example, decreasing the sound level of the other signal(s) to a predetermined sound level or by a predetermined percentage). For example, the processor may be configured to amplify the audio signal associated with a public announcement by 50% and attenuate one or more other audio signals by 50%.

In some embodiments, the processor may determine whether the audio signal relating to a public announcement (e.g., a public announcement at an airport) is relevant to the user and may selectively amplify the audio signal based on the result of the determination. For example, the processor may determine that the audio signal relates to a flight that is irrelevant to the user and may not amplify the audio signal accordingly. As another example, the processor may determine that the public announcement associated with the audio signal relates to a gate change of the user's flight. The processor may also selectively amplify the audio signal. In some embodiments, the processor may determine whether airport announcement is relevant to the user based on automatic review of a calendar entry or reservation notice stored on a mobile device associated with the user. For example, the processor may access the data relating to a calendar entry or reservation notice stored on a mobile device associated with the user and determine that the flight information (e.g., the flight number) relating to the flight that the user is going to take based on the accessed data. The processor may also determine whether a public announcement associated with the audio signal is relevant to the user based on the flight information and the audio signal (e.g., the content of the message associated with the audio signal).

In some embodiments, the hearing aid system may capture one or more audio signals received during a moving time window of a predetermined length, and the processor may be programmed to cause selective amplification and transmission of a portion of the audio signal received within the moving time window but prior to the determination that the audio signal is related to a public announcement. For example, the hearing aid system may recognize that a stream of voice communications (in the form of one or more audio signals) includes a public announcement. The recognition may be after the announcement begins. The processor may use a moving time window of the captured audio signal(s) to go back to the beginning of the public announcement and extract information relating to the full announcement from within the time window and selectively amplify that full announcement (in the form of one or more audio signals) for the user. The amplified audio signal(s) may be transmitted to the user time-delayed relative to the original announcement.

At step 3163, the hearing aid system may cause transmission of the selectively amplified audio signal to a hearing interface device. For example, the processor may cause a transmitter to transmit the amplified audio signal to a hearing interface device via a wireless network (e.g., cellular, Wi-Fi, Bluetooth®, etc.), or via near-field capacitive coupling, other short-range wireless techniques, or via a wired connection. Alternatively or additionally, the processor may cause transmission of the unprocessed audio signal(s) (and/or the selectively attenuated audio signal) to the hearing interface device.

Selectively Conditioning Audio Signals

In accordance with various embodiments of the disclosure, a wearable apparatus, such as apparatus 110, may be configured to use audio information in addition to image information. For example, apparatus 110 may detect and capture sounds in an environment of the user (e.g., user 100), via one or more microphones. Apparatus 110 may use this audio information instead of, or in combination with, image and/or video information to determine situations, identify persons, perform activities, or the like. The image and/or video information may supplement the audio information in various situations for people wearing a hearing aid system. For example, people that use a hearing aid often find that the hearing aid does not perform optimally in a crowded environment. In such cases, various environmental sounds may be amplified and impede a user who wears the hearing aid (e.g., user 100) from clearly distinguishing sounds that are directly relevant to user 100, such as conversational words or sounds from a person communicating with user 100. In such cases, image data may be used to identify an individual relevant to user 100 (e.g., an individual in conversation with user 100).

In accordance with an embodiment of the disclosure, a hearing aid system is provided. The hearing aid system may include a wearable camera configured to capture a plurality of images from an environment of user 100. In various embodiments, the hearing aid system may include at least one microphone configured to capture sounds from an environment of the user. In some embodiments, the hearing aid system may include more than one microphone. In an example embodiment, the hearing aid system may include a first microphone for capturing audio signals in a first wavelength range and a second microphone for capturing audio signals in a second wavelength range.

The hearing aid system may include at least one processor programmed to receive the plurality of images captured by the wearable camera and identify a representation of at least one individual in at least one of the plurality of images. The processor may be configured to use a computer-based model to extract an image of a person from the received image. For example, the processor may use a neural network model (e.g., a convolutional neural network (CNN)), to recognize an image of a person in the received image. In an example embodiment, the hearing aid system may be configured to capture an image in a direction normal to a face of user 100 (e.g., determined based on a direction associated with a chin of the user, which direction can be normal to the chin of user 100) to discern a speaker in the captured image.

The hearing aid system may be incorporated into apparatus 110, or in some embodiments, apparatus 110 may constitute the hearing aid system. As previously described, in connection with FIG. 2, apparatus 110 may transfer or receive data to/from server 250 via network 240. In an example embodiment, an image of a person in the received image may be transferred to server 250 for analysis of the image. Server 250 may include a processor configured to access a database associated with server 250 containing various images of people that are related to user 100 and compare these images with the one or more images of a person transferred to server 250 by apparatus 110.

In an example embodiment, the database of server 250 may select images of friends of user 100, relatives of user 100, co-workers of user 100, persons whom user 100 has encountered in the past, and the like for comparison with the one or more images of a person captured by the hearing aid system. In some embodiments, the hearing aid system may access to a global positioning system (GPS) and may determine the location of user 100. For example, the hearing aid system may include a GPS system, or it may communicate with a mobile device (e.g., smartphone, tablet, laptop, etc.) of user 100 that includes a GPS system (or alternative system for determining position of the mobile device, such as Wi-Fi, local network, etc.) to obtain location data (e.g., coordinates of user 100, address of user 100, IP address of the mobile device of user 100, etc.). The hearing aid system may communicate the location of user 100 to server 250. In an example embodiment, server 250 may be configured to select from a database (e.g., stored in server 250) images of people who are likely to be found at the location of user 100. For example, when user 100 is located at a work site, images of co-workers may be selected first.

Additionally, or alternatively, the hearing aid system may communicate to server 250 a time when the images of an environment of user 100 were captured by the wearable camera. In an example embodiment, server 250 may be configured to select from a database (e.g., stored in server 250) images of people who are likely to be found at the location of user 100 at the communicated time. For example, when user 100 is located at home, and the time corresponds to dinner time, the images of relatives may be selected first.

In various embodiments, the image of a person obtained from captured images by the wearable camera of the hearing aid system may be compared by a processor of server 250 with various images selected from the database of server 250 using any suitable approaches. For example, images may be compared by using neural networks such as CNN, or any other suitable computer-based methods. In some embodiments, a computer-based model may assign a likelihood indicating to what degree the image of the person obtained from captured images matches with at least one image found in the database of server 250. In an example embodiment, the likelihood may be a probability of the image of the person obtained from captured images matching with at least one image found in the database of server 250 and may be in the range of values from zero to one.

In various embodiments, an image in the database of server 250 may have an associated data record that can be stored in the database of server 250 in association with the related image. For example, the image from the database may have a data record associated with a person, and the data record may include a person's name, a relationship to user 100, dates and times the person met user 100, and the like. In some cases, one data record may be associated with multiple images located in the database of server 250. A data record may be retrieved from the database for one or more associated images. For example, server 250 may be configured to retrieve a data record for the one or more associated images using a processor. Additionally, or alternatively, one or more images may be retrieved from the database for the associated data record. In an example embodiment, the image of a person obtained from captured images may be compared with more than one image from the database of server 250 that corresponds to the same data record to establish the likelihood. In various embodiments, if the likelihood is above a predetermined threshold value, the hearing aid system may establish that the image of the person obtained from captured images matches the data record from the database.

In an example embodiment, data records for images stored in the database of server 250 may be linked. For example, a data record for one person may be linked with a data record for another person, where a link may include any suitable relationship information between the linked data records. In some cases, the link may be used to define the relationship between people whose data records are stored in the database. For example, the people may be defined as co-workers, friends, competitors, neighbors, teammates, admirers of the same product, person, singer, actor, and the like. In various embodiments, server 250 may use links between data records to re-evaluate the likelihood that the person identified from captured images matches the image of an individual found in the database of server 250. For example, if a data record for an image of the individual found in the database of server 250 includes a link to a data record of user 100, the likelihood value may be increased.

For example, if the link indicates that user 100 is a co-worker of the individual, and user 100 is located at a work site, the likelihood value may be increased. In some embodiments, a first encounter with a first individual (e.g., a coworker) may affect the likelihood value that a second individual (e.g., another coworker) identified from captured images during a second encounter, matches a data record for an individual found in the database of server 250.

While the discussion above describes using server 250 for analyzing images captured by a wearable device of user 100, additionally, or alternatively, a processor of the hearing aid system may be used for analyzing the images. For example, the processor of the hearing aid system may be configured to receive various images or characteristics of persons from the database of server 250 as well as the associated data records for these images or characteristics, and compare the received images or characteristics with an image or characteristics of the person identified in the captured images. Similar to the embodiments discussed above, the processor of the hearing aid system may use a computer-based model to compare images and may receive images from the database that are relevant to location or time for user 100. In an example embodiment, the computer-based model may include a neural network such as a convolutional neural network (CNN). In some embodiments, the determination of whether the at least one individual is a recognized individual may be based on an output of a trained neural network supplied with the at least one of the plurality of images that can be used to analyze one or more images. In some embodiments, the determination of whether the at least one individual is a recognized individual may be based on one or more facial features associated with the at least one individual that are detected based on analysis of the at least one of the plurality of images. For example, a computer-based model such as CNN may be used to analyze images and compare facial features or relations between facial features of the person identified in the captured images with facial features or relations therebetween of people found in images stored in the database of server 250. In some embodiments, a video of person's facial dynamic movements may be compared with video data record for various people, obtained from the database, in order to establish that the person captured in the video is a recognized individual.

In various embodiments, the hearing aid system may include at least one processor programmed to receive an audio signal from the at least one microphone. In an example embodiment, the at least one processor may be configured to use a computer-based model to determine whether the received audio signal is associated with a recognized individual. For example, the computer-based model may be a neural network model (e.g., convolutional neural network (CNN)), and the like. In some cases, the audio signal may include multiple audio signals from multiple sources (e.g., an audio signal from a speaker in conversation with user 100, an environmental audio signal, and the like). In various embodiments, the determination of whether the at least one individual is a recognized individual may be based on analysis of the at least one audio signal (e.g., an audio signal related to user 100 conversing with one or more speakers) received by the microphone of the hearing aid system. In an example embodiment, the audio signal may be determined to be associated with the recognized individual based on a detected look direction for the user, determined based on a direction associated with a chin of the user detected in the at least one of the plurality of images.

In an example embodiment, a detection in the audio signal of one or more of predetermined voice characteristics associated with one or more recognized individuals (e.g., individuals whose voiceprints and data records are available, for example, in the database of server 250, or elsewhere) may be used to identify and recognize one or more speakers. For example, the detection of voice characteristics of a recognized individual may determine whether the received audio signal is associated with the recognized individual. As used herein, the term "voiceprint" may refer to a set of measurable features (or feature ranges) of a human voice that uniquely identifies a speaker. In some embodiments, these parameters may based on the physical configuration of a speaker's mouth, throat, and additional organs, and/or may be expressed as a set of sounds related to various syllables pronounced by the speaker, a set of sounds related to various words pronounced by the speaker, a modulation or inflection of a voice of the speaker, cadence of a speech of the speaker, and the like.

Figure 32:
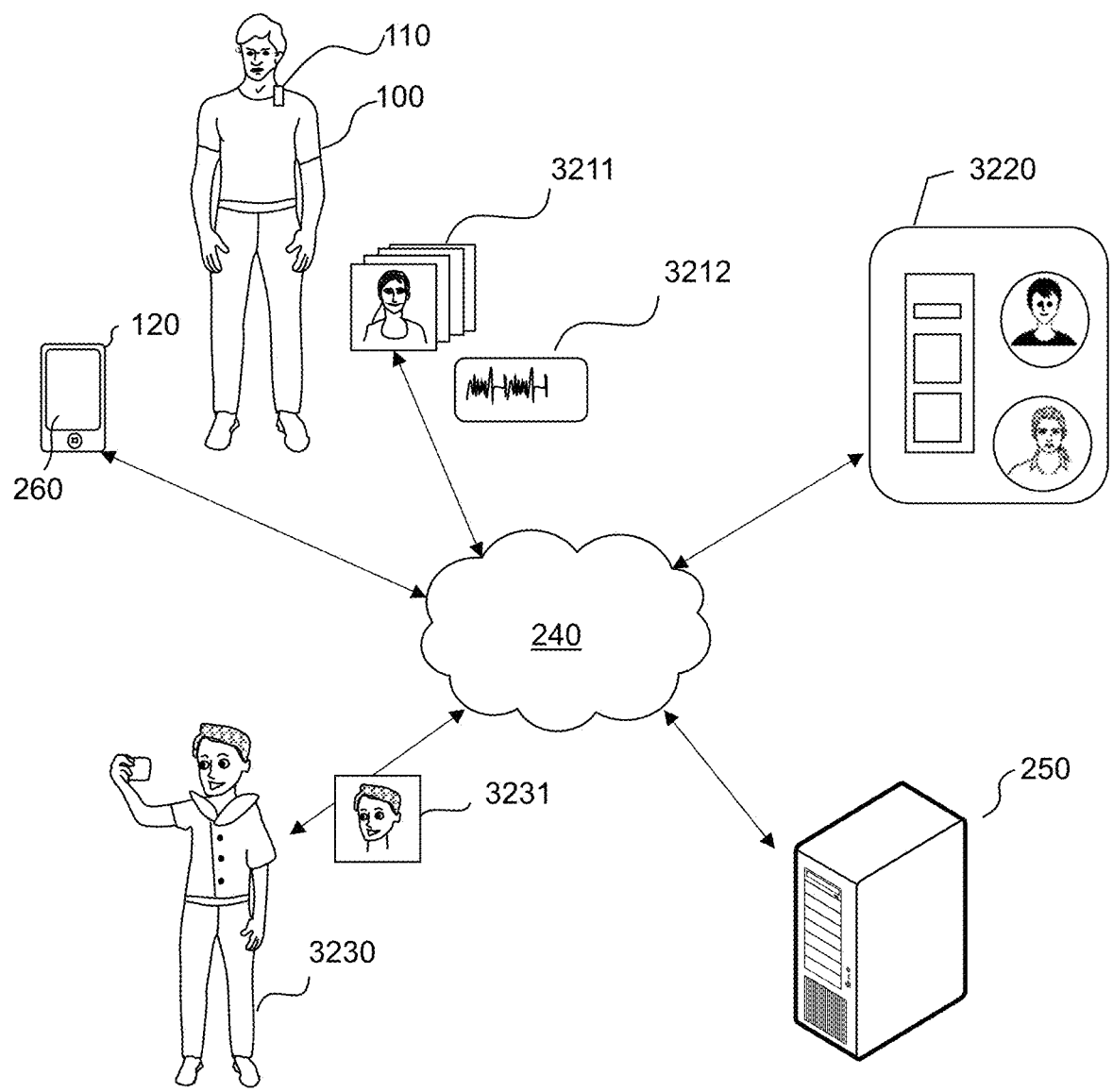
FIG. 32 is a schematic illustration of an example system including a wearable apparatus according to a disclosed embodiment.

In various embodiments, server 250 may receive images and audio information (e.g., voiceprints) for various individuals from a variety of sources. For example, FIG. 32 shows server 250 receiving images 3211 and audio data 3212 from user 100 wearing apparatus 110. In some cases, images and audio data may be submitted to server 250 via computing device 120 (e.g., a smartphone, laptop, tablet, and the like). In some embodiments, server 250 may be configured to access information (e.g., images, video, audio data, etc.) available over a social network 3220 (e.g., a Facebook® page/LinkedIn® page, email, Instagram®, and the like) associated either with user 100 or with one or more individuals identified in images 3211, as shown in FIG. 32. The information from social network 3220 may include data related to friends of user 100, to friends of friends of user 100, and the like. In some embodiments, server 250 may receive information from individuals that do not use the hearing aid system (e.g., apparatus 110, as shown in FIG. 32) but who may have a user profile associated with server 250. For example, user 3230 may be a relative, co-worker, friend, and the like of user 100, and may have a user profile associated with server 250. In various embodiments, user 3230 may take images/video and/or audio data 3231 (e.g., a selfie as shown in FIG. 32) and upload data 3231 to server 250. In various embodiments, user 3230 may upload information to server 250 such as an associated data record (e.g., a name of user 3230, a location, and the like). In an example embodiment, the one or more processors may be programmed to transmit images 3211 and audio data 3212 to the database relating to encounters with individuals. For example, the one or more processors may be configured to transmit images 3211 and audio data 3212 when a speaker for a conversation is identified and recognized, or/and images 3211 and audio data 3212 related to various conversations with various speakers even if those speakers are not recognized.

In various embodiments, the hearing aid system may be configured to interact with user 100 via visual or audio data. For example, the hearing aid system may interact with user 100 via a display using audio signals delivered to user 100 via earpiece devices, and the like. In an example embodiment, the hearing aid system may determine whether the at least one individual is a recognized individual by comparing images captured by the wearable device with the images and the associated data records stored in the database of server 250 as described above. When the likelihood for the image of the person obtained from captured images matching the data record from the database is above a predetermined threshold value, the hearing aid system may establish that the individual captured in the images is a recognized individual.

In some cases when the likelihood is insufficiently high (e.g., below the predetermined threshold value) the hearing aid system may be configured to suggest various possible names for the person displayed in the captured one or more images. The hearing aid system may then allow user 100 to select a name that user 100 believes matches best the person displayed in the captured images. For cases when the hearing aid system includes a display (e.g., a mobile phone a tablet, device 120 with display 260, as shown in FIG. 2, or the like), the hearing aid system may cause an image of the at least one individual to be shown on the display. In some embodiments, the hearing aid system may present user 100 with one or more images of individuals associated with one or more suggested possible names for the person displayed in the captured one or more images. For example, the hearing aid system may show the one or more images of individuals on display 260 of device 120. Additionally, the hearing aid system may inform user 100 about other information related to individuals associated with one or more suggested possible names (e.g., estimated/expected locations of the individuals, occupations of the individuals, etc.) in order to facilitate user 100 in selecting the name of an individual that user 100 believes matches best the person displayed in the captured images.

In some cases, the display may be included with a housing common to the wearable camera and the at least one microphone. In some cases, the wearable camera and the at least one microphone may be included in the common housing, and the display may be located elsewhere. In some embodiments, the common housing may further include a processor. In some cases, the hearing aid system may include various elements and devices that may not be included in the common housing. For example, the hearing aid system may include a second processor that is not included in the common housing. In some embodiments, the at least one processor is configured to receive the captured images via a wireless link between a transmitter in the common housing and receiver in the second housing. For example, the second housing may be associated with a paired (e.g., connected wirelessly or wired using any suitable approach) mobile device. As previously described, the display may be part of the second housing (e.g., a mobile device such as smartphone, tablet, laptop, and the like) paired with the hearing aid system.

In an example embodiment, the image of the at least one individual that may be shown on display 260 may be retrieved from a database stored in memory, (e.g., the database of server 250) that associates the recognized individuals with corresponding images or features extracted from images, as described above. In some cases, the displayed image of the at least one individual may be extracted (e.g., derived) from the at least one image.

For cases when at least one individual is determined to be a recognized individual, the hearing aid system may be configured to inform user 100 that the individual has been recognized. For example, for cases when the hearing aid system includes a display, the hearing aid system may cause an image of the at least one individual to be shown on display (e.g., display 260 of device 120).

In some cases, the hearing aid system may be configured to display information obtained from the data record associated with the recognized individual such as the individual name, address, relationship to user 100, and the like. Additionally, or alternatively, the hearing aid system may be configured to notify user 100 that the individual has been recognized using audio signals delivered to user 100 using any suitable means (e.g., using one or more earpiece devices, a speaker, and the like). For example, the hearing aid system may inform user 100 via one or more earpiece devices the information obtained from the data record associated with the recognized individual, such as the individual name, address, relationship to user 100, and the like. Additionally, or alternatively, the hearing aid system may inform user 100 that the individual has been recognized using any other suitable approaches (e.g., via a text message, a tactile signal, and the like).

The hearing aid system may selectively condition at least one audio signal that is received from the at least one microphone and determined to be associated with the recognized individual. Selective conditioning of an audio signal may involve filtering a selected audio signal from the audio signal. In some cases, selective conditioning may include attenuating the audio signal. Alternatively, selective conditioning may include amplification of the audio signal. In an example embodiment, the selected audio signal may correspond to audio related to the conversation of user 100 with another person. In some cases, the audio signal may include environmental noises (e.g., various background sounds such as music, sounds/noises from people not participating in conversation with user 100, and the like), and selected audio signal may include speech of the person participating in the conversation with user 100 (referred to as a speaker). In some embodiments, the selective conditioning may include changing a tone associated with the at least one audio signal or changing a rate of speech associated with the at least one audio signal.

Figure 33:
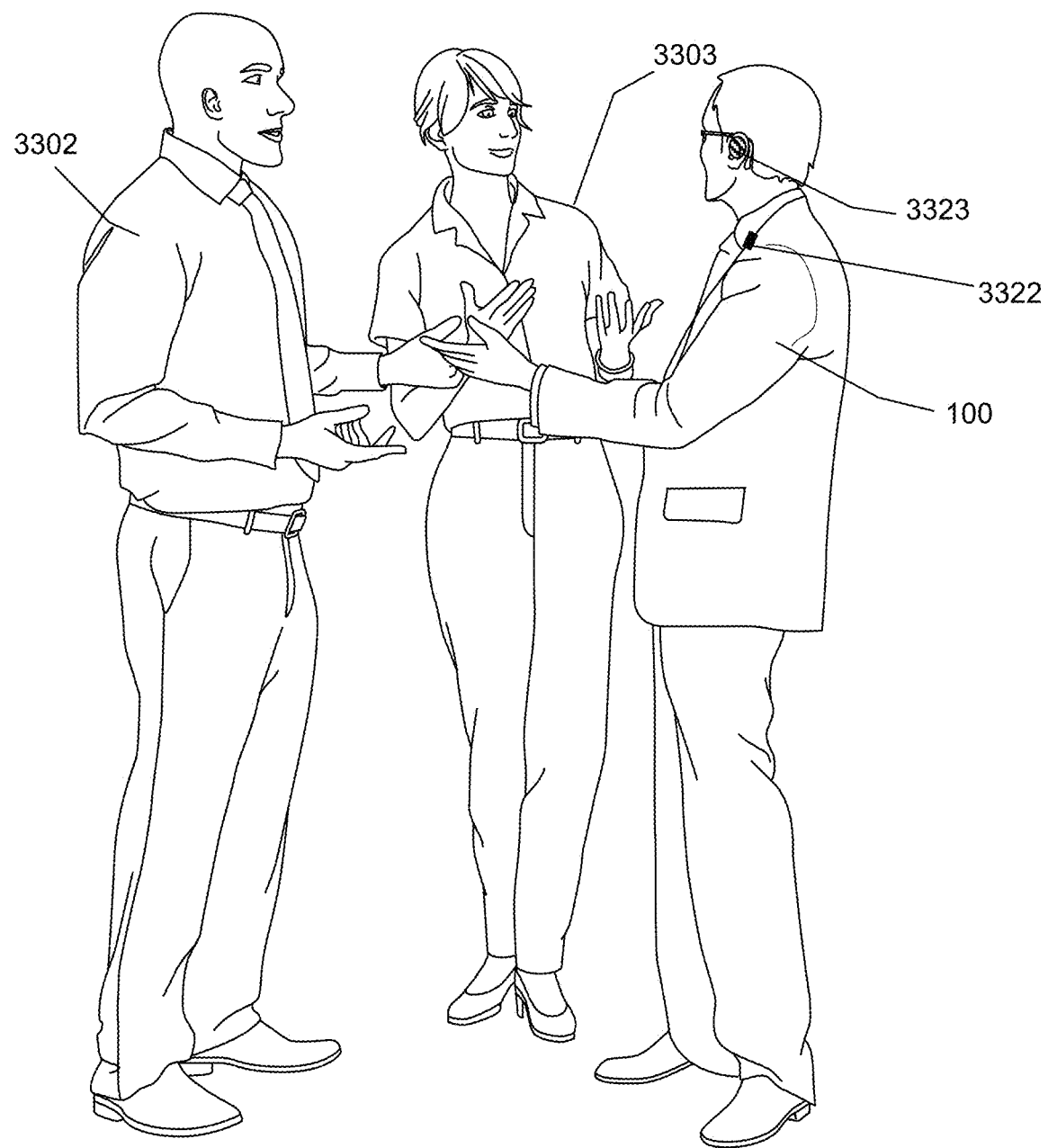
FIG. 33 is an example illustration of a user with a wearable device communicating with other people according to a disclosed embodiment.

Separating the voice of the speaker from the background sounds may be performed using any suitable approach, for example, using a multiplicity of wearable microphones mounted at different positions on user 100. In some cases, at least one microphone may be a directional microphone or a microphone array. For example, one microphone may capture background noise, while another microphone may capture an audio signal comprising the background noise as well as the voice of a particular person. The voice may then be obtained by subtracting the background noise from the combined audio. In some cases, some of the microphones capable of transmitting audio to the hearing aid system may be wearable by the person who is speaking (e.g., a speaker). For example, user 100 may hand the person who is speaking a removable microphone. In some situations, there may be two or more persons engaged in a conversation with user 100, with or without background noise. For example, FIG. 33 shows user 100, wearing an image capturing device 3322 and an audio capturing device 3323, interacting with a speaker 3302 and a speaker 3303. In such situations, knowing the identity of at least one of the speakers, or the number of speakers, may be helpful in separating the voices.

The number of speakers may be obtained using, for example, a speaker estimation algorithm. The algorithm may receive image data (e.g., an image of speaker 3302 and an image of speaker 3303 as captured by apparatus 110), and based on the received images, output whether the conversation includes multiple speakers. Speaker 3302 and speaker 3303 may be identified and recognized by the hearing aid system by finding a pair of people facing each other. Multiple images may be captured by the hearing aid system to ensure that the pair of people continue to face each other over a period of time. In some embodiments, the hearing aid system may identify speakers 3302 and 3303 are engaged in conversation with user 100 based on the orientation of their faces, gestures of the speakers (e.g., nodding by one of the individuals when the second person is speaking), the timing of the gestures and sounds, etc. In some embodiments, at least one of the speakers (e.g., speaker 3302) may be identified by his or her voiceprint. In some embodiments, user 100 may assist the hearing aid in determining the number of speakers by using a positioning of user 100 head and/or head gestures. The speaker estimation algorithm may output whether the conversation includes no speech (e.g., only background noise is present), a single speaker, or multiple speakers.

The head positioning and/or head gestures may be used to determine the number of speakers, and also to determine which audio signal is associated with which speaker. In various embodiments, head positioning for user 100 may include orienting a face of user 100 towards a speaker that is talking (e.g., speaker 3303, as shown in FIG. 33), and maintaining such position for at least a predetermined duration of time (e.g., for a second, for a few seconds, or for a duration of a speech of speaker 3303).

In some embodiments, the hearing aid system may be configured to use the correlation between head positions of user 100 audio signals received from speaker 3302 and 3303 to establish the number of speakers for the conversation. Additionally, or alternatively, head gestures such as nodding, head shaking, specific head movements, facial movements, etc., may also be used to indicate to the hearing aid system the number of speakers in the conversation and which audio signal is associated with which speaker.

In some embodiments, attributes of an audio signal (e.g., signal from speaker 3302 and speaker 3303) may be used alone or in combination with image data as well as head positioning data and head gestures to determine the number of speakers in the conversation, and which audio signal is associated with which speaker. For example, if an audio signal includes a first audio signal having a first distinct tone, cadence, loudness, etc., and a second audio signal includes a second distinct tone, cadence, loudness, etc., the hearing aid system may determine that there are two speakers in the conversation. Furthermore, the hearing aid system may differentiate between the first and the second audio signal when these signals are not overlapping (e.g., when speaker 3302 and 3303 are not talking at exactly the same time, which is a typical situation during a conversation).

In some embodiments, speech content or speech cadence of one of the speakers (e.g., the speaker 3302) may be analyzed by the hearing aid system to differentiate between voices of speaker 3302 and 3303. For example, the hearing aid system may determine, based on the content of the speech or speech cadence, that speaker 3302 may be awaiting a response from speaker 3303. For example, such a situation may arise when speaker 3302 asks the speaker 3303 a question or requests information from speaker 3303. In some embodiments, some of the keywords may be detected by the hearing aid system that may indicate that speaker 3302 is awaiting a response from speaker 3303 (e.g., keywords may include "tell us about," "what do you think about," etc.). In some cases, the content or cadence of the speech of speaker 3302 may indicate that speaker 3302 is planning to continue speaking. For example, speaker 3302 may use phrases such as "I disagree with you because," "the list includes five items, the first item being," etc.

In various embodiments, the hearing aid system may be configured to record or transcribe the conversation between multiple speakers. The transcription process may be assisted by captured images by the hearing aid system. For example, the hearing aid system may identify and recognize speaker 3302 and/or speaker 3303. Speaker 3302 may be facing speaker 3303 (not shown in FIG. 33), and, based on the images captured by image capturing device 3322 of the hearing aid system, the hearing aid system may determine that speaker 3302 is addressing speaker 3303. The hearing aid system may be configured to transcribe the conversation between speaker 3302 and speaker 3303 and to identify the first speech as belonging to speaker 3302 and the second speech as to belonging to speaker 3303.

In various embodiments, a voiceprint of a speaker may be obtained using an audio signal associated with a speech of the speaker and stored in the database of server 250 for further reference. The stored voice data may include one or more voiceprints that may be obtained from one or more speeches of the speaker. In an example embodiment, at least one audio signal may be determined to be associated with the recognized individual based on one or more predetermined voiceprint characteristics associated with the recognized individual detected in the at least one audio signal. The predetermined voiceprint may be stored in association with a person and one or more images or visual characteristics thereof, and optionally updated over time, enhanced, or the like. When the speaker is recognized in one or more images, one or more voiceprints may be retrieved and used for separating the specific voice from a mixture of voices. In an example embodiment, the voiceprint may be stored in the database of server 250 and may be associated with the data record corresponding to the speaker. Additionally, the voiceprint may further be associated with one or more images of the speaker related to the data record.

Alternatively, for example, if a speaker is not identified, the speaker's voiceprint may be extracted from an earlier part of the conversation when only that speaker was engaged in the conversation. The extraction of the voiceprint may be performed on segments of the audio for which the number of speaker algorithm indicates a single speaker. The extracted voiceprint may then be used later in the conversation for separating the speaker's voice from other voices. The separated voice can be used for any purpose, such as transmission over the phone, transmission to a microphone, transmission to a hearing aid, or the like.

In some cases, the hearing aid system may be configured to obtain a first audio sample from the first speaker (e.g., speaker 3302) separated from a second audio sample from the second speaker (e.g., speaker 3303). The hearing aid system may use the first audio sample to determine a first voiceprint for speaker 3302 and the second audio sample to determine a second voiceprint for speaker 3303. As described above, a speaker communicating with user 100 may be identified using images captured by an apparatus such as apparatus 110. An individual may be identified as the speaker if the speaker is located in the center of the user's field of view as captured by a wearable camera of the hearing aid system. In other embodiments, the speaker may be identified as a speaker to which the user's chin, as recognized in one or more images, is directed.

The voiceprint extraction may be facilitated by user 100 head position and/or head gestures. For example, at the beginning of a conversation, user 100 may orient his/her face towards a speaker that is talking to user 100 as shown, for example, in FIG. 33, by looking at speaker 3303. Similarly, when speaker 3302 is talking, user 100 may look at speaker 3302 to indicate to the hearing aid system that an audio signal received by the hearing aid system is primarily due to the speech of speaker 3302. In an example embodiment, at the beginning of the conversation, the hearing aid system may not be configured to separate the specific voice from a mixture of voices prior to obtaining sufficient data (e.g., voiceprint related data) to adequately separate voices. However, once the hearing aid system receives sufficient information to adequately separate voices, the hearing system may selectively condition (e.g., abruptly or gradually) the audio signal related to the conversation of user 100, by separating a voice of a speaker engaged in a conversation with user 100.

In various embodiments, a speaker's voiceprint and a high-quality voiceprint, in particular, may provide for fast and efficient speaker separation. A high-quality voiceprint for a speaker may be collected, for example, when the speaker speaks alone, preferably in a quiet environment. Having a voiceprint of one or more speakers, a processor of the hearing aid system to separate an ongoing voice signal almost in real time, e.g., with a minimal delay, using a sliding time window. The delay may be, for example, 10 milliseconds, 20 milliseconds, 30 milliseconds, 50 milliseconds, 100 milliseconds, or the like. Different time windows may be selected, depending on the quality of the voiceprint, on the quality of the captured audio, the difference in characteristics between the speaker and other speaker(s), the available processing resources, the required separation quality, or the like.

A voiceprint extraction may be performed by extracting spectral features, also referred to as spectral attributes, spectral envelope, or spectrogram from clean audio of a single speaker. The clean audio may include a short sample (e.g., one second long, two seconds long, and the like) of the voice of a single speaker isolated from any other sounds such as background noises or other voices. The clean audio may be input into a computer-based model such as a pre-trained neural network, which outputs a signature of the speaker's voice based on the extracted features. Such signature of the speaker's voice may include the same information as a voiceprint for the speaker. Additionally, or alternatively, the signature of the speaker's voice may include audio information that may be used to obtain the voiceprint for the speaker. In some cases, the signature of the speaker's voice may include audio information that can be used to obtain at least some of the data needed to determine the voiceprint for the speaker.

The output signature may be a vector of numbers. For example, for each audio sample submitted to a computer-based model (e.g., a trained neural network), the computer-based model may output a set of numbers forming a vector. Any suitable computer-based model may be used to process the audio data captured by one or more microphones of the hearing aid system to return an output signature. In an example embodiment, the computer-based model may detect and output various statistical characteristics of the captured audio such as average loudness or average pitch of the audio, spectral frequencies of the audio, variation in the loudness, or the pitch of the audio, rhythm pattern of the audio, and the like. Such parameters may be used to form an output signature comprising a set of numbers forming a vector.

The output signature may be a first vector representing the speaker's voice, such that the distance between the first vector and another vector (i.e., another output signature) extracted from the voice of the same speaker is typically smaller than the distance between the output signature of the speaker's voice and the output signature extracted from a voice of another speaker. In some embodiments, output signature of the speaker's voice may be a voiceprint for the speaker and may include a sound spectrogram that may be a graph that shows a sound's frequency on the vertical axis and time on the horizontal axis. Different speech sounds may create different shapes within the graph. The voiceprint may be represented visually and may include colors or shades of grey to represent the acoustical qualities of a sound of the speaker's voice.

Figure 34A:
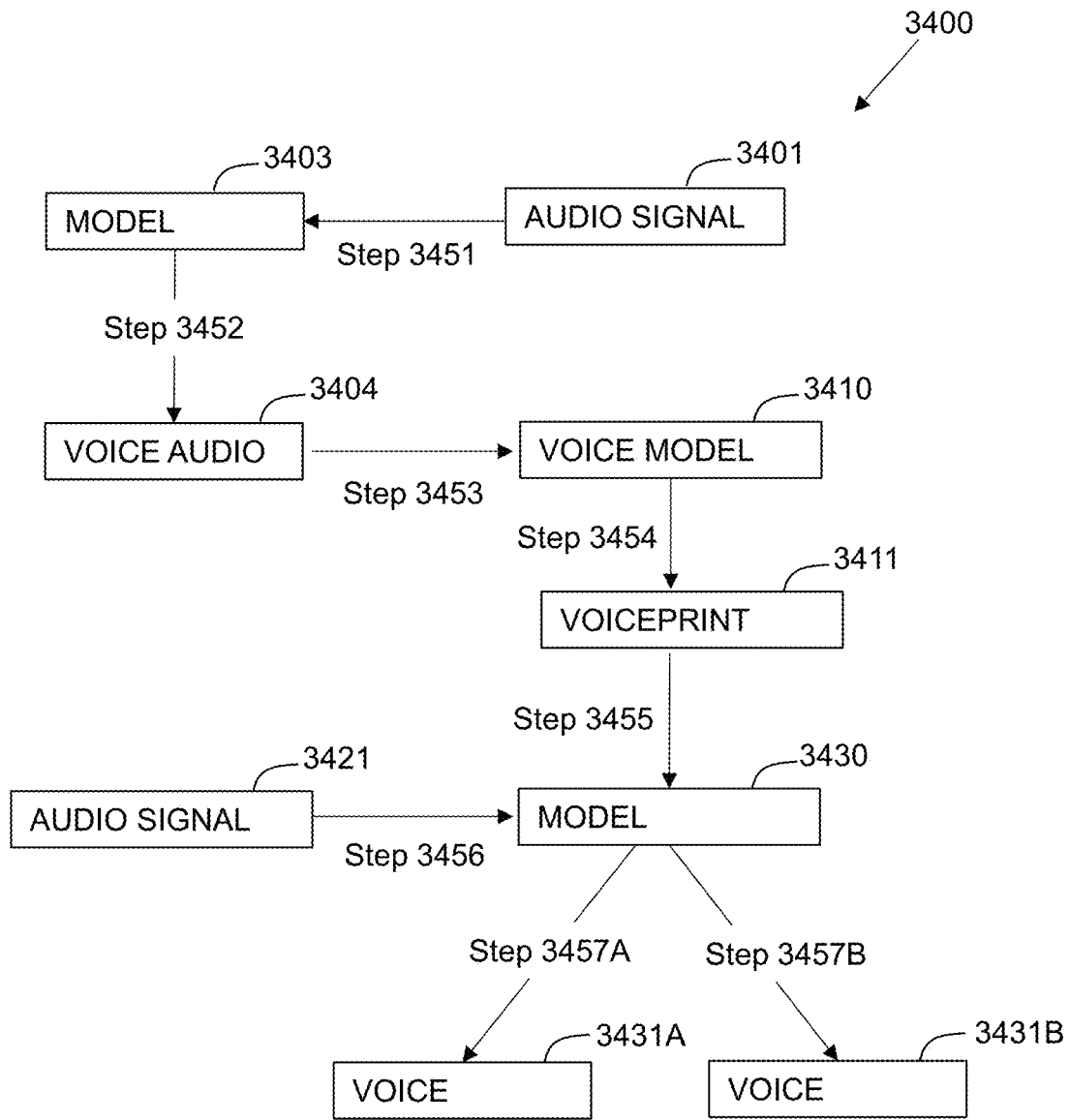
FIGS. 34A and 34B are example flowcharts describing a process of isolating one or more voices of different speakers from an audio signal according to disclosed embodiments.

FIG. 34A shows a flowchart of a process 3400 for separating voices in an audio signal. At step 3451, an audio signal 3401 may be received by a hearing aid system. The hearing aid system may include a computer-based model 3403 for separating an audio signal that corresponds to a voice of a speaker from the background sounds using any suitable approaches described above. In some cases, the hearing aid system may record a "room tone" prior to the beginning of the conversation, where room tone may refer to the natural noise of the environment of user 100. The audio signature corresponding to room tone may be used to filter out the background noise from an audio signal containing conversational sounds.

Model 3403 may output a voice audio signal 3404 at step 3452. At step 3453, signal 3404 may be received by a voice model 3410, and at step 3454 the voice model may output voiceprint 3411 for the speaker's voice. Model 3410 may use any suitable approach describing above for obtaining voiceprint 3411 from the speaker's voice, such as extracting a spectrogram from the speaker's voice, extracting statistical audio characteristics, and the like. At step 3455 of process 3400, a computer-based model 3430 may receive voiceprint 3411 and an audio signal 3421 that may include background sounds, and/or one or more voices of one or more individuals.

In various embodiments, computer-based model 3430 may be a neural network. At step 3456, model 3430 may receive the noisy audio signal 3421 and the speaker's signature or voiceprint 3411, and, at step 3457A or/and 3457B, output audio signal related to a voice 3431A and/or a voice 3431B. It should be noted, that filtered (i.e., separated) voice 3431A and/or 3431B may be used to prepare an additional voiceprint (or/and output signature) for the speaker that can be used by computer-based model 3430. In some embodiments, more than one voiceprint (e.g., voiceprint 3411) may be used as an input for model 3430 at step 3455. In some embodiments, multiple voiceprints may correspond to the same individual, and in other embodiments, some of the voiceprints may correspond to a first person (e.g., speaker 3303, as shown in FIG. 33) and other voiceprints may correspond to a second person (e.g., speaker 3302, as shown in FIG. 33).

Figure 34B:
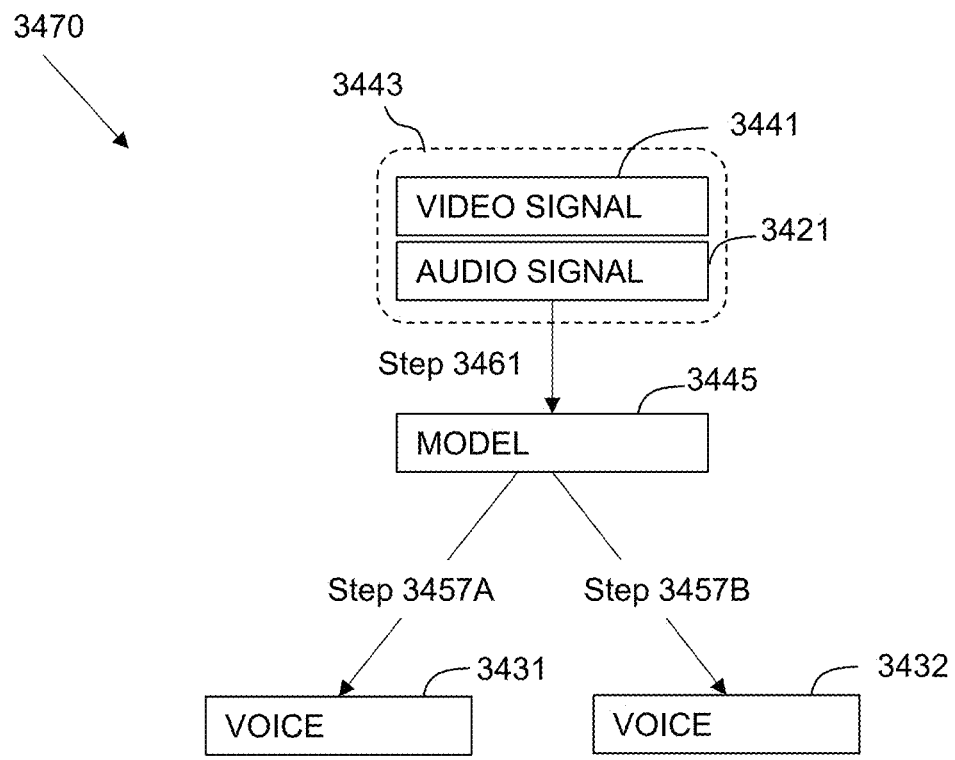

FIG. 34B shows an illustrative process 3470 for separating voice signal from an audio signal using a video signal. At step 3461, model 3445 may receive data 3443 related to a conversation of user 100 with speakers 3302 and 3303. Data 3443 may include a video signal 3441 and an audio signal 3421. Video signal 3441 may indicate whether a speaker (e.g., speaker 3303) is talking or silent. For example, video signal 3441 may show the lips movement of speaker 3303. Audio signal 3421 may include a background sound as well as voices of speaker 3302 and 3303 that may or may not overlap. For example, the voice of speaker 3302 may overlap briefly with the voice of speaker 3303. Model 3445 may identify, and separate voices for speaker 3302 and 3303 by synchronizing the lips movement of speaker 3303 (or speaker 3302) with words/sounds identified in audio signal 3421. In some embodiments, the hearing aid system may be configured to collect video and audio data for both of the speakers. For example, the hearing aid system may be configured to detect lip movements of speaker 3302 and speaker 3303 during the conversation. At step 3457A or/and 3457B, model 3445 may output audio signal related to a voice 3431 and/or a voice 3432.

In various embodiments, the selectively conditioned audio signal (e.g., voice 3431A or voice 3431B) processed by the hearing aid system as described in process 3400 or process 3470 may be transmitted to an interface device (e.g., an earpiece, headphones, a speaker, a display, a vibrational or tactile device, etc.) for delivering the audio signal to user 100. In various embodiments, the interface device may be part of the hearing aid system. In an example embodiment, the interface device may transmit to user 100 an audio signal (e.g., a signal transmitted to user 100 via an earpiece), a visual signal (e.g., a text written on a screen or a video of a person communicating with user 100 via a silent language), a vibration signal, a tactile signal (e.g., tactile letters used by visually impaired people for reading), an electric signal, and the like. In an example embodiment, the interface device may include a hearing interface device configured to provide sound to an ear of the user. In an example embodiment, the hearing interface device may include a speaker associated with an earpiece or a bone conduction microphone.

In some embodiments, the hearing interface device of the hearing aid system may transmit to user 100 an audio signal corresponding to a speech of a speaker as it is extracted from an audio signal captured by one or more microphones of the hearing aid system. Additionally, or alternatively, the hearing aid system may be configured to modify one or more parameters of the audio signal corresponding to the speech of the speaker. For example, the hearing aid system may modify the pitch, loudness, cadence, etc., of the audio signal prior to providing the signal to user 100 via the hearing interface device. In some embodiments, the hearing aid system may be configured to transcribe the speech of the speaker, modify the transcribed speech, and read the transcribed speech using a text-to-speech natural voice artificial intelligence reader. In some embodiments, when multiple voices are detected (e.g., when voices 3431A and 3431B overlap), the hearing aid system may be configured to time shift one voice relative to another to reduce the overlap. Alternatively, the hearing aid system may be configured to modify one or more characteristics of one of the voices (e.g., voice 3431A) to further differentiate it from voice 3431B. For example, the tone, cadence, etc. of voice 3431A may be modified to differentiate voice 3431A from voice 3431B.

In some embodiments, when multiple microphones are present (e.g., two microphones are present), a delay of the audio signal measured between the two microphones may be used to determine the directional characteristics of the audio signal related to the speaker's voice. In an example embodiment, user 100 may have a left microphone positioned next to a left ear and a right microphone positioned next to a right ear. A left speaker, engaged in conversation with user 100, may be positioned slightly to the left of user 100, and audio signals from the left speaker may arrive first in the left microphone, and second, to the right microphone, resulting in a phase shift between audio signals received by the two microphones. The phase shift may be used to distinguish from other signals that may not have a well-defined phase shift, or which may have a different phase shift. For example, if another speaker is present (e.g., a right speaker positioned slightly to the right of user 100), audio signals from the right speaker may have a different phase shift compared to the phase shift for the left speaker. For example, the audio signals from the right speaker may arrive first to the right microphone of user 100, and after that, to the left microphone of user 100, resulting in a phase shift that has an opposite sign from the phase shift for the left speaker. In various embodiments, user 100 may be able to move his/her head to further differentiate between left and right speaker using the left and the right microphone.

In some cases, an audio signal from different speakers cannot be separated by the hearing aid system due to, for example, an unavailable voiceprint for the one or more speakers, a low-quality voiceprint for the one or more speaker, two or more voices of the different speakers being similar to each other, or the like. In such cases, when it is determined that there are two or more voices present in a conversation, the output signal may be silenced. This feature may help user 100 adapt in a noisy environment. For example, such a feature may prevent user 100 from hearing loud and unpleasant noise while not being able to understand what is being said. Thus, silencing the output signal, as described above, may not reduce user 100 understanding of the conversation, but may reduce the environmental noise and thus improve user 100 with a comfort level during the conversation. In various embodiments, the silencing of the output signal can be partial (also referred to as suppression of the output signal).

Figure 35A:
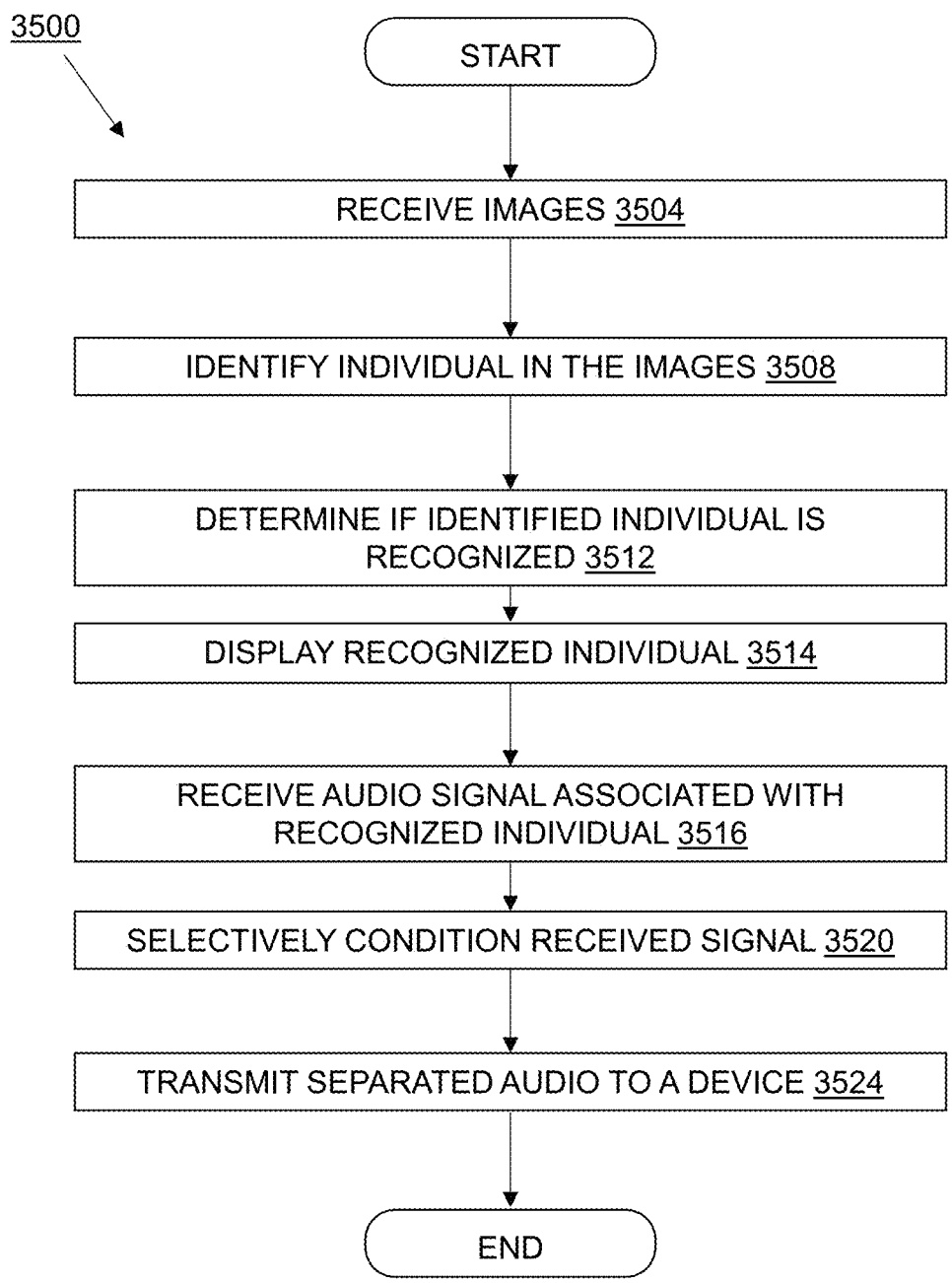
FIG. 35A is an example flowchart describing a process of separating a voice of a speaker from an audio signal according to disclosed embodiments.

FIG. 35A shows an illustrative process 3500 for transmitting a voice separated from an audio signal to a device, such as earpiece of the hearing aid system. At step 3504, one or more images captured by the apparatus described above may be received by a processor of a hearing aid system or by a processor of server 250. In some embodiments, the images may be captured substantially in line with the user's line of sight, such that a speaker communicating with user 100 is at or near the center of the image. At step 3508, the speaker may be identified in the captured images using any suitable approaches as described above. At step 3512, the speaker may be recognized. The speaker identification may relate to locating a person within an image, while recognition of the speaker may relate to recognizing the identified person as being a specific known person. The person may be recognized if previously captured by the device, and his or her name or another detail were provided by a user or in any other manner. The recognition of the speaker may be done using any suitable approaches described above. At step 3514, an image of the recognized individual may be shown on a display associated with the hearing aid system. For example, an image of the recognized individual may be retrieved from the database and displayed on a mobile device paired with the hearing aid system.

At step 3516, an audio signal may be received by a microphone of the hearing aid system (e.g., an audio signal of user 100 communicating with another individual). The audio signal may be further analyzed by a processor of the hearing aid system. In an example embodiment, the processor may be configured to determine if the captured audio signal corresponds to a recognized individual. For example, the processor may be configured to retrieve the recognized individual voiceprint, from a storage device, based to the person's identity. For example, the voiceprint may be retrieved from the database of server 250. Additionally, or alternatively, the voiceprint may be obtained by analyzing a speech of the speaker during a conversation that does not contain audio signals from other speakers, and/or does not contain a high volume of environmental noises. For example, a conversation may be first conducted in a quiet environment (e.g., a car prior to arriving at an event) followed by a conversation at a restaurant (e.g., a noisy environment).

At step 3520, the received audio signal may be selectively conditioned by the processor. Additionally, or alternatively, the received audio signal may be transmitted to server 250 and selectively conditioned by one of the processors of server 250. In an example embodiment, selectively conditioning may include separating voices of one or more speakers from the audio signal. Separation may be performed using any of the approaches described above. In some embodiments, if the speaker is recognized at step 3512, and the voiceprint of the speaker is obtained at step 3602, the received audio may be separated by extracting only the voice of the particular speaker rather than all voices participating in the conversation or background voices (e.g., voices that do not directly engage user 100). Selective conditioning may use any of the suitable approaches discussed above.

At step 3524, the speaker's voice may be provided to the hearing aid system of user 100 to help user 100 focusing on the conversation with the speaker while reducing disturbances from the environmental noises and/or from other background voices. As previously described, the audio signal related to the voice of the speaker may be altered by the hearing aid system (e.g., the voice may be amplified, and/or otherwise modified, for example, by changing the tone of the voice, using noise cancellation or other approaches).

In various embodiments, the audio processing may be combined with an image processing technique, for example by identifying, and in some case recognizing a speaking person, synchronizing received audio with a motion of lips of a speaker in communication with user 100 and/or lip reading based on the motion of the speaker's lips (e.g., the sound "ba" may be uttered by a person who opened his/her mouth). In another example, if no person in an environment of user 100 is speaking, then background noise may be detected and canceled.

In some embodiments, the audio signal received by user 100 may arrive to user 100 via different channels. For example, user 100 may participate in a phone audio/video conversation with a speaker, and background noises may be due to an environment of user 100. In such cases, the background noises may be suppressed.

In various embodiments, the hearing aid system may be operated by a battery. In order to prolong the functioning of the hearing aid system, various approaches may be used to reduce the power consumption of the hearing aid system. For example, the hearing aid system may optimize a rate of capturing video frames, reduce the resolution of captured images, optimize compression of the captured images and/or optimize compression/quality of a captured audio signal. Other steps for reducing power consumption by the hearing aid system may include optimizing the process of data transfer from the hearing aid system to server 250. For example, the hearing aid system may be configured to transfer data to server 250 periodically, with time intervals between data transfers increasing when a reduction in power consumption by the hearing aid system occurs.

As described, in various embodiments, the voice audio signal corresponding to a speech of a speaker may be manipulated prior to transmitting it to user 100. For example, if a rate of the speech exceeds a predetermined value, the speech may be slowed and transmitted to the hearing aid system at a lower rate. The lower rate may be compensated during breathing or other pauses, so as not to accumulate delay. In further embodiments, slang or inappropriate words may be replaced. Such features may be useful, for example, in helping older people communicate with younger ones, for example, their grandchildren. In some embodiments, slower speech may be accelerated, which may help prevent boredom or allow a user to more rapidly listen to audio.

In some embodiments, the database may be configured to establish a timeline for various encounters with various speakers and track the encounters with different individuals chronologically. In some cases, based on input received from user 100, the one or more processors of the hearing aid system may be configured to forego transmitting to the database information related to encounters with one or more individuals identified in the plurality of images, thus, preventing the storage of such information. For example, the information related to the encounter may be ignored (i.e., not stored in the database of server 250) if user 100 believes the encounter is not important, or if she/he prefers the information not to be available for access/inspection later by a third party and/or by user 100. In some cases, to prevent access to the information stored in the database, the information may be password protected.

In some instances, the one or more processors of the hearing aid system may be configured to forego transmitting to the database information related to encounters with one or more individuals determined to be associated with a predetermined group of individuals. For example, a group of individuals may be identified by identifying members of the group or by identifying attributes of individuals in the group (e.g., all the individuals that wear a uniform). The attributes of the individuals may be identified by user 100 and entered using a user interface for the hearing aid system. In some cases, the attributes of the individuals may be inferred from the images captured by the hearing aid system. In example embodiments, the one or more predetermined groups of individuals may include office workers, service personnel, or various individuals with whom user 100 does not participate in vocal interactions. In some embodiments, the predetermined group may include individuals who do not participate in a conversation with user 100, and in some embodiments, the predetermined group may include individuals who do not participate in a conversation with individuals that participate in a conversation with user 100. The information related to the encounter with one or more individuals determined to be associated with a predetermined group of individuals may be ignored (i.e., not stored in the database of server 250) if user 100 believes the encounter is not important, or if she/he prefers the information not to be available for access/inspection later by a third party and/or by user 100. In some cases, to prevent access to the information stored in the database, the information may be password protected.

Figure 35B:
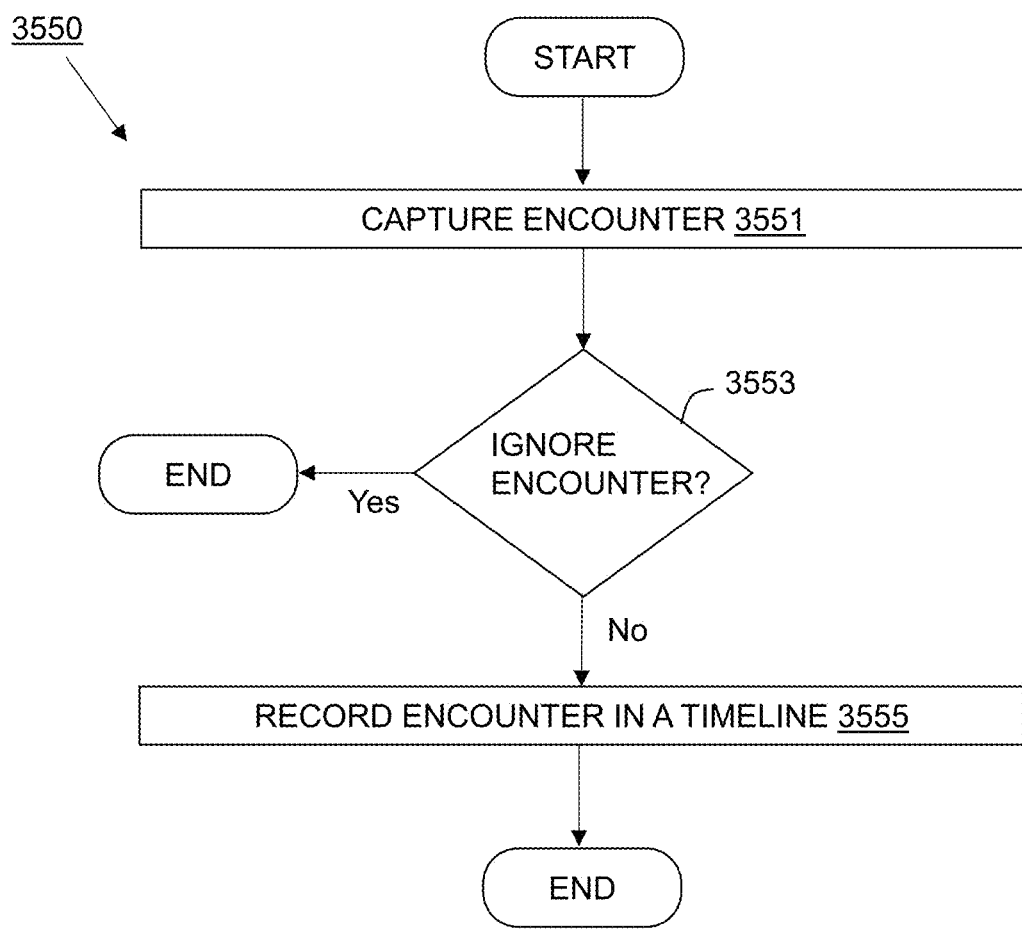
FIG. 35B is an example flowchart describing a process of transmitting to a hearing device a conditioned audio signal according to disclosed embodiments.

FIG. 35B is an illustrative process 3550 for recording an encounter in a timeline. At step 3551 of process 3550, the hearing aid system may be configured to capture the encounter with an individual for user 100 using any suitable approaches described above. For example, the hearing aid system may be configured to capture the encounter by directing a camera and a microphone of the hearing aid system to capture the image/video data and audio data related to the encounter. At step 3553, the hearing aid system may obtain input from user 100 whether the encounter should be ignored. For example, the hearing aid system may obtain an audio signal from user 100 to ignore the encounter. Additionally, or alternatively, the hearing aid system may obtain user 100 input regarding ignoring the encounter via a touch screen (e.g., a touch screen of a mobile device paired with the hearing aid system). If the encounter is determined not to be ignored (step 3553, No), the encounter may be recorded in a timeline at step 3555. Recordation of the encounter may allow user 100 to retrieve information associated with the encounter by specifying some identifying characteristics of the encounter, such as date and time of the encounter, the nature of the encounter, the speaker identified and recognized in the encounter, the topic of conversation, etc. If the encounter is determined to be ignored (step 3553, Yes), the encounter may not be recorded, and process 3550 may be terminated. In some embodiments, if the encounter is determined to be ignored (step 3553, Yes), the encounter may be recorded for a predefined period of time before it is deleted from the timeline. Such temporal recordation of the encounter may allow user 100 to change his/her mind regarding ignoring the encounter.

Selectively Conditioning Audio Signals Including Overlapping Voices

In some embodiments, a hearing aid system may include at least one processor programmed to receive audio signals from the at least one microphone. The processor may be configured to detect, based on analysis of the audio signals, a first audio signal associated with a first time period, wherein the first audio signal is representative of a voice of a single individual. In addition, the processor may be configured to detect, based on analysis of the audio signals, a second audio signal associated with a second time period, wherein the second time period is different from the first time period, and wherein the second audio signal is representative of overlapping voices of two or more individuals.

The audio signal corresponding to the overlapping voices may include at least two overlapping voices, and in some cases, may include more than two voices. In some cases, some of the overlapping voices may be in close proximity to user 100, and have a high amplitude, while other overlapping voices may be further away from user 100 and have a lower amplitude. In some cases a voice with a high amplitude may overlap a voice with a lower amplitude. In various embodiments, a first and a second voice overlap when a sound associated with the first voice is emitted during a first time interval, a sound associated with the second voice is emitted during a second time, and the first and the second time intervals overlap. In some cases, the first and the second time windows may overlap partially. For example, a portion of the first time window may overlap with a portion of the second time window. It should be noted that, the duration of the first time window may be shorter or longer than a duration of the second time window.

When the audio signal contains more than two voices, more than two voices may overlap. For example, when audio signal includes a first, a second, and a third voice, the first and the second voice may overlap, the second and the third voice may overlap, the third and the first voice may overlap, and, in some cases, all three voices may overlap.

In an example embodiment, the processor may selectively condition the first audio signal and the second audio signal, wherein the selective conditioning of the first audio signal may be different in at least one respect relative the selective conditioning of the second audio signal. For example, selectively conditioning the first audio signal may include removing the background sound and separating the voice of the individual detected in the first audio signal. Additionally, or alternatively, selective conditioning the first audio signal may include amplification of the signal, changing a tone of the signal, or changing a rate of speech associated with the signal. In an example embodiment, selectively conditioning the second audio signal may include amplification of the second audio signal. In some cases, when both the first and the second audio signals are amplified, the amplification level associated with the second audio signal may be less than the amplification level associated with the first audio signal. In some embodiments, the selective conditioning of the second audio signal includes attenuation of the signal.

For example, the signal may be completely or partially attenuated. In some cases, some of the frequencies of the second audio signal may be attenuated. Additionally, or alternatively, some of the portions of the second audio signal may be attenuated while other portions may be unchanged or amplified. In some cases, the amplitude of the second audio signal may be attenuated in a time-dependent way, and in some cases, an amplitude of a set of frequencies of the second audio signal may be attenuated in a time-dependent way. In some cases, the selective conditioning of the second audio signal includes foregoing transmission of the second audio signal to the hearing interface device configured to provide sound to an ear of the user. For example, the second audio signal may not be transmitted to the hearing interface device when voices in the second signal are not clearly discernible and may cause confusion to user 100.

In various embodiments, at least one processor of the hearing aid system may be programmed to analyze the plurality of images captured by a wearable camera (e.g., image capturing device 3322) and identify in at least one of the plurality of images representation of a single individual associated with the first audio signal. For example, the processor may be programmed to capture a video data related to facial expressions of the individual and analyze video frames by evaluating the correlation between facial expressions and sounds detected in the first audio signal. In some cases, the analysis may identify correlations between particular facial expressions and particular sounds or sound fluctuations. For example, a facial expression related to a particular lip movement may be associated with a sound or word that may have been said during a conversation captured in the first audio signal. In some embodiments, the analysis of the plurality of images is performed by a computer-based model such as a trained neural network. For example, the trained neural network may be trained to receive an image and/or video data related to facial expressions of an individual and predict a sound associated with the received image and/or video data. For example, the trained neural network may be trained to receive an image and/or video data related to facial expressions of an individual and a sound, and output whether the facial expressions correspond to the sound. In some embodiments, other factors, such as gestures of the individual, the position of the individual, the orientation of the individual's face, etc., may be identified in the one or more images captured by a wearable camera. These factors may be used alone or in combination with facial expressions of the individual to determine if the individual is associated with the first audio signal.

In some embodiments, at least one audio signal (e.g., the first audio signal) is determined to be associated with the recognized individual based on lip movements of the user, as detected based on analysis of the plurality of images. For example, the first audio signal may be determined to be associated with the recognized individual based on a determination of whether the detected lip movements are consistent with a voice signal associated with the at least one audio signal.

In various embodiments, at least one processor of the hearing aid system is configured to transmit the conditioned first audio signal to a hearing interface device configured to provide sound to an ear of user 100 using any suitable approaches discussed above. In some embodiments, the processor may also be configured to transmit conditioned second audio signal to the hearing interface device configured to provide sound to an ear of user 100 using any suitable approaches discussed above.

Figure 36A:
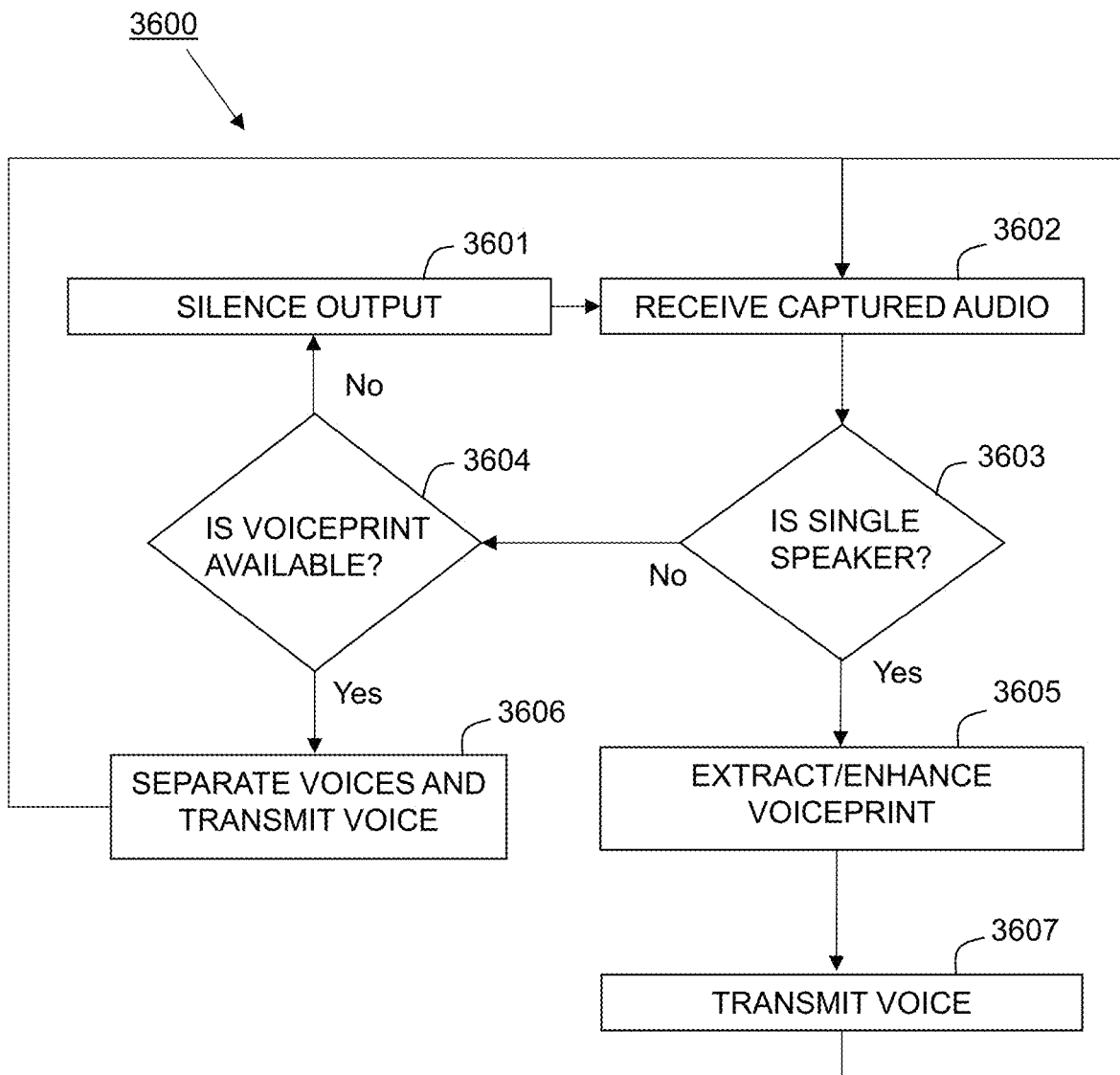
FIG. 36A is an example flowchart describing a process of separating a voice of a speaker from an audio signal according to disclosed embodiments.

FIG. 36A shows an illustrative process 3600 describing exemplary steps for transmitting a voice audio data to user 100 from a speaker in communication with user 100. At step 3602 the hearing aid system may receive captured audio. Step 3602 of process 3600 may be similar to step 3516 of process 3500. At step 3603, the hearing aid system may determine if the received audio includes a speech by a single speaker. Such determination may be done using any suitable approaches described above (e.g., using multiple microphones that may determine a phase shift corresponding to an audio signal for the speech of the speaker, using a computer-based model that can take as an input a voiceprint of the speaker, an audio analysis algorithm that can evaluate a number of speakers, and the like). If the hearing aid system determines that the received audio includes a speech from a single speaker (step 3603, Yes), at step 3605 a voiceprint of the speaker may be extracted from the audio, and optionally used for enhancing a previously available voiceprint. In some embodiments, the voiceprint may be associated with the speaker that is recognized by the hearing aid system, and in some embodiments, the voiceprint may be extracted for the speaker when the speaker is not recognized. In some embodiments, if a voiceprint exists for the speaker, then a new voiceprint may not be extracted from the received audio data. At step 3607, the speaker's voice may be transmitted to the hearing interface device of the hearing aid system and delivered to user 100 as an audio signal as described above. In some embodiments, the voice may be transmitted to user 100 via a visual interface, tactile interface, and the like.

If at step 3603 the hearing aid system determines that the received audio signal includes voices of multiple speakers (step 3603, No), process 3600 may be configured to follow step 3604 and determine if a voiceprint for at least one speaker is available. In various embodiments, if one or more speaker is recognized by the hearing aid system, the hearing aid system may access data associated with the one or more speaker and determine if the related voiceprint is available. For example, the hearing aid system may access the speaker data record from the database of server 250 to determine if the voiceprint is available. Step 3604 may use a trained model to determine whether or not an audio signal comprises speech associated with a particular voiceprint, or provide a probability that the audio signal comprises speech associated with the particular voiceprint.

In some embodiments, once a speaker in communication with user 100 is recognized and her/his voice audio data is separated from an audio signal for the conversation and transmitted to user 100, the voice audio data may be transmitted as long as the speaker is continuously speaking, even if/when other voices, whether recognized or not are captured. Such an approach may be used to allow user 100 to continuously listen to the speaker. Short breaks in speaking, for example, breathing breaks or pauses while searching for a word may still be considered as a continuous speech. In some embodiments, pauses up to a predetermined length may be considered as part of continuous speech, while longer periods may be considered as the end of a speech by the speaker, such that other speakers can be detected or amplified.

If a voiceprint is available, (step 3604, Yes) the speaker's voice may be separated from the audio data and transmitted to user 100 at step 3606. If no voiceprint is available, and/or if the separation of the speaker's voice from the audio data is not successful, (step 3604, No) the hearing aid system may silence the output at step 3601. The output may be silenced using any of the approaches described above. In some embodiments, completely silencing the rest of the voices may create an uneasy and out of context feel, for example, when speaking to a person in a restaurant and seeing the waiter approaching and talking but not hearing anything. Therefore, providing a low but positive amplification for the other sound, for example, 10%, 20%, or any other suitable degree of the volume may feel more natural for user 100. Similarly, if no voice is recognized by the hearing aid system, instead of silencing everything, the loudness of the environmental noises can be reduced to a predetermined level. In such circumstances, the audio related to the environmental sounds may be transmitted at a low volume (e.g., 10% of the original volume) for a more natural feeling, enabling user 100, for example, to hear some background noise at a restaurant. The loudness level selected by the hearing aid system may be set by a user or predetermined, depending on an environmental situation, location of user 100, time of the day, and the like.

The hearing aid system may be configured to process environmental sounds and determine if some of the sounds may or may not be silenced or suppressed. For example, sounds that may be important and related to user 100 may not be filtered, suppressed, or silenced. For example, emergency sounds, such as a fire alarm, a siren, sounds of screams, sounds of crying kids, etc. may not be silenced, modified, or suppressed.

In some embodiments, some sounds (whether predetermined, recognized or not) may be amplified and transmitted at a delay. For example, in an airport when there is an announcement about a flight, the device may realize that this is an important announcement only after the flight number is mentioned. Then it can play the whole announcement even though the sound of the announcement may not relate to the voice of a speaker engaged in conversation with user 100.

In various embodiments, the voice separation and amplification process may be time-dependent and may depend on a content of audio captured by the microphones of the hearing aid system as well as environmental factors may be determined, for example, by analyzing the images captured by the hearing aid system. In some embodiments, the hearing aid system may collect audio data during a predetermined sliding time window and then separate voice audio data within such a window. For a short time window (e.g., a millisecond, few milliseconds, a second, few seconds, etc.) user 100 may experience only a short delay, between captured audio and transmitted voice data to user 100. In an example embodiment, the time window may be less than a second, for example, 10 milliseconds, 20 milliseconds, 50 milliseconds, 100 milliseconds, or the like.

In some embodiments, the hearing aid system may enable user 100 to select an audio voice signal from certain individuals to take precedence over other audio voice signals. In various embodiments, the voiceprints for these individuals may be extracted and stored. If one of the indicated speakers is recognized within an image captured by the hearing aid system, or if their voices are recognized within a captured audio, these selected voices may be amplified over voices of other speakers or other sounds, such as sounds from a television or speaker. For example, the voice of a parent, a spouse, a child, a grandchild, a great-grandchild, or other family members may be identified and amplified for user 100, enabling user 100 to identify these voices over other voices or other environmental sounds.

In some embodiments, the hearing aid system may interact with various other devices when audio signals related to voices/sounds of recognized individuals (including a voice of user 100) are captured by the hearing aid system. For example, the hearing aid system may interact with smart-home devices that may affect the environment of user 100. For example, the hearing aid system may interact with smart-home devices to turn the light on/off, to make special sounds, to turn the television on/off, and the like.

Audio sounds not related to voices may be separated from other audio signals. For example, such audio sounds may include sounds of a dog barking or howling, the sound of a baby crying or making sounds, sounds of broken glass, sounds of dropped objects, sounds of creaking/opening/closing doors, doorbell sounds, and the like. These sounds may be amplified relative to other environmental sounds that may be less important (e.g., the sound of a radio station).

The amplified voices may be provided to user 100 via a hearing aid, while other sounds may be silenced or suppressed. User 100 may configure the hearing aid system to silence or suppress voices of selected individuals (the selected individuals may be selected, for example, by user 100 via an interface device for the hearing aid system). For example, the selected individuals may be recognized in one or more images captured by the hearing aid system, or these individuals may be recognized within captured audio due to their voiceprint. As described above, in addition to, or instead of amplifying an audio signal related to the selected voices, the audio signal of the voices may be enhanced, for example, the tone may be changed, or other modifications may be made.

In some embodiments, the hearing aid system may create a "hierarchy" of voices for various speakers, wherein the hierarchy may or may not be time or situation-dependent. For example, during a lecture, user 100 may want the lecturer's voice to be amplified, even when the user is looking at another person. In an example embodiment, when user 100 is in a meeting, user 100 may want to receive a speech from a selected person or a group of people (e.g., from a supervisor of user 100). In some embodiments, user 100 may separate various voices within the captured audio data but amplify only one selected voice. In various embodiments, other voices may be recorded or/and transcribed. In some cases, user 100 may discard the voices of some individuals that are deemed unimportant.

Figure 36B:
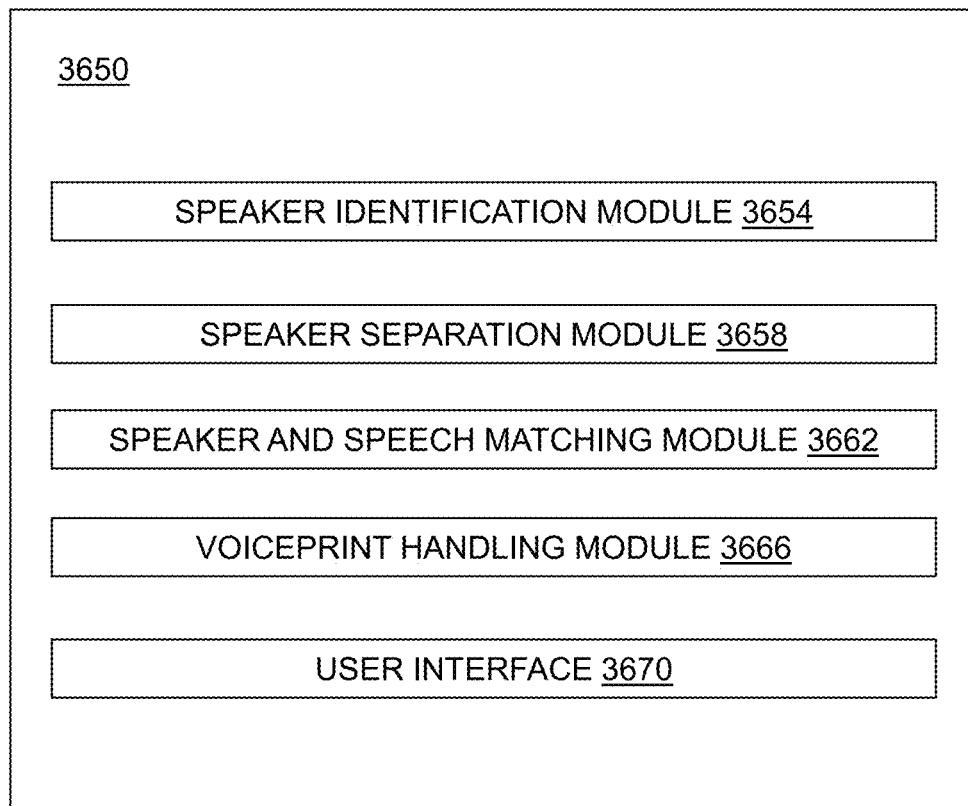
FIG. 36B is a block diagram of modules of a wearable apparatus consistent with the disclosed embodiments.

In various embodiments, the hearing aid system may be apparatus 110 that may include a processor and a memory as described above. The hearing aid system may include software applications that may contain software modules stored in a memory 3650 of the hearing aid system as schematically shown in FIG. 36B. The software modules may include a speaker identification module 3654, a speaker separation module 3658, a speaker and speech matching module 3662, a voiceprint handling module 3666, and a user interface 3670.

Modules 3654, 3658, 3662, 3666, and 3670 may contain software instructions for execution by at least one processing device, e.g., processor 210, included with a wearable apparatus. In some embodiments, any one or more of the modules may facilitate processing one or more images from an image sensor, e.g., image sensor 220 and audio sensor to generate a set of instructions to assist user 100 in improving user 100 hearing voice of one or more speakers.

Speaker identification module 3654 can be used in identifying one or more speakers in an image captured by the apparatus, such that a speaker communicating with user 100 may be identified. Speaker identification module 3654 can identify the speaker by his/her location in the captured images that may display a field of view of user 100. For example, if the speaker is in the center of the image, the speaker may be in the center of the field of view. In some embodiment, the direction of user 100 head may be used to identify a speaker. For example, the hearing aid system may be configured to capture an image in a direction normal to a face of user 100 (e.g., normal to a chin of user 100) to discern a speaker in the captured image. In some embodiments, module 3654 may identify the data record for the speaker, as previously discussed. In an example embodiment, module 3654 may associate at least one audio signal with the identified and recognized individual based on a detected look direction for the user, determined based on a direction associated with a chin of the user detected in the at least one of the plurality of images.

Voiceprint handling module 3666 may be used to generate, store, or retrieve a voiceprint, using, for example, wavelet transform or any other attributes of the voice of one or more persons. Voiceprint handling module 3666 may use any suitable algorithm to determine whether an audio signal comprises speech, as well as to determine whether there is one speaker or multiple speakers participating in a conversation. A voiceprint may then be extracted from single speech audio using a neural network as described above. Information obtained using voiceprint handling module 3666 may be transmitted to speaker identification module 3654, and module 3654 may associate the identified speaker with the voiceprint.

In various embodiments, speaker separation module 3658 may receive noisy audio captured by the device and voiceprints of one or more speakers, and separate one or more voices for one or more speakers using any of the methods described above. In some embodiments, for example when no voiceprint is available for the speaker, matching the voice with a specific speaker may be performed in accordance with the captured images, for example by matching identified words with the lip movement of the speaker, by matching speaking and silent periods, or the like.

In some embodiments, when the identity of the speaker is determined from the captured images, speaker and speech matching module 3662 may be used to match the identity of the speaker with the audio signal corresponding to the voice of the speaker detected using speaker separation module 3658. In some embodiments, when speaker identity is not established, an image of the speaker may be used by module 3662 to correspond with the audio signal of the voice of the speaker.

In various embodiments, the hearing aid system may include user interface 3670 to allow user 100 to change performance characteristics of the hearing aid system. In some embodiments, the user interface 3670 may include an interface for receiving a visual, audio, tactile, or any other suitable signal from user 100. For example, the interface may include a display that may be part of a mobile device (e.g., a smartphone, laptop, tablet, etc.) In an example embodiment, the interface may include a touch screen, a graphical user interface (GUI) having GUI elements that may be manipulated by user gestures, or by appropriate physical or virtual (i.e., on screen) devices (e.g., keyboard, mouse, etc.). In some embodiments, interface 3670 may be an audio interface capable of receiving user 100 audio inputs (e.g., user 100 voice inputs) for adjusting one or more parameters of the hearing aid system. For example, user 100 may adjust the loudness of the audio signal produced by the hearing aid system using audio voice inputs, the pitch of the audio signal produced by the hearing aid system, tempo of the audio signal, and the like. In some embodiment, user interface 3670 may be configured to assist user 100 in identifying the data record for a speaker in conversation with user 100 and for facilitating separation of the voice of the speaker from the audio data captured by microphones of the hearing aid system. For example, interface 3670 may prompt user 100 to select a name for the speaker from a list of available names, to display an image of the speaker, to select an audio stream corresponding to the voice of the speaker, and the like.

Figure 37A:
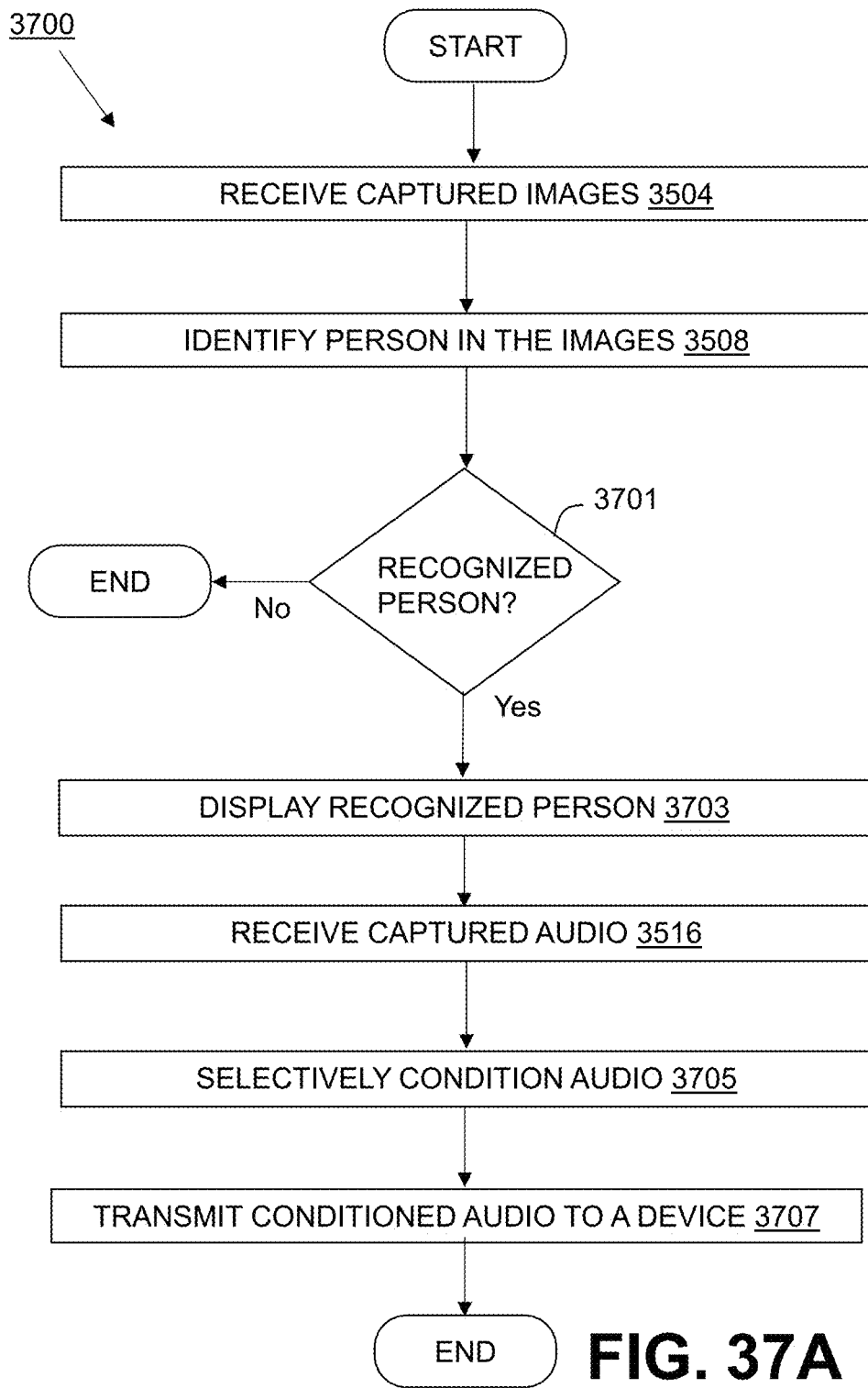
FIGS. 37A-37C are example flowcharts describing a process of transmitting to a hearing device a conditioned audio signal according to disclosed embodiments.

FIG. 37A shows an illustrative process 3700 of transmitting a conditioned audio signal to a device (e.g., an earpiece of the hearing aid system). At step 3504, one or more images of a speaker engaged in a conversation with user 100 may be captured by the hearing aid system. Step 3504 of process 3700 may be the same as step 3504 of process 3500. At step 3508, the speaker may be identified as described above. In various embodiments, step 3508 of process 3700 may be the same as step 3508 of process 3500. At step 3701, the hearing aid system may determine if the identified speaker is recognized using any of the suitable approaches described above. If the speaker is recognized (step 3701, Yes) the image of the recognized person may be displayed in step 3703. If the speaker is not recognized (step 3701, No) process 3700 may be terminated. In some embodiments, if the speaker is not recognized, the audio signal associated with the voice of the speaker may be silenced or suppressed as described above.

At step 3516, a processor of the hearing aid system may receive audio data related to user 100 conversing with one or more speakers. In various embodiments, step 3516 of process 3700 may be the same as step 3602 of process 3500. At step 3705, the processor of the hearing aid system may selectively condition the received audio data using any suitable approaches described above. For example, the processor may selectively condition the received audio data by analyzing the data and separating one or more voice audio data related to the one or more speakers from the received audio data. In some embodiments, selectively conditioning the audio data may include removing audio background noise data as described above.

At step 3707, the conditioned audio signal may be provided, for example transmitted, to the hearing aid system of user 100. For example, the conditioned audio signal may be provided to a hearing interface device (e.g., earpiece, headphones, speaker, etc.). Step 3707 may be similar to step 3524 of process 3500.

Figure 37B:
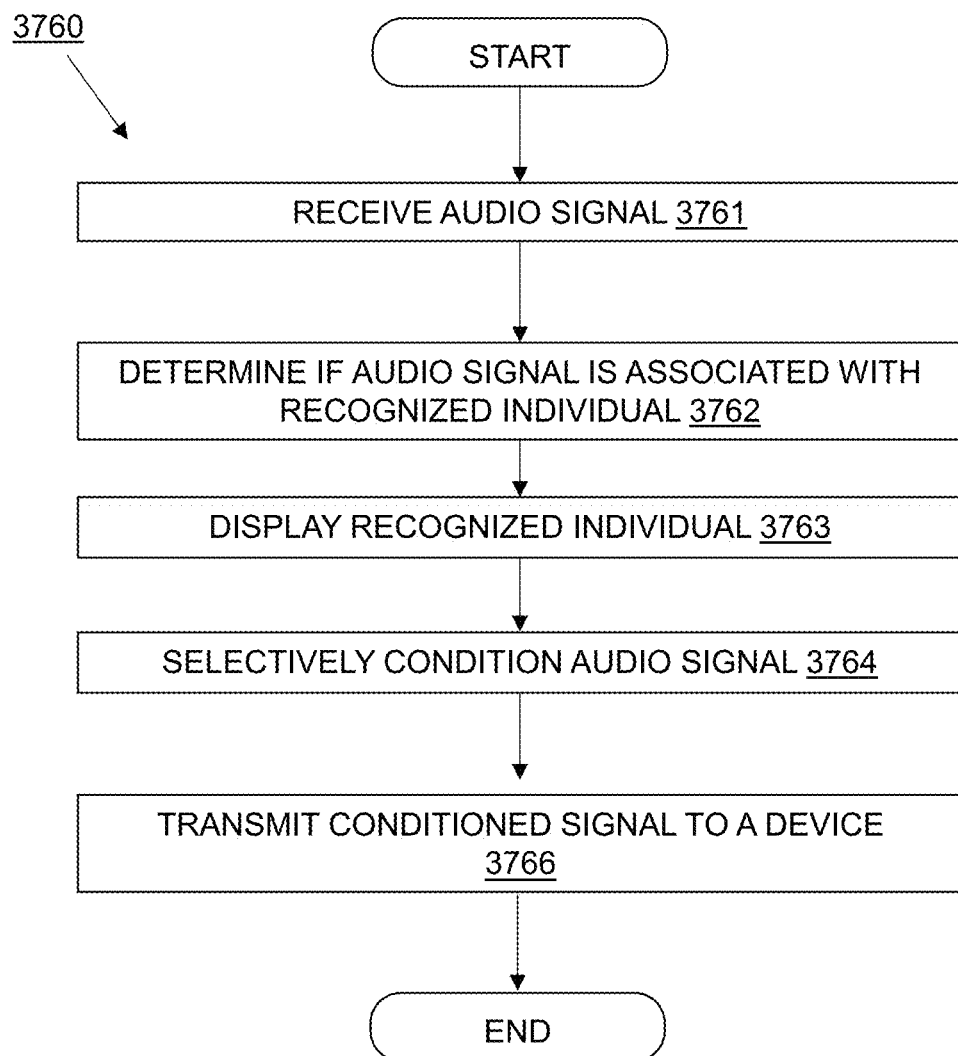

FIG. 37B shows an illustrative process 3760 of transmitting a conditioned audio signal to a device (e.g., an earpiece of the hearing aid system). At step 3761, a processor of the hearing aid system may be programmed to receive an audio signal from the at least one microphone. In various embodiments, step 3761 may be the same as step 3602 of process 3500.

At step 3762, a processor of the hearing aid system may determine if the audio signal is associated with or comprises speech by a recognized individual. The processor may make the determination using any of the suitable approaches described above, such as comparing the audio signal from the individual with a voiceprint of a person whose image is being recognized, using a trained engine, or the like.

At step 3763, an image of the individual may be displayed on a screen of a computing device (e.g., a mobile device) available for user 100. In various embodiments, step 3763 may be the same as step 3514 of process 3500. At step 3764, the processor of the hearing aid system may selectively condition the received audio signal. In various embodiments, step 3764 may be the same as step 3520 of process 3500. In some embodiments, the audio signal may be transmitted to server 250, and a processor of server 250 may selectively condition the audio signal. Selective conditioning of the received audio signal may be achieved using any suitable approaches described above. For example, the processor of the hearing aid system may selectively condition the received audio signal by analyzing the signal and separating one or more voice audio data related to the one or more speaker from the received audio signal. In some embodiments, selectively conditioning the audio signal may include removing audio background noise data as described above.

At step 3766, the conditioned audio signal may be provided to a hearing aid interface of user 100. For example, the conditioned audio signal may be transmitted to a hearing interface device (e.g., earpiece, headphones, speaker, etc.). Step 3766 may be similar to step 3524 of process 3500.

Figure 37C:
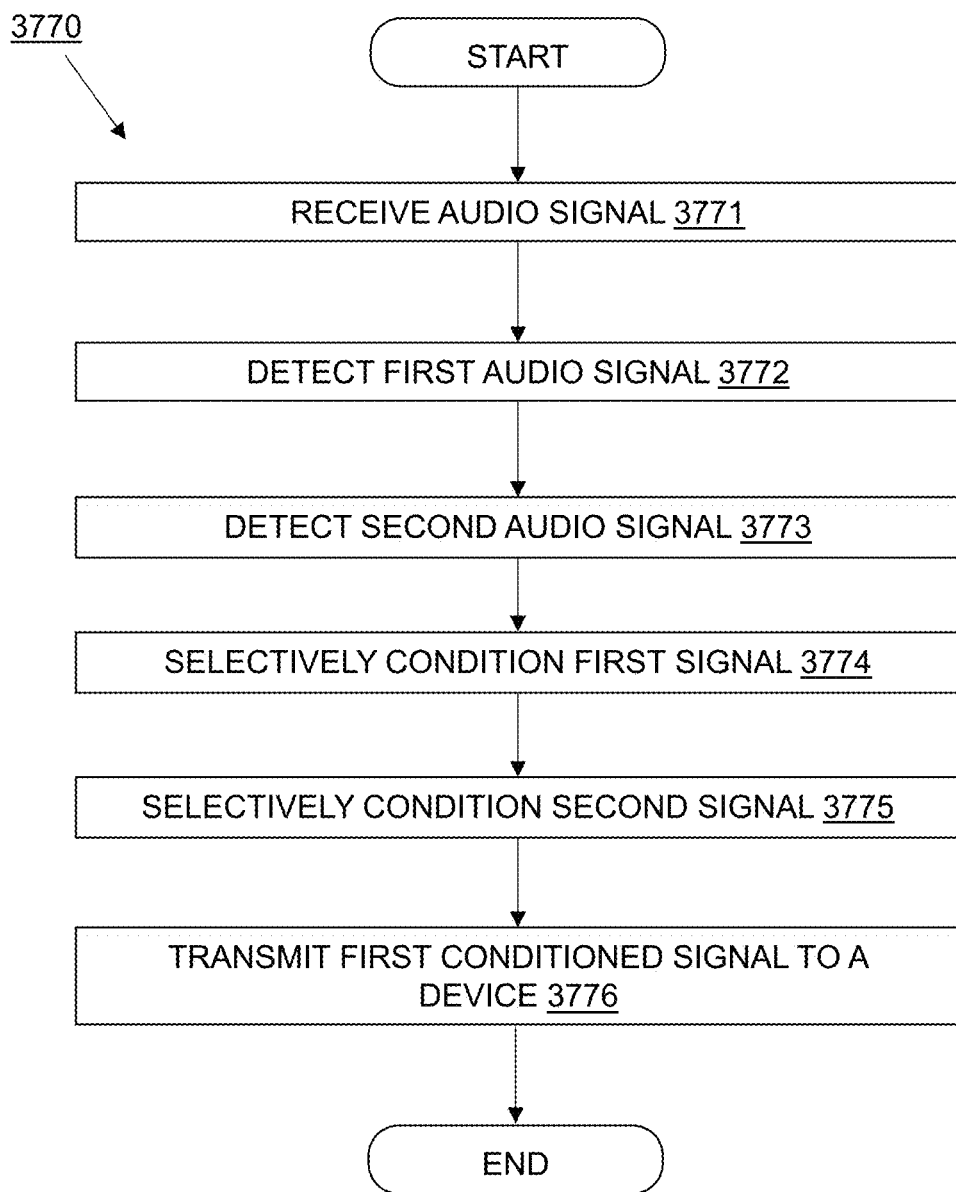

FIG. 37C shows an illustrative process 3770 of transmitting a conditioned audio signal to a device (e.g., an earpiece of the hearing aid system). At step 3771, a processor of the hearing aid system may be programmed to receive an audio signal from the at least one microphone. In various embodiments, step 3771 may be the same as step 3516? of process 3500.

At step 3772, a processor of the hearing aid system may detect, based on analysis of the audio signals, a first audio signal associated with a first time period, wherein the first audio signal is representative of a voice of a single individual. In an example embodiment, the first audio signal may correspond to a single person communicating with user 100 during the first time window. Alternatively, during a first time window, multiple individuals may be communicated with user 100, having distinct voices, that the processor of the hearing aid system is capable of separating using any of the suitable approaches discussed above. In some embodiments, the audio signal associated with the first time window may be transmitted to server 250, and a processor of server 250 may separate audio signal to extract voices of individuals communicating with user 100.

At step 3773, the processor of the hearing aid system may detect, based on analysis of the audio signals, a second audio signal associated with a second time period, wherein the second time period is different from the first time period, and wherein the second audio signal is representative of overlapping voices of two or more individuals. For example, the second time window may correspond to an instance when multiple speakers are talking at the same time. In some embodiments, the first or the second time window may not have to correspond to a continuous time interval. For example, during a conversation, a speech of a single individual may be overlapped at various times by the voices of other individuals. In such cases, the time when a single individual is speaking corresponds to the first time window and the time when multiple individuals are speaking correspond to the second time window At step 3774, the first detected audio signal may be selectively conditioned using any of the suitable approaches discussed above. In various embodiments, step 3774 may be similar to step 3520 of process 3500. At step 3775, the second detected audio signal may be selectively conditioned using any of the suitable approaches discussed above. In various embodiments, the selective conditioning of the first audio signal may be different in at least one respect relative to the selective conditioning of the second audio signal. For example, the first audio signal may be amplified while the second audio signal may be suppressed. In various embodiments, some of the voices presented in the second audio signal may be separated and suppressed, and other voices presented in the second audio signal may be amplified, or modified in any suitable way as discussed above.

At step 3776, the conditioned audio signal may be provided to the hearing aid system of user 100. For example, the conditioned audio signal may be transmitted to a hearing interface device (e.g., earpiece, headphones, speaker, etc.). Step 3776 may be similar to step 3524 of process 3500.

In various embodiments, the processor of the hearing aid system may be programmed to analyze one or more images captured by a wearable camera of the hearing aid system and identify two or more individuals, wherein the selective conditioning of the first audio signal and the second audio signal is based on information associated with an identity of at least one of the two or more individuals. For example, if it is important for user 100 to clearly hear the voice of the identified individual (e.g., when one of the individuals is the user's boss) the voice of the identified individual may be amplified. In various embodiments, one of the two individuals may be identified using any of the suitable approaches discussed above. For example, the individual may be identified using a computer-based model trained to recognize people within images. In some cases, the individual may also be identified based on an audio signal detected within the first or the second audio signal. For example, the hearing aid system may retrieve from the database of server 250 various voiceprints of known individuals and use one or more of the retrieved voiceprints to identify a voice of a known individual within the first or the second audio signal.

In some embodiments, the hearing aid system may be configured to condition the first and the second audio signal and modify voices associated with identified individuals in any suitable way as discussed above. For example, the hearing aid system may suppress one or more voices associated with the one or more identified individual, amplify the one or more voices, change the pitch or the rate of the one or more voices, and the like. As another example, when two individuals are present, and one individual is identified, the voice of the identified individual may be amplified, and the voice of the second individual may be suppressed. As yet another example, the voice of the second individual may be transcribed and displayed on a device associated with the hearing aid system of user 100.

In various embodiments, when the audio signal contains overlapping voices of various individuals, the hearing aid system, may identify audio signals related to the voices, and selectively condition the audio signal (e.g., by amplifying and suppressing voices) using any suitable logic. For example, the hearing aid system may amplify voices related to a particular topic, voices, of individuals engaging in conversation with user 100, voices of individuals engaging in conversation with a particular individual, voices of individuals selected by user 100, and the like. In some cases, the hearing aid system may be configured to suppress the overlapping voices of a background conversation (e.g., a conversation between various speakers that are not directly conversing with user 100). In some cases, the hearing aid system may suppress the voices that cannot be transcribed by the hearing aid system (e.g., the voices that are cannot be clearly heard, or voices that present no discernable useful information, such as voices that produce sounds that can be interpreted to correspond to words).

Identifying Information and Associated Individuals

According to embodiments of this disclosure, a hearing aid system may recognize speakers in a surrounding environment of a user (e.g., user 100 in FIGS. 1A-1B and 2). In some embodiments, the hearing aid system may further recognize that one speaker is talking to another speaker or user 100. Such recognition may be implemented through image analysis, audio analysis, or both. The hearing aid system may transcribe recognized conversations between the speakers. In some embodiments, the conversations may be associated with respective identifiers (e.g., names) of the speakers, if the speakers are recognized individuals. In some embodiments, the hearing aid system may capture instructions or action items directed to user 100 from a speaker (e.g., when user 100 is in a meeting).

Figure 38A:
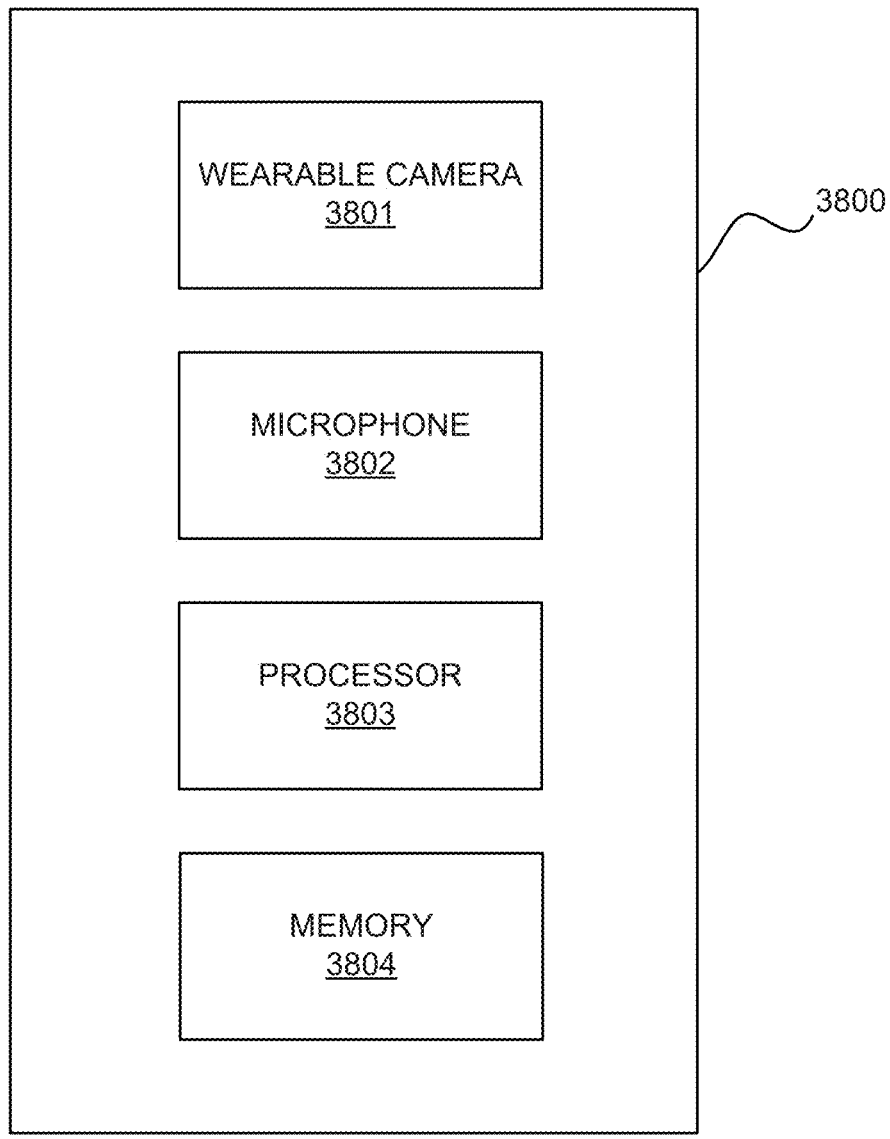
FIG. 38A is a block diagram illustrating a hearing aid system according to an example embodiment.

FIG. 38A is a block diagram illustrating a hearing aid system 3800 according to an example embodiment. As shown in FIG. 38A, the hearing aid system 3800 includes at least one wearable camera 3801, at least one microphone 3802, at least one processor 3803, and a memory 3804. In some embodiments, system 3800 may further include other components, such as components as shown in FIGS. 5A-5C.

In some embodiments, wearable camera 3801 may capture images from an environment of user 100. In some embodiments, wearable camera 3801 may include image sensor 220 in FIG. 5A or 5C. In some embodiments, wearable camera 3801 may include at least one of image sensors 220a or 220b in FIG. 5B.

In some embodiments, microphone 3802 may capture sounds from the environment of user 100. In some embodiments, microphone 3802 may include a directional microphone. In some embodiments, microphone 3802 may include multiple microphones (e.g., a microphone array). In such cases, one microphone may capture only the background noise, while another microphone may capture a combined audio including the background noise as well as individuals' voices. Processor 3803 may obtain the voices by subtracting the background noise from the combined audio. In some other embodiments, system 3800 may include at least one microphone and a pressure sensor (not shown). The pressure sensor may encode air pressure differences (e.g., caused by a sound wave) as a digital signal. System 3800 may process the sounds captured by microphone 3802 and the digital signal captured by the pressure sensor to separate the required voice and the background noise.

In some embodiments, wearable camera 3801 and microphone 3802 may be included in a common housing (e.g., a shell). For example, wearable camera 3801 and microphone 3802 may be included in a common housing of apparatus 110 in FIGS. 3A-3B and 4A-4B.

In some embodiments, processor 3803 may be implemented as processor 210 in FIG. 5A or 5C. In some embodiments, processor 3803 may be implemented as at least one of processors 210a or 210b in FIG. 5B. In some embodiments, processor 3803 may be implemented as processor 540 in FIG. 5C. In some embodiments, processor 3803 may be included in the common housing that includes wearable camera 3801 and microphone 3802. For example, processor 3803 may be included in the common housing of apparatus 110 in FIGS. 3A-3B and 4A-4B. In some embodiments, processor 3803 may be included in a second housing separate from the common housing. In some embodiments, the second housing may be associated with a paired mobile device. For example, the mobile device may be computing device 120 in FIG. 1A-1D, 2, or 5C. The mobile device may be paired with system 300 via, for example, a wireless link (e.g., Bluetooth® link). In such a case, processor 3803 (e.g., implemented as processor 540 in FIG. 5C) may be included in a housing of computing device 120. When processor 3803 is in the second housing, in some embodiments, processor 3093 may receive data (e.g., the images captured by wearable camera 3801) via a wireless link between a transmitter (e.g., wireless transceiver 503a in FIG. 5C) in the common housing and receiver (e.g., wireless transceiver 503b in FIG. 5C) in the second housing. For example, the wireless link may be a Bluetooth® link, a Wi-Fi link, a near-field communications (NFC) link, or the like.

In some embodiments, memory 3804 may be implemented as memory 550 as shown in FIGS. 5A and 5B. In some embodiments, memory 3804 may be implemented as at least one of memories 550a and 550b in FIG. 5C.

Figure 38B:
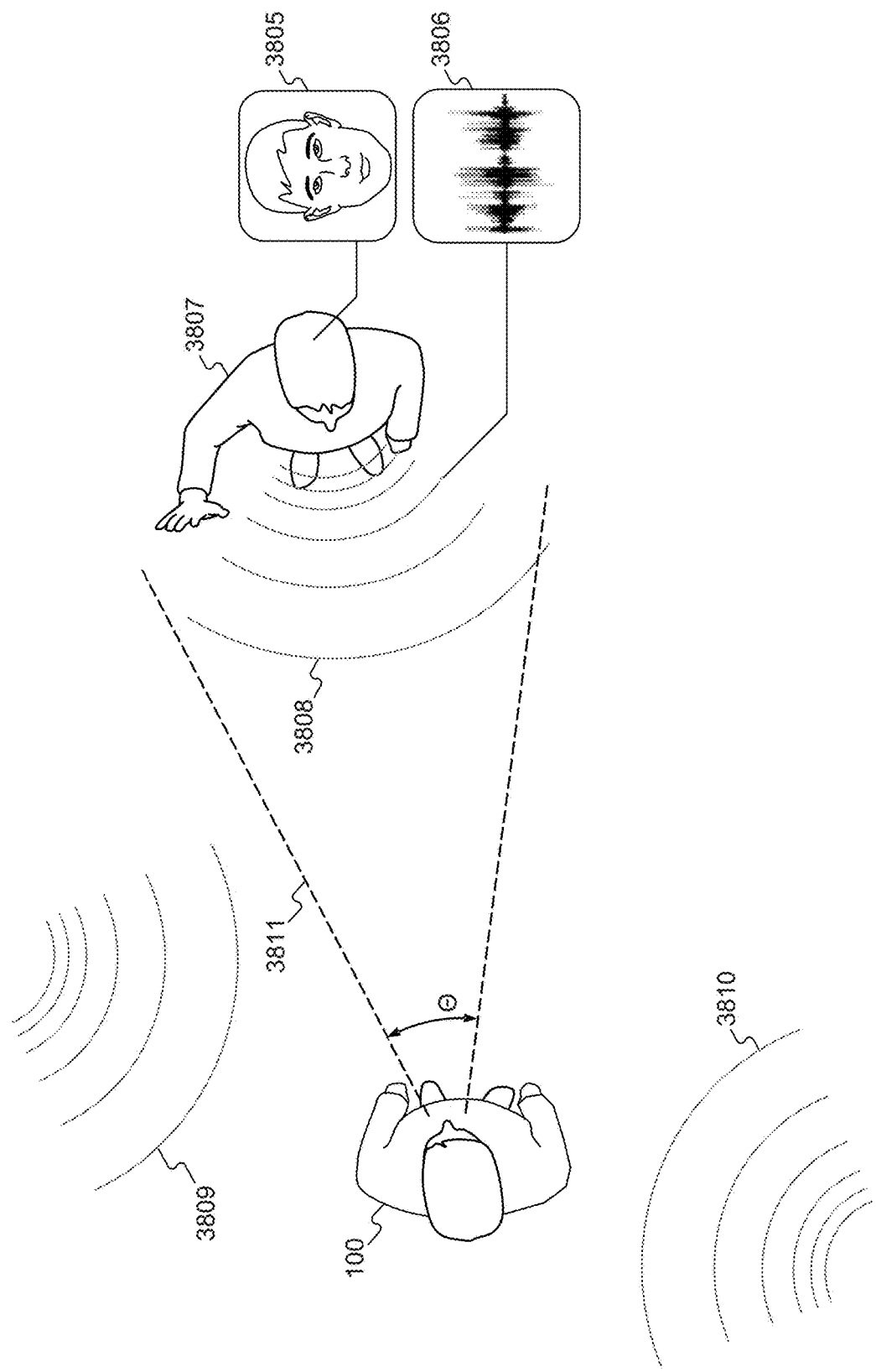
FIG. 38B is a schematic illustration showing an exemplary environment for use of a hearing aid with instruction deduction consistent with the present disclosure.

Apparatus 110 may be configured to deduce instructions from an individual in the environment of user 100. FIG. 38B is a schematic illustration showing an exemplary environment for use of a hearing aid with instruction deduction capabilities consistent with the present disclosure.

As shown, apparatus 110 may be configured to recognize a face 3805 or voice 3806 associated with an individual 3807 within the environment of user 100. For example, apparatus 110 may be configured to capture one or more images of the surrounding environment of user 100 using wearable camera 3801. The captured images may include a representation of a recognized individual 3807, which may be a friend, colleague, relative, or prior acquaintance of user 100. Processor 3803 (e.g., processors 210a and/or 210b) may be configured to analyze the captured images and detect the recognized user using various facial recognition techniques. Accordingly, apparatus 110, or specifically memory 550, may comprise one or more facial or voice recognition components.

Processor 3803 may further be configured to determine whether individual 3807 is recognized by user 100 based on one or more detected audio characteristics of sounds associated with a voice of individual 3807. Processor 3803 may determine that sound 3808 corresponds to voice 3806 of user 3807. Processor 3803 may analyze audio signals representative of sound 3808 captured by microphone 3802 to determine whether individual 3807 is recognized by user 100. This may be performed using one or more voice recognition algorithms, such as Hidden Markov Models, Dynamic Time Warping, neural networks, or other techniques. Voice recognition component and/or processor 3803 may access a database (not shown), which may further include a voiceprint of one or more individuals. Processor 3803 may perform voice recognition to analyze the audio signal representative of sound 3808 to determine whether voice 3806 matches a voiceprint of an individual in the database. Accordingly, the database may contain voiceprint data associated with a number of individuals. After determining a match, individual 3807 may be determined to be a recognized individual of user 100. This process may be used alone, or in conjunction with the facial recognition techniques. For example, individual 3807 may be recognized using facial recognition and may be verified using voice recognition, or vice versa.

After determining that individual 3807 is a recognized individual of apparatus 110, processor 3803 may cause selective conditioning of audio associated with the recognized individual. The conditioned audio signal may be transmitted to a hearing interface device (e.g., a speaker or an earphone), and thus may provide user 100 with audio conditioned based on the recognized individual. For example, the conditioning may include amplifying audio signals determined to correspond to sound 3808 (which may correspond to voice 3806 of user 3807) relative to other audio signals. In some embodiments, amplification may be accomplished digitally, for example by processing audio signals associated with sound 3808 relative to other signals. Additionally, or alternatively, amplification may be accomplished by changing one or more parameters of microphone 3802 to focus on audio sounds associated with individual 3807. For example, microphone 3802 may be a directional microphone and processor 3803 may perform an operation to focus microphone 3802 on sound 3808. Various other techniques for amplifying sound 3808 may be used, such as using a beamforming microphone array, acoustic telescope techniques, etc.

In some embodiments, selective conditioning may include attenuation or suppressing one or more audio signals received from directions not associated with individual 3807. For example, processor 3803 may attenuate sounds 3809 and 3810. Similar to amplification of sound 3808, attenuation of sounds may occur through processing audio signals, or by varying one or more parameters associated with microphone 3802 to direct focus away from sounds not associated with individual 3807.

Selective conditioning may further include determining whether individual 3807 is speaking. For example, processor 3803 may be configured to analyze images or videos containing representations of individual 3807 to determine when individual 3807 is speaking, for example, based on detected movement of the recognized individual's lips. This may also be determined through analysis of audio signals received by microphone 3802, for example by detecting the voice 3806 of individual 3807. In some embodiments, the selective conditioning may occur dynamically (initiated and/or terminated) based on whether or not the recognized individual is speaking.

In some embodiments, conditioning may further include changing a tone of one or more audio signals corresponding to sound 3808 to make the sound more perceptible to user 100. For example, user 100 may have lesser sensitivity to tones in a certain range and conditioning of the audio signals may adjust the pitch of sound 3808. In some embodiments processor 3803 may be configured to change a rate of speech associated with one or more audio signals. For example, sound 3808 may be determined to correspond to voice 3806 of individual 3807. Processor 3803 may be configured to vary the rate of speech of individual 3807 to make the detected speech more perceptible to user 100. Various other processing may be performed, such as modifying the tone of sound 3808 to maintain the same pitch as the original audio signal, or to reduce noise within the audio signal.

In some embodiments, processor 3803 may determine a region 3811 associated with individual 3807. Region 3811 may be associated with a direction of individual 3807 relative to apparatus 110 or user 100. The direction of individual 3807 may be determined using wearable camera 3801 and/or microphone 3802 using the methods described above. As shown in FIG. 38B, region 3811 may be defined by a cone or range of directions based on a determined direction of individual 3807. The range of angles may be defined by an angle, θ, as shown in FIG. 38B. The angle, θ, may be any suitable angle for defining a range for conditioning sounds within the environment of user 100 (e.g., 10 degrees, 20 degrees, 45 degrees). Region 3811 may be dynamically calculated as the position of individual 3807 changes relative to apparatus 110. For example, as user 100 turns, or if individual 3807 moves within the environment, processor 3803 may be configured to track individual 3807 within the environment and dynamically update region 3811. Region 3811 may be used for selective conditioning, for example by amplifying sounds associated with region 3811 and/or attenuating sounds determined to be emanating from outside of region 3811.

The conditioned audio signal may then be transmitted to the hearing interface device and produced for user 100. Thus, in the conditioned audio signal, sound 3808 (and specifically voice 3806) may be louder and/or more easily distinguishable than sounds 3809 and 3810, which may represent background noise within the environment.

In some embodiments, processor 3803 may determine the direction of a recognized individual relative to the user based on the images. In some embodiments, processor 3803 may be configured to determine a look direction of the individuals in the images. In some embodiments, when the recognized individual is speaking to the user, the selective conditioning may include amplifying an audio signal associated with the recognized individual relative to other audio signals received from directions outside a region associated with the recognized individual. If the recognized individual is speaking towards the user (e.g., individual 3807 speaking towards user 100 in FIG. 38B), processor 3803 may transcribe text corresponding to speech associated with the voice of the recognized individual.

Figure 38C:
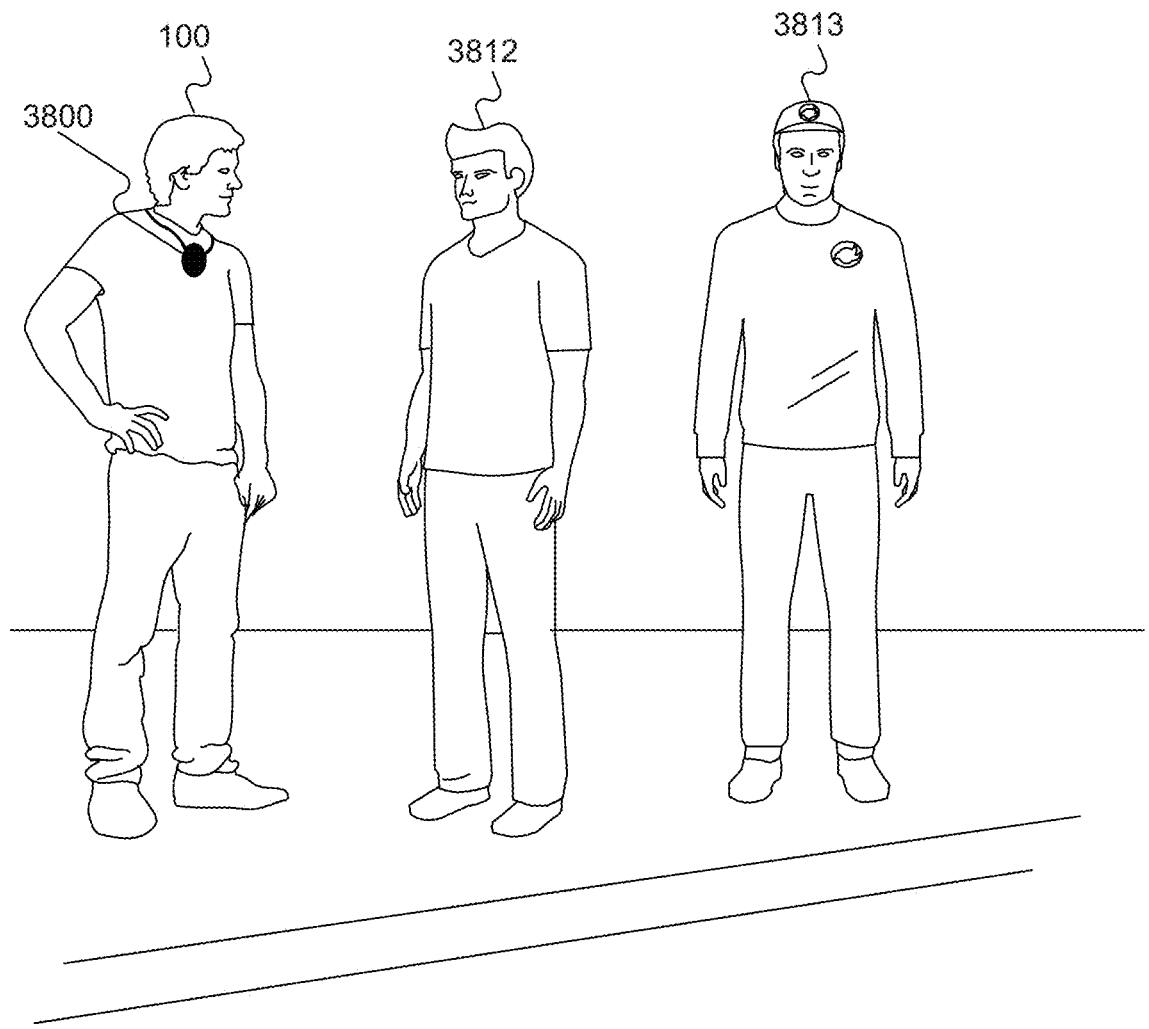
FIG. 38C is a schematic illustration of an exemplary hearing aid system consistent with the present disclosure.

FIG. 38C illustrates a user wearing an exemplary hearing aid system. User 100 may wear system 3800 (e.g., as a wearable device). Wearable camera 3801 may capture images of the environment of user 100. As illustrated in FIG. 38C, a first individual 3812 may stand in front of user 100 and look in the direction of user 100. In addition, a second individual 3813 may also stand in front of user 100, but look in a direction away from user 100. The image sensor of system 3800 may capture one or more images including first individual 3812 and second individual 3813. Processor 3803 may analyze the images captured by wearable camera 3801. Processor 3803 may also identify one or more individuals included in the images, based on image analysis or face recognition. For example, processor 3803 may identify first individual 3812 and second individual 3813 included in the image. Based on the analysis, processor 3803 may detect that first individual 3812 is looking in the direction of user 100 and second individual 3813 is looking in a direction away from user 100. Microphone 3804 may receive one or more audio signals from the environment of user 100. For example, microphone 3804 may be configured to receive (or detect) a first audio signal associated with the voice of the first individual 3812 and a second audio signal associated with the voice of the second individual 3813. In the example as shown in FIG. 38C, based on the looking directions of first individual 3812 and second individual 3813, processor 3803 may transcribe text corresponding to speech associated with the voice of first individual 3812, but not text corresponding to speech associated with the voice of second individual 3813.

Figure 39A:
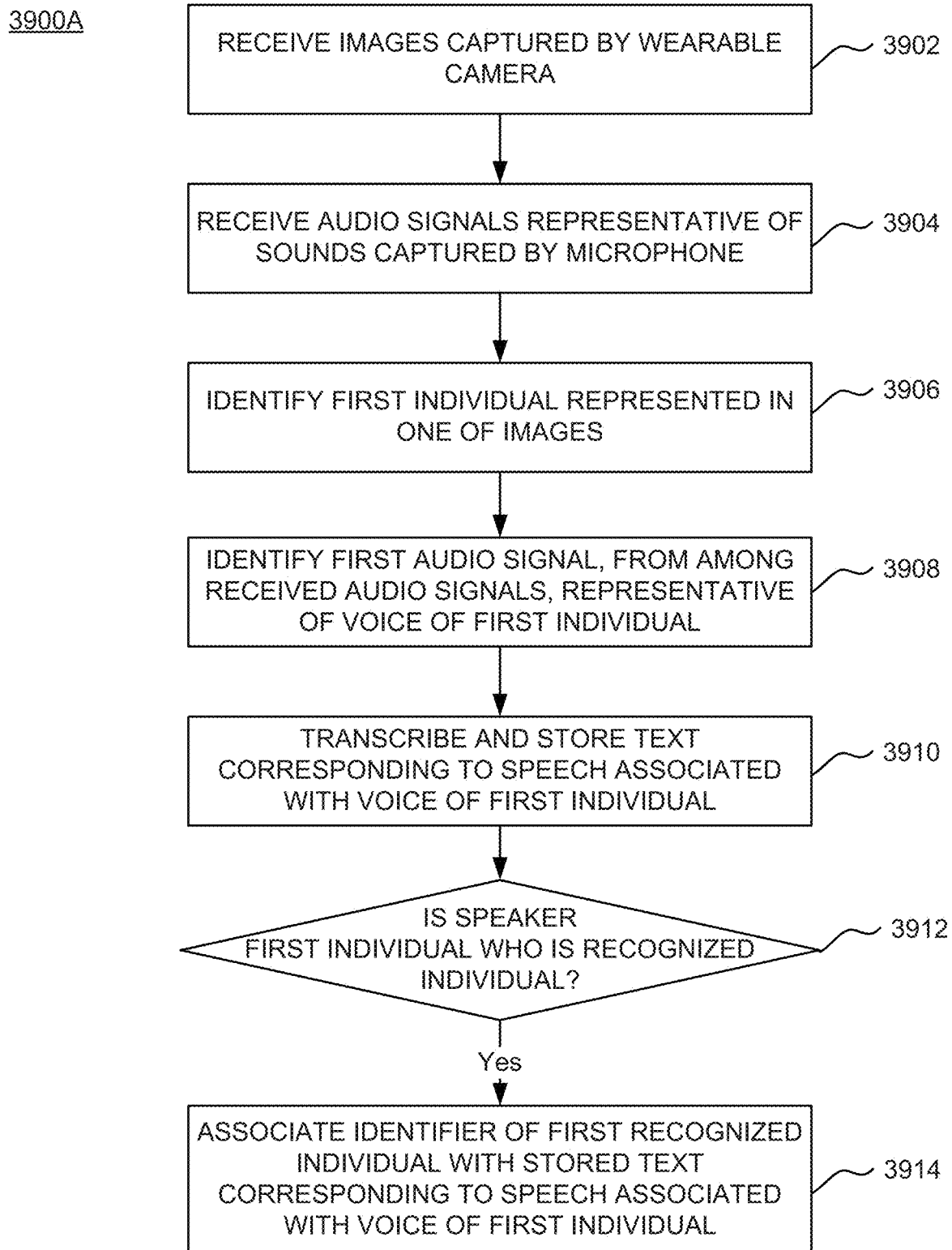
FIGS. 39A and 39B are flowcharts illustrating processes for deducing instructions for a hearing aid system according to a first embodiment.

In some embodiments, processor 3803 may be programmed to perform a method for deducing instructions for user 100. FIG. 39A is a flowchart illustrating a process 3900A for deducing instructions for a hearing aid system according to an embodiment. Processor 3803 may perform process 3900A to recognize an individual in a surrounding environment of user 100 after system 300 captures the voices or images of the individual.

At step 3902, processor 3803 may receive the images captured by wearable camera 3801. In some embodiments, the images may include human beings. In some embodiments, wearable camera 3801 may capture the images substantially in line with a line of sight of user 100, such that an individual user 100 is speaking with may be likely to be at or near the center of the images.

At step 3904, processor 3803 receives audio signals representative of sounds captured by microphone 3802. In some embodiments, the audio signals may include speech or non-speech sounds by one or more persons in the vicinity of user 100, environmental sound (e.g., music, tones, or environmental noise), or the like. In some embodiments, the sounds may be an audio stream. The audio stream may be made up of a combination of audio signal components. Each of the audio signal components may be separated to provide a unique audio signal. Processor 3803 may then receive a plurality of such unique audio signals.

At step 3906, processor 3803 may identify a first individual represented in at least one of the images. In some embodiments, processor 3803 may receive a plurality of images. In some embodiments, step 3906 may be optional. The first individual may appear in some or all of the plurality of images. In some embodiments, processor 3803 may implement an image processing technique (e.g., an algorithm or a software module) to recognize individuals in the images. Such an image processing technique may be based on geometry. For example, processor 3803 may identify an individual at the center of the image as the first individual. For example, processor 3803 may identify a chin of the user in the images and then identify another individual opposite the user.

In some embodiments, processor 3803 may amplify the first audio signal. For example, processor 3803 may amplify the first audio signal by changing tones or applying a noise cancellation technique (e.g., an algorithm or a software module). In some embodiments, processor 3803 may cause transmission (e.g., using wireless transceiver 530 or 530a in FIGS. 5A-5C) of the amplified first audio signal to a hearing interface device that is configured to provide sound to an ear of user 100. By providing the sound of the amplified first audio signal, user 100 may be able to concentrate on the first individual with fewer disturbances of other voices or sounds. For example, the hearing interface device may include a speaker associated with an earpiece. For another example, the hearing interface device may include a bone conduction microphone.

In some embodiments, processor 3803 may transmit the amplified first audio signal as long as the first individual keeps speaking. Processor 3803 may transmit the amplified first audio even if other voices or sounds are captured by microphone 3802, whether recognized or not, in order to let user 100 continuously listen to the first individual. In some embodiments, when the first individual pauses for up to a predetermined length, processor 3803 may determine it as an end of a speech by the first individual and attempt to detect speech of other individuals. In some embodiments, processor 3803 may amplify audio signals of other individuals to a different degree from the first audio signal.

Referring back to FIG. 39A, at step 3908, processor 3803 may identify a first audio signal. The first audio signal may be representative of a voice of the first individual from among the received audio signals. However, the first audio signal may also be associated with another, or unknown, speaker. In some embodiments, the first audio signal may be preprocessed to be separated from background noise captured by microphone 3802.

At step 3910, processor 3803 may transcribe and store, in memory 3804, text corresponding to the speech, which may be associated with the voice of the first individual, if the individual has been associated with the speech. In some embodiments, the voice may include speech (e.g., a conversation or a verbal instruction). The voice may further include non-speech sounds (e.g., laughter, crying, or noise). Processor 3803 may implement a text-to-speech technique (e.g., a text-to-speech algorithm or software module) to recognize the speech from the voice and transcribe the speech associated with the voice into the text.

At step 3912, processor 3803 may determine whether the speaker is the first individual, and whether the first individual is a recognized individual. In some embodiment, processor 3803 may recognize the first individual by analyzing the first audio signal associated. For example, the voice of the first individual may have been previously recognized (e.g., in a different conversation or in an earlier part of the same conversation), and features (e.g., vocal prints) of the recognized voice of the first individual may be stored in memory 3804 (e.g., in a database). When processor 3804 analyzes the first audio signal, it may determine the features of the first audio signal (e.g., by extracting vocal prints) and search memory 3804 (e.g., in the database) to seek a match. If such a match is found, processor 3803 may determine the matching between the speaker and the first individual, and that the first individual is a recognized individual.

In some embodiments, processor 3803 may recognize the first individual based on imaged facial features extracted from the at least one image identified at step 3803. For example, the images of the first individual may have been previously recognized (e.g., using a facial recognition algorithm), and the first individual's facial features may be stored in memory 3804 (e.g., in a database). When processor 3804 analyzes the identified images, it may determine the facial features of the first individual and search memory 3804 (e.g., in the database) to seek a match. If such a match is found, processor 3803 may determine that the first individual is a recognized individual.

In some embodiments, processor 3803 may recognize the first individual based on both the first audio signal and the identified images. It should be noted that processor 3803 may also use other methods, processes, algorithms, or means to recognize the first individual, not limited to the examples as described herein.

Referring back to FIG. 39A, at step 3914, if the first individual is a recognized individual, processor 3803 may associate an identifier of the first recognized individual with the stored text corresponding to the speech associated with the voice of the first individual. In some embodiments, for example, if the text is stored in a database (e.g., a relational database) in memory 3804, processor 3803 may add or change a record in the relational database to store the identifier as a key of the text, in which the text is stored as a value. In some embodiments, processor 3803 may prompt user 100 for identifying information relating to the first individual if the first individual is not a recognized individual. For example, processor 3803 may prompt user 100 to speak an identifier (e.g., a name, a label, or a tag) of the first individual. For another example, processor 3803 may prompt user 100 an input field in a user interface (e.g., on display 260 in FIG. 5C) for user 100 to input the identifier of the first individual.

Figure 39B:
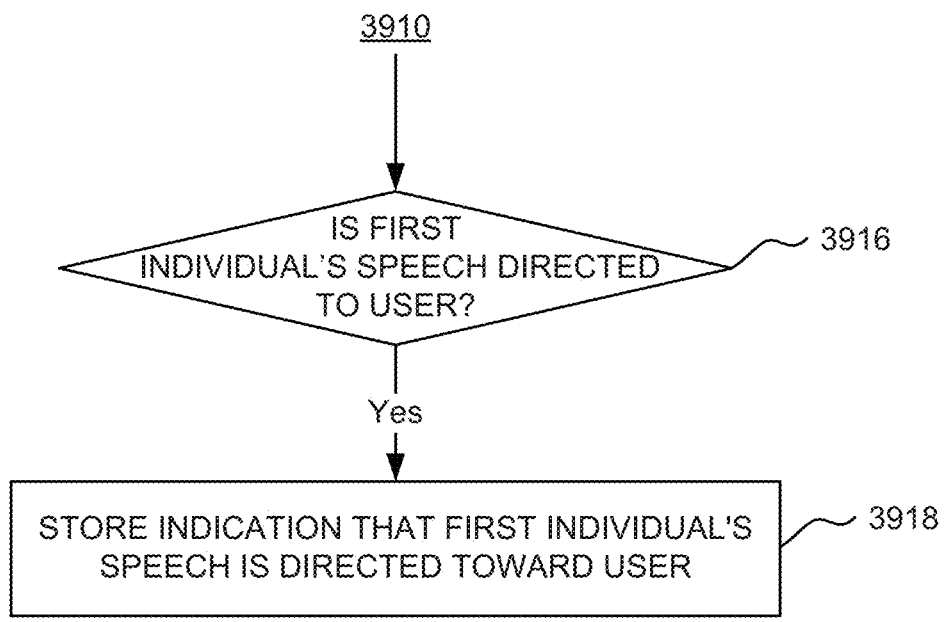

FIG. 39B is a flowchart illustrating a process 3900B for deducing instructions for a hearing aid system according to an embodiment. Process 3900B may follow step 3910 of process 3900A. Processor 3803 may perform process 3900B to recognize whether the individual is speaking towards user 100.

At step 3916, processor 3803 may determine whether the speech associated with the voice of the first individual is directed toward user 100. In some embodiments, processor 3803 may determine whether the speech associated with the voice of the first individual is directed toward user 100 based on at least one of a detected look direction of user 100 or a detected look direction of the first individual. For example, processor 3803 may determine the look direction of user 100 based on detection of a chin of user 100 in at least one of the images. For another example, processor 3803 may determine the look direction of the first individual based on detection of one or more eyes of the first individual in at least one of the images and based on at least one characteristic of the one or more detected eyes. For another example, processor 3803 may determine the look direction of the first individual based on gestures, gaits, or body movement features of the first individual detected from at least one of the images. For another example, processor 3803 may determine the look direction of the first individual based on the user's name included in the speech of the first individual.

At step 3918, if the speech of the first individual is directed toward user 100, processor 3803 may store in memory 3804 an indication that the first individual's speech is directed toward user 100. For example, processor 3803 may store the indication in the relational database described at step 3914.

Figure 40A:
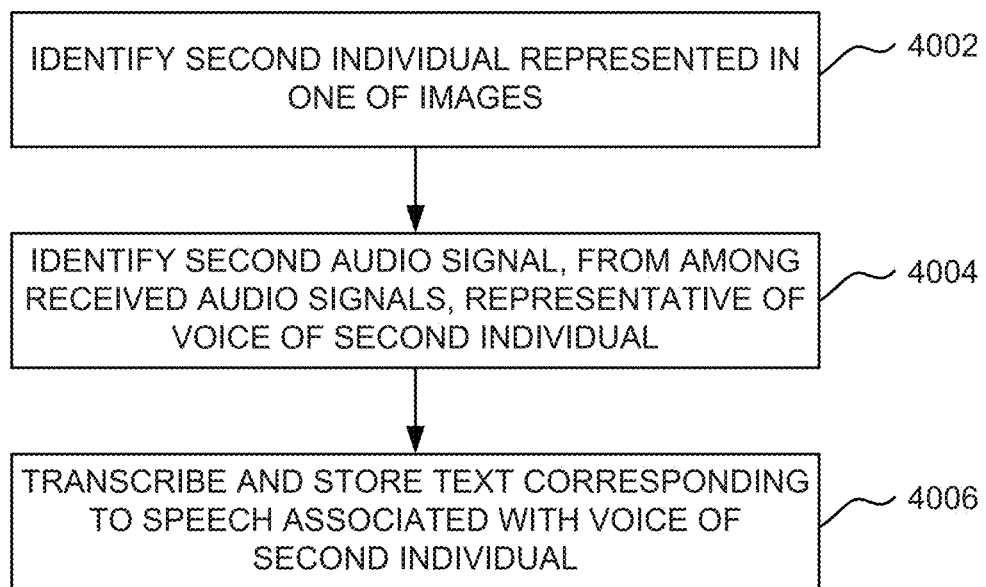
FIGS. 40A and 40B are flowcharts illustrating processes for deducing instructions for a hearing aid system according to a second embodiment.

FIG. 40A is a flowchart illustrating a process 4000A for deducing instructions for a hearing aid system according to an embodiment. In some embodiments, process 4000A may follow any step of process 3900A or 3900B. Processor 3803 may implement process 4000A to recognize multiple individuals in the surrounding environment of user 100 and transcribe their speech if the voice or images of the individual is captured by system 300.

At step 4002, processor 3803 may identify a second individual represented in at least one of the images. Step 4002 may be implemented in a manner similar to step 3906. For example, processor 3803 may use the image processing algorithm to identify individuals in images based on the individuals' traits or characteristics of at least one of the body shapes, motions, or facial expressions. If recognized individuals have different traits or characteristics, processor 3803 may determine that the second individual is identified in the images.

At step 4004, processor 3803 may identify a second audio signal, from among the received audio signals, representative of a voice of the second individual. Step 4004 may be implemented in a manner similar to step 3908. For example, processor 3803 may extract features (e.g., vocal prints) from audio signals. If the extracted features are not the same, processor 3803 may determine that the second signal is identified in the received audio signals.

At step 4006, processor 3803 may transcribe and store, in memory 3804, text corresponding to speech associated with the voice of the second individual. Step 4006 may be implemented in a manner similar to step 3910.

Figure 40B:
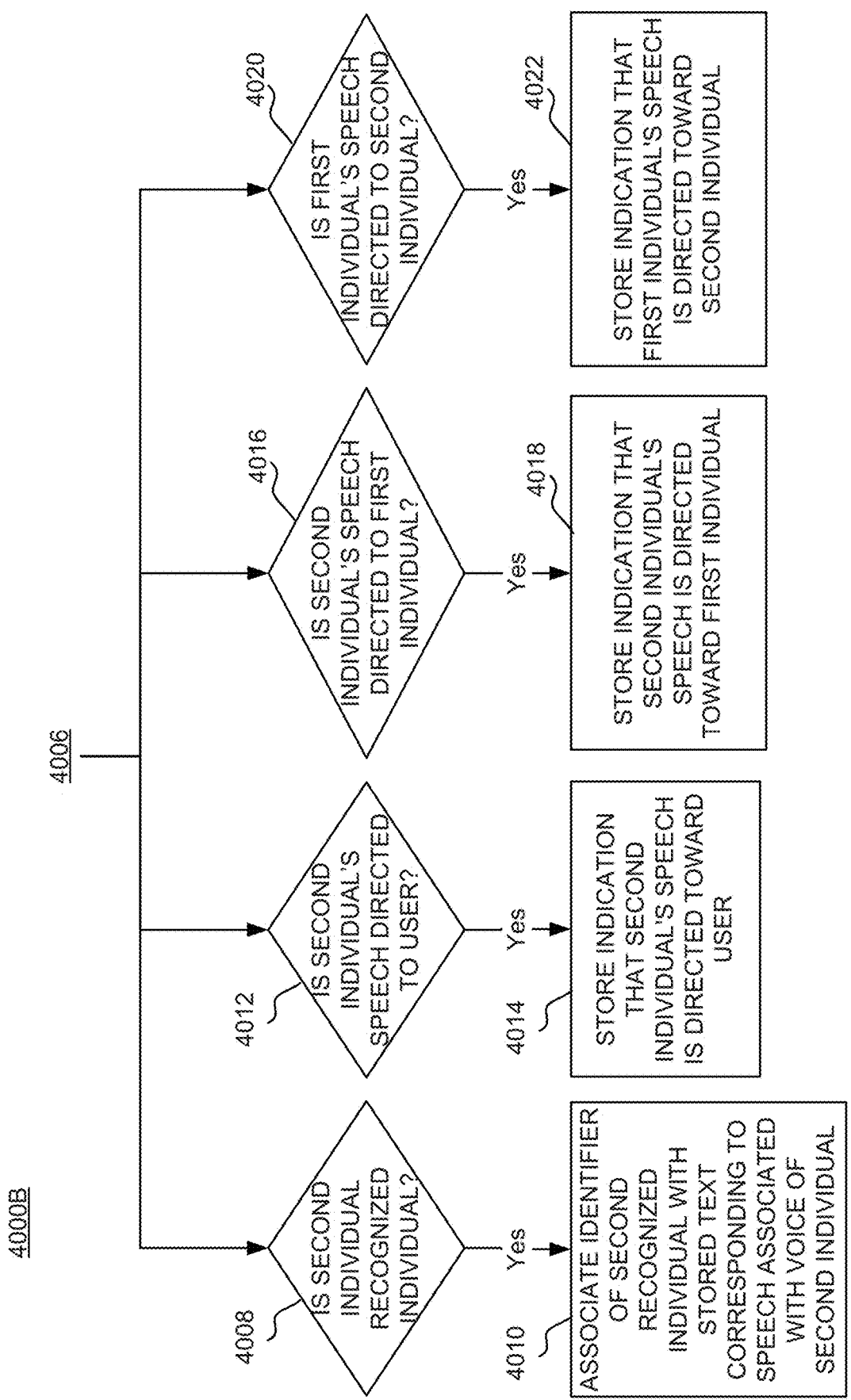

FIG. 40B is a flowchart illustrating a process 4000B for deducing instructions for a hearing aid system according to an embodiment. In some embodiments, process 4000B may follow step 4006 of process 4000A. Processor 3803 may implement process 4000B to recognize that whether the second individual is a recognized individual. Processor 3803 may implement process 4000B to further recognize whether the second individual is speaking towards user 100, whether the second individual is speaking towards the first individual, or whether the first individual is speaking towards the second individual.

At step 4008, processor 3803 may determine whether the second individual is a recognized individual. Step 4008 may be implemented in a manner similar to step 3912.

At step 4010, if the second individual is a recognized individual, processor 3803 may associate an identifier of the second recognized individual with the stored text corresponding to speech associated with the voice of the second individual. Step 4010 may be implemented in a manner similar to step 3914.

At step 4012, processor 3803 may determine whether the speech associated with the voice of the second individual is directed toward user 100. Step 4012 may be implemented in a manner similar to step 3916.

At step 4014, if the speech of the second individual is directed toward user 100, processor 3803 may store in memory 3804 an indication that the second individual's speech is directed toward user 100. Step 4014 may be implemented in a manner similar to step 3918.

At step 4016, processor 3803 may determine whether the speech associated with the voice of the second individual is directed toward the first individual. Step 4016 may be implemented in a manner similar to step 3916 or 4012. In some embodiments, processor 3803 may determine whether the speech associated with the voice of the second individual is directed toward the first individual based on a look direction of the second individual detected based on analysis of at least one of the images. In some embodiments, processor 3803 may determine whether the speech associated with the voice of the second individual is directed toward the first individual based on detection of a name associated with the first individual in the speech of the second individual.

At step 4018, if the speech of the second individual is directed toward the first individual, processor 3803 may store in memory 3804 an indication that the second individual's speech is directed toward the first individual. Step 4018 may be implemented in a manner similar to step 3918 or 4014.

At step 4020, processor 3803 may determine whether the speech associated with the voice of the first individual is directed toward the second individual. Step 4016 may be implemented in a manner similar to step 3916, 4012, or 4016.

At step 4022, if the speech of the first individual is directed toward the second individual, processor 3803 may store in memory 3804 an indication that the first individual's speech is directed toward the second individual. Step 4022 may be implemented in a manner similar to step 3918, 4014, or 4018.

In some embodiments, processes 39A-39B or 40A-40B may include additional steps. For example, processor 3803 may perform those additional steps after any step of 39A-39B or 40A-40B.

In some embodiments, processor 3803 may cause the stored text (e.g., at step 3910 or 4006) to be shown on a display. In some embodiments, the display (not shown in FIG. 38A) may be included in the common housing that includes wearable camera 3801 and microphone 3802. In some embodiments, the display may be associated with a paired mobile device paired with system 300. For example, the mobile device may be computing device 120 in FIG. 1A-1D, 2 or 5C. The display may be, for example, display 260 in FIG. 5C.

In some embodiments, processor 3803 may generate a task item based on analysis of the speech associated with the voice of the first individual. In some embodiments, processor 3803 may implement a task-context matching technique (e.g., an algorithm or a software module) to determine whether the context (e.g., the stored text of the recognized individual's speech) is suitable for any task (e.g., an undated task or a dated task). For example, processor 3803 may implement the task-context matching technique to recognize that the context of the speech between the recognized individuals and user 100 is a meeting. Based on that context, processor 3803 may further determine that the context is suitable for receiving tasks. Based on the stored text and the direction of the speech (e.g., as recognized in process 400B), processor 3803 may determine the content of the task. In some embodiments, processor 3803 may implement a suggestion technique (e.g., an algorithm or a software module) to suggest the task to user 100. In some embodiments, the suggestion technique may include a natural language processing technique. For example, processor 3803 may cause to suggest performing the task or setting a date for the task. In some embodiments, processor 3803 may identify tasks by specific words in the speech, such as "please", "prepare", "e-mail me", "send", or the like. In some embodiments, processor 3803 may attach a due date to a task, based on identified times or dates in the speech, such as, for example, "by Wednesday noon", "next week", or the like.

In some embodiments, processor 3803 may deduce or identify instructions based on at least one of the speech, images, or the transcribed texts. For example, processor 3803 may analyze the context of the speech of the first individual using natural language processing technique to determine whether there is an instruction included. For another example, processor 3803 may analyze the images captured and analyze gestures, gaits, facial expressions, body movements to determine whether there is an instruction included, such as nodding a head, shaking a head, raising a hand, or the like. For another example, processor 3803 may analyze the transcribed texts to determine whether there is an instruction included, such as generating a task item as previously described. In some embodiments, processor 3803 may determine whether there is an instruction from the first individual using a combination of any of the speech, images, or the transcribed texts. In some embodiments, processor 3803 may determine whether the recognized instruction is directed to the user or to a second individual based on who the first individual is speaking to. In some embodiments, processor 3803 may further check with contextual information to further determine whether there is an instruction included. For example, when processor 3803 recognized a candidate instruction related to adding an item to a schedule or calendar of the user, processor 3803 may checked the schedule or calendar for conflicts to determined that whether the item is restated or newly added.

In some embodiments, processor 3803 may update a database associated with user 100 to include the generated task item. For example, the database may be the database in memory 3802 as described in step 3912, 3914, or 3918. Processor 3803 may store or update the generated task item as a data record in the database, for example.

In some embodiments, processor 3803 may collect the tasks throughout the day and provide them to the user upon request.

Selectively Conditioning of Audio Signals Based on an Audioprint of an Object

Human beings have distinct and different voices. While some people have a good voice memory and can easily recognize their first primary school teacher, other people may have difficulty recognizing their closest friends only from their voice. Nowadays, computer algorithms surpass most people in recognizing speakers because they can identify and distinguish the human voice. The way these machine-learning algorithms recognize speakers is based on mathematical solutions that use audioprints. The term "audioprint," also known as "acoustic fingerprint" and "voice signature," refers to a condensed digital summary of the specific acoustic features of a sound-emanating object (e.g., individuals and also inanimate objects) deterministically generated from a reference audio signal. A common technique for determining an audioprint from recorded audio signals is using a time-frequency graph called a spectrogram. For example, the disclosed hearing aid system may identify in the spectrogram multiple points (e.g., peak intensity points) related to different words or vocal sounds created by an individual talking to user 100. The disclosed hearing aid system may access multiple reference audioprints associated with different sound-emanating objects stored in a local or a cloud-based database. Using the reference audioprints, the disclosed hearing aid system may determine an audioprint from recorded audio signals and identify the sound-emanating object responsible for generating the audio signals. Consistent with the present disclosure, the hearing aid system may retrieve information relating to the identified sound-emanating object and cause selective conditioning of at least one audio signal associated with the identified sound-emanating object based on the retrieved information. For example, when user 100 is at the park with his child, the disclosed system may amplify the voice of the child relative to the voices of other nearby children.

Figure 41A:
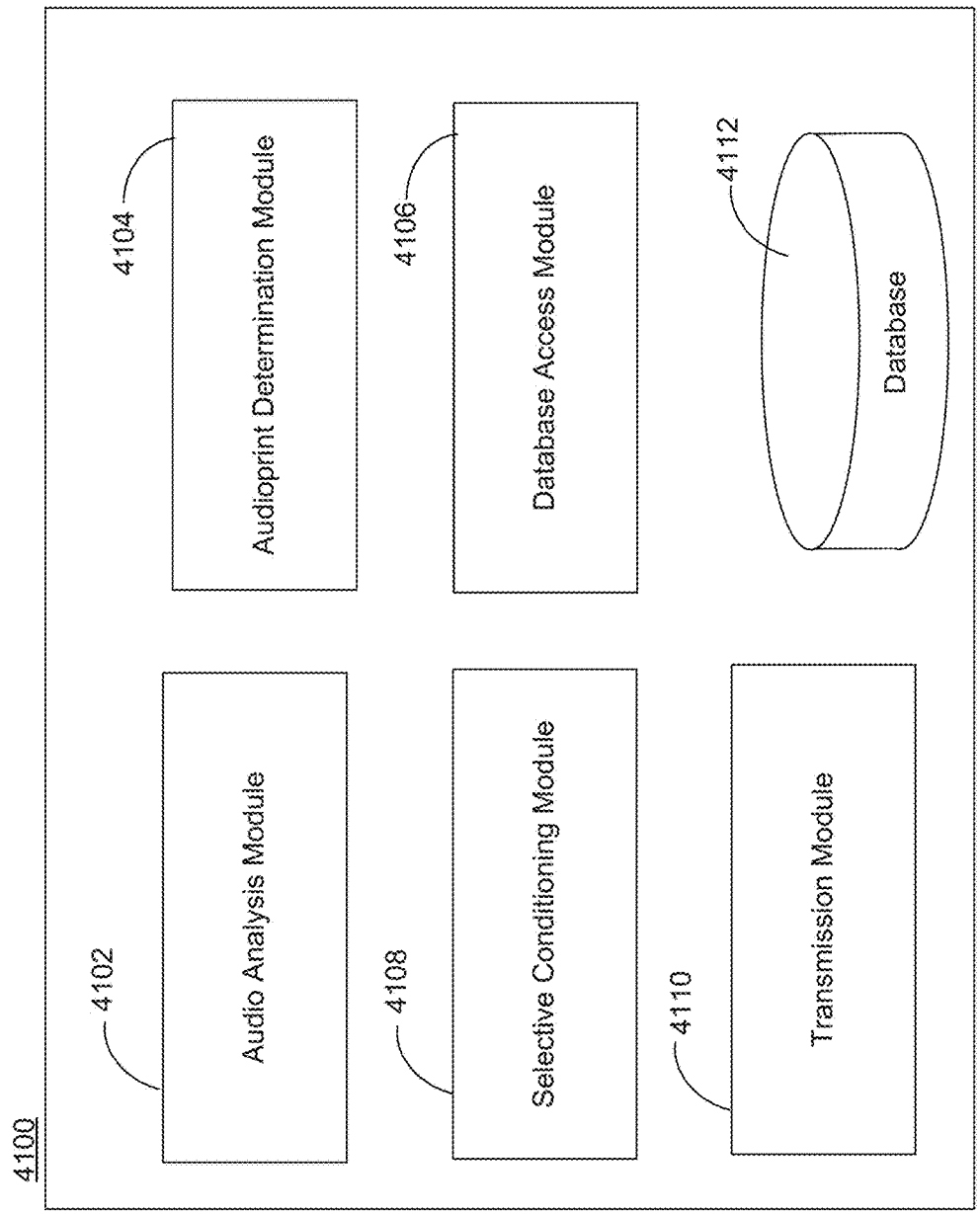
FIG. 41A is a block chart illustrating an exemplary embodiment of a memory device containing software modules consistent with the present disclosure.

FIG. 41A illustrates an exemplary embodiment of a memory 4100 containing software modules consistent with the present disclosure. In particular, as shown, memory 4100 may include an audio analysis module 4102, an audioprint determination module 4104, a database access module 4106, a selective conditioning module 4108, a transmission module 4110, and a database 4112. Modules 4102, 4104, 4106, 4108, and 4110 may contain software instructions for execution by at least one processing device (e.g., processor 210, included with the suggested hearing aid system). Audio analysis module 4102, audioprint determination module 4104, database access module 4106, selective conditioning module 4108, transmission module 4110, and database 4112 may cooperate to perform multiple operations.

For example, the hearing aid system may be used to selectively condition audio signals based on a determined audioprint of a sound-emitting object. For example, audio analysis module 4102 may receive audio signals representative of sounds emanating from objects in an environment of user 100 and analyze the received audio signals to obtain an isolated audio stream associated with one sound-emanating object. Audioprint determination module 4104 may determine an audioprint of the sound-emanating object from the isolated audio stream. In one implementation, audioprint determination module 4104 may use deep learning algorithms or neural embedding models to determine the audioprint of the sound-emanating object. Database access module 4106 may interact with database 4112, which may store information relating to sound-emanating objects associated with user 100 and any other information associated with the functions of modules 4102-4110. For example, database access module 4106 may use the determined audioprint to retrieve information relating to a detected sound-emanating object from database 4112. The retrieved information may include relationship level indicators between user 100 and the detected sound-emanating object, or specific audio conditioning rules associated with an identified sound-emanating object. Selective conditioning module 4108 may cause selective conditioning of at least one audio signal associated with the identified sound-emanating object. For example, selective conditioning module 4108 may amplify sounds from the user's smartphone and avoid from amplifying sounds from other phones. Transmission module 4110 may cause transmission of the at least one conditioned audio signal to a hearing interface device (e.g., hearing interface device 1710) configured to provide sounds to an ear of user 100.

In another example, the hearing aid system may attenuate background noise based on determined audioprints of objects in the environment of user 100. For example, audio analysis module 4102 may receive audio signals representative of sounds from the environment of user 100 and analyze the received audio signals to isolate a plurality of audio streams associated with a corresponding plurality of sound-emanating objects in the environment of user 100. Each sound-emanating object in the environment of user 100 may be associated with a unique audioprint. Audioprint determination module 4104 may determine a plurality of audioprints associated with the plurality of isolated audio streams. Database access module 4106 may use the determined audioprints to obtain at least one indicator of a type associated with each of the plurality of sound-emanating objects. The at least one indicator may be indicative of a level of interest user 100 has with the type associated with each of the plurality of sound-emanating objects. Selective conditioning module 4108 may cause selective conditioning of the plurality of isolated audio streams based on the determined at least one indicator of a type associated with each of the plurality of sound-emanating objects. For example, selective conditioning module 4108 may selectively attenuate a first audio stream determined to be associated with background noise relative to a second audio stream determined to not be associated with background noise. Transmission module 4110 may cause transmission of the conditioned audio signals (and the non-conditioned audio signals) to a hearing interface device configured to provide sounds to an ear of user 100. Additional details on this example operation are provided below with reference to FIGS. 44A-44C.

Consistent with embodiments of the present disclosure, memory 4100 may also include an object identification module (not shown). The object identification module may identify the at least one sound-emanating object in the environment of user 100 based on the audioprint determined by audioprint determination module 4104. Moreover, in an embodiment, the object identification module may identify the at least one sound-emanating object in the environment of user 100 using image analysis. For example, the object identification module may receive a plurality of images depicting one or more sound-emanating objects. The plurality of images may be captured by a wearable camera located in a same housing that includes the wearable microphone (e.g., apparatus 110). According to this embodiment, the object identification module may determine visual characteristics of a sound-emanating object based on analysis of the plurality of images. Thereafter, the object identification module may use the determined visual characteristics and the determined audioprint to identify the sound-emanating object. For example, the visual characteristics of the sound-emanating object may include facial features of an individual speaking with user 100. Database access module 4106 may retrieve from database 4112 predefined settings associated with an identity of the sound-emanating object. Thereafter, selective conditioning module 4108 may cause the conditioning of at least one audio signal based on the identity of the sound-emanating object. For example, sounds generated by specific sound-emitting objects may be silenced (e.g., the intensity of the conditioned audio signals associated with the AC may be 0%) and sounds generated by other specific sound-emitting objects may be amplified (e.g., the intensity of the conditioned audio signals associated with a family member may be 110%).

After the object identification module identifies the sound-emanating object (e.g., using audio analysis, using image analysis, or using a combination of both), database access module 4106 may retrieve predefined settings related to the identified sound-emanating object. In one embodiment, the predefined settings may be associated with modifications to audio signals generated by the sound-emanating object. For example, according to one predefined setting, audio signals from a specific sound-emanating object may be silenced whenever encountered. In another embodiment, the predefined settings may be defined by or be specific to user 100. For example, Alice may want to amplify sounds generated by babies and Bob may want to silence sounds generated by babies. In another embodiment, the predefined settings may be context related. In other words, a single sound-emanating object may be associated with different settings that correspond with different situations. Thus, the hearing aid system may identify the situation user 100 is in and apply the settings associated with sound-emanating objects accordingly. As another example, when Alice is at home, she may want to amplify sounds generated by babies; but when Alice is at work, she may want to silence sounds generated by babies. The hearing aid system may determine if Alice is at home or at work (e.g., through analysis of images captured of Alice's surrounds, by accessing information associated with a calendar or schedule, and/or via accessing GPS or other location information) and modify the audio signals associated with babies accordingly.

Consistent with additional embodiments of the present disclosure, the software modules illustrated in FIG. 41A may be stored in separate memory devices. In one example embodiment, selective conditioning module 4108 may be stored in a memory device located in a hearing interface device (e.g., hearing interface device 1710). The hearing interface device in this disclosure may include an electroacoustic transducer configured to provide sounds from the at least one audio signal to an ear of user 100. The electroacoustic transducer may include a speaker or a bone conduction microphone. In this example embodiment, transmission module 4110 may transmit isolated audio signals to the hearing interface device, and the conditioning of the audio signals may be performed by the hearing interface device. In another example embodiment, the hearing interface device may include a receiver configured to receive at least one audio signal, wherein the at least one audio signal was acquired by a wearable microphone and was selectively conditioned by at least one processor (e.g., processor 210 located in apparatus 110) configured to identify an audioprint of the at least one sound-emanating object using a plurality of reference audioprints, retrieve information from a database about the at least one sound-emanating object, and cause the conditioning based on retrieved information.

Figure 41B:
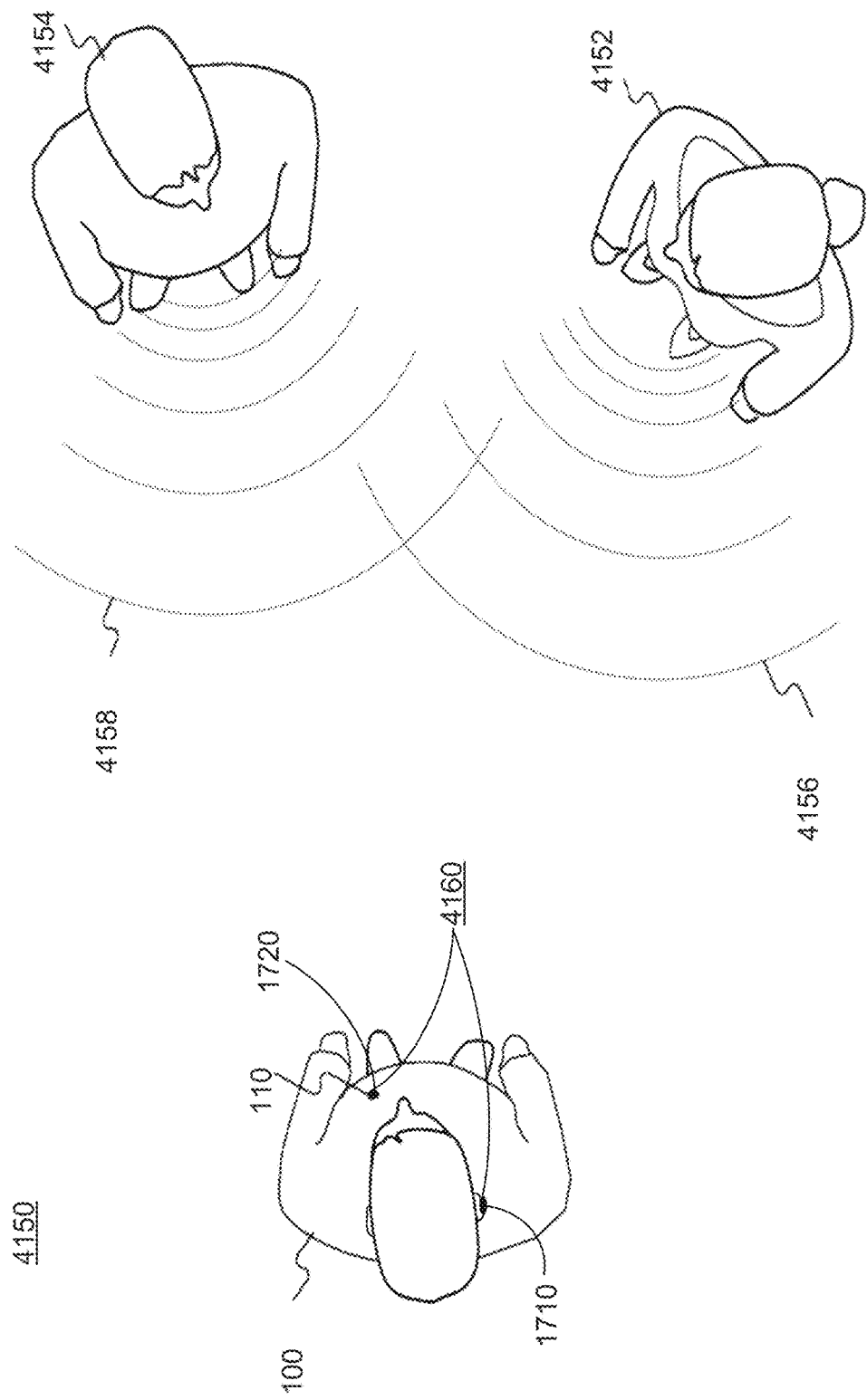
FIG. 41B is a schematic illustration showing an exemplary environment of user of a hearing aid system that selectively conditions audio signals consistent with the present disclosure.

FIG. 41B is a schematic illustration showing an exemplary environment 4150 for using a hearing aid system 4160 consistent with the present disclosure. Hearing aid system 4160 may include apparatus 110 and identify one or more individuals within environment 4150 using wearable microphone 1720 and hearing interface device 1710 to provide selectively conditioned audio signals to an ear of user 100. In the illustrated scenario, apparatus 110 may identify a first individual 4152 and a second individual 4154 using audioprints determined from recorded audio signals. For example, wearable microphone 1720 may record audio signals generated by sound-emitting objects in environment 4150. In some embodiments, the audio signals may represent voices of various individuals. For example, as shown in FIG. 41B, first audio signals 4156 may represent a voice of first individual 4152 and second audio signals 4158 may represent a voice of second individual 4154. The at least one processing device of hearing aid system 4160 may analyze first audio signals 4156 and second audio signals 4158 to separate them and to determine audioprints associated with voices. For example, the at least one processing device may use one or more speech or voice activity detection (VAD) algorithms and/or the voice separation techniques to isolate audio signals associated with each voice. In some embodiments, the at least one processing device may perform further analysis on the audio signal associated the detected voice activity to determine the audioprint associated with each voice. For example, the at least one processing device may use one or more voice recognition algorithms (e.g., Hidden Markov Models, Dynamic Time Warping, neural networks, or other techniques) to determine the audioprint associated with each voice. In some embodiments, as illustrated in FIG. 43B, the at least one processing device may use captured images and one or more image recognition algorithms to identify an object, and thereafter the object's identity may be used to determine the audioprint.

FIGS. 42A-42F are schematic illustrations of audio signals recorded during the scenario illustrated in FIG. 41B and being processed by at least one processing device using the software modules depicted in FIG. 41A. In accordance with the present disclosure, audio analysis module 4102 may receive audio signals acquired by wearable microphone 1720 that reflect sounds generated by first individual 4152 and second individual 4154. FIG. 42A illustrates audio stream 4200 acquired by wearable microphone 1720. Audio analysis module 4102 may also analyze audio stream 4200 to identify first audio signals 4156 associated with first individual 4152 and second audio signals 4158 associated with second individual 4154. FIG. 42B depicts first audio signal 4156 in light gray and second audio signal 4158 in dark gray. Audio analysis module 4102 may further isolate first audio signal 4156 associated with first individual 4152 and second audio signal 4158 associated with second individual 4154. FIG. 42C depicts the two isolated audio signals. After the at least one processing device determines the audioprints for audio signals 4156 and 4158, identifies individuals 4152 and 4154, and retrieves from database 4112 information relating to individuals 4152 and 4154, selective conditioning module 4108 may cause selective conditioning of first audio signal 4156 and second audio signal 4158. In the example illustrated in FIG. 42D, the retrieved information may indicate that second individual 4154 is more important to user 100 than first individual 4152. Accordingly, selective conditioning module 4108 may attenuate first audio signal 4156 and amplify second audio signal 4158. First conditioned audio signal 4202 was generated from first audio signal 4156 and second conditioned audio signal 4204 was generated from second audio signal 4158. Transmission module 4110 may receive first conditioned audio signal 4202 and second conditioned audio signal 4204 from selective conditioning module 4108 and may combine them together to a conditioned audio stream 4206, as illustrated in FIG. 42E. Thereafter, transmission module 4110 may cause transmission of conditioned audio stream 4206 to hearing interface device 1710 configured to provide sounds to an ear of user 100. FIG. 42F depicts conditioned audio stream 4206 as received by hearing interface device 1710. Consistent with the present disclosure, the at least one processing device may cause transmission of conditioned audio stream 4206 to hearing interface device 1710 in less than 100 mSec after audio stream 4200 was acquired by the wearable microphone. For example, conditioned audio stream 4206 may be transmitted to the hearing interface device in less than 50 mSec, less than 30 mSec, less than 20 mSec, or less than 10 mSec after audio stream 4200 was acquired by the wearable microphone.

Figure 43A:
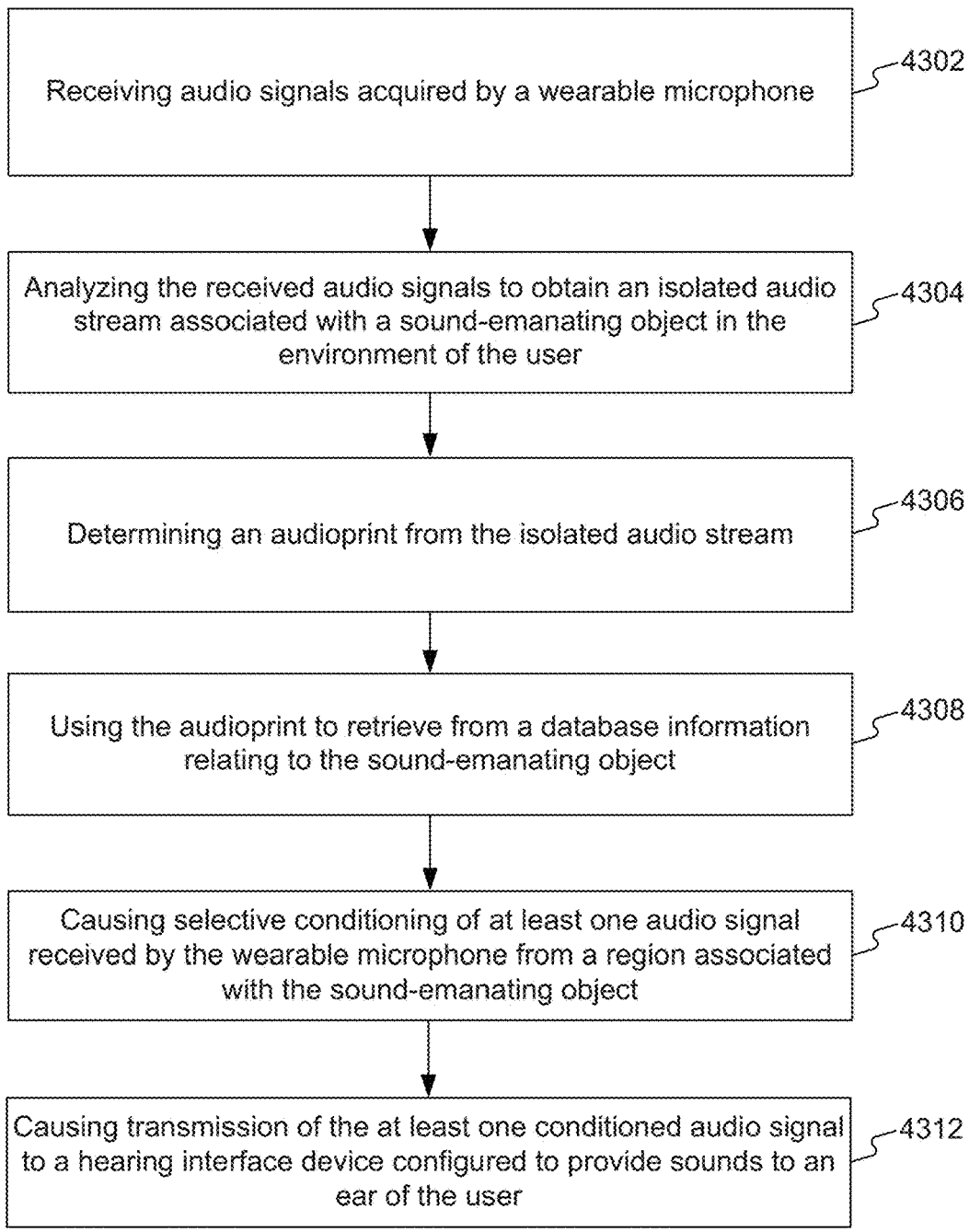
FIG. 43A is a flowchart showing an exemplary process for selectively conditioning audio signals associated with a recognized object, consistent with disclosed embodiments.
Figure 43B:
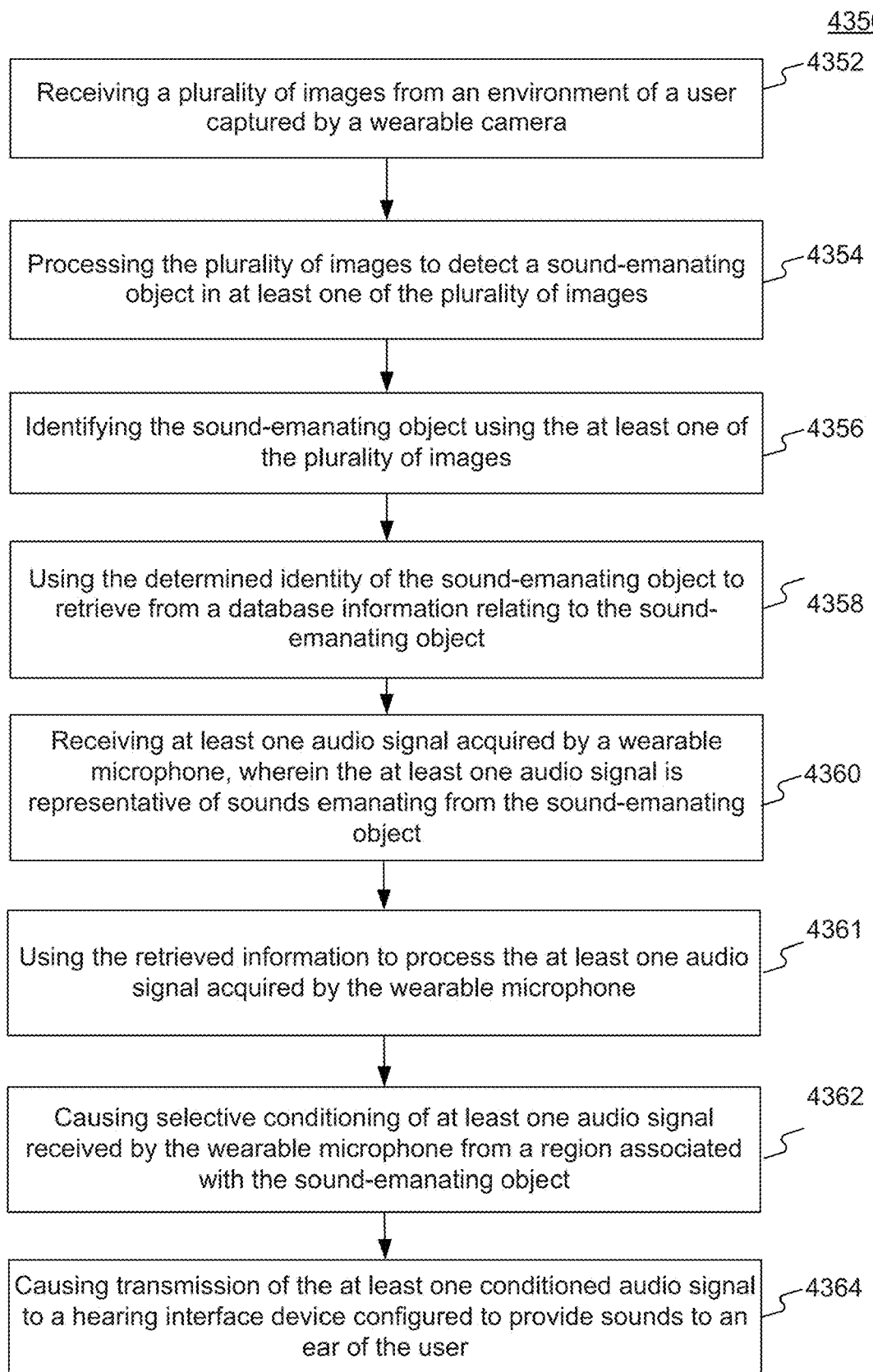
FIG. 43B is a flowchart showing another exemplary process for selectively conditioning audio signals associated with a recognized object, consistent with disclosed embodiments.

FIG. 43A is a flowchart showing an exemplary process 4300 for selectively conditioning audio signals associated with a recognized object consistent with the disclosed embodiments. Process 4300 may be performed by one or more processors associated with apparatus 110, such as processor 210. In some embodiments, some or all of process 4300 may be performed by devices external to apparatus 110, such as hearing interface device 1710 or computing device 120. In other words, the processing device performing process 4300 may include at least one processor located in a single housing including the wearable camera and the wearable microphone, or a plurality of processors located in separate housings.

In step 4302, the processing device may receive audio signals acquired by a wearable microphone. The audio signals may be representative of sounds emanating from objects in an environment of user 100. Consistent with the present disclosure, the received audio signals may include any form of data generated in response to sounds within a range of between 10 to 30,000 hertz (e.g., between 20 to 20,000 hertz) in the environment of user 100. For example, the audio signals may represent sounds generated by multiple sound-emanating objects. Consistent with the present disclosure, the wearable microphone may include one or more directional microphones, a microphone array, a multi-port microphone, or various other types of microphones. The processing device may be configured to determine a directionality of sounds in the environment of user 100. Accordingly, the audio signals may be indicative of a region of the environment of user 100 associated with a sound-emanating object that generated the sounds represented by the audio signals.

In step 4304, the processing device may analyze the received audio signals to obtain an isolated audio stream associated with a sound-emanating object in the environment of user 100. In one embodiment, the processing device may analyze the received audio signals by using audio sample convolution. Specifically, speaker separation and other audio analysis algorithms described in this disclosure may use audio sample convolution. For example, by convoluting past samples when calculating a value for a present sample, and avoiding waiting for future samples, the delay providing the analysis results may be significantly reduced. For example, the delay in generating an isolated audio stream (or any other processed audio stream) for each sound-emitting object may be less than 50 mSec (e.g., less than 10 mSec, less than 5 mSec, or less than 1 mSec). In the scenario illustrated in FIG. 41B, the processing device may generate an isolated audio stream for each of the two speakers in front of user 100. Each isolated audio stream may include of the voice of a speaker isolated from any other sounds such as background noises or other voices.

In step 4306, the processing device may determine an audioprint from the isolated audio stream. In one embodiment, the determined audioprint may be a voiceprint associated with an individual. In another embodiment, the determined audioprint may be associated with a non-human sound-emitting object, such as, AC, a car, an animal, etc. The determination of the audioprint may be performed by extracting spectral features, also referred to as spectral attributes, spectral envelope, or spectrogram from the isolated audio stream. In one embodiment, the isolated audio stream may be inputted into a computer-based model such as a pre-trained neural network, which outputs audioprint based on the extracted features. The determined audioprint may be used to identify the sound-emitting object to cause selective conditioning of its associated audio signals. Consistent with the present disclosure, the processing device may access at least one identification database storing a set of reference audioprints for different sound-emanating objects. The set of reference audioprints may be previously determined by the processing device, or determined by a different processing device. The set of reference audioprints may be used in determining the audioprint of the sound-emitting object. For example, the processing device may select the most similar audioprint from the set of reference audioprints as the determined audioprint of the sound-emitting object. In another embodiment, the set of reference audioprints may be used in identifying the sound-emanating object. For example, the processing device may trigger a comparison between the determined audioprint and the set of reference audioprints to determine an identity of the sound-emanating object.

In some cases, when the determined audioprint matches one of the sets of reference audioprints, the processing device may cause the conditioning of at least one audio signal based on predefined settings associated with the identity of the sound-emanating object. In other cases, when the determined audioprint fails to match any of the sets of reference audioprints, the processing device may determine at least one indicator of a level of similarity between a specific reference audioprint and the determined audioprint. Based on a comparison of the at least one indicator of a level of similarity with a predetermined threshold, the processing device may cause the conditioning of at least one audio signal based on predefined settings associated with the specific reference audioprint. In addition, when the determined audioprint fails to match any of the sets of reference audioprints, the processing device may determine at least one indicator of a level of similarity between a specific reference audioprint and the determined audioprint. Based on a comparison of the at least one indicator of a level of similarity with a predetermined threshold, the processing device may update the set of reference audioprints based on the determined audioprint. In some embodiments, the set of reference audioprints may include a plurality of reference audioprints associated with a single sound-emitting object. For example, the set of reference audioprints may include a first reference audioprint for a specific individual determined based on an instance where the specific individual was standing next to user 100, and a second reference audioprint for the specific individual determined based on an instance where a voice of the specific individual was projected from a communication device.

In step 4308, the processing device may use the audioprint to retrieve from a database information relating to the sound-emanating object. In one embodiment, the retrieved information may be indicative of a pre-existing relationship between user 100 and the sound-emanating object. Accordingly, the processing device cause selective conditioning of at least one audio signal based on the pre-existing relationship. For example, the processing device may apply a hierarchy of amplifications to audio signals associated with a plurality of sound-emanating objects having various levels of pre-existing relationships. Consistent with the present disclosure, the retrieved information may include at least one predefined audio conditioning parameter value to apply to the audio stream associated with the sound-emanating object. The at least one predefined audio conditioning parameter may include pitch, loudness, cadence, smoothness, intonation, and more. In one embodiment, the at least one predefined audio conditioning parameter value included in the retrieved information may be dependent on an audio hierarchy and the sound-emanating object's position in the audio hierarchy (e.g., a fire alarm may be ranked higher than office chatter). In a first example, the value of the retrieved at least one predefined audio conditioning parameter may cause amplification of audio signals associated with a particular sound-emanating object at a level higher than for another sound-emanating object lower on the audio hierarchy than the particular sound-emanating object. In a second example, the value of the retrieved at least one predefined audio conditioning parameter may cause attenuation of the audio signals associated with a particular sound-emanating object at a level lower than for another sound-emanating object higher on the audio hierarchy than the particular sound-emanating object. In a third example, the value of the retrieved at least one predefined audio conditioning parameter may cause a change in tone associated with the audio signals associated with a particular sound-emanating object. In this example, objects higher in the hierarchy may receive tone modification while lower ranked objects may receive no tone change.

In step 4310, the processing device may cause selective conditioning of at least one audio signal received by the wearable microphone from a region associated with the at least one sound-emanating object. Consistent with the present disclosure, the processing device may determine a type associated with the sound-emanating object based on a comparison of the determined audioprint with a set of reference audioprints. The type associated with the sound-emanating object may include mechanical machines, speakers, humans, animals, inanimate objects, weather-related objects, and more. After determining the type associated with the sound-emanating object, the processing device may cause the selective conditioning of the at least one audio signal based on the determined type. In addition, the processing device may analyze the received audio signals to isolate audio packets determined to be associated with multiple sound-emanating objects in the environment of user 100. For example, the multiple sound-emanating objects may include a first individual and a second individual. Accordingly, the processing device may cause a first selective conditioning of audio signals associated with the first individual based on retrieved information associated with the first individual, and cause a second selective conditioning, different from the first selective conditioning of audio signals, associated with the second individual based on retrieved information associated with the second individual. For example, amplifying audio signals associated with the first individual and pitch enhancement to audio signals associated with the second individual. FIG. 42D shows how the processing device may cause a first selective conditioning to audio signals associated with the first individual and a second selective conditioning to audio signals associated with the second individual.

In step 4312, the processing device may cause transmission of the at least one conditioned audio signal to a hearing interface device configured to provide sounds to an ear of user 100. Consistent with the present disclosure, the processing device may cause a transmitter (e.g., wireless transceiver 530*a*) to transmit the conditioned audio signals to the hearing interface device via a wireless network (e.g., cellular, Wi-Fi, Bluetooth®, etc.), or via near-field capacitive coupling, other short-range wireless techniques, or via a wired connection. In addition, the processing device may cause transmission of unprocessed audio signals together with the conditioned audio signals to the hearing interface device.

FIG. 43B is a flowchart showing another exemplary process 4350 for selectively conditioning audio signals associated with a recognized object consistent with the disclosed embodiments. Similar to process 4300, process 4350 may be performed by one or more processors associated with apparatus 110 or by devices external to apparatus 110. In other words, the processing device performing process 4350 may include at least one processor located in a single housing including the wearable camera and the wearable microphone, or a plurality of processors located in separate housings.

In step 4352, the processing device may receive a plurality of images from an environment of user 100 captured by a wearable camera. For example, the suggested system may include a processor (e.g., processor 210) configured to receive a plurality of images of the environment of user 100 captured by an image sensor (e.g., image sensor 220). Consistent with the present disclosure, the plurality of images may include frames of a video stream captured by the wearable camera.

In step 4354, the processing device may process the plurality of images to detect a sound-emanating object in at least one of the plurality of images, and in step 4356, the processing device may identify the sound-emanating object using the at least one of the plurality of images. As used herein, the term "detecting a sound-emanating object" may broadly refer to determining an existence of the sound-emanating object. For example, the system may determine the existence of a plurality of distinct sound-emanating objects. By detecting the plurality of sound-emanating objects, the system may acquire different details relative to the plurality of sound-emanating objects (e.g., how many sound-emanating objects are present in the environment of user 100), but it does not necessarily gain knowledge of the type of object. In contrast, the term "identifying a sound-emanating object" may refer to determining a unique identifier associated with a specific sound-emanating object that allows the system to uniquely access records associated with the sound-emanating object in a database (e.g., database 4112). In some embodiments, the identification may at least in part be made based on visual characteristics of the sound-emanating object derived from images captured by the wearable camera. For example, the sound-emanating object may be an individual speaking with user 100 and the visual characteristics of the sound-emanating object may include facial features of the individual. The unique identifier may include any combinations of numbers, letters, and symbols. Consistent with the present disclosure, the terms "determining a type of a sound-emanating object" may also be used interchangeably in this disclosure with reference to the term "identifying a sound-emanating object."

In step 4358, the processing device may use the determined identity of the sound-emanating object to retrieve from a database information relating to the sound-emanating object. In one embodiment, the retrieved information may include a reference audioprint or voice print associated with the recognized sound-emanating object. In another embodiment, the retrieved information may be indicative of a pre-existing relationship between user 100 and the recognized sound-emanating object. Accordingly, the processing device may cause selective conditioning of at least one audio signal based on the pre-existing relationship. Additional details on how the retrieved information may be used to cause selective conditioning of at least one audio signal are described above with reference to step 4308.

In step 4360, the processing device may receive at least one audio signal acquired by a wearable microphone, wherein the at least one audio signal is representative of sounds emanating from the sound-emanating objects. Consistent with some embodiments of the present disclosure, the identities of one or more of the sound-emanating objects may be determined based on the received images from the wearable camera and the at least one audio signal acquired by the wearable microphone. For example, the at least one audio signal may be used together with the received imaged to identify one or more sound-emanating objects when a confidence score corresponding to a degree of certainty that a sound emanating object represented in the captured images corresponds to one or more objects in database is below a certain threshold.

In step 4361, the processing device may use retrieved information (e.g., the information retrieved in step 4358) to process at least one audio signal (e.g., the at least one audio signal received in step 4360). In one embodiment, when the sound-emanating object is an individual, the retrieved information may include at least one detail about the individual (e.g., gender, age, ethnicity, etc.). The processing device may use the at least one detail about the individual to separate sounds associated with the individual from sounds emanating from other sound emanating objects. In another embodiment, the retrieved information may include a reference audioprint associated with the recognized sound-emanating object and the processing device may use the reference audioprint to identify and separate sounds associated with the recognized sound emanating object from sounds emanating from other sound emanating objects. Consistent with the present disclosure, audio separation may be more efficient when the retrieved information includes a reference audioprint of a recognized individual, but for some implementations of the system at least one detail about the individual may be sufficient.

In step 4362, the processing device may cause selective conditioning of the audio signal received by the wearable microphone from a region associated with the at least one sound-emanating object as separated in step 4361. Thus, in this example, only the audio emanating from a particular object, for example a person the user is speaking with, may be conditioned. For example, the audio may be amplified.

In step 4364 the processing device may cause transmission of the at least one conditioned audio signal to a hearing interface device configured to provide sounds to an ear of user 100. The details described above with reference to steps 4310 and 4312 are relevant also for steps 4362 and 4364.

Selective Modification of Background Noises

Users of hearing aids systems typically find it intrusive when irrelevant background noises are amplified. Some existing hearing aids systems filter out low-frequency sounds to reduce background noises. This solution eliminates some of the background noises, but it provides a partial solution as it may eliminate important parts of speech sounds or other sounds in the environment of user 100. Other existing hearing aids systems use directional microphones to reduce the sounds from beside and behind the user. This solution provides a better signal-to-noise ratio in certain specific scenarios, but it also provides a partial solution, as some background noises are important and should not be eliminated. The disclosed hearing aid system may include a wearable device (e.g., apparatus 110) that causes selective conditioning of audio signals generated by a sound-emanating object in the environment of the user, and a hearing interface device (e.g., hearing interface device 1710) to provide selectively modified sounds to an ear of user 100. The disclosed hearing aid system may use image data to determine if the background noises are important and cause selective conditioning accordingly. For example, the hearing aid system may amplify background noises determined to be important and attenuate background noises determined not to be important.

Figure 44A:
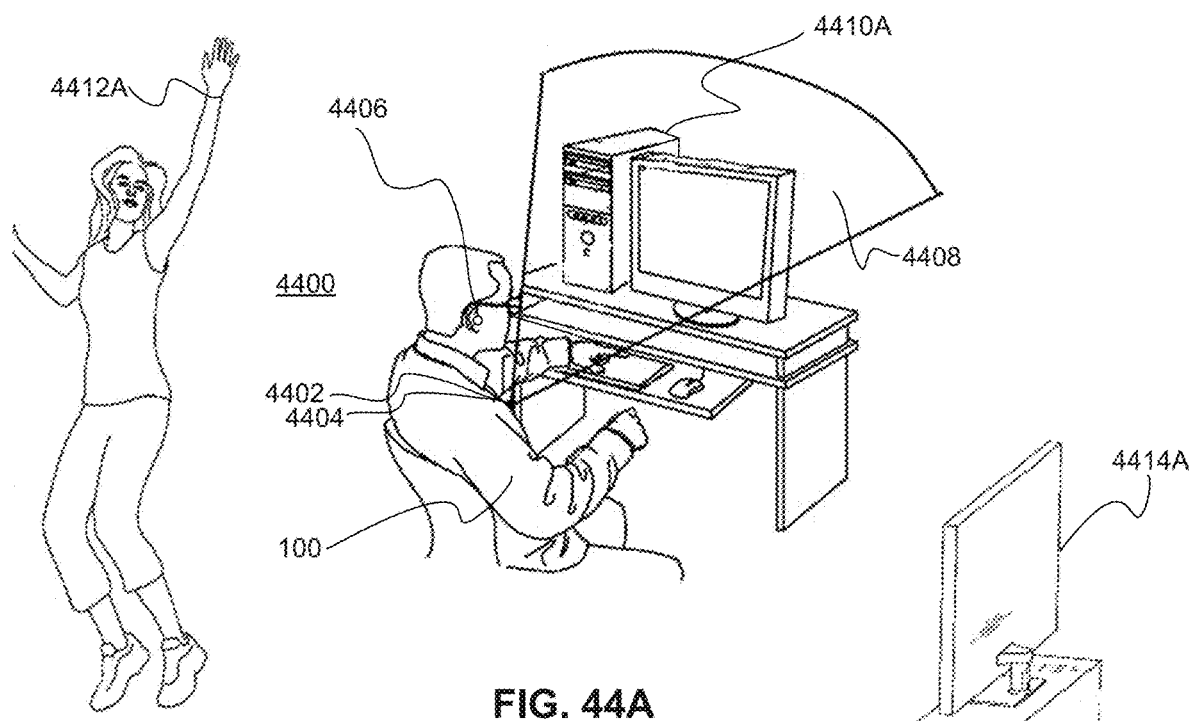
FIG. 44A is a schematic illustration showing an exemplary environment of a user that includes sound-emanating objects responsible for background noises consistent with the present disclosure.

FIG. 44A illustrates a scenario where user 100 is working at his desk. User 100 wears a hearing aid system 4400 that may include wearable camera 4402, wearable microphone 4404, and hearing interface device 4406. In the illustrated scenario, a first part of the environment of user 100 is associated with field of view 4408 of wearable camera 4402 and may include at least one sound-emanating object, and a second part of the environment of user 100 may also include at least one sound-emanating object outside field of view 4408 of wearable camera 4402. For example, the first part of the environment of user 100 may include a first sound-emanating object 4410A (e.g., a computer with speakers), and the second part of the environment of user 100 may include a second sound-emanating object 4412A (e.g., a woman) and a third sound-emanating object 4414A (e.g., a television).

Figure 44B:
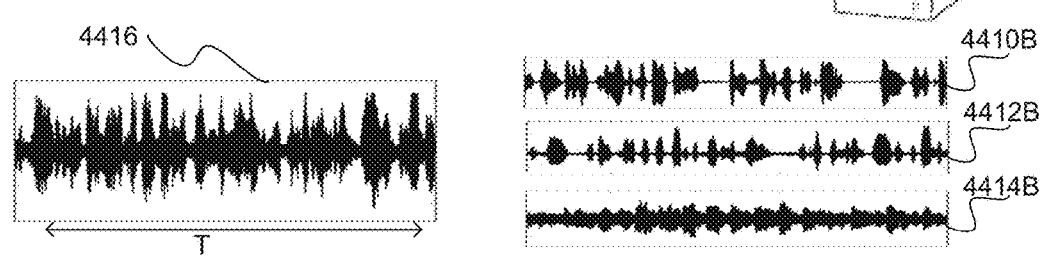
FIG. 44B is a schematic illustration of the audio signals acquired by a wearable microphone in the scenario illustrated in FIG. 44A, consistent with the present disclosure.
Figure 44C:
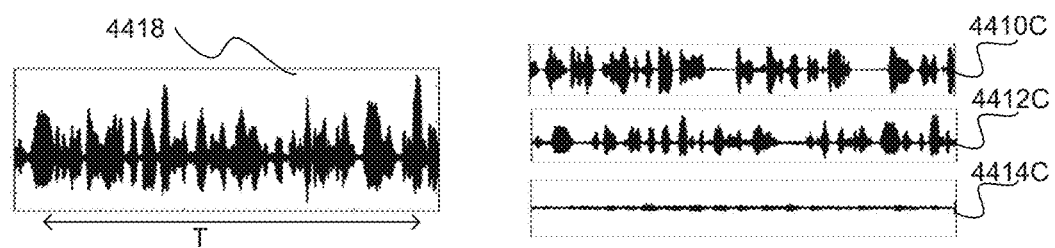
FIG. 44C is a schematic illustration of the conditioned audio signals transmitted to a hearing interface device in the scenario illustrated in FIG. 44A, consistent with the present disclosure.

FIG. 44B illustrates audio signals 4416 acquired by wearable microphone 4404 during a time period T. As shown in the figure, acquired audio signals 4416 include first audio signals 4410B from first sound-emanating object 4410A, second audio signals 4412B from second sound-emanating object 4412A, and third audio signals 4414B from third sound-emanating object 4414A. In the scenario described above, hearing aid system 4400 may determine that the sounds from second sound-emanating object 4412A are more important that the sounds from third sound-emanating object 4414A, and attenuate third audio signals 4414B generated by third sound-emanating object 4414A. FIG. 44C illustrates conditioned audio signals 4418 transmitted to hearing interface device 4406. Conditioned audio signals 4418 includes first audio signals 4410C, second audio signals 4412C, and third audio signals 4414C. In the illustrated example, only the third audio signals 4414C are conditioned; specifically, third audio signals 4414C were attenuated because hearing aid system 4400 determined that the sounds from second sound-emanating object 4412A are more important that the sounds from third sound-emanating object 4414A.

In one embodiment, hearing aid system 4400 may use image data captured by wearable camera 4402 during time period T to determine the importance of the audio signals. For example, hearing aid system 4400 may determine from the image data that user 100 is sitting in his office and use this information to identify the woman based on her voice as his supervisor. Hearing aid system 4400 may determine the importance of the sounds from the woman based on her identity. In another embodiment, the image data may be captured by wearable camera 4402 before time period T. For example, while user 100 walked to his desk, or sat at his desk and turned around, wearable camera 4402 captured at least one image of the woman participating in an activity. Hearing aid system 4400 may determine the importance of the sounds from the woman based on the activity the woman participated in.

FIG. 45 is a block diagram illustrating the components of hearing interface device 4406 configured to communicate with apparatus 110 and computing device 120, according to example embodiments. As shown in FIG. 45, hearing interface device 4406 may include a receiver 4500, an electroacoustic transducer 4502, a processor 4504, a memory 4506, and a mobile power source 4508. Receiver 4500 may be used to receive data (e.g., audio signals, data about sound-emitting objects, and more) from apparatus 110 and/or from computing device 120. Electroacoustic transducer 4502 may be used to generate sounds based on the received data. The generated sounds may be provided to an ear of user 100. In one embodiment, electroacoustic transducer 4502 may include a speaker. In another embodiment, electroacoustic transducer 4502 may include a bone conduction microphone. Processor 4504, memory 4506, and mobile power source 4508 may operate in a manner similar to processor 210, memory 550, and mobile power source 520 described above. As will be appreciated by a person skilled in the art, having the benefit of this disclosure, numerous variations and/or modifications may be made to hearing interface device 4406. Not all of the components included in the illustrated configuration of hearing interface device 4406 are essential for the operation of hearing aid system 4400. Any component may be located in any appropriate apparatus and the components may be rearranged into a variety of configurations while providing the functionality of the disclosed embodiments. For example, in one configuration, hearing interface device 4406 may include a processor for selective conditioning of received audio signals. In another configuration, hearing interface device 4406 may receive audio signals selectively conditioned by a processor located in a separate device (e.g., apparatus 110 or computing device 120).

In one embodiment, receiver 4500 may receive at least one audio signal. The at least one audio signal may have been acquired by a wearable microphone (e.g., wearable microphone 4404). The at least one audio signal may have been selectively conditioned by at least one processor (e.g., processor 210 or processor 540). The at least one processor may receive a plurality of images captured by a wearable camera (e.g., wearable camera 4402) and determine, based on an analysis of the plurality of images, that the at least one sound was generated by a remote sound-emanating object outside of a field of view of the wearable camera. Thereafter, the at least one processor may cause the conditioning of the audio signal based on information about the remote sound-emanating object retrieved from at least one memory (e.g., memory 550a, memory 550b, or memory 4506). Consistent with embodiments of the present disclosure, processor 4504 of hearing interface device 4406 may have at least some of the capabilities of: selective conditioning audio signals, processing image data to identify objects, and processing audio data to recognize sounds. Accordingly, the functionality described in this disclosure with reference to a processing device located in apparatus 110 may be also executed by processor 4504. For example, receiver 4500 may receive nonconditioned audio signals acquired by wearable microphone 4404 and, thereafter, processor 4504 may determine the importance of at least one audio signal and cause selective conditioning of the at least one audio signal based on information retrieved from at least one memory.

Figure 46A:
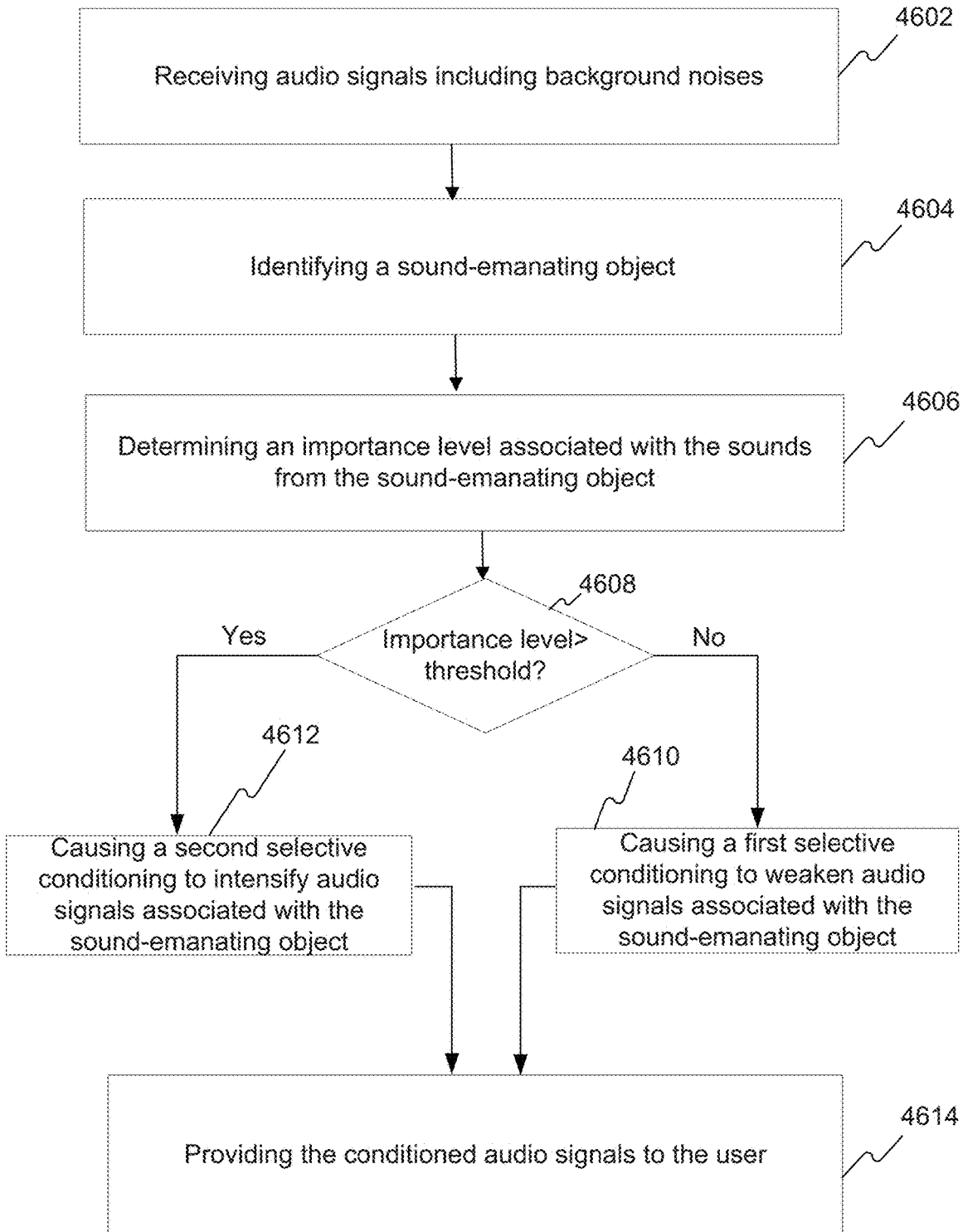
FIG. 46A is a flowchart showing an exemplary process for selective modification of background noises based on determined importance levels, consistent with disclosed embodiments.

FIG. 46A is an illustrative process 4600 for causing selective modification of background noises based on determined importance levels. The importance level assigned to audio signals associated with a background noise may represent the likelihood that user 100 may be interested in hearing said background noise. Consistent with the present disclosure, the importance levels assigned to audio signals associated with background noises may be determined based on the content of the background noises, the identity of the sound-emitting objects that generate the background noises, the context of the background noises, and more. For example, the importance level of a background noise may be classified into multiple levels, such as "nuisance," "relevant," and "critical." Alternatively, the importance level may be represented as a numeric value between one and ten, where one is not important at all and ten is very important.

At step 4602, the hearing aid system (e.g., hearing aid system 4400) may receive audio signals including background noises. The background noises may include sounds from one or more sound-emanating objects in the environment of user 100, but outside of field of view 4408, for example, sounds from second sound-emanating object 4412A and sounds from third sound-emanating object 4414A. The audio signals may be received separately, for example through directional microphones. Additionally, or alternatively, the audio signals may be received together and thereafter separated, using for example known audio prints of a specific human, known patterns, for example the sound on an A/C, or the like.

At step 4604, the hearing aid system may identify one or more sound-emanating objects responsible for at least some of the background noises. Consistent with the present disclosure, the hearing aid system may identify the sound-emanating object using information from one or more images captured by wearable camera 4402. For example, the hearing aid system may determine from captured image data that user 100 is at his home and use this information to determine the identity of the sound-emanating object responsible for at least some of the background noises.

At step 4606, the hearing aid system may determine an importance level associated with the sounds from the sound-emanating object. In one embodiment, the determination of the importance level may be based on a detected voiceprint of the sound-emanating object. In another embodiment, the determination of the importance level may be based on an analysis of a plurality of images captured by wearable camera 4402. For example, when wearable microphone 4404 detects audio signals associated with a car honk when user 100 walks down the street, the hearing aid system may rank the importance level to these audio signals as 7.5. Alternatively, when wearable microphone 4404 detects audio signals associated with a car honk when user 100 sits in a restaurant, the hearing aid system may rank the importance level to these audio signals as 2.8. In addition, the determination of the importance level may be based on context derived from analysis of at least one image captured by wearable camera 4402 before receiving the background noises. For example, the hearing aid system may determine that user 100 may put a baby in bed based on image analysis and, five minutes later, wearable microphone 4404 may detect a baby crying. In this case, the hearing aid system may categorize the audio signals associated with the baby crying as "critical." In another embodiment, the determination of the importance level may be based on context derived from audio signals representative of sounds acquired before receiving the sounds from the sound-emanating object. For example, a person related to user 100 may have asked user 100 to take care of a baby and, five minutes later, wearable microphone 4404 may detect a baby crying. In this case, the hearing aid system may categorize the audio signals associated with the baby crying as "critical." In another case, the hearing aid system may determine user 100 is on a plane and that the baby crying in the background is not related to user 100. In this case, the hearing aid system may categorize the audio signals associated with the baby crying as "nuisance."

At step 4608, the hearing aid system may determine if the importance level is greater than a threshold based on retrieved information. The term "threshold" is used herewith to denote a reference value, a level, a point, or a range of values such that when the importance level is above it the hearing aid system may follow a first course of action and when the importance level is under it the hearing aid system follows a second course of action. The value of the threshold may be predetermined for each sound-emitting object or dynamically selected based on the context determined based on image data.

If the importance level is determined to be less than the threshold, the hearing aid system may cause a first selective conditioning to weaken audio signals associated with the sound-emanating object (step 4610). In one embodiment, when the hearing aid system determines that an importance level of the sound-emanating object is lower than the threshold, the first selective conditioning may include attenuating audio signals associated with the sound-emanating object. For example, background noises from the AC may be considered to be unimportant, so they can be silenced relative to sounds from other sound-emanating objects. Alternatively, the first selective conditioning may include amplifying audio signals associated with other sound-emanating objects. Consistent with the present disclosure, the hearing aid system may determine that the importance level of the at least one sound is lower than the threshold based on analysis of a plurality of images from wearable camera 4402.

If the importance level is determined to be greater than the threshold, the hearing aid system may cause a second selective conditioning to intensify audio signals associated with the sound-emanating object (step 4612). In one embodiment, when the hearing aid system determines that an importance level of the sound-emanating object is greater than the threshold, the second selective conditioning may include amplifying audio signals associated with the sound-emanating object. For example, background noises from certain colleagues may be considered to be important, so they can be amplified relative to sounds from other sound-emanating objects. Alternatively, the second selective conditioning may include attenuating audio signals associated with other sound-emanating objects.

In one embodiment, the hearing aid system may determine that the background noises were generated by a plurality of sound-emanating objects outside the field of view of the wearable camera. Consistent with this embodiment, the hearing aid system may identify the plurality of sound-emanating objects and rank the plurality of remote sound-emanating objects based on their corresponding importance levels. Thereafter, the hearing aid system may cause selective conditioning of a plurality of sounds associated with the plurality of remote sound-emanating objects based on their corresponding importance levels. For example, with reference to FIG. 44A, the hearing aid system may rank the sounds from third sound-emanating object 4414A with a lower importance level than the sounds from third sound-emanating object 4414. Accordingly, the audio signals from second sound-emanating object 4412A may be amplified and the audio signals from third sound-emanating object 4414A may be attenuated.

After selective conditioning of audio signals associated with the sound-emanating object, the hearing aid system may provide the conditioned audio signals to user 100 (step 4614). The conditioned audio signals may be provided to user 100 using electroacoustic transducer 4502 of hearing interface device 4406. In one embodiment, the hearing aid system may notify user 100 about background noises that were substantially removed in the conditioned audio signals.

For example, the hearing aid system may send to computing device 120 an indication about at least one sound-emitting object that its audio signals were attenuated. After receiving a feedback from user 100 regarding the at least one sound-emitting object, hearing aid system may avoid attenuating audio signals of the at least one sound-emitting object in the future.

Figure 46B:
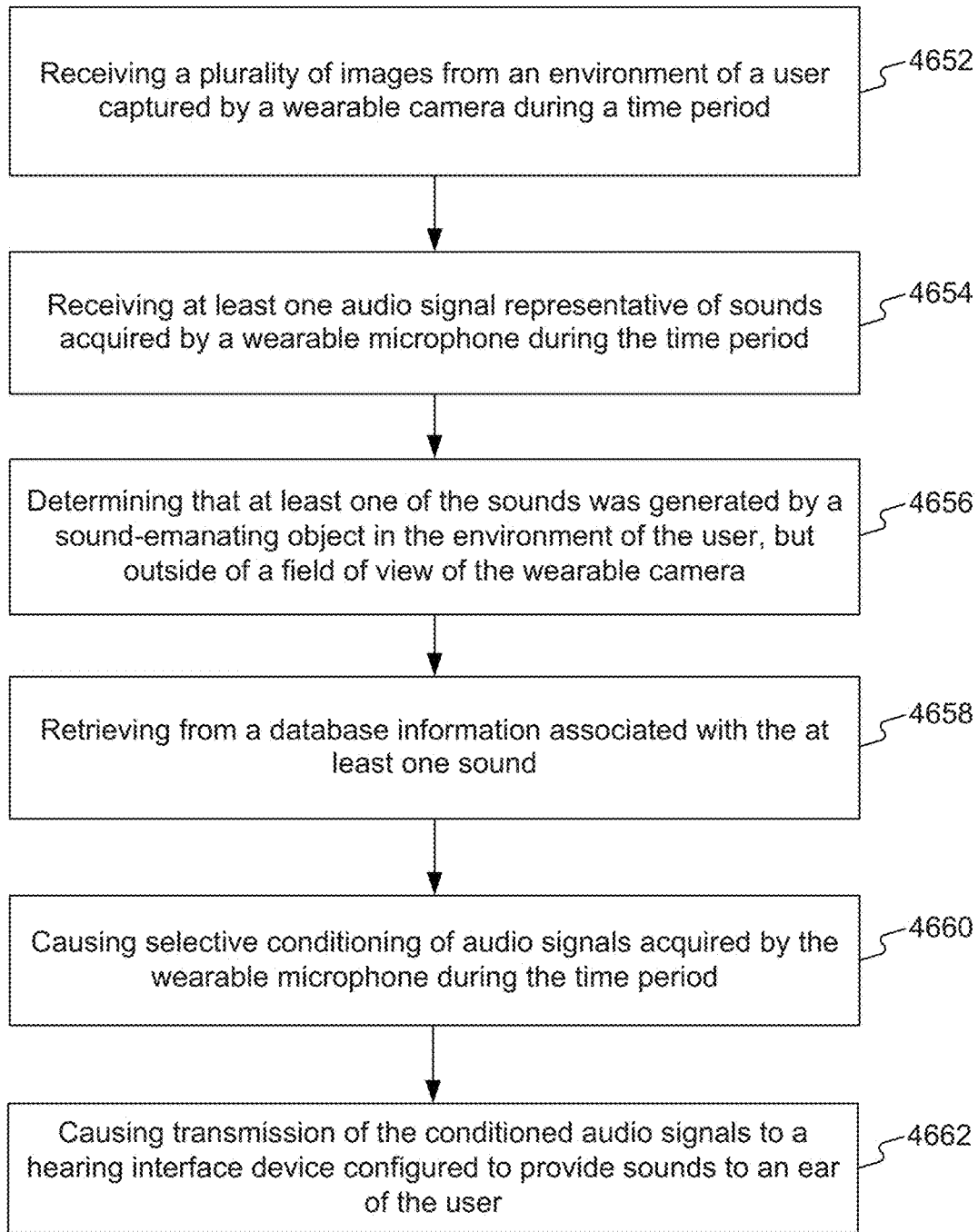
FIG. 46B is a flowchart showing an exemplary process for selective modification of background noises, consistent with disclosed embodiments.

FIG. 46B is a flowchart showing an exemplary process 4650 for selective modification of different types of background noises consistent with disclosed embodiments. Process 4650 may be performed by one or more processors associated with apparatus 110, such as processor 210. In some embodiments, some or all of process 4650 may be performed by processors external to apparatus 110, such as processor 4504 in hearing interface device 4406 or processor 540 in computing device 120. In other words, the at least one processor performing process 4650 may be included in the same common housing as wearable camera 4402 and wearable microphone 4404 or may be included in a separate housing.

In step 4652, a processing device (e.g., processor 210) may receive image data from an environment of user 100 captured by wearable camera 4402 during a time period. Consistent with the present disclosure, the received image data may include any form of data retrieved from optical signals in the near-infrared, infrared, visible, ultraviolet spectrums or multi-spectral. The image data may include video clips, one or more images, or information derived from processing one or more images. For example, the image data may include details about objects (e.g., sound-emanating objects and non-sound-emanating objects) identified in images captured by wearable camera 4402.

In step 4654, the processing device may receive at least one audio signal representative of sounds acquired by wearable microphone 4404 during the time period. Consistent with the present disclosure, wearable microphone 4404 may include microphone array and/or at least one directional microphone for capturing sounds from at least one sound-emanating object in the environment of user 100. As used herein, the term "sound-emanating object" may refer to any object capable of generating sounds within a range of between 10 to 30,000 hertz (e.g., between 20 to 20,000 hertz). Examples of sound-emanating objects may include different inanimate things (e.g., fans, speakers, traffic, wind, rain, etc.) and animate beings (e.g., people, animals). In one embodiment, the at least one audio signal may include a plurality of audio signals from multiple sound-emanating objects, each audio signal having a distinct tone, distinct cadence, distinct loudness, or distinct combination of tone, cadence, and loudness.

In step 4656, the processing device may determine that at least one of the sounds was generated by a sound-emanating object in the environment of the user, but outside of a field of view of wearable camera 4402. The sound-emanating object may be outside of the field of view of wearable camera 4402 when it generates sounds and/or when the conditioned audio signals are being transmitted to hearing interface device 4406. The processing device may determine that at least one of the sounds was generated by a sound-emanating object outside of the field of view of wearable camera 4402 by identifying the objects in the field of view of wearable camera 4402 and determining that the at least one of the sounds was not generated by any of the identified objects. The processing device may also determine that at least one of the sounds was generated by a sound-emanating object outside of the field of view of wearable camera 4402 using information about objects in the field of view of wearable camera 4402 (e.g., voiceprint, relationship, and more) retrieved from a database, or objects that are not in the field of view, but have been identified earlier in the field of view.

Consistent with the present disclosure, the processing device may analyze the at least one audio signal to determine an importance level of the sounds generated by a sound-emanating object outside of the field of view of wearable camera 4402. In one embodiment, the at least one sound may be associated with spoken words, and the processing device may identify at least one of the spoken words and determine an importance level of the at least one sound based on the identity of at least one of the spoken words. For example, the spoken words "help," "be careful," and the user's name may be associated with a higher importance level than other words. In another embodiment, the at least one sound generated by the sound-emanating object may be associated with a frequency range, and the processing device may determine an importance level of the at least one sound based on the detected frequency range. For example, a smoke alarm has a specific frequency and audio signals with that specific frequency may be associated with a higher importance level than other audio signals. For example, the processing device may determine an importance level of a siren based on context, e.g., a certain siren may be more important when user 100 is walking in the street than when user 100 is indoors.

In step 4658, the processing device may retrieve from a database information associated with the at least one sound. The database may be any device capable of storing information about one or more sound-emanating objects, and may include a hard drive, a solid-state drive, a web storage platform, a remote server, or the like. The database may be located within apparatus 110 (e.g., within memory 550a) or external to apparatus 110 (e.g., within memory 550b or within memory 4506). In some embodiments, the database may be compiled by apparatus 110 through previous audio analyses. For example, the processing device may store in the database information associated with voices and sounds recognized in audio signals captured by wearable microphone 4404. For example, each time a voice detected in the audio signals is recognized as complying with a stored voiceprint, the processing device stores information associated with the detected sound-emanating object, for example an updated voice print. The processing device may retrieve information by analyzing the audio signals and identifying the voiceprint of the sound-emanating object. The retrieved information may include details associated with the identity of the sound-emitting object. Specifically, in one embodiment, the retrieved information may be indicative of a pre-existing relationship of user 100 with the sound-emanating object, and the at least one processor may be further programmed to determine an importance level of the at least one sound based on the pre-existing relationship. For example, the woman asking for help in FIG. 44A may be the user's supervisor. In another embodiment, the processing device may determine, based on analysis of the at least one of the sounds, that the at least one of the sounds is related to a public announcement. For example, the analysis of the at least one of the sounds includes identifying a recognized word or phrase associated with the public announcement. Moreover, the processing device may determine the relevancy of the public announcement to user 100 based on automatic review of calendar data associated with user 100. The relevancy of the public announcement to user 100 may affect the determination of the importance level. For example, the processing device can access calendar data to determine that the user is on flight 641 to X destination on a certain day and time and selectively amplify announcements for this flight.

In step 4660, the processing device may cause selective conditioning of audio signals acquired by wearable microphone 4404 during the time period based on the retrieved information. Consistent with the present disclosure, the conditioning may include amplifying audio signals determined to correspond to the sound-emanating object outside of the field of view of wearable camera 4402 relative to other audio signals and/or optionally attenuation or suppression of one or more audio signals associated with a sound-emanating object inside the field of view of wearable camera 4402. Additionally, or alternatively, selective conditioning may include attenuation of audio signals determined to correspond to the sound-emanating object outside of the field of view of wearable camera 4402 relative to other audio signals and/or optionally amplifying one or more audio signals associated with a sound-emanating object inside the field of view of wearable camera 4402. Additionally, or alternatively, selective conditioning may include changing a tone or rate of speech associated with the audio signals determined to correspond to the sound-emanating object outside of the field of view of wearable camera 4402 relative to other audio signals to make the sound more perceptible to user 100 (e.g., increasing spaces between words, diction improvement, accent improvement, and more). Various other processing may be performed such as digitally reducing noise within the audio signal. Consistent with the present disclosure, the processing device may distinguish between three types of background noises. For example, the first type may be a stationary noise that is substantially constant over time, such as a refrigerator. The second type may be nonstationary noise that is relatively transient, such as the sound of a falling object. The third type may be temporary noise that is longer in time than the second type and shorter in time than the first type. Examples of the third type of background noise may include a passing car, humming in an audience, and more. The processing device may cause selective conditioning of audio signals based on the identified type of background noise.

As described above, the processing device may determine, based on the retrieved information, that an importance level of the at least one sound is greater than a threshold. In this embodiment, the selective conditioning of the audio signals may include amplifying the at least one sound based on the determination of the importance level. For example, the retrieved information may identify some audio signals as a fire alarm and rank these audio signals as important. When user 100 has a lower sensitivity to tones in a range associated with the fire alarm, the selective conditioning of the audio signals may include changing a tone of the audio signals to make the fire alarm more perceptible to user 100. In another embodiment, the selective conditioning further includes attenuating sounds generated by other sound-emanating objects. The other sound-emanating objects may be inside or outside the field of view of the camera.

In step 4662, the processing device may cause transmission of the conditioned audio signals to hearing interface device 4406, which may be configured to provide sounds to an ear of user 100. Consistent with the present disclosure, the processing device may cause a transmitter (e.g., wireless transceiver 530*a*) to transmit the conditioned audio signals to hearing interface device 4406 via a wireless network (e.g., cellular, Wi-Fi, Bluetooth®, etc.), or via near-field capacitive coupling, other short-range wireless techniques, or via a wired connection. In addition, the processing device may cause transmission of unprocessed audio signals together with the conditioned audio signals to hearing interface device 4406. In one embodiment, the conditioned audio signals may be transmitted to hearing interface device 4406 in less than 100 mSec after the at least one audio signal was acquired by wearable microphone 4404. For example, the conditioned audio signals may be transmitted to hearing interface device 4406 in less than 50 mSec, less than 30 mSec, less than 20 mSec, or less than 10 mSec after the at least one audio signal was acquired by wearable microphone 4404.

Using Voice and Visual Signatures to Identify Objects

Consistent with the disclosed embodiments, a hearing aid system may use voice and visual signatures to identify objects within an environment of a user. The hearing aid system may analyze captured images of the environment of a user to identify a sound-emanating object and determine visual characteristics of the object. When the identification is not certain (e.g., a confidence level is below a predetermined level), or based on any other criteria, the system may use a voiceprint determined from acquired audio signals to identify the object. The hearing aid system may repeat one or more portions of this process until a certainty exceeds a threshold, and then take an action based on the determined identity of the object. This association between visual and audio identification provides for faster start of audio analysis actions such as speaker separation.

Figure 47A:
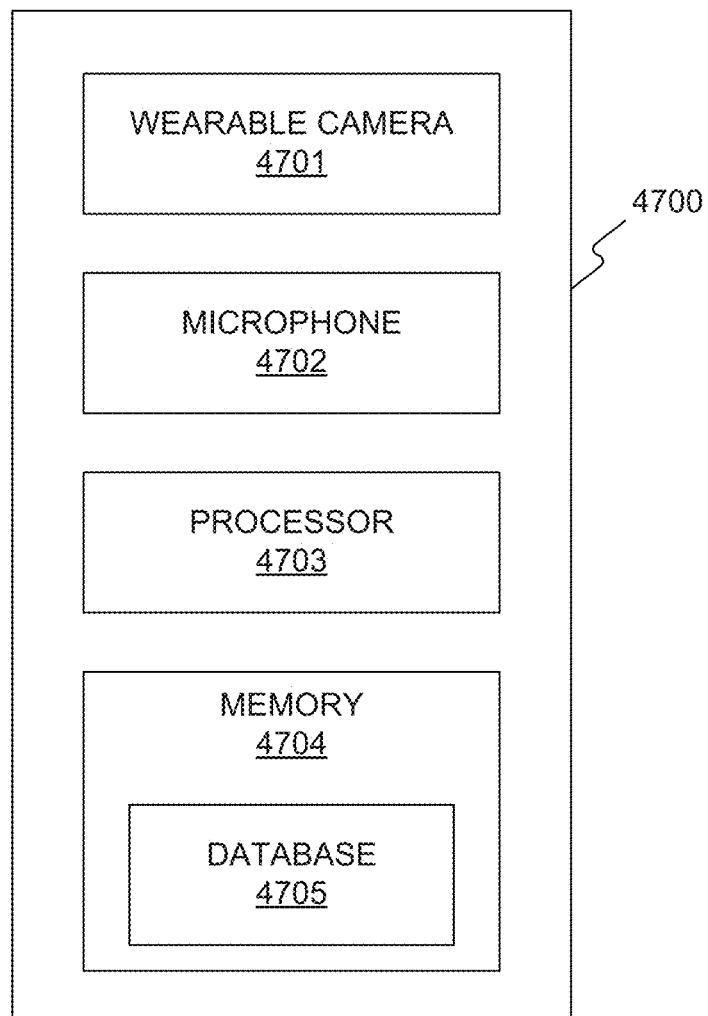
FIG. 47A is a block diagram illustrating an exemplary hearing aid system consistent with the present disclosure.

FIG. 47A is a block diagram illustrating a hearing aid system 4700 according to an example embodiment. Hearing aid system 4700 may include at least one wearable camera 4701, at least one microphone 4702, at least one processor 4703, and at least one memory 4704. Hearing aid system 4700 may further include additional components beyond those shown in FIG. 47A. For example, hearing aid system 4700 may include one or more components described above with respect to FIGS. 5A-5C. Further, the components shown in FIG. 47A may be housed in a single device or may be contained in one or more different devices.

Wearable camera 4701 may be configured to capture one or more images from the environment of user 100. In some embodiments, wearable camera 4701 may be included in a wearable camera device, such as apparatus 110. For example, wearable camera 4701 may be camera 1730, as described above, which may also correspond to image sensor 220.

Microphone 4702 may be configured to capture sounds from the environment of user 100. In some embodiments, camera 4701 and microphone 4702 may be included in the same device. Similar to wearable camera 4701, microphone 4702 may be included in a wearable camera device, such as apparatus 110. For example, apparatus 110 may comprise microphone 1720, as described with respect to FIG. 17B, which may be configured to determine a directionality of sounds in the environment of user 100. As discussed above, apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to apparatus 110 or processor 210 may be performed by computing device 120 and/or processor 540. Apparatus 110 may also communicate with a hearing interface device worn by user 100, such as hearing interface device 1710. Such communication may be through a wired connection, or may be made wirelessly (e.g., using a Bluetooth™, NFC, or forms of wireless communication).

Processor 4703 may be configured to receive and process images and audio signals captured by wearable camera 4701 and microphone 4702. In some embodiments, processor 3803 may be associated with apparatus 110, and thus may be included in the same housing as wearable camera 4701 and microphone 4702. For example, processor 4703 may correspond to processors 210, 210a or 210b, as described above with respect to FIGS. 5A and 5B. In other embodiments, processor 4703 may be included in one or more other devices, such as computing device 120, server 250 (FIG. 2) or various other devices. In such embodiments, processor 4703 may be configured to receive data remotely, such as images captured by wearable camera 4701 and audio signals captured by microphone 4702.

Memory 4704 may be configured to store information associated with sound emanating objects in the environment of user 100. Memory 4704 may be any device capable of storing information about one or more objects, and may include a hard drive, a solid state drive, a web storage platform, a remote server, or the like. Memory 4704 may be located within apparatus 110 (e.g., within memory 550) or external to apparatus 110.

Figure 47B:
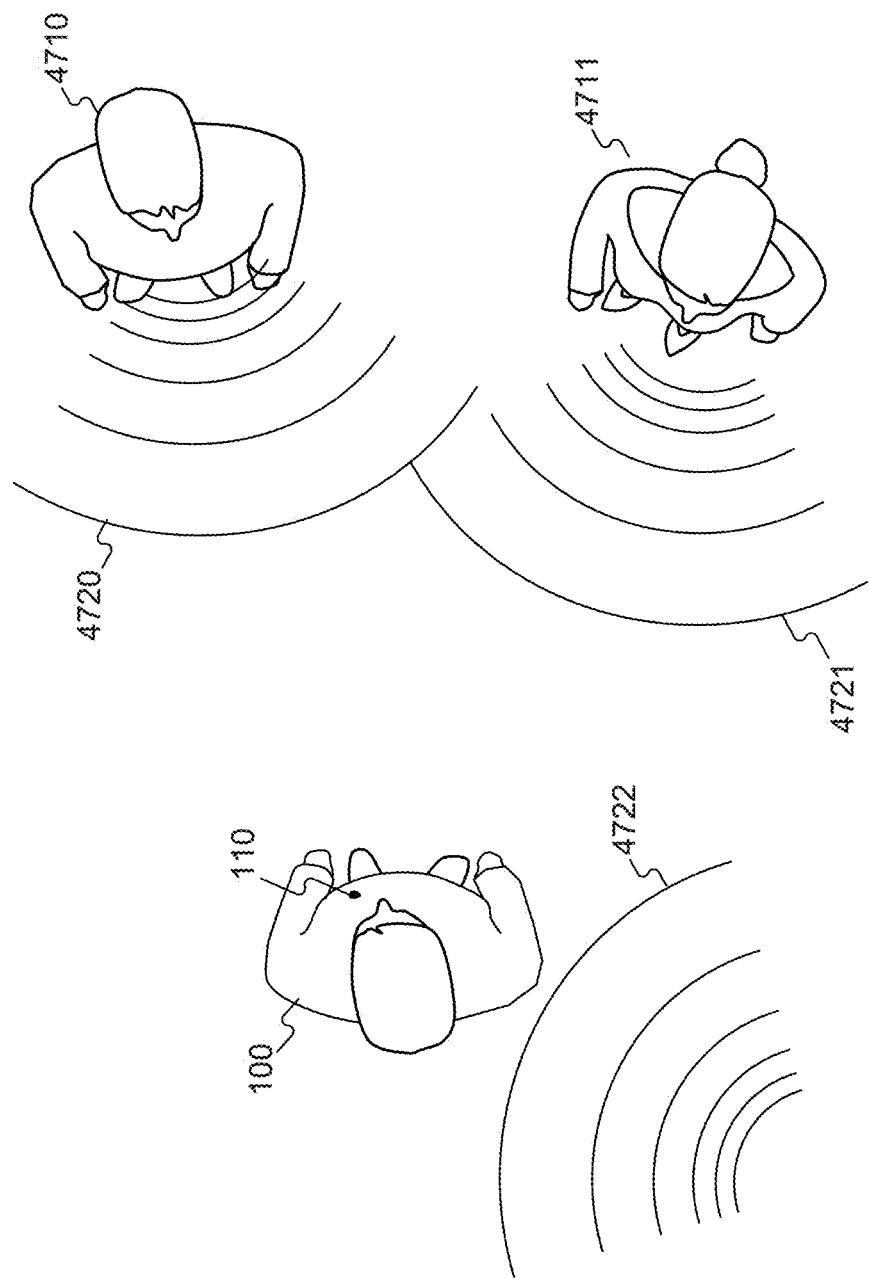
FIG. 47B is a schematic illustration showing an exemplary environment for using voice and visual signatures to identify objects consistent with the present disclosure.

FIG. 47B is a schematic illustration showing an exemplary environment for using voice and visual signatures to identify objects consistent with the present disclosure. The environment of user 100 may include one or more sound-emanating objects. The sound emanating objects may include any objects capable of emitting sounds that are perceptible to user 100 or apparatus 110. For example, the sound emanating objects may be sound emanating objects 4710 and 4711, shown in FIG. 47. In some instances, sound emanating objects 4710 or 4711 may be an individual, as shown in FIG. 47. In other embodiments sound emanating objects 4710 or 4711 may be a device, such as a radio, a speaker, a television, a mobile device (e.g., a mobile phone, tablet, etc.), a computing device (e.g., personal computer, desktop computer, laptop, gaming console, etc.), vehicles, alarms, or any other device capable of emitting sounds. The sound-emanating objects 4710 or 4711 may also include other objects, such as pets, animals, insects, natural features (e.g., streams, trees, etc.) or any other objects that may emanate sounds.

Hearing aid system 4700 may be configured to receive images and/or audio signals associated with sound emanating objects 4710 and/or 4711. For example, wearable camera 4701 may be included in apparatus 110, worn by user 100. Wearable camera 4701 may capture an image including a representation of sound emanating object 4710 within the environment of user 100. The image may contain representations of other objects or features within the environment of user 100. Processor 4703 may receive a plurality of images captured by wearable camera 4701 and analyze the images to determine visual characteristics of sound emanating object 4710. Such visual characteristics may include any features of the object represented in the image. For example, the visual characteristics may include a color, shape, size, or the like. In some embodiments the visual characteristics may be indicative of a type of the sound emanating object. For example, the visual characteristics may identify whether sound emanating object 4710 is an individual or an inanimate object, a classification of the object (e.g., television, vehicle, animal, person, etc.), an identity of an individual, an identity of the object, or other similar object type classifications. Accordingly, processor 4703 may use one or more image recognition techniques or algorithms to detect features of sound emanating object 4710. For example, processor 4703 may identify one or more points, edges, vertices or other features of the object. For example, where sound emanating object 4710 is an individual, processor 4703 may further determine the visual characteristics based on a facial analysis of an image of the individual. Accordingly, processor 4703 may identify facial features on the face of the individual, such as the eyes, nose, cheekbones, jaw, or other features. Processor 4703 may use one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like. Similar feature recognition techniques may be used for detecting features of inanimate objects as well.

Processor 4703 may further be configured to receive audio signals associated with sound emanating objects in the environment of user 100. The audio signals may be representative of one or more sounds emanating from the sound emanating object. For example, sound emanating object 4710 may emanate sound 4720, as shown in FIG. 47B. Microphone 4702 may be configured to capture sound 4720 and convert it to an audio signal to be processed by processor 4703. Sound 4720 may be any sound or noise produced by sound emanating object 4710. For example, sound 4720 may be an output of a television, mobile phone, or other device, or a sound produced by a vehicle. In instances where sound emanating object 4710 is an individual, sound 4720 may be a voice of the individual. Processor 4703 may be configured to analyze the received audio signals to determine a voiceprint of the sound emanating object. Processor 4703 may be configured to determine the voiceprint based on audio analysis of a recording of the individual. This may be performed using a voice recognition component, such as voice recognition component 2041, as described in FIG. 20B. Processor 4703 may use one or more voice recognition algorithms (e.g., Hidden Markov Models, Dynamic Time Warping, neural networks, or other techniques) to recognize the voice of the individual. The determined voiceprint may include various characteristics associated with the individual, such as an accent of the individual, the age of the individual, a gender of the individual, or the like. While the voiceprint may represent a voice pattern of an individual, the term voiceprint should be interpreted broadly to include any sound pattern or feature that may be used to identify sound emanating object 4710.

Memory 4704 may include one or more databases 4705 containing reference visual characteristics and reference voiceprints corresponding to a plurality of objects. For example, database 4705 may store a plurality of visual characteristics and may associate one or more objects with the visual characteristics. For example, database 4705 may associate a size, color, shape, or other visual characteristics with a particular type of object, such as a television or mobile phone. Database 4705 may also associate visual characteristics with a specific object, rather than an object type. For example, visual characteristics may be used to identify a mobile phone or other object as belonging to user 100 or another individual known to user 100. In some embodiments, database 4705 may include a list of contacts known to user 100. Visual characteristics may include facial features used to identify a particular individual. In some embodiments, database 4705 may be associated with a social network platform, such as Facebook™, LinkedIn™, Instagram™, etc. Processor 4703 may be configured to access database 4705 to identify sound emanating object 4710. For example, processor 4703 may compare visual characteristics determined from the captured images to visual characteristics stored within database 4705. Processor 4703 may determine a match between the sound emanating object represented in the images and an object in database 4705 based on how closely the visual characteristics match. In some embodiments, processor 4703 may further be configured to determine a confidence score associated with the match. For example, the confidence score may be based on the number of visual characteristics detected in the image that match visual characteristics in the database for a given object. The confidence score may also be based on the degree to which the visual characteristics match those in database 4705. For example, if the visual characteristic is a color, the confidence score may be based on how closely a color detected in the image matches a color represented in database 4705. The confidence score may be represented on a scale (e.g., ranging from 1-10, 1-100, etc.), as a percentage or any other suitable format. In some embodiments, identifying the object may comprise comparing the confidence score to a certain threshold value, or determining a confidence score for multiple potential objects and selecting the object with the highest score.

Database 4705 may similarly associate voiceprint data with a plurality of objects. For example, database 4705 may contain voiceprint data associated with a number of individuals, similar to the stored visual characteristic data described above. For example, processor 4703 may compare voiceprint data determined from the received audio signals to voiceprint data within database 4705. Processor 4703 may determine a match between the sound emanating object represented in the audio signals and an object in database 4705 based on how closely the voiceprint data matches. This process may be used alone, or in conjunction with the visual characteristic identification techniques described above. For example, sound emanating object may be recognized using the visual characteristics and may be confirmed using the voiceprint data, or vice versa. In some embodiments the identification of the at least one sound emanating object using the determined visual characteristics may result in a group of candidate objects, and the identification of the at least one sound emanating object may include selecting one candidate of the group of candidate objects based on the voiceprint.

Similar to the visual characteristics, processor 4703 may further be configured to determine a confidence score associated with the voiceprint match. For example, the confidence score may be based on the degree to which the voiceprint detected in the audio signals matches voiceprint data stored in database 4705 for a given object. In some embodiments, the confidence score for the voiceprint data may be combined with the confidence score based on the visual characteristics, described above. For example, a single confidence score may represent the degree of confidence that sound emanating object 4710 corresponds with an object in database 4705 based on combined analysis of the visual characteristics and the voiceprint. In some embodiments, processor 4703 may determine a confidence score based on the visual characteristics and, if the confidence score does not exceed a certain threshold, use the voiceprint data to further identify sound emanating object 4710 and refine the confidence score.

Consistent with the present disclosure, database 4703 may be built at least in part through a machine learning process. For example, database 4703 may be compiled by inputting a training data set into a training algorithm to associate various visual characteristics or voiceprints with known objects. Accordingly, identifying the sound emanating object may be based on an output of a trained neural network associated with database 4705. The trained neural network may be continuously improved as hearing aid system 4700 continues to identify objects. For example, user 100 may confirm or manually edit the identity of objects identified by processor 4703 and the neural network may be adjusted or further developed based on the feedback from user 100. Such feedback may be received through a device associated with user 100, such as apparatus 110, computing device 120, or any other device capable of interacting with hearing aid system 4700 (e.g., through a network connection, etc.).

In some embodiments, processor 4703 may be configured to determine the identity of a sound emanating object based on visual characteristics or voiceprint data associated with another sound emanating object. For example, the at least one sound emanating object may include a first sound emanating object (e.g., sound emanating object 4710) and a second sound emanating object (e.g., sound emanating object 4711). Hearing aid system 4700 may use determined visual characteristics of the first sound emanating object to identify the second sound emanating object. Similarly, hearing aid system 4700 may use the determined voiceprint of the first sound emanating object to identify the second sound emanating object. The visual characteristics or voiceprint data from first sound emanating object 4710 may be indicative of the identity of second sound emanating object 4711. For example, where the sound emanating objects are individuals, a first individual may frequently be encountered along with the second individual. As another example, an individual may frequently be associated with an object such as a mobile phone, pet, or the like. Processor 4703 may determine the identity of the object based on visual characteristics (e.g., face recognition) and voiceprint data associated with the individual. Accordingly, database 4705 (or memory 4704) may be configured to store associations between various objects within the database.

Processor 4703 may be configured to adjust the confidence score based on whether second sound emanating object 4711 was identified based on visual characteristics and/or voiceprint data of first sound emanating object 4710. For example, where second emanating object 4711 was identified based on visual characteristics and/or voiceprint data of first sound emanating object 4710 alone, processor 4703 may assign a lower confidence score. One the other hand, where second sound emanating object 4711 was identified based on visual characteristics and/or voiceprint data associated with second sound emanating object 4711 and confirmed using visual characteristics and/or voiceprint data associated with first sound emanating object 4710, processor 4703 may assign a higher confidence score than if second sound emanating object 4711 was identified based on its own visual characteristics and/or voiceprint alone.

In some embodiments, hearing aid system 4700 may be configured to perform various actions based on identifying sound emanating object 4710. In some embodiments, processor 4703 may store information relating to the identification of 4710. For example, processor 4703 may store in memory 4704 information relating to an encounter with sound emanating object 4710. This may include storing information such as the identity of the object (or identity of an individual) determined above. The information may further include a time associated with the identification, a time associated with the image or audio signal being captured, a location (e.g., of user 100 or of sound emanating object 4710), data associated with the sound emanating object (e.g., the captured images or audio signals, etc.), keywords mentioned in an encounter, or various other information. In some embodiments, processor 4703 may maintain a timeline of identified objects or other events associated with apparatus 110, and processor 4703 may add the identified sound emanating object to the timeline. In some embodiments, storing the information may include updating database 4705. For example, the information may be used for updating the visual characteristics of sound emanating object 4710 or may be used for updating the voiceprint of sound emanating object 4710. The stored information may improve the accuracy of the associations stored in database 4705 and thereby improve the accuracy of hearing aid system 4700 in future object identification.

In some embodiments, hearing aid system 4700 may be configured to condition the sound received from the sound emanating object. In some embodiments, the action performed by hearing aid system 4700 may include causing selective conditioning of at least one audio signal associated with the at least one sound emanating object and causing transmission of the at least one conditioned audio signal to a hearing interface device configured to provide sounds to an ear of the user. For example, processor 4703 may receive an audio signal associated with sound 4720 from sound emanating object 4710. Based on the identification of sound emanating object 4710, processor 4703 may selectively condition the audio signal associated with sound 4720. For example, sound emanating object 4710 may be a television and processor 4703 may selectively condition the audio of the television. Where sound emanating object 4710 is an individual, processor 4703 may determine that sound 4720 emanating from the individual should be selectively conditioned.

In some embodiments, conditioning may include changing a tone of one or more audio signals corresponding to sound 4720 to make the sound more perceptible to user 100. For example, user 100 may have lesser sensitivity to tones in a certain range and conditioning of the audio signals may adjust the pitch of sound 4720. For example, user 100 may experience hearing loss in frequencies above 10 kHz and processor 210 may remap higher frequencies (e.g., at 15 kHz) to 10 kHz. In some embodiments processor 210 may be configured to change a rate of speech associated with one or more audio signals. Processor 210 may be configured to vary the rate of speech of sound emanating object 4710 to make the detected speech more perceptible to user 100. The type and degree of selective conditioning may depend on the particular object or individual that was identified and/or on preferences of the user. For example, memory 4704 (e.g., database 4705) may store selective conditioning functions associated with particular objects.

In some embodiments, selective conditioning may include attenuation or suppressing one or more audio signals not associated with sound emanating object 4710, such as sounds 4721 and 4722, which may emanate from other objects within the environment (e.g., sound emanating object 4711), or may be background noise. Similar to amplification of sound 4720, attenuation of sounds may occur through processing audio signals, or by varying one or more parameters associated with microphone 4702 to direct focus away from sounds not associated with sound emanating object 4710.

Where more than one sound emanating object is detected, hearing aid system 4700 may selectively condition sounds associated with the sound emanating objects relative to each other. For example, the at least one sound emanating object may include a first sound emanating object (e.g., sound emanating object 4710) and a second sound emanating object (e.g., sound emanating object 4711). Selective conditioning may include attenuating a first audio signal associated with the first sound emanating object; and amplifying a second audio signal associated with the second sound emanating object. Similarly, selective conditioning may include changing a tone of a first audio signal associated with the first sound emanating object; and avoiding from changing a tone of a second audio signal associated with the second sound emanating object. Accordingly, the audio signal associated with the first sound emanating object may be more perceptible to user 100. Where the sound emanating objects are individuals, selective conditioning may include changing a rate of speech associated with the first individual and avoid from changing a rate of speech associated with the second individual. For example, processor 4703 may add short pauses between words associated with the first individual in order to make the audio more intelligible. Various other forms of selective conditioning may also be performed to improve the presentation of the audio signal to user 100.

Hearing aid system 4700 may perform other actions, such as presenting the determined identity of sound emanating object 4710 to user 100. The identity may be presented in various ways. In some embodiments, hearing aid system 4700 may audibly present the identification of the object to the user, for example, through hearing interface device 1710, computing device 120, or various other devices. Hearing aid system 4700 may read the name of the detected object to the user. Accordingly, hearing aid system may access one or more speech-to-text algorithms or software components for presenting a name of an object in database 4705. In other embodiments, prerecorded names of the objects may be stored in memory 4704. Where the sound emanating object is an individual, hearing aid system 4700 may present the name of the individual to the user and/or other information associated with the individual (e.g., a relationship to the individual, an age of the individual, names of other individuals associated with the individual, a title of the individual, etc.).

Figure 48:
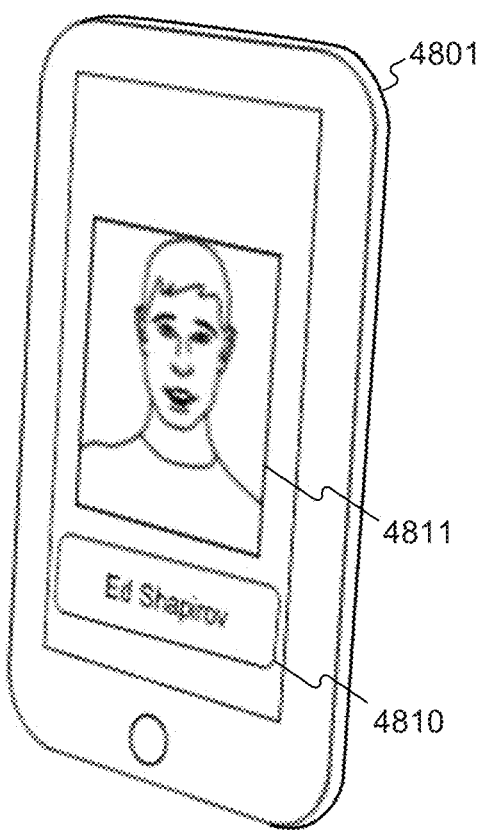
FIG. 48 is an illustration showing an exemplary device displaying the name of a sound emanating object with the present disclosure.

Hearing aid system 4700 may also present the determined identity of sound emanating object 4710 to user 100 visually. FIG. 48 is an illustration showing an exemplary device displaying the name of a sound emanating object consistent with the present disclosure. As shown in FIG. 48, hearing aid system 4700 may display information about sound emanating object 4710 on a display of device 4801. In some embodiments, device 4801 may be a paired wearable device, such as a mobile phone, tablet, personal computer, smart watch, heads up display (HUD), or the like. In embodiments where sound emanating device 4710 is an individual, the at least one action performed by hearing aid system 4700 may include causing a name 4810 of the individual to be shown on the display. Various other information may also be presented on the display. For example, device 4801 may display an image 4811 of the object or individual, as shown in FIG. 48. Where sound emanating object is an individual, hearing aid system 4700 may display various other identification information associated with the individual (e.g., a phone number, address, title, company, relationship, age, etc.). The display may also include other functionality associated with the individual, such as contacting the individual (e.g., by phone, email, SMS, etc.), access an account associated with the individual (e.g., a social media page, file sharing account or location, etc.), or the like. In some instances, the display may also include functionality for confirming or editing the identification of sound emanating object 4710, for example, to improve a trained neural network or other machine learning system, as described above.

Figure 49:
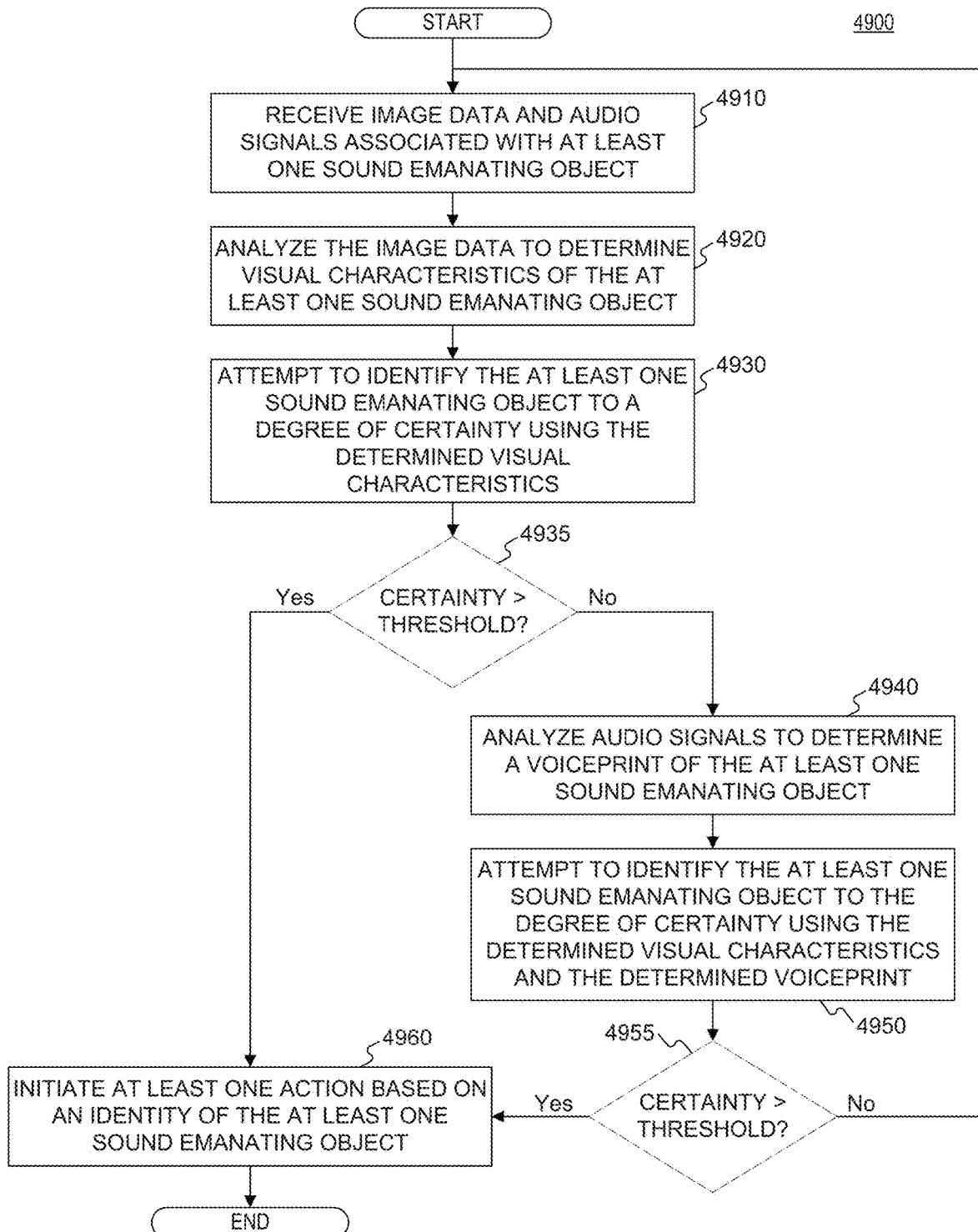
FIG. 49 is a flowchart showing an exemplary process for using voice and visual signatures to identify objects consistent with disclosed embodiments.

FIG. 49 is a flowchart showing an exemplary process 4900 for using voice and visual signatures to identify objects consistent with disclosed embodiments. Process 4900 may be performed by hearing aid system 4700, for example by processor 4703. As described above, processor 4703 may correspond to one or more other processors described in detail above, including processors 210, 210a and/or 210b. Accordingly, process 4900 may be performed by a processor associated with a wearable camera device, such as apparatus 110. Some or all of process 4900 may be performed by processors associated with other components, such as computer device 120, server 250, or other devices. As described above, hearing aid system 4900 may include memory 4704 configured to store a database (e.g., database 4705) of reference visual characteristics and reference voiceprints corresponding to a plurality of objects. Processor 4703, or the processor performing various steps of process 4900 may access memory 4704.

In step 4910, process 4900 may include receiving image data and audio signals associated with at least one sound emanating object. For example, step 4910 may include receiving a plurality of images captured by a wearable camera, wherein at least one of the plurality of images depicts at least one sound emanating object in an environment of a user. The images may be captured, for example, by wearable camera 4701 and may include a representation of sound emanating object 4710. The images may be received by processor 4703. Step 4910 may further include receiving audio signals acquired by a wearable microphone, wherein the audio signals are representative of one or more sounds emanating from the at least one sound emanating object. For example, processor 4703 may receive audio signals from microphone 4702 which may represent sound 4720 emanating from sound emanating object 4710. The audio signals may be received concurrently with the captured images, or may be received later during process 4900, for example, after an identification of sound emanating object 4710 has been made based on the captured images.

In step 4920, process 4900 may include analyzing at least one of the received plurality of images to determine one or more visual characteristics associated with the at least one sound emanating object. For example, processor 4703 may use one or more image recognition techniques to extract features from the image that are associated with sound emanating object 4710. The extracted features may be analyzed to determine the visual characteristics, which may include a color, shape, arrangement, size, or other characteristic of the object. The visual characteristics may be indicative of the type of an object, such as whether the object is an individual or an inanimate object, a classification of the object, etc. In some instances, sound emanating object 4710 may be an individual. Accordingly, step 4920 may include determining the visual characteristics based on a facial analysis of an image of the individual. Accordingly, processor 4703 may identify facial features on the face of the individual, such as the eyes, nose, cheekbones, jaw, or other features. Processor 4703 may use one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like.

In step 4930, process 4900 may include identifying (or attempting to identify) within the database in view of the one or more visual characteristics, the at least one sound emanating object and determine a degree of certainty of identification. Accordingly, process 4900 may further include accessing a database of reference visual signatures and reference voice signatures corresponding to a plurality of objects. As described above, processor 4703 may access database 4705, which may store a plurality of visual characteristics, a plurality of objects, and associations between the visual characteristics and the objects. Processor 4703 may attempt to match the visual characteristics determined in step 4920 to visual characteristics within database 4705. In some embodiments, as described above, the at least one sound emanating object may include a first sound emanating object and a second sound emanating object, and step 4930 may further comprise using determined visual characteristics of the first sound emanating object to identify the second sound emanating object. Processor 4703 may determine a confidence score corresponding to a degree of certainty that the sound emanating object represented in the captured images corresponds to one or more objects in database 4705. In some embodiments, step 4730 may include generating a confidence score for more than one object in database 4705 and identifying sound emanating object 4710 as the object in database 4710 corresponding to the highest confidence score.

In some instances, the at least one sound emanating object may be identified based on the visual characteristics alone. In some instances, however, process 4900 may further include identifying the at least one sound emanating object based on audio signals associated with the sound emanating object(s). Accordingly, process 4900 may include a step 4935 of determining whether identification based on the visual characteristics is sufficient. For example, step 4935 may comprise comparing the confidence score determine in step 4930 with a certain threshold. Where the confidence scores are represented as a percentage (with 100% representing a maximum confidence), for example, the threshold may be an intermediate value (e.g. 40%, 50%, 60%, 70%, etc.). The threshold may be higher or lower depending on the use of the system. In some embodiments the threshold may vary based on various other factors or settings, for example, based on the type of object identified, an image quality, an importance value associated with correctly identifying the object, a time of day, a threshold set by a user, a threshold set by an administrator, etc.). If the confidence score exceeds the threshold, process 4900 may proceed to step 4960, as indicated in FIG. 49. If the confidence score is below the threshold, however, process 4900 may proceed to step 4940. The outcome of step 4935 may be determined by other factors besides the confidence score. For example, a user or administrator may change a setting to always proceed to step 4960 or 4940. In other embodiments the determination may be based on other factors, such as a type of the sound emanating object (e.g., whether the object is an individual, etc.) or an importance value (e.g., if hearing aid system is identifying an oncoming vehicle, etc.).

In step 4940, process 4900 may include analyzing received audio signals to determine a voiceprint of the at least one sound emanating object. As discussed above, with respect to step 4910, step 4940 may include a step of receiving audio signals acquired by a wearable microphone if the audio signals have not yet been received. The audio signals may be representative of one or more sounds emanating from the at least one sound emanating object. Processor 4703 may analyze the received audio signals to identify a voiceprint of the sound emanating object. In instances where the at least one sound emanating object is an individual, step 4940 may include determining the voiceprint based on audio analysis of a recording of the individual. For example, processor 4703 may use one or more voice recognition algorithms, such as Hidden Markov Models, Dynamic Time Warping, neural networks, or other techniques, to recognize the voice of the individual. The determined voiceprint may include characteristics of the individual, such as an accent, age, gender, vocabulary, or the like.

In step 4950, process 4900 may include identifying the at least one sound emanating object based on the visual characteristics and the determined voiceprint. For example, processor 4703 may access database 4705, which may store voiceprint data associated with a plurality of objects. Processor 4703 may be configured to determine a match between the voiceprint determined in step 4940 and the voiceprint data stored in database 4705. In some embodiments the identification of the at least one sound emanating object using the determined visual characteristics (e.g., in step 4930) results in a group of candidate objects, and the identification of the at least one sound emanating object includes selecting one of the group of candidate objects based on the voiceprint. In other embodiments, the voiceprint data may be used to identify candidate objects independently and compare the candidate objects to those identified in step 4930. In some embodiments, as described above, the at least one sound emanating object may include a first sound emanating object and a second sound emanating object, and step 4930 may further comprise using determined visual characteristics of the first sound emanating object to identify the second sound emanating object. Step 4950 may further include determining a confidence score associated with the identification based on the voiceprint. In some embodiments, the confidence score may be cumulative, representing a confidence based on both the visual characteristic identification in step 4930 and the voiceprint identification in step 4950. In other embodiments, a voiceprint confidence score may be determined separately.

In step 4955, process 4950 may include reassessing the identification of the at least one sound emitting object. Similar to step 4935, step 4955 may comprise comparing the confidence score from step 4950 with a predetermined threshold. Threshold may be the same threshold described above with reference to step 4935 or may be a different threshold. For example, a confidence score based on a combined analysis under steps 4930 and 4950 may be subject to a higher confidence score threshold than based on step 4930 alone. The threshold value and the determination under step 4955 generally may be based on other factors as described above with respect to step 4935. If the confidence score exceeds the threshold, process 4900 may proceed to step 4960. If the confidence score does not meet the threshold value, however, process 4900 may return to step 4910. For example, hearing aid system 4700 may determine that the object cannot be identified based on the received images and audio signals and may obtain additional images and/or audio signals to complete the identification. Process 4900 may include other steps, such as sending a notification to a user indicating the identification failed, or the like.

In step 4960, process 4900 may comprise initiating at least one action based on an identity of the at least one sound emanating object. As described above, the at least one action may include causing selective conditioning of at least one audio signal associated with the at least one sound emanating object. The at least one action may further include causing transmission of the at least one conditioned audio signal to a hearing interface device configured to provide sounds to an ear of the user, such as hearing interface device 1710. For example, the selective conditioning may include varying a tone, volume, or rate of speech of the audio signal, as discussed in greater detail above. In some instances, the at least one sound emanating object includes a first sound emanating object and a second sound emanating object, and causing selective conditioning of the at least one audio signal may include attenuating a first audio signal associated with the first sound emanating object and amplifying a second audio signal associated with the second sound emanating object. The selective conditioning may further include changing a tone of a first audio signal associated with the first sound emanating object and avoiding hanging a tone of a second audio signal associated with the second sound emanating object. In some instances, the at least one sound emanating object may include a first individual and a second individual, and causing selective conditioning of the at least one audio signal may include changing a rate of speech associated with the first individual and avoiding changing a rate of speech associated with the second individual.

In some embodiments, the at least one action may include storing in the at least one memory device information relating to an encounter with the at least one sound emanating object, as described in greater detail above. The stored information may be used for updating the visual characteristics and/or voiceprint of the at least one sound emanating object in database 4705. For example, the stored information may be used to ensure that database 4705 is accurate and/or up to date, as discussed in greater detail above.

In some embodiments, where the at least one sound emanating object (e.g., sound emanating object 4710) is an individual, the at least one action may include causing a name of the individual to be shown on a display, as discussed above in reference to FIG. 48. The display may be associated with a paired wearable device (e.g., device 4801), such as a mobile phone, smartwatch, or other mobile device. Other information or functionality may also be displayed for user 100, as discussed in detail above.

Selective Input for a Hearing Aid Based on Image Data

Consistent with the disclosed embodiments, a hearing aid system may selectively condition audio signals from sound emanating objects within the environment of a user. The hearing aid system may access a database storing information about various sound emanating objects and may selectively condition audio from the sound emanating objects based on the information stored in the database. As one example, the hearing aid system may determine a relative rank or importance of the various sound emanating objects and selectively condition audio signals associated with the sound emanating objects based on the relative rank or importance. The hearing aid system may also selectively condition audio signals from the sound emanating objects based on the context, for example based on the location of the user.

The hearing aid system of the present disclosure may correspond to hearing aid system 4700, described above with respect to FIG. 47A. For example, the hearing aid system may include at least one wearable camera 4701, at least one microphone 4702, at least one processor 4703, and at least one memory 4704. While the hearing aid system for selectively condition audio signals from sound emanating objects is described in reference to hearing aid system 4700 throughout the present disclosure, it is understood that the hearing aid system may be separate and/or different from hearing aid system 4700. For example, the hearing aid system may include additional or fewer components than those shown in FIG. 47A. Further, as discussed above, the components shown in FIG. 47A may be housed in a single device or may be contained in one or more different devices.

As discussed above, wearable camera 4701 may be configured to capture one or more images from the environment of user 100. In some embodiments, wearable camera 4701 may be included in a wearable camera device, such as apparatus 110. For example, wearable camera 4701 may be camera 1730, as described above, which may also correspond to image sensor 220. Microphone 4702 may be configured to capture sounds from the environment of user 100. In some embodiments, camera 4701 and microphone 4702 may be included in the same device. Microphone 4702 may be included in a wearable camera device, such as apparatus 110. For example, apparatus 110 may comprise microphone 1720, as described with respect to FIG. 17B, which may be configured to determine a directionality of sounds in the environment of user 100. Apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to hearing aid system 4700 or processor 4703 may be performed by computing device 120 and/or processor 540.

Processor 4703 may be configured to receive and process images and audio signals captured by wearable camera 4701 and microphone 4702. As discussed above, processor 4703 may be associated with apparatus 110, and thus may be included in the same housing as wearable camera 4701 and microphone 4702. For example, processor 4703 may correspond to processors 210, 210a or 210b, as described above with respect to FIGS. 5A and 5B. In other embodiments, processor 4703 may be included in one or more other devices, such as computing device 120, server 250 (FIG. 2) or various other devices. In such embodiments, processor 4703 may be configured to receive data remotely, such as images captured by wearable camera 4701 and audio signals captured by microphone 4702.

Memory 4704 may be configured to store information associated with sound emanating objects in the environment of user 100. Memory 4704 may be any device capable of storing information about one or more objects, and may include a hard drive, a solid state drive, a web storage platform, a remote server, or the like. Memory 4704 may be located within apparatus 110 (e.g., within memory 550) or external to apparatus 110. In some embodiments, memory 4704 may further include a database, such as database 5020, which is described in detail below.

Apparatus 110 may also communicate with a hearing interface device worn by user 100. For example, the hearing aid device may be hearing interface device 1710, as shown in FIG. 17A. As described above, hearing interface device 1710 may be any device configured to provide audible feedback to user 100. Hearing interface device 1710 may be placed in one or both ears of user 100, similar to traditional hearing interface devices. Hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, a communication unit for receiving signals from another system, such as apparatus 110, microphones for detecting sounds in the environment of user 100, internal electronics, processors, memories, etc. Hearing interface device 1710 may correspond to feedback outputting unit 230 or may be separate from feedback outputting unit 230 and may be configured to receive signals from feedback outputting unit 230.

In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc. Hearing interface device 1710 may be configured to communicate with a camera device, such as apparatus 110. Such communication may be through a wired connection, or may be made wirelessly (e.g., using a Bluetooth™, NFC, or forms of wireless communication). Accordingly, hearing interface device 1710 may include a receiver configured to receive at least one audio signal and an electroacoustic transducer configured to provide sounds from the at least one audio signal to an ear of the user.

FIG. 50A is a schematic illustration showing examples of sound emitting objects that may be identified in an environment 5000 of a user consistent with the present disclosure. As discussed above, the sound emanating objects may include any objects capable of emitting sounds that are perceptible to user 100 or apparatus 110. In some instances, sound emanating objects may be a person, such as individuals 5010 and 5011 shown in FIG. 50A. In other embodiments the sound emanating objects may be a device, such as television 5012, shown in FIG. 50A. Sound emanating objects may include other devices, such as a radio, a speaker, a television, a mobile device (e.g., a mobile phone, tablet, etc.), a computing device (e.g., personal computer, desktop computer, laptop, gaming console, etc.), vehicles, alarms, or any other device capable of emitting sounds. Sound emanating objects may also include other objects, such as pets, animals, insects, natural features (e.g., streams, trees, etc.), inanimate objects, weather-related objects, or any other objects or portions of an object that may emanate sounds.

FIG. 50B is an illustration of an example database 5020 storing information associated with sound emanating objects consistent with the present disclosure. Database 5020 may be maintained on any memory associated with hearing aid system 4700, such as memory 4704. Database 4705 may correspond to database 4705, described above, or may be a separate database. In some embodiments, database 5020 may be located separately from hearing aid system 4700, for example on a remote device or server, and may be accessible by hearing aid system 4700. As shown in FIG. 50B, database 5020 may store visual characteristics of one or more sound emanating objects. The visual characteristics may include features or attributes of the sound emanating objects that may be detected by hearing aid system 4700. For example, the visual characteristics may include a size, color, shape, pattern, or other visual features of the associated sound emanating object. Visual characteristics may include facial features used to identify a particular individual.

Database 5020 may include other information about the sound emanating object, such as a name, type, relationship, level of importance, voiceprint data, and/or rules for audio conditioning. Where the sound emanating object is an individual, the name of the sound emanating object may be associated with the individual's name. The relationship stored in database 5020 may define a relationship between the individual and user 100, such as whether the individual is a friend, colleague, family relative, acquaintance, or any other forms of relationships that may be defined. For example, as shown in FIG. 50B, individual Cindy Moore may be a colleague of user 100, where individual Raj Polar may be a friend of user 100. In some embodiments, more specific relationships may be defined, such as identifying a co-worker as a manager of the user, identifying a family member as the user's father, identifying a friend as close friend, etc. In some embodiments, database 5020 may be associated with a list of contacts of user 100, a social network platform (e.g., Facebook™, LinkedIn™, Instagram™, etc.), or various other associated lists or databases, and may be configured to determine a relationship based on data received from the lists or databases.

The sound emanating object may also be a device or other object, as described above. In some instances, the name of the sound emanating object may be a generic name of the device (e.g., laptop, television, phone, etc.) In some embodiments, hearing aid system 4700 may recognize a particular device, rather than just a general device type. Accordingly, the name of the sound emanating object stored in database 5020 may be specific to the detected device. For example, the name may identify the owner of the device, (e.g., "my phone," "Terri's laptop," etc.). In some embodiments, the name may also include a serial number or other unique identifier of the device. Similarly, the relationship of the sound emanating object may indicate whether the sound emanating object is associated with user 100 in some way.

Database 5020 may further store information pertaining to selective audio conditioning of the sound emanating object. For example, the level of importance may rank the sound emanating objects in database 5020 relative to each other. In some embodiments, each device may be uniquely ranked relative to each of the other sound emanating objects in the database. In other embodiments, the sound emanating objects may be ranked on a scale (e.g., 1-5, 1-10, 1-100, etc.), as a percentage, based on predefined ranking levels (e.g., "high importance," "low importance," etc.) or any other suitable ranking method. In some embodiments, the ranking may be based on the relationship to the user. For example, family members of user 100 may be given a higher importance ranking than acquaintances of user 100. Similarly, a manager or boss of user 100 may be given a higher importance ranking than a peer of user 100. Database 5020 may also store specific audio conditioning rules associated with the sound emanating object. For example, as shown in FIG. 50B, the rules may include a predefined conditioning parameter to be applied to an audio signal associated with the sound emanating object, such as changing a pitch or volume of the audio signal. The conditioning parameter may be absolute (e.g., a set volume level, +10% volume, etc.) or may be defined relative to other sounds in the environment (e.g., increase volume relative to other sounds). In some embodiments, the rule may be associated with one or more other parameters, such as the relationship to the user. For example, the rule may apply to all family members of user 100 or may apply to individuals of a certain level of importance. In some embodiments, the rules may further include context-based conditions, for example, based on current or previous actions of user 100, the environment of user 100 or any other context-based rules. Referring to the examples shown in FIG. 50B, hearing aid system 4700 may be configured to mute a television when user 100 is not looking at it or increase the volume of an individual when they are meeting outside. Accordingly, hearing aid system 4700 may be configured to determine an environment of the user, for example, based on analyzing other objects in captured images, analyzing captured audio, using global positioning system (GPS) data, or the like. Other audio conditioning methods are described in greater detail below.

In some embodiments, database 5020 may also store voiceprint data associated with sound emanating objects. The voiceprint data may be unique to the particular sound emanating object that it is associated with (similar to the voiceprint data in database 4705, described above). Accordingly, the voiceprint may be suitable for identifying the sound emanating object. For example, processor 4703 may identify a sound emanating object, such as an individual, through the visual characteristics described above and may retrieve information associated with the sound emanating object from database 5020. In some embodiments, the information may include the voiceprint, which may be used for further identifying the sound emanating object, or the like. In some instances, the voiceprint information for a particular sound emanating object may include a set of reference voiceprints. For example, a first voiceprint of a specific individual may be associated with a scenario where the specific individual is standing next to the user, and a second voiceprint of the specific individual may be associated with a scenario where the specific individual is talking through a communication device.

In some embodiments, the information stored in database 5020 may be designated and/or modified by user 100 or another individual (e.g., a caretaker, administrator, etc.). For example, user 100 may manually add to or edit the sound emanating objects in database 5020, for example through a user interface, such as computing device 120. User 100 may define the name of the sound emanating object, the classification type, the relationships, the level of importance, and/or the rules for audio conditioning. In some embodiments, database 5020 may be built and/or modified through an automated process. For example, hearing aid system 4700 may be configured to learn one or more properties or values associated with a sound emanating object based on the interaction of user 100 with the sound emanating object. If user 100 continually increases the volume of hearing interface device 1710 when interacting with a particular sound emanating object, hearing aid system 4700 may automatically include a rule to increase the volume of audio signals associated with that sound emanating object. As another example, user 100 may more frequently look at a particular sound emanating object relative to other sound emanating objects and hearing aid system 4700 may assign a level of importance, relationship, rule for audio conditioning, or another property based on the behavior of user 100.

Figure 51A:
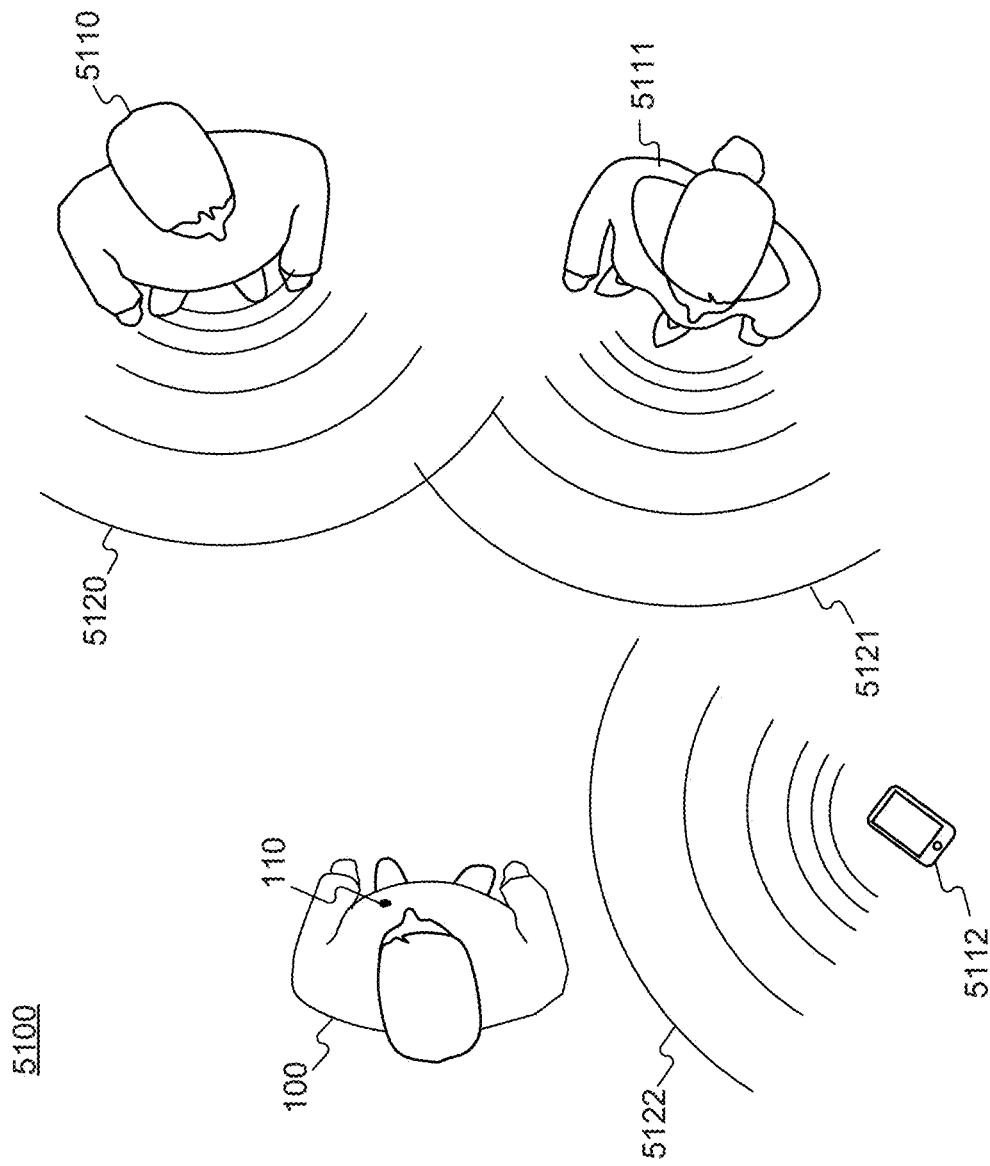
FIGS. 51A and 51B are schematic illustrations showing example environments for selectively conditioning audio signals consistent with the present disclosure.

FIG. 51A is a schematic illustration showing an example environment 5100 for selectively conditioning audio signals consistent with the present disclosure. Environment 5100 of user 100 may include one or more sound emanating objects, as discussed above. For example, environment 5100 may include sound emanating objects 5110 and 5111, which may be individuals, and sound emanating object 5512, which may be a device.

Hearing aid system 4700 may be configured to receive images and/or audio signals associated with sound emanating objects 5110, 5111, and 5112. For example, wearable camera 4701 may be included in apparatus 110, worn by user 100. Wearable camera 4701 may capture an image including a representation of sound emanating object 5110 within the environment of user 100. Processor 4703 may receive a plurality of images captured by wearable camera 4701 and analyze the images to determine visual characteristics of sound emanating object 5110. Such visual characteristics may include any features of the object represented in the image. For example, the visual characteristics may include a color, shape, size, type, or the like, which may correspond to the visual characteristic types stored in database 5020. Accordingly, processor 4703 may use one or more image recognition techniques or algorithms to detect features of sound emanating object 5110. For example, processor 4703 may identify one or more points, edges, vertices or other features of the object. Where sound emanating object 5110 is an individual, processor 4703 may further determine the visual characteristics based on a facial analysis or face recognition of an image of the individual. Accordingly, processor 4703 may use one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like. Similar feature recognition techniques may be used for detecting features of inanimate objects as well, such as sound emanating object 5112.

In addition to identifying sound emanating objects, hearing aid system 4700 may also determine a context of the sound emanating objects. Accordingly, processor 4703 may be configured to analyze other features or objects within the captured images. For example, objects such as trees, flowers, grass, buildings, etc. may indicate that user 100 is outside. Other objects, such as chairs, desks, computer screens, printers, etc. may indicate that user 100 is in an office environment. In some embodiments, processor 4703 may associate particular objects or groups of objects with a particular environment of user 100. For example, processor 4703 may recognize one or more objects to determine that user 100 is in a particular room, such as a living room of user 100, a particular office or conference room, etc. This contextual information may be used for selectively conditioning audio signals associated with a sound emanating object, as described in further detail below.

Processor 4703 may further be configured to receive audio signals associated with sound emanating objects in the environment of user 100. The audio signals may be representative of one or more sounds emanating from the sound emanating object. For example, sound emanating objects 5110, 5111, and 5112 may emanate sounds 5120, 5121, and 5122, respectively, as shown in FIG. 51A. Hearing aid system 4700 may be configured to capture sounds 5120, 5121, and 5122 (e.g., through microphone 4702) and convert them to an audio signal to be processed by processor 4703. In instances where the sound emanating object is an individual, such as sound emanating object 5110, sound 5120 may be a voice of the individual. Where the sound emanating object is a device or other object, such as sound emanating object 5112, sound 5122 may be an output of the device, such as sound from a television, mobile phone, or other device, a sound produced by a vehicle, etc.

In some embodiments, processor 4703 may be configured to determine a voiceprint of the sound emanating object. The voiceprint may be determined according to any of the methods discussed above with respect to FIG. 47B. For example, processor 4703 may use one or more voice recognition algorithms (e.g., Hidden Markov Models, Dynamic Time Warping, neural networks, or other techniques) to recognize the voice of the individual. The determined voiceprint may include various characteristics associated with the individual, such as an accent of the individual, the age of the individual, a gender of the individual, or the like. While the voiceprint may represent a voice pattern of an individual, the term voiceprint should be interpreted broadly to include any sound pattern or feature that may be used to identify a sound emanating object.

Hearing aid system 4700 may be configured to selectively condition the sound received from one or more sound emanating objects. In some embodiments, conditioning may include changing a tone of one or more audio signals corresponding to sound 5120 to make the sound more perceptible to user 100. User 100 may have lesser sensitivity to tones in a certain range and conditioning of the audio signals may adjust the pitch of sound 5120. For example, user 100 may experience hearing loss in frequencies above 10 kHz and processor 4703 may remap higher frequencies (e.g., at 15 kHz) to 10 kHz. In some embodiments, processor 4703 may be configured to receive information about the user's hearing capabilities and cause the conditioning of at least one audio signal is based on the user's hearing capabilities.

In some embodiments processor 4703 may be configured to change a rate of speech associated with one or more audio signals. Processor 4703 may be configured to vary the rate of speech of sound emanating object 5110 to make the detected speech more perceptible to user 100. Selective conditioning may also include adding one or more spaces or pauses within the audio signal. For example, the sound emanating object may include an individual saying a sentence and causing the conditioning of at least one audio signal includes adding at least one space between words in the sentence to make the sentence more intelligible. Accordingly, rather than hearing the spoken sentence at 1× speed, user 100 may hear the sentence at an increased speed (e.g., 1.1×, 1.5×, 2.0×, 2.5×, etc.) and the space between each word may be increased accordingly. Similarly, the spacing between sentences may be increased, giving user 100 more time to interpret or digest each sentence.

In some embodiments, hearing aid system 4700 may selectively condition the audio signals based on information about the identified sound emanating object retrieved from database 5020. For example, processor 4703 may receive an audio signal associated with sound 5120 from sound emanating object 5110. Based on the identification of sound emanating object 5110, processor 4703 may retrieve information about the sound emanating object from database 5020. For example, identifying the sound emanating object may include determining a type of the sound emanating object, and processor 4700 may further be programmed to cause selective conditioning of the audio signal based on the determined type of the at least one sound emanating object. In another embodiment, the retrieved information may be associated with a pre-existing relationship of user 100 with the sound emanating object, and the at least one processor may be further programmed to cause the selective conditioning of the at least one audio signal based on the pre-existing relationship. In some embodiments, the selective conditioning may also be performed based on a contextual situation associated with user 100. The contextual situation may be determined by analysis of one or more images captured from a camera device, such as wearable camera 4701. The conditioning of a sound emanating object determined through database 5020 may be different based on the context. As an illustrative example, if the sound emanating object is a crying baby, the selective conditioning may include amplifying the volume of the audio signal associated with the baby if user 100 is at home. Conversely, if hearing aid system 4700 determines user 100 is on an airplane, the selective conditioning may include muting the audio signal associated with the crying baby.

Where more than one sound emanating object is detected, hearing aid system 4700 may selectively condition sounds associated with the sound emanating objects relative to each other. In the example scenario shown in FIG. 51A, sound emanating objects 5110 and 5111 may comprise two individuals. Processor 4703 may be programmed to cause a first selective conditioning of audio signals associated with a first individual (e.g., sound emanating object 5110) based on retrieved information associated with the first individual, and cause a second selective conditioning different from the first selective conditioning of audio signals associated with second individual (e.g., sound emanating object 5111) based on retrieved information associated with the second individual. For example, the first individual may be difficult to understand and processor 4703 may increase the volume or vary the pitch of the audio signal associated with the first individual. Processor 4703 may determine that the audio signal associated with the second individual is of lesser importance (e.g., based on a relationship, importance level, etc.) and may decrease the volume associated with the second individual. As another example, processor 4703 may analyze a plurality of images to identify an individual (e.g., sound emanating object 5110) that is speaking and a sound emanating object that generates background noises (e.g., sound emanating object 5112). Processor 4703 may be configured to separate sounds generated by the individual from the background noises. Accordingly, causing selective conditioning of audio signals may include attenuating audio signals associated with the sound emanating object relative to the audio signals associated with the individual. For example, if the sound emanating object is a television, such as sound emanating object 5012, selective conditioning of audio signals may include reducing the volume of the television or muting it completely.

Figure 51B:
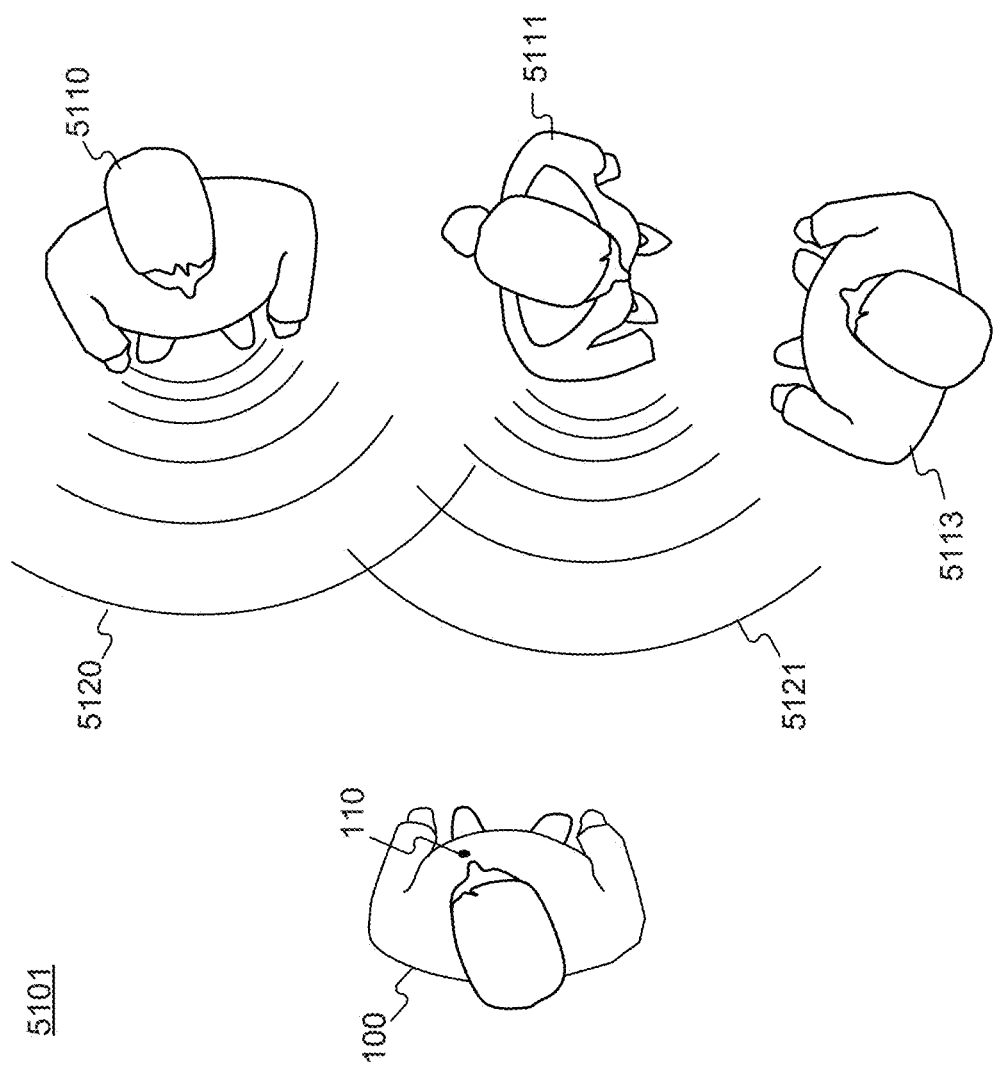

FIG. 51B is a schematic illustration showing another example environment 5101 for selectively conditioning audio signals consistent with the present disclosure. In this scenario user 100 may be wearing apparatus 110 and may be in the presence of sound emanating objects 5110 and 5111, which may be individuals, as described above. Environment 5101 may include a third sound emanating object 5113, which may also be an individual. Processor 4703 may be configured to selectively condition audio signals associated with sound emanating objects 5110, 5111, and 5113 based on the interactions between sound emanating objects 5110, 5111, and 5113 and/or user 100. In the scenario shown in FIG. 51B, processor 4703 may identify a first individual (e.g., sound emanating object 5110) talking to user 100 and a second individual (e.g., sound emanating object 5111) talking to a third individual (e.g., sound emanating object 5113). Accordingly, processor 4703 may amplify audio signals associated with the first individual and attenuate audio signals associated with the second individual. In another scenario, processor 4703 may identify a group of individuals listening to a specific individual and may be programmed to amplify audio signals from the specific individual.

As discussed above, database 5020 may include one or more voiceprints associated with a particular sound emanating object. Processor 4703 may include instructions to receive a reference voiceprint associated with a sound emanating object that has been identified based on the visual characteristics. Accordingly, processor 4703 may be configured to use the plurality of images and the reference voiceprint to identify the at least one sound emanating object and to cause the conditioning of at least one audio signal based on predefined settings associated with an identity of the at least one sound emanating object. The predefined settings may correspond to information stored in database 5020, including rules for selectively conditioning audio, a level of importance, a relationship with user 100, or various other parameters that may or may not be shown in FIG. 50B. For example, based on the voiceprint data, processor 4703 may determine that certain sounds (e.g., a siren, a baby crying, etc.) should be heard but may reduce the volume of background noises (e.g., an air conditioning unit, traffic, noise office mates, etc.). In some embodiments, processor 4703 may further use the voiceprints to separate audio signals associated with various sound emanating objects. For example, each sound emanating object is associated with a unique voiceprint and processor 4703 may use voiceprints of the sound emanating objects to separate sounds generated by a first sound emanating object and sounds generated by a second sound emanating object. Causing the conditioning of at least one audio signal may include attenuating audio signals associated with the second sound emanating object relative to the audio signals associated with the first sound emanating object.

Figure 52:
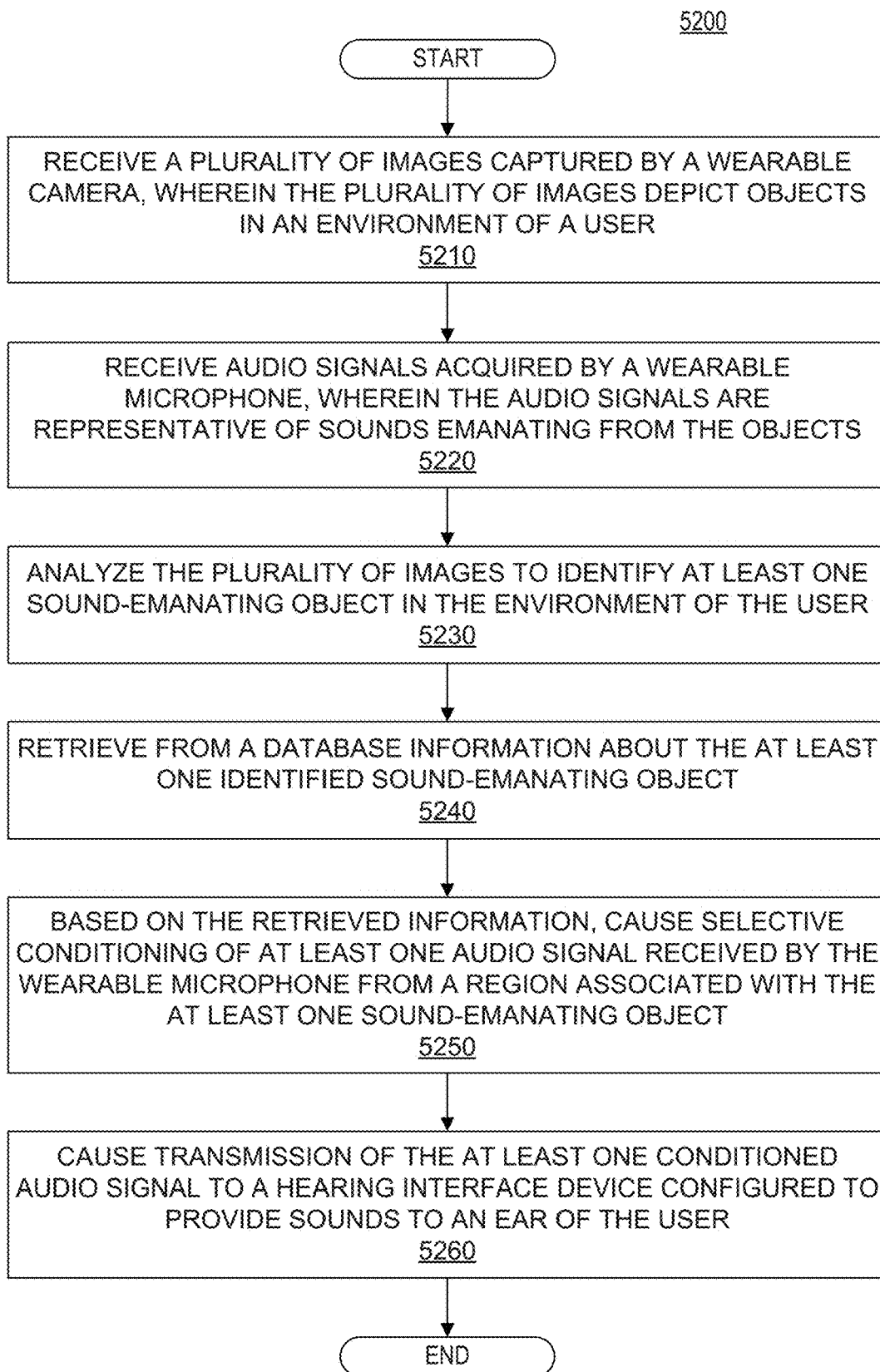
FIG. 52 is a flowchart showing an exemplary process for modifying sounds emanating from objects in an environment of a user consistent with the disclosed embodiments.

FIG. 52 is a flowchart showing an exemplary process 5200 for modifying sounds emanating from objects in an environment of a user consistent with the disclosed embodiments. Process 5200 may be performed by a hearing aid system (e.g., hearing aid system 4700), which may include at least one processor (e.g., processor 4703) programmed to perform the steps described below. Processor 4703 may correspond to one or more other processors described in detail above, including processors 210, 210a and/or 210b. Accordingly, process 5200 may be performed by a processor associated with a wearable camera device, such as apparatus 110. Some or all of process 5200 may be performed by processors associated with other components, such as computing device 120, server 250, and/or other devices. As described above, hearing aid system 4700 may access a database (e.g., database 5020), which may contain information for selectively conditioning audio for one or more sound emanating objects. The database may be internal to the hearing aid system (e.g., stored within memory 4704) or may be external (e.g., accessed via a network connection, a short-range wireless connection, etc.). The hearing aid system may further comprise at least one wearable camera (e.g., wearable camera 4701) and at least one wearable microphone (e.g., microphone 4702). In some embodiments, the wearable camera, the wearable microphone, and the at least one processor may be included in a common housing (e.g., in apparatus 110). In other embodiments, the wearable camera, the wearable microphone, and the at least one processor may be distributed among multiple housings. For example, the wearable camera and the wearable microphone are included in a first housing and the at least one processor is included in a second housing separate from the first housing.

In step 5210, process 5200 may include receiving a plurality of images captured by the wearable camera. For example, step 5210 may include receiving a plurality of images captured from the environment of the user (e.g., user 100) by the wearable camera. Accordingly, the plurality of images may depict objects in an environment of a user. The plurality of images may include a representation of a sound emanating object, such as sound emanating object 5110. In step 5220, process 5200 may include receiving audio signals acquired by the wearable microphone. The audio signals may be representative of sounds emanating from the objects depicted in the plurality of images received in step 5210. For example, processor 4703 may receive audio signals from microphone 4702 which may represent sound 5120 emanating from sound emanating object 5110.

In step 5230, process 5200 may include analyzing the plurality of images to identify at least one sound emanating object in the environment of the user. For example, processor 4703 may use one or more image recognition techniques to extract features from the image that are associated with sound emanating object 5110. In some instances, the at least one sound emanating object may include an individual and, accordingly, step 5230 may include performing a facial analysis or face recognition of an image of the individual. In some embodiments, identifying the at least one sound emanating object may include determining a type of the at least one sound emanating object. For example, processor 4703 may determine whether sound emanating object 5510 is a mechanical machine or device, a speaker, an individual, an animal, an inanimate object, a weather-related object, or the like.

In step 5240, process 5200 may include retrieving, from a database, information about the at least one sound emanating object. For example, processor 4703 may access database 5020 storing information about one or more sound emanating objects. The stored information may refer to a class of sound emanating objects (e.g., televisions), or may refer to a specific sound emanating object (e.g., a specific person, the user's phone, etc.). As described above in reference to FIG. 50B, database 5020 may store information including visual characteristics of the object, a name of the object, a type of object, a relationship of the object to the user, a level of importance of the object, voiceprint data associated with the object, a rule of audio conditioning for the object, or other information.

In step 5250, process 5200 may include causing, based on the retrieved information, selective conditioning of at least one audio signal received by the wearable microphone from a region associated with the at least one sound emanating object. The region may be determined using the various methods described above (e.g., as shown in FIG. 20A). For example, the region may be determined based on a determined direction of the sound emanating object based on analysis of one or more of the plurality of images or audio signals. The range may be associated with an angular width about the direction of the sound emanating object (e.g., 10 degrees, 20 degrees, 45 degrees, etc.).

Various forms of conditioning may be performed on the audio signal, as discussed above. In some embodiments, conditioning may include changing the tone or playback speed of an audio signal. For example, conditioning may include changing a rate of speech associated with the audio signal. As discussed above, the at least one sound emanating object may include an individual saying a sentence and causing the conditioning of at least one audio signal may include adding at least one space between words in the sentence to make the sentence more intelligible. In some embodiments, the conditioning may include amplification of the audio signal relative to other audio signals received from outside of the region associated with the recognized individual. Amplification may be performed by various means, such as operation of a directional microphone configured to focus on audio sounds emanating from the region, varying one or more parameters associated with the wearable microphone to cause the microphone to focus on audio sounds emanating from the region, modifying one or more properties of the audio signal, or the like. The amplification may include attenuating or suppressing one or more audio signals received by the microphone from directions outside the region. As discussed above, selective conditioning may depend on the preferences or hearing capabilities of the user. For example, the retrieved information (e.g., information received in step 5240) may include information indicative of the user's hearing capabilities and causing the conditioning of at least one audio signal may be based on the user's hearing capabilities.

In some embodiments, identifying the at least one sound emanating object (e.g., in step 5230) may include determining a type of the at least one sound emanating object, and the at least one processor may be further programmed to cause the selective conditioning of the at least one audio signal based on the determined type of the at least one sound emanating object. For example, the voice of an individual may be amplified whereas the sound from a television may be reduced or muted. In other embodiments, the retrieved information may be associated with a pre-existing relationship of the user with the at least one sound emanating object, and the at least one processor may further be programmed to cause the selective conditioning of the at least one audio signal based on the pre-existing relationship. For example, processor 4703 may recognize that a sound emanating object is a phone belonging to user 100 and may amplify audio signals associated with the phone belonging to user 100, but may not amplify (or may mute or attenuate) audio signals associated with other phones. Where the at least one sound emanating object includes a plurality of objects, processor 4703 may apply a hierarchy of amplification for audio signals associated with the objects. In such embodiments, the hierarchy of amplification may be based on the pre-existing relationships.

Consistent with the present disclosure, processor 4703 may selectively condition audio associated with one sound emanating object relative to other sound emanating objects. For example, the at least one sound emanating object may include a plurality of sound emanating objects, and process 5200 may further comprise using the plurality of images to identify different types of sound emanating objects and applying different conditioning for audio signals received by from different regions associated with different types of sound emanating objects. Similarly, process 5200 may further comprise analyzing the plurality of images to identify an individual that speaks and a sound emanating object that generates background noises, and separating sounds generated by the individual from background noises. Causing the conditioning of at least one audio signal may include attenuating audio signals associated with the sound emanating object that generates background noises relative to the audio signals associated with the individual. For example, the sound emanating object may be a television or a similar device and attenuating audio signals may include muting or reducing the volume of audio signals associated with the television.

In some embodiments, processor 4703 may be configured to selectively condition audio signals associated with a plurality of individuals in the environment of user 100. As discussed above, processor 4703 may be configured to apply different conditioning for different individuals based on the information in database 5020. For example, the at least one sound emanating object may include a plurality of individuals, and the at least one processor may further be programmed to cause a first selective conditioning of audio signals associated with a first individual based on retrieved information associated with the first individual and cause a second selective conditioning different from the first selective conditioning of audio signals associated with a second individual based on retrieved information associated with the second individual.

Processor 4703 may further selectively condition audio signals based on actions of the individuals. For example, the at least one sound emanating object may include a plurality of individuals and the at least one processor may further be programmed to identify in the plurality of images a first individual talking to the user and a second individual talking to a third individual. The at least one processor may amplify audio signals from the first individual and attenuate audio signals from the second individual. Accordingly, audio associated with the first individual, who is talking to the user, may be more easily perceptible than audio associated with the second individual. As another example, the at least one sound emanating object may include a plurality of individuals and the at least one processor may further be programmed to identify in the plurality of images a group of individuals listening to a specific individual and to amplify audio signals from the specific individual.

In some embodiments, processor 4703 may selectively condition audio signals based on a detected speaker. Processor 4703 may automatically switch between speakers based on another individual beginning to speak. For example, the plurality of sound emanating objects may include a plurality of individuals, and process 5200 may comprise using the plurality of images to determine that a first individual is talking; amplifying audio signals received from a region associated with the first individual; using the plurality of images to determine that a second individual is about to talk and amplify audio signals received from a region associated with the second individual instead of audio signals received from the region associated with the first individual. For example, processor 4703 may be configured to detect facial features of the second individual and may automatically switch to selectively condition audio signals associated with the second individual when they open their mouth, etc.

In some embodiments, processor 4703 may also determine and/or retrieve voiceprint data associated with sound emanating objects for the purposes of selectively conditioning audio associated with the sound emanating objects. For example, the retrieved information (e.g., information retrieved from database 5020 in step 5240) may include a reference voiceprint associated with the at least one sound emanating object. In some embodiments, process 5200 may further comprise using the plurality of images and the reference voiceprint to identify the at least one sound emanating object, separate the audio signal associated with the reference voiceprint, and cause the conditioning of the audio signal based on predefined settings associated with an identity of the at least one sound emanating object. For example, processor 4703 may amplify an audio signal associated with a close family member of user 100 but may attenuate or mute audio associated with other individuals, such as a noisy office mate. Database 5020 may store more than one voiceprint for each sound emanating object. For example, the at least one sound emanating object may include a plurality of individuals and the retrieved information may include a set of reference voiceprints for each individual. A first voiceprint of a specific individual may be associated with a scenario where the specific individual is standing next to the user, and a second voiceprint of the specific individual may be associated with a scenario where the specific individual is talking through a communication device. Accordingly, processor 4703 may selectively condition the voice of an individual regardless of whether they are standing next to the user or if they are talking on a speaker phone.

The voiceprint data may also be used to improve selective conditioning of audio signals. For example, process 5200 may further comprise analyzing the plurality of images to identify a plurality of sound emanating objects in the environment of the user, wherein each sound emanating object is associated with a unique voiceprint. Process 5200 may include using voiceprints of the plurality of sound emanating objects to separate sounds generated by a first sound emanating object and sounds generated by a second sound emanating object, and causing the conditioning of at least one audio signal may include attenuating audio signals associated with the second sound emanating object relative to the audio signals associated with the first sound emanating object.

As described above, selective conditioning may further be based on contextual information associated with user 100 or the at least one sound emanating object. For example, process 5200 may further comprise identifying, based on analysis of the plurality of images, a contextual situation associated with one or more of the plurality of images; retrieving, from the database, information associated with the contextual situation; and causing a first selective conditioning of audio signals from a specific object in response to a first detected contextual situation and cause a second selective conditioning, different from the first selective conditioning of audio signals from the specific object, in response to a second detected contextual situation.

In step 5260, process 5200 may comprise causing transmission of the at least one conditioned audio signal to a hearing interface device configured to provide sounds to an ear of the user. The conditioned audio signal, for example, may be transmitted to hearing interface device 1710, which may provide sound corresponding to the audio signal to user 100. Processor 4703 may be configured to transmit the conditioned audio signal in real time (or after a very short delay). For example, the at least one processor may be programmed to cause transmission of the at least one conditioned audio signal to the hearing interface device in less than 100 mSec (e.g, 10 mSec, 20 mSec, 30 mSec, 50 mSec, etc.) after the at least one audio signal was acquired by the wearable microphone. The processor performing process 1900 may further be configured to cause transmission to the hearing interface device of one or more audio signals representative of other sound emanating objects, which may also be conditioned. Accordingly, the hearing interface device may comprise a receiver configured to receive at least one audio signal. As discussed above, the at least one audio signal may have been acquired by a wearable microphone and may have been selectively conditioned by at least one processor configured to receive a plurality of images captured by a wearable camera, identify at least one sound emanating object in the plurality of images, and cause the conditioning based on retrieved information about the at least one sound emanating object. The hearing interface device may further comprise an electroacoustic transducer configured to provide sounds from the at least one audio signal to an ear of the user. The hearing aid device may also comprise other elements, such as those described above with respect to hearing interface device 1710. In some embodiments, the hearing interface device may include a bone conduction microphone, configured to provide an audio signal to user through vibrations of a bone of the user's head.

Such devices may be placed in contact with the exterior of the user's skin or may be implanted surgically and attached to the bone of the user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A hearing aid system comprising:
    at least one microphone configured to capture sounds from an environment of a user; and
    at least one processor programmed to:
        receive audio signals from the at least one microphone;
        detect, based on analysis of the audio signals, a first audio signal associated with a first time period, wherein the first audio signal is representative of a voice of a single individual;
        detect, based on analysis of the audio signals, a second audio signal associated with a second time period, wherein the second time period is different from the first time period, and wherein the second audio signal is representative of overlapping voices of two or more individuals;
        selectively condition the first audio signal and the second audio signal, wherein the selective conditioning of the first audio signal is different in at least one respect relative the selective conditioning of the second audio signal; and
        cause transmission of the conditioned first audio signal to a hearing interface device configured to provide sound to an ear of the user.

2. The system of claim 1, wherein the at least one processor is further programmed to cause transmission of the conditioned second audio signal to the hearing interface device configured to provide sound to an ear of the user.

3. The system of claim 1, wherein the selective conditioning of the first audio signal includes amplification of the first audio signal.

4. The system of claim 3, wherein the selective conditioning of the second audio signal includes amplification of the second audio signal, and wherein an amplification level associated with the second audio signal is less than an amplification level associated with the first audio signal.

5. The system of claim 3, wherein the selective conditioning of the second audio signal includes attenuation of the second audio signal.

6. The system of claim 1, wherein the selective conditioning of the first audio signal includes changing a tone associated with the first audio signal.

7. The system of claim 1, wherein the selective conditioning of the first audio signal includes changing a rate of speech associated with the first audio signal.

8. The system of claim 1, wherein the selective conditioning of the second audio signal includes foregoing transmission of the second audio signal to the hearing interface device configured to provide sound to an ear of the user.

9. The system of claim 1, wherein the at least one processor is further programmed to analyze a plurality of images captured by a wearable camera included in the system and identify in at least one of the plurality of images a representation of the single individual associated with the first audio signal.

10. The system of claim 9, wherein the analysis of the plurality of images is performed by a trained neural network.

11. The system of claim 9, wherein the wearable camera and the at least one microphone are included in a common housing.

12. The system of claim 11, wherein the at least one processor is included in the common housing.

13. The system of claim 12, wherein the at least one processor is included in a second housing separate from the common housing.

14. The system of claim 13, wherein the at least one processor is configured to receive the captured images via a wireless link between a transmitter in the common housing and receiver in the second housing.

15. The system of claim 14, wherein the second housing is associated with a paired mobile device.

16. The system of claim 1, wherein the at least one microphone includes a directional microphone.

17. The system of claim 1, wherein the at least one microphone includes a microphone array.

18. The system of claim 1, wherein the hearing interface device includes a speaker associated with an earpiece.

19. The system of claim 1, wherein the hearing interface device includes a bone conduction microphone.

20. The system of claim 1, wherein the at least one processor is further programmed to analyze a plurality of images captured by a wearable camera included in the system and identify the two or more individuals, wherein the selectively conditioning of the first audio signal and the second audio signal is based on information associated with an identity of at least one of the two or more individuals.

* * * * *